(12) United States Patent
Fan et al.

(10) Patent No.: US 12,497,392 B2
(45) Date of Patent: Dec. 16, 2025

(54) EP300/CBP INHIBITOR

(71) Applicant: HINOVA PHARMACEUTICALS INC., Sichuan (CN)

(72) Inventors: Lei Fan, Sichuan (CN); Fei Wang, Sichuan (CN); Xiaoquan Wu, Sichuan (CN); Kexin Xu, Sichuan (CN); Tongchuan Luo, Sichuan (CN); Shaohua Zhang, Sichuan (CN); Yongxu Huo, Sichuan (CN); Xinghai Li, Sichuan (CN); Yuanwei Chen, Sichuan (CN)

(73) Assignee: HINOVA PHARMACEUTICALS INC., Sichuan (CN)

( * ) Notice: Subject to any disclaimer, the term of this patent is extended or adjusted under 35 U.S.C. 154(b) by 771 days.

(21) Appl. No.: 17/754,240

(22) PCT Filed: Sep. 25, 2020

(86) PCT No.: PCT/CN2020/117839
§ 371 (c)(1),
(2) Date: Mar. 28, 2022

(87) PCT Pub. No.: WO2021/057915
PCT Pub. Date: Apr. 1, 2021

(65) Prior Publication Data
US 2023/0027088 A1   Jan. 26, 2023

(30) Foreign Application Priority Data
Sep. 27, 2019 (CN) .................. 201910925785.6

(51) Int. Cl.
| C07D 413/14 | (2006.01) |
| A61K 31/519 | (2006.01) |
| A61K 45/06 | (2006.01) |
| C07D 401/04 | (2006.01) |
| C07D 401/14 | (2006.01) |
| C07D 413/04 | (2006.01) |

(52) U.S. Cl.
CPC .......... *C07D 413/14* (2013.01); *A61K 31/519* (2013.01); *A61K 45/06* (2013.01); *C07D 401/04* (2013.01); *C07D 401/14* (2013.01); *C07D 413/04* (2013.01)

(58) Field of Classification Search
CPC .. C07D 413/14; C07D 401/04; C07D 401/14; C07D 413/04; A61K 31/519; A61K 45/06
See application file for complete search history.

(56) References Cited

FOREIGN PATENT DOCUMENTS

| CN | 107750251 A | 3/2018 | |
| CN | 109476641 A | 3/2019 | |
| CN | 110036002 A | 7/2019 | |
| CN | 110049983 A | * 7/2019 | ........... A61K 31/422 |
| CN | 112351982 A | 2/2021 | |
| CN | 110036002 B | * 8/2022 | ......... A61K 31/4184 |
| WO | 2005121132 A1 | 12/2005 | |
| WO | WO-2018073586 A1 | * 4/2018 | ........... A61K 31/422 |

OTHER PUBLICATIONS

Laurence "The pKBHX Database: Toward a Better Understanding of Hydrogen-Bond Basicity for MedicinalChemist" J. Med. Chem. 2009 52, 4073-4086 (Year: 2009).*
Liu "Mechanisms of the CDK4/6 inhibitor palbociclib (PD 0332991) and its future application in cancer treatment (Review)" Oncology Reports 2018 39 901-911 (Year: 2018).*
Mcshane et al "Updates on managing advanced breast cancer with palbociclib combination therapy" Ther Adv Med Oncol 2018 10 1-17 (Year: 2018).*
English translation of CN110036002B (Year: 2017).*
Hay, Duncan A. et al., "Discovery and Optimization of Small-Molecule Ligands for the CBP/p300 Bromodomains", Journal of the American Chemical Society, Jun. 19, 2014, vol. 136, No. 26, pp. 9308-9319.
R. B. Silverman et al., "The Organic Chemistry of Drug Design and Drug Action", first edition, Jan. 2008, pp. 20-21, Chemical Industry Press Co., Ltd.
Wang, Shizhen; "Stable Drugs for Radionuclide Therapy(Non-official translation)"; Molecular Nuclear Medicine; Apr. 30, 2004; pp. 417-418.

* cited by examiner

*Primary Examiner* — Renee Claytor
(74) *Attorney, Agent, or Firm* — NKL Law; Allen Xue

(57) ABSTRACT

An EP300/CBP inhibitor, specifically provided is a compound as shown in formula I, or a deuterated product thereof, or a salt thereof, or a conformational isomer thereof, or a crystal form thereof, or a solvate thereof. The compound is highly selective for EP300/CBP, and can effectively inhibit the activity of EP300/CBP; in addition, the compound has an excellent inhibitory effect on various tumor cells including prostate cancer cells, leukemia cells, breast cancer cells and multiple myeloma cells. The compound has broad application prospects in the preparation of an EP300/CBP inhibitor, and drugs for preventing and/or treating tumors, myeloid hematopoietic stem/progenitor cells malignant disease, and regulating regulatory T cells.

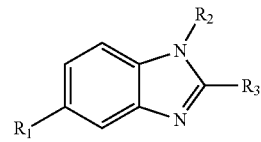

Formula I

18 Claims, No Drawings

EP300/CBP INHIBITOR

TECHNICAL FIELD

The present invention belongs to the field of drug synthesis, and in particular relates to an EP300/CBP inhibitor with novel structure and its pharmaceutical application.

BACKGROUND TECHNOLOGY

Histone acetyltransferase (HAT) and histone deacetylase (HDAC) can affect the acetylation of histones. The recruitment and normal functioning of HAT and HDAC are key regulatory steps in gene expression and cell cycle, and functional defects in these enzymes may lead to a variety of diseases, including tumors.

The EP300/CBP family, composed of highly homologous adenovirus EIA-associated 300 kDa protein (EP300) and CAMP response element binding protein (CREB) binding protein (CBP), is one of the major members of the histone acetyltransferase (HAT) family. It has been found that EP300 and CBP can bind to chromatin through their bromodomain (BRD) and participate in cell cycle progression and in cell growth, differentiation and development. As a class of very important coactivators, they can regulate the function of a variety of key transcriptional regulators. It has been shown that EP300/CBP is highly expressed and activated in many tumors, and closely related to various tumor diseases. Thus, EP300/CBP becomes a promising tumor therapeutic target, and EP300/CBP inhibitors have attracted more and more attention.

Zhou's team and Hewings's team disclosed representative EP300/CBP inhibitors of following formulas 1a, 2a and 3a, with the affinity of up to micromolar level, where against CBP, 1a has a Kd value of 19.6 $\mu mol \cdot L^{-1}$, and 2a has a Kd value of 19 $\mu mol \cdot L^{-1}$, while 3a has an $IC_{50}$ value of 28.1 $\mu mol \cdot L^{-1}$.

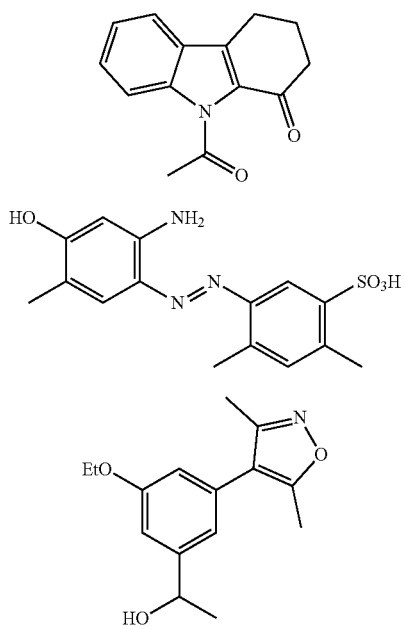

Researchers from the Structural Genomics Consortium (SGC) of the University of Oxford first designed and synthesized a benzimidazole compound 9a, but compound 9a was not highly selective for CBP and BRD4 (CBP: $IC_{50}=4$ $\mu mol \cdot L^{-1}$, BRD4: $IC_{50}=6.3$ $\mu mol \cdot L^{-1}$). Then, compounds 10a (CBP: $IC_{50}=0.12$ $\mu mol \cdot L^{-1}$, BRD4: $IC_{50}=2.4$ $\mu mol \cdot L^{-1}$) and 11a (SGC-CBP30, CBP: $IC_{50}=69$ $nmol \cdot L^{-1}$, Kd=21 $nmol \cdot L^{-1}$, p300: Kd=32 $nmol \cdot L^{-1}$) was obtained by further optimization.

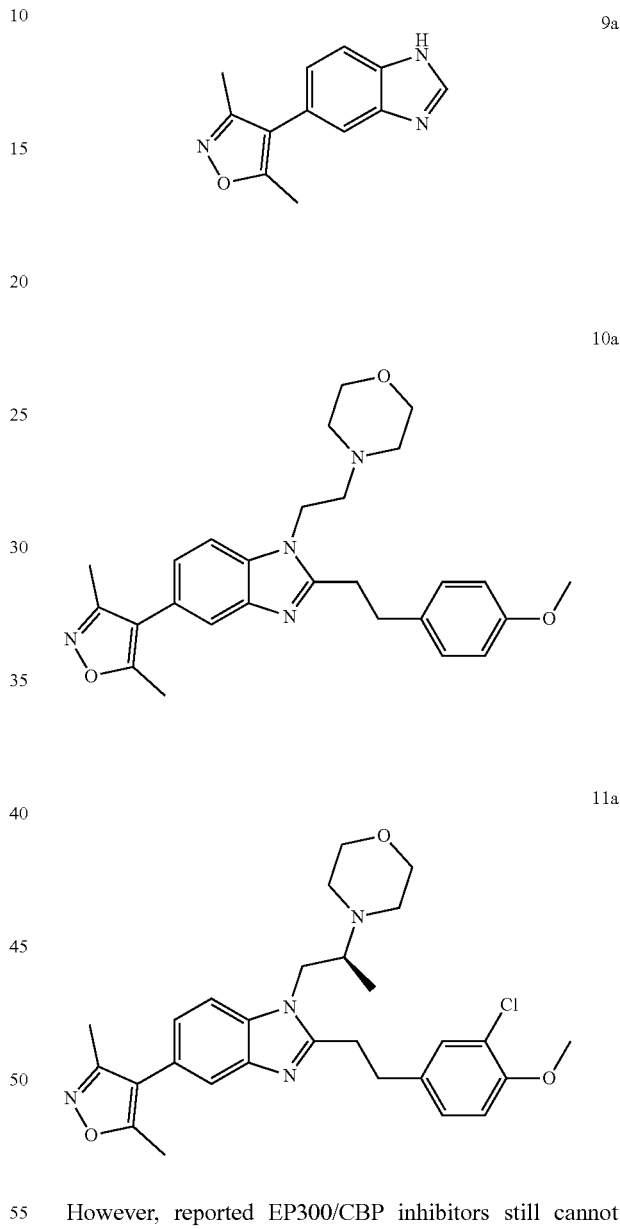

However, reported EP300/CBP inhibitors still cannot meet the clinical needs. Therefore, it is of great significance to develop more EP300/CBP inhibitors with novel structure, higher selectivity and better inhibitory activity.

CONTENT OF THE INVENTION

The object of the present invention is to provide a highly active EP300/CBP inhibitor with a novel structure.

The present invention provides a compound of formula I, or a deuterated product thereof, or a salt thereof, or a conformational isomer thereof, or a crystal form thereof, or a solvate thereof:

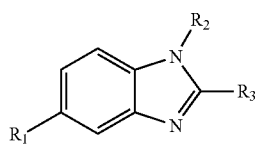

Formula I wherein, $R_1$ is selected from the group consisting of 5-6 membered saturated or unsaturated cycloalkyl and 5-6 membered saturated or unsaturated heterocyclic group, in which said cycloalkyl and said heterocyclic group are each optionally substituted with 0-4 $R_7$ substitutent. Each $R_7$ is independently selected from the group consisting of $C_{1-5}$ alkyl or a deuterated derivative thereof, =O, $C_{1-5}$ alkoxy or a deuterated derivative thereof, halogen, hydroxyl and cyano;

$R_2$ is selected from the group consisting of 5-6 membered saturated cycloalkyl and 5-6 membered saturated heterocyclic group, in which said cycloalkyl and said heterocyclic group are each optionally substituted with 0-4 $R_5$. Each $R_5$ is independently selected from the group consisting of $C_{1-5}$ alkyl or a deuterated derivative thereof, $C_{1-5}$haloalkyl, =O, $C_{1-5}$ alkoxy or a deuterated derivative thereof, halogen, hydroxyl, cyano, and

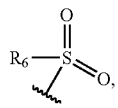

in which $R_6$ is $C_{1-5}$ alkyl;

$R_3$ is selected from the group consisting of 3-7 membered saturated or unsaturated cycloalkyl and 3-7 membered saturated or unsaturated heterocyclic group, in which said cycloalkyl and said heterocyclic group are each optionally substituted with 0-4 $R_4$. Each $R_4$ is independently selected from the group consisting of =O, =S, $SO_2$, cyano, $C_{1-5}$ alkyl or a deuterated derivative thereof, $C_{1-5}$ alkoxy or a deuterated derivative thereof, hydroxyl, halogen and

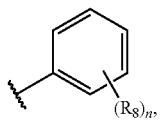

or two $R_4$ are linked to form a 3-4 membered ring; wherein $R_8$ is selected from $C_1$-3 alkyl or halogen, and n is an integer of 0-4.

Further, $R_1$ is selected from the group consisting of 5-6 membered saturated or unsaturated cycloalkyl and 5-6 membered saturated or unsaturated heterocyclic group, in which said cycloalkyl and said heterocyclic group are each optionally substituted with 1-3 $R_7$, and the heteroatom in said heterocyclic group is selected from O, N and S; each $R_7$ is independently selected from the group consisting of $C_{1-3}$ alkyl or a deuterated derivative thereof, and =O;

$R_2$ is selected from the group consisting of 5-6 membered saturated cycloalkyl and 5-6 membered saturated heterocyclic group, in which said cycloalkyl and said heterocyclic group are each optionally substituted with 1-3 $R_5$, and the heteroatom in said heterocyclic group is selected from O, N and S; each $R_5$ is independently selected from the group consisting of $C_{1-3}$ alkyl or a deuterated derivative thereof, $C_{1-5}$haloalkyl, =O, $C_{1-3}$ alkoxy or a deuterated derivative thereof, halogen, hydroxyl, cyano, and

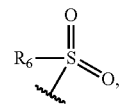

in which $R_6$ is $C_{1-3}$ alkyl;

$R_3$ is selected from the group consisting of 3-7 membered saturated or unsaturated cycloalkyl and 3-7 membered saturated or unsaturated heterocyclic group, in which said cycloalkyl and said heterocyclic group are each optionally substituted with 0-4 $R_4$, and the heteroatom in said heterocyclic group is selected from one or more of O, S and N; each $R_4$ is independently selected from the group consisting of =O, =S, $SO_2$, cyano, $C_{1-3}$ alkyl or a deuterated derivative thereof, $C_{1-3}$ alkoxy or a deuterated derivative thereof, hydroxyl, halogen and

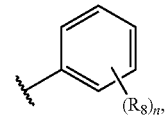

or two $R_4$ are linked to form a 3-4-membered saturated carbocycle or a 3-4-membered saturated heterocycle; wherein $R_8$ is a halogen, and n is an integer of 1-3.

Further, said compound has the structure of formula II-1:

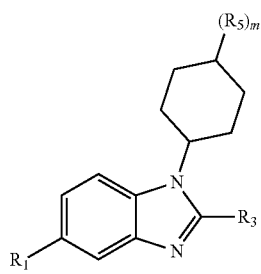

Formula II-I $R_5$ is selected from the group consisting of $C_{1-3}$ alkyl or a deuterated derivative thereof, $C_{1-5}$haloalkyl, $C_{1-3}$ alkoxy or a deuterated derivative thereof, halogen, hydroxyl; m is 1 or 2;

$R_1$ and $R_3$ are as described above;

or, said compound has the structure of formula II-2:

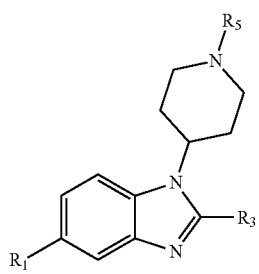

Formula II-2

$R_5$ is selected from the group consisting of $C_{1-3}$ alkyl or a deuterated derivative thereof, $C_{1-5}$ haloalkyl, $C_{1-3}$ alkoxy or a deuterated derivative thereof, halogen, hydroxyl, and

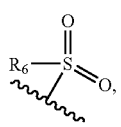

in which $R_6$ is $C_{1-3}$ alkyl;
$R_1$ and $R_3$ are as described above;
or, said compound has the structure of formula II-3:

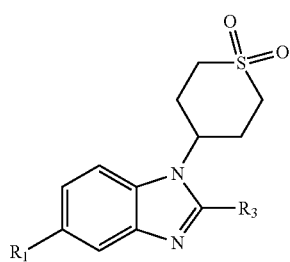

Formula II-3

$R_5$ is selected from the group consisting of $C_{1-3}$ alkyl or a deuterated derivative thereof, $C_{1-5}$ haloalkyl, $C_{1-3}$ alkoxy or a deuterated derivative thereof, halogen, hydroxyl, and

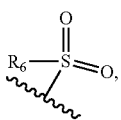

in which $R_6$ is $C_{1-3}$ alkyl;
$R_1$ and $R_3$ are as described above;

or, said compound has the structure of formula II-4:

Formula II-4

$R_1$ and $R_3$ are as described above.
Further, $R_1$ is selected from the group consisting of

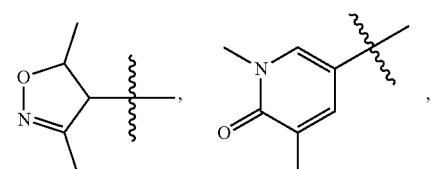

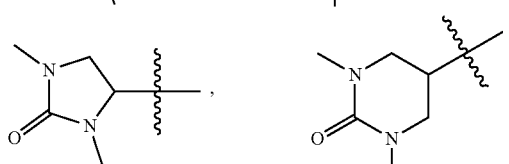

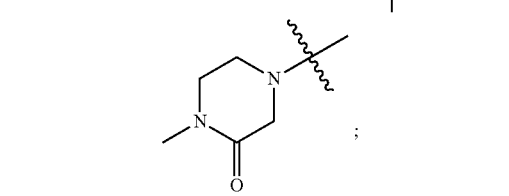

;

and/or, $R_3$ is selected from the group consisting of

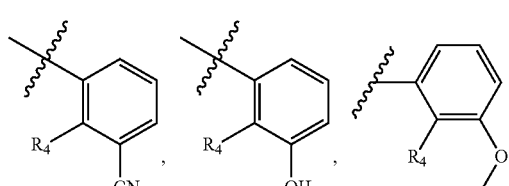

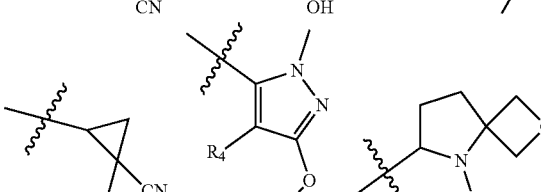

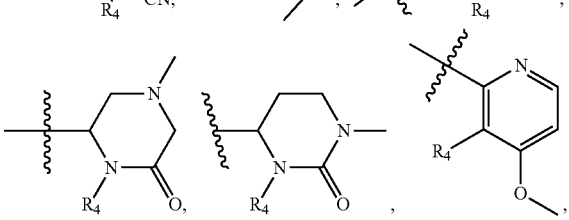

-continued
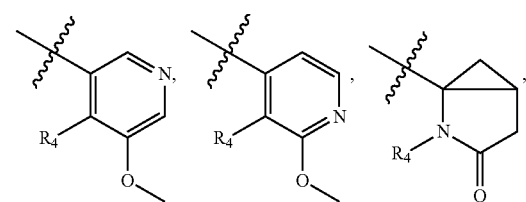
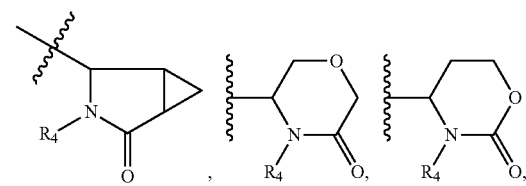
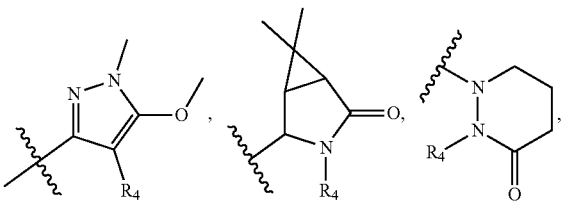
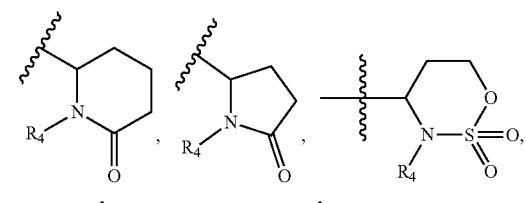
in which R$_4$ is selected from the group consisting of
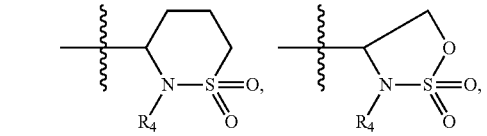
-continued
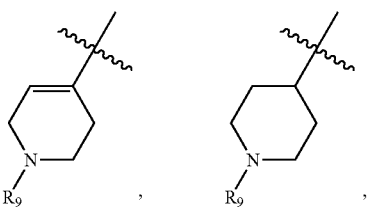
wherein R$_9$ is selected from the group consisting of alkyl or haloalkyl.
Further, said compound is selected from the group consisting of the following compounds:
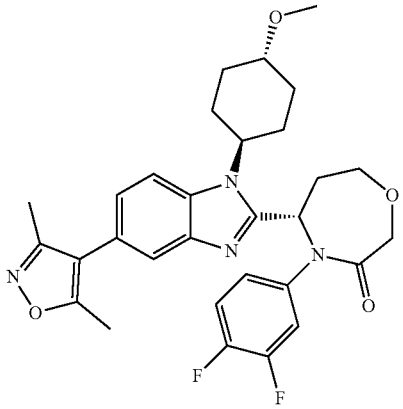
106
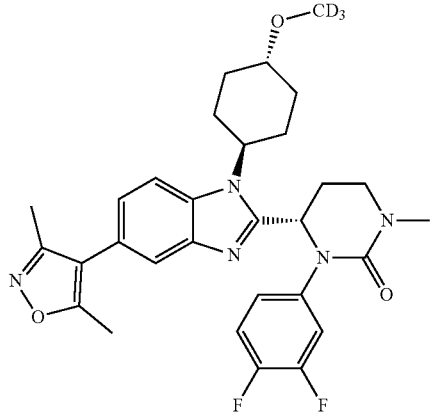
108
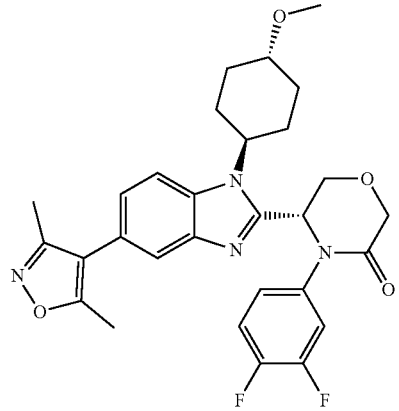
111

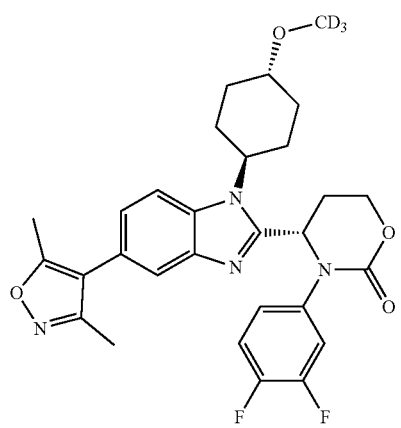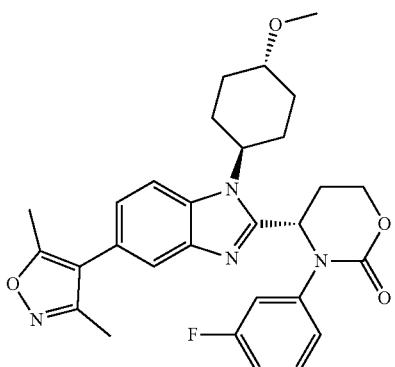

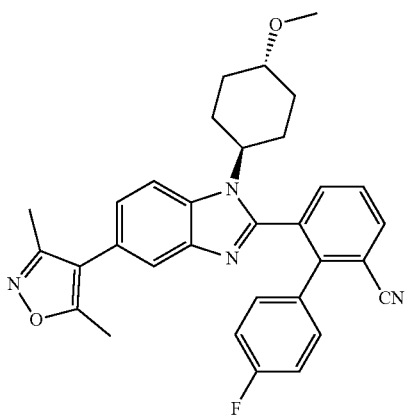

140

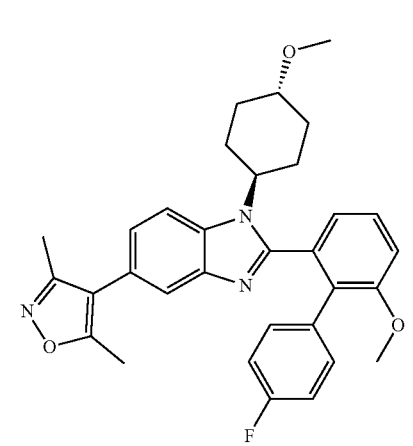

141

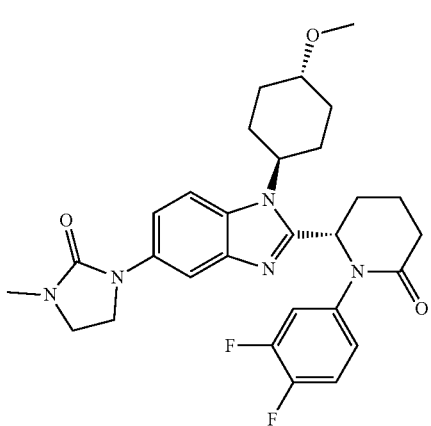

155

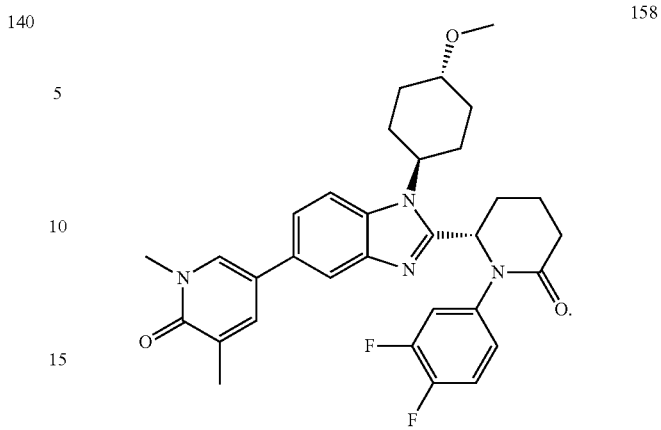

158

The present invention also provides a compound of formula I', or a deuterated product thereof, or a salt thereof, or a conformational isomer thereof, or a crystal form thereof, or a solvate thereof:

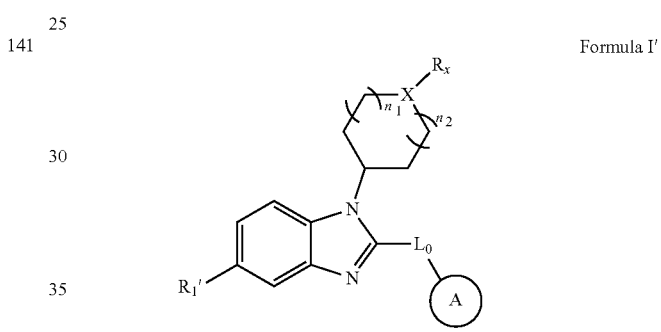

Formula I' wherein $R_1'$ is selected from the following substituted or unsubstituted groups: 5-6-membered saturated or unsaturated cycloalkyl, 5-6-membered saturated or unsaturated heterocyclic group, $C_{1-5}$ alkyl, $C_{2-6}$ alkenyl, amino, acylamino, carboxylate group, ureido, halogen, hydroxyl and cyano; wherein $R_1'$ is substituted with one or more substituents, and each substituent is independently selected from the group consisting of deuterium, deuterated or non-deuterated $C_{1-4}$ alkyl, deuterated or non-deuterated $C_{1-4}$ alkoxy, cycloalkyl, heterocyclyl, $CONR_{2a}R_{2b}$, $COOR_{2c}$, $COR_{2d}$, $COL_1NR_{2f}R_{2g}$, $SO_2R_{2e}$, $=O$ and $=S$; each of $R_{2a}$, $R_{2b}$, $R_{2c}$, $R_{2d}$, $R_{2e}$, $R_{2f}$ and $R_{2g}$ is independently selected from halogenated or non-halogenated $C_{1-4}$ alkyl, and $L_1$ is selected from none or $C_{1-2}$ alkylene;

$L_0$ is selected from none or $C_{1-2}$ alkylene;

Ring A is selected from 5-7-membered saturated or unsaturated cycloalkyl and 5-7-membered saturated or unsaturated heterocyclic group, which are substituted with zero, one or more $R_3'$; wherein each $R_3'$ is independently selected from the group consisting of deuterium, $=O$, $=S$, $C_{1-4}$ alkyl, $C_{1-4}$ alkoxy, cyano, aryl substituted with 0-4 $R_{3a}$, heteroaryl substituted with 0-4 $R_{3a}$, or two $R_3'$ are linked to form a ring; each $R_{3a}$ is independently selected from the group consisting of halogen, amino-protecting group, $C_{1-4}$ alkyl, $C_{1-4}$ alkoxy and cyano;

$n_1$ is selected from an integer of 0-2, and $n_2$ is selected from an integer of 0-2;

X is selected from the group consisting of CH, N, O or S;

$R_x$ is selected from the group consisting of none, hydrogen, deuterium, deuterated or non-deuterated $C_{1-4}$ alkyl, deuterated or non-deuterated $C_{1-4}$ alkoxy, $COR_{x1}$; wherein $R_{x1}$ is deuterated or non-deuterated $C_{1-3}$ alkyl.

Further, said compound has the structure of formula II':

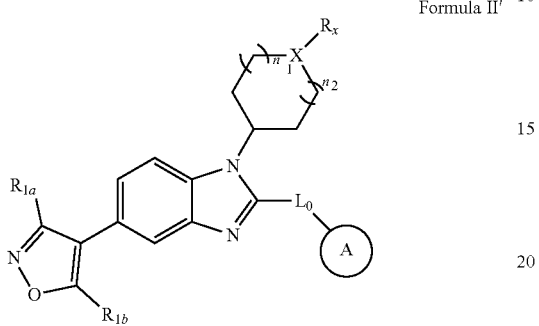

Formula II' wherein each of $R_{1a}$ and $R_{1b}$ is independently selected from the group consisting of hydrogen, deuterium, deuterated or non-deuterated $C_{1-3}$ alkyl, deuterated or non-deuterated $C_{1-3}$ alkoxy;

$L_0$ is selected from none or methylene;

Ring A is selected from 5-7-membered saturated or unsaturated cycloalkyl and 5-7-membered saturated or unsaturated heterocyclic group, which are substituted with zero, one or more $R_3'$; wherein each $R_3'$ is independently selected from the group consisting of deuterium, =O, =S, $C_{1-4}$ alkyl, $C_{1-4}$ alkoxy, cyano, aryl substituted with 0-4 $R_{3a}$, heteroaryl substituted with 0-4 $R_{3a}$, or two $R_3'$ are linked to form a ring; each $R_{3a}$ is independently selected from the group consisting of halogen, amino-protecting group, $C_{1-4}$ alkyl, $C_{1-4}$ alkoxy and cyano;

$n_1$ is 0 or 1, and $n_2$ is 0 or 1;

X is selected from the group consisting of CH, N, O or S;

$R_x$ is selected from the group consisting of none, hydrogen, deuterium, deuterated or non-deuterated $C_{1-3}$ alkyl, deuterated or non-deuterated $C_{1-3}$ alkoxy, $COR_{x1}$; wherein $R_{x1}$ is deuterated or non-deuterated $C_{1-2}$ alkyl.

Said salt is a pharmaceutically acceptable salt.

Further, said compound has the structure of formula III-1 or formula III-2:

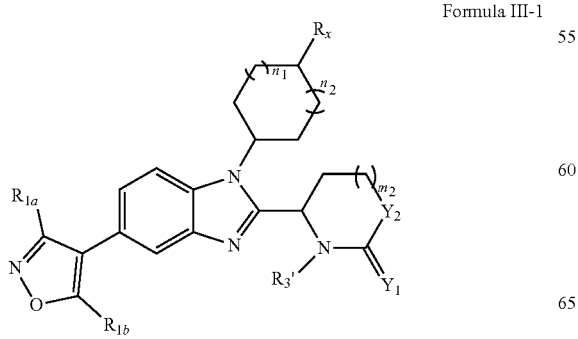

Formula III-1

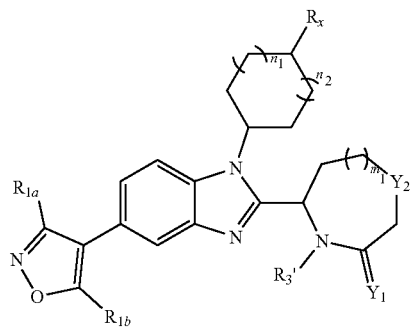

Formula III-2 wherein each of $R_{1a}$ and $R_{1b}$ is independently selected from the group consisting of hydrogen, deuterium, deuterated or non-deuterated $C_{1-3}$ alkyl, and deuterated or non-deuterated $C_{1-3}$ alkoxy;

$n_1$ is 0 or 1, and preferably 1; $n_2$ is 0 or 1, and preferably 1;

$m_1$ is 0 or 1; $m_2$ is 0 or 1, and preferably 1;

$Y_1$ is O or S;

$Y_2$ is selected from the group consisting of O, S, $CR_{Y1}R_{Y2}$, $NR_{Y3}$, each of $R_{Y1}$, $R_{Y2}$ and $R_{Y3}$ is independently selected from the group consisting of hydrogen, deuterium, $C_{1-3}$ alkyl, and $C_{1-3}$ alkoxy;

$R_x$ is selected from the group consisting of hydrogen, deuterium, deuterated or non-deuterated $C_{1-2}$ alkyl, deuterated or non-deuterated $C_{1-2}$ alkoxy, $COR_{x1}$, wherein $R_{x1}$ is deuterated or non-deuterated $C_{1-2}$ alkyl;

$R_3'$ is selected from phenyl or heteroaryl, which is substituted with 0-3 $R_{3a}$; preferably, $R_3'$ is a phenyl substituted with 2-3 $R_{3a}$; wherein $R_{3a}$ is halogen, and said halogen is preferably fluorine, chlorine or bromine.

Further, said compound has the structure of formula III-3:

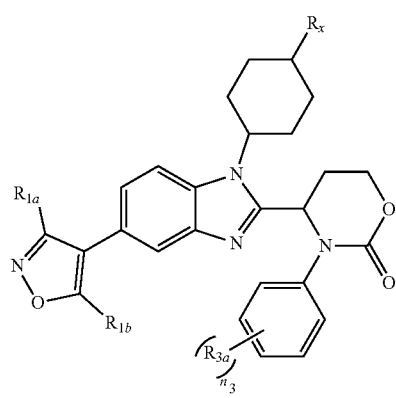

Formula III-3 wherein each of $R_{1a}$ and $R_{1b}$ is independently selected from the group consisting of hydrogen, deuterium, deuterated or non-deuterated $C_{1-3}$ alkyl, and deuterated or non-deuterated $C_{1-3}$ alkoxy;

$R_x$ is selected from the group consisting of hydrogen, deuterium, deuterated or non-deuterated $C_{1-2}$ alkyl, deuterated or non-deuterated $C_{1-2}$ alkoxy;

$n_3$ is 2 or 3, and preferably 2;

$R_{3a}$ is halogen, and said halogen is preferably fluorine, chlorine or bromine.

Further, said compound has the structure of formula IV:

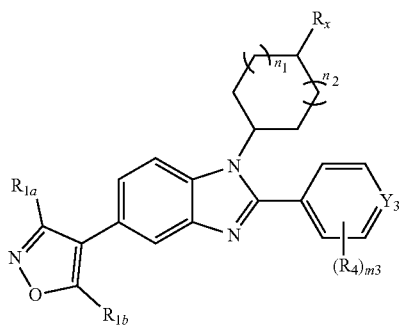

Formula IV wherein each of $R_{1a}$ and $R_{1b}$ is independently selected from the group consisting of hydrogen, deuterium, deuterated or non-deuterated $C_{1-3}$ alkyl, and deuterated or non-deuterated $C_{1-3}$ alkoxy;

$n_1$ is 0 or 1, and preferably 1; $n_2$ is 0 or 1, and preferably 1;

$R_x$ is selected from the group consisting of none, hydrogen, deuterium, deuterated or non-deuterated $C_{1-3}$ alkyl, deuterated or non-deuterated $C_{1-3}$ alkoxy, and $COR_{x1}$; wherein $R_{x1}$ is deuterated or non-deuterated $C_{1-2}$ alkyl;

$Y_3$ is CH or N;

$m_3$ is selected from an integer of 0 to 3, and is preferably 2 or 3;

each $R_4$ is independently selected from the group consisting of cyano, $C_{1-3}$ alkyl, $C_{1-3}$ alkoxy, and substituted or unsubstituted phenyl; the substituent in said phenyl is selected from the group consisting of halogen, $C_{1-3}$ alkyl or $C_{1-3}$ alkoxy.

Further, said compound is selected from the group consisting of the following compounds:

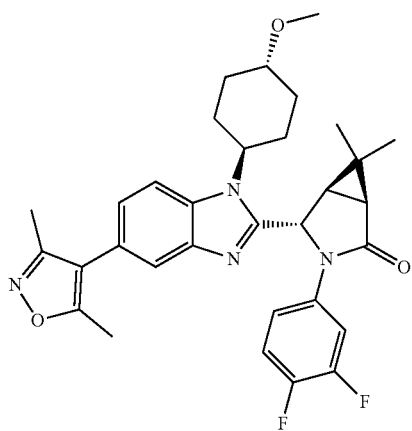

100

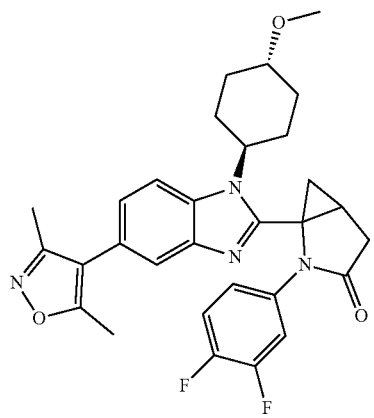

101

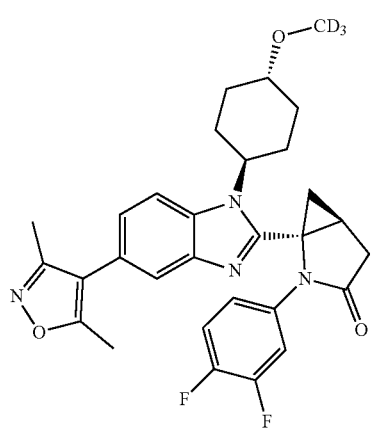

102

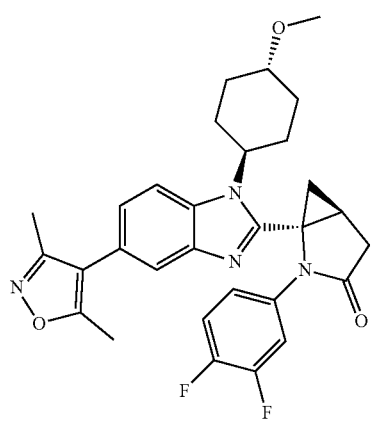

103

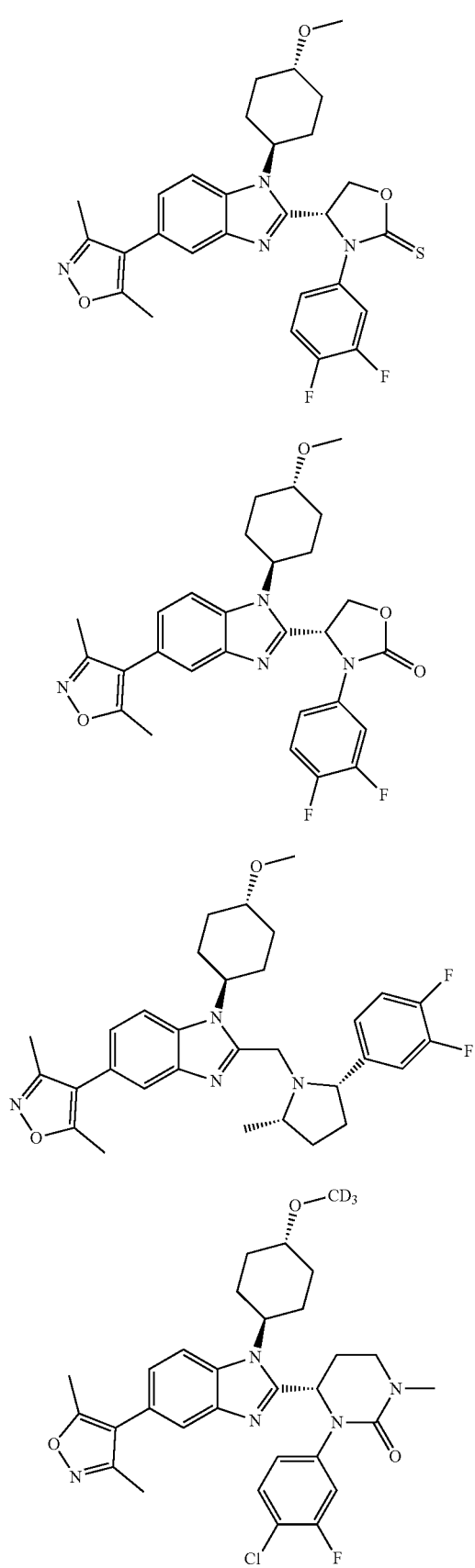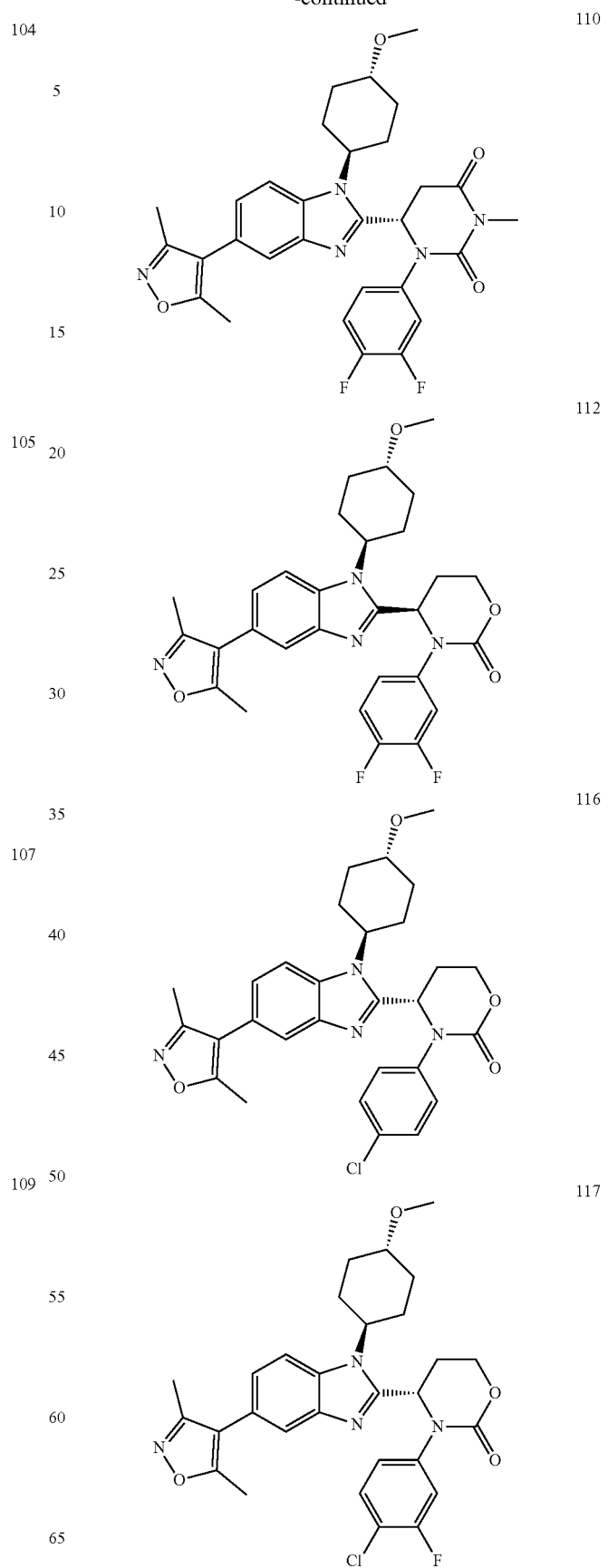

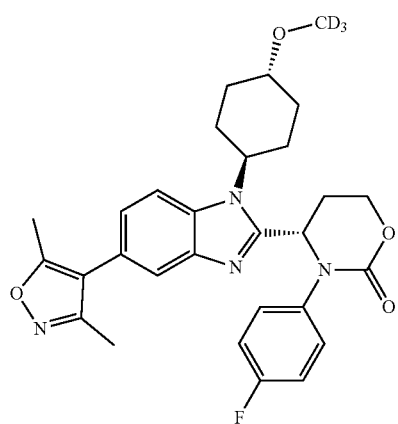
119
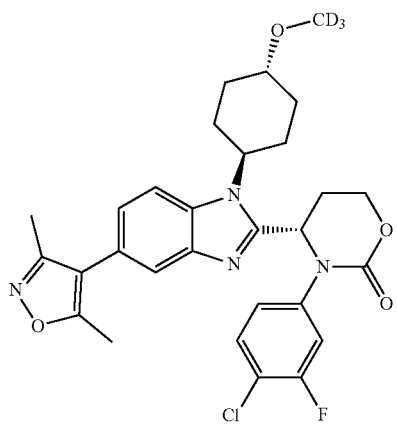
122
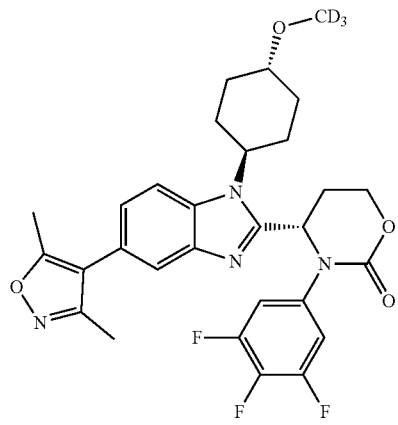
120
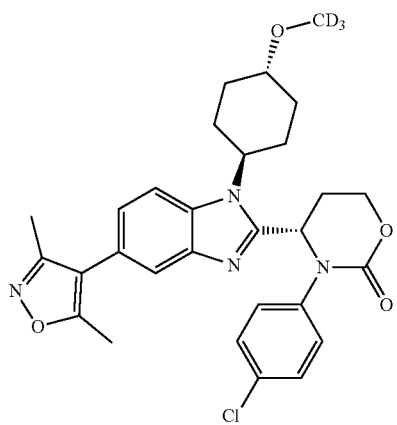
123
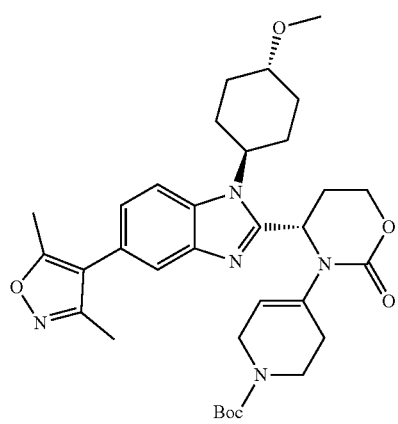
121
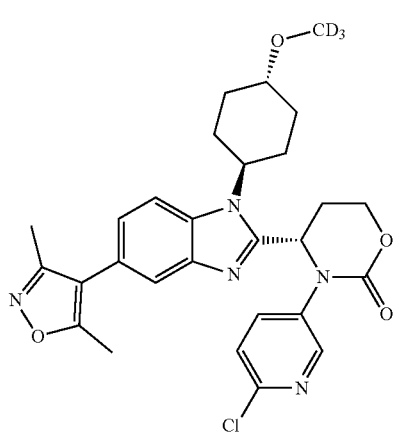
124

126
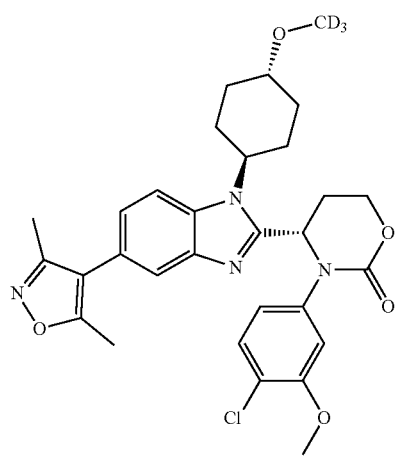
127
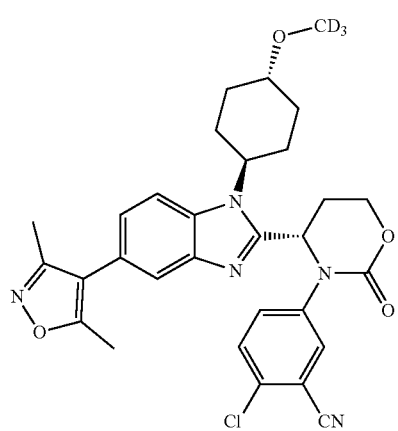
128
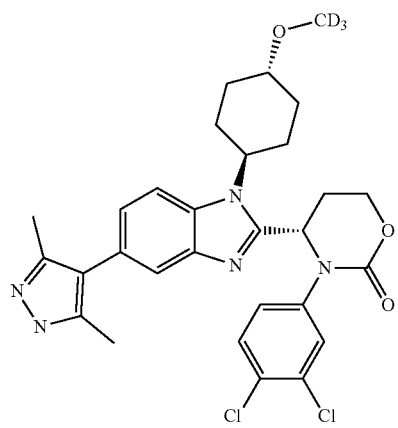
129
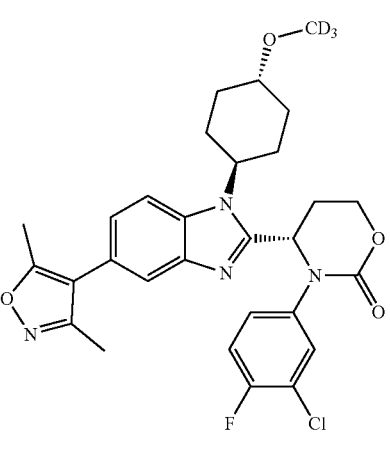
130
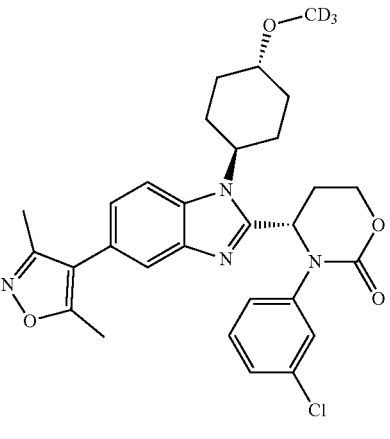
131
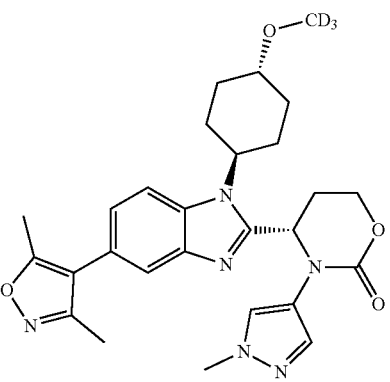

132
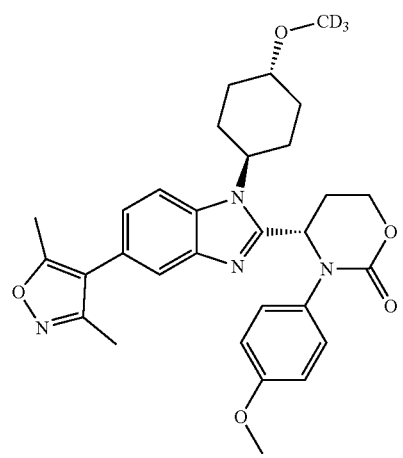
133
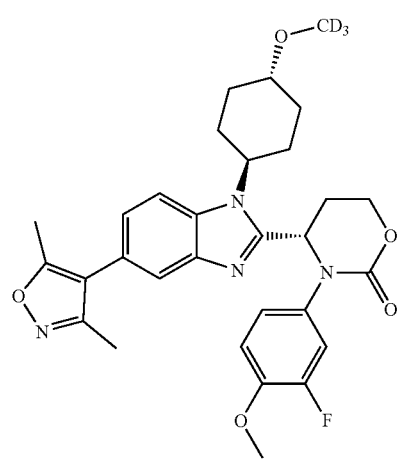
134
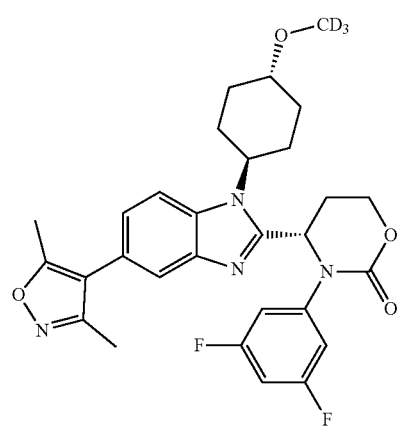
135
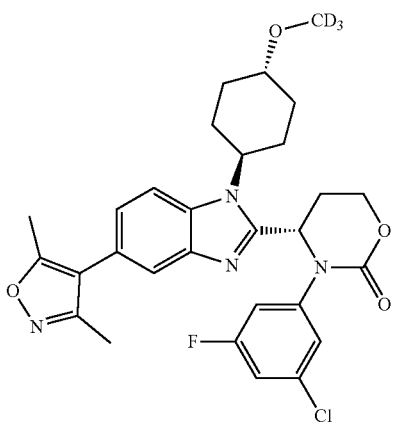
136
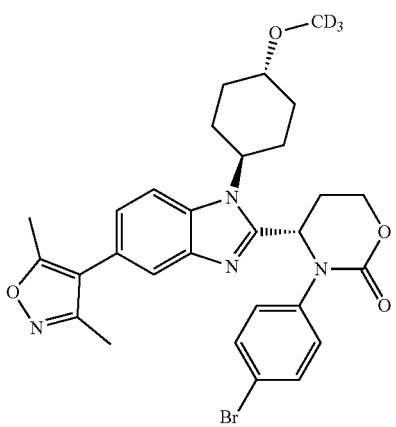
137
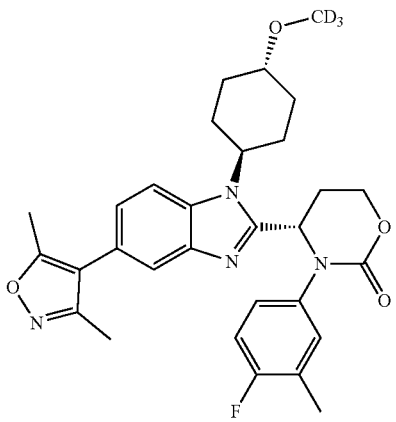
142
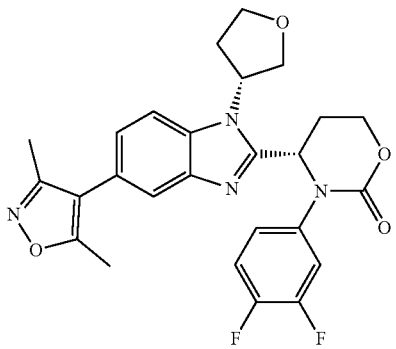

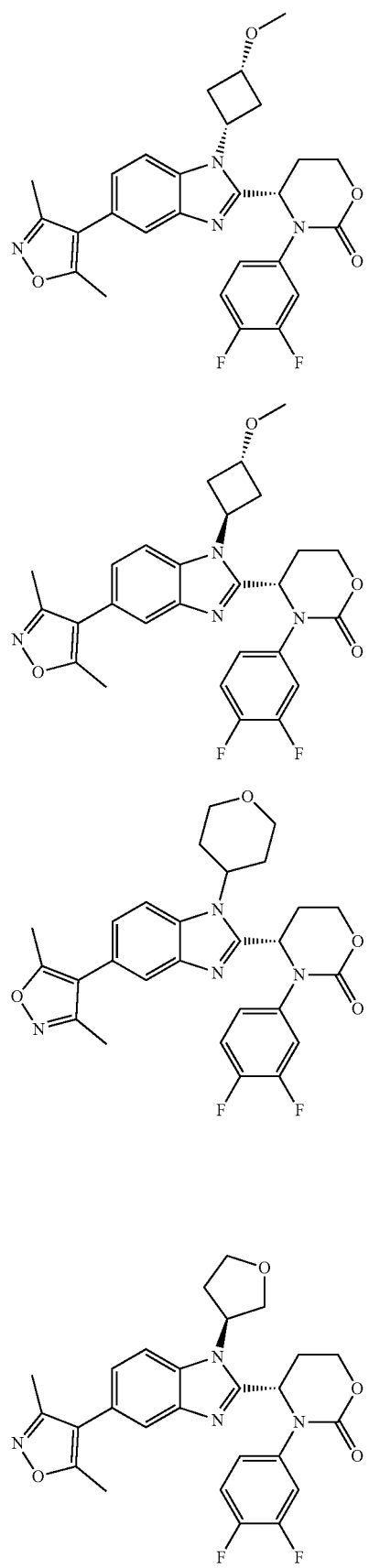
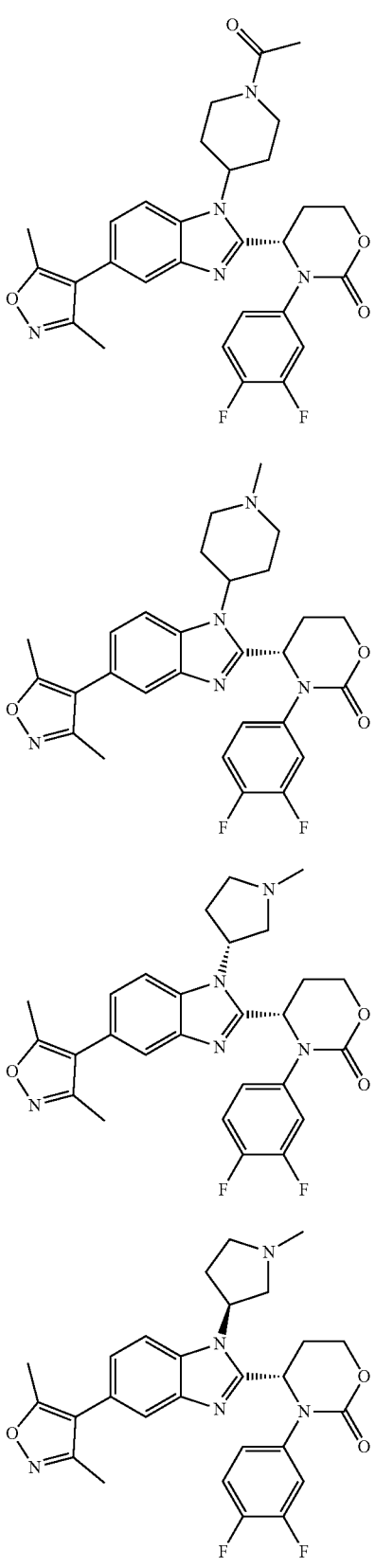

| 151 | 156 |
|---|---|
| 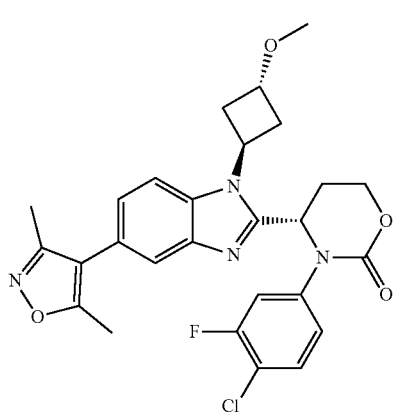 | 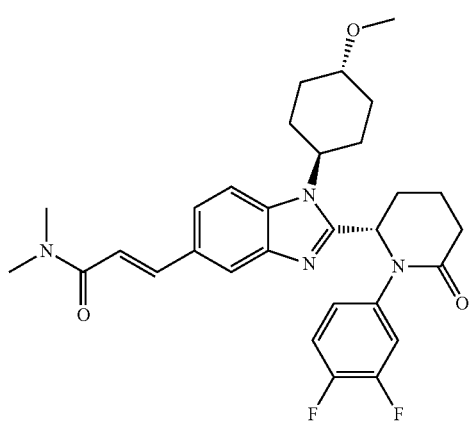 |
| 152 | 157 |
|---|---|
| 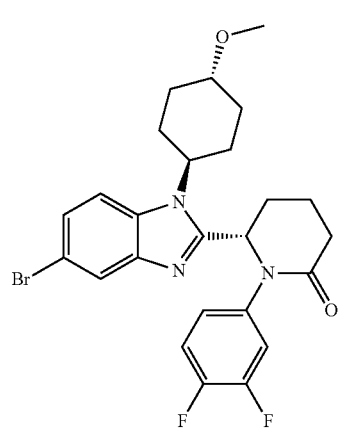 | 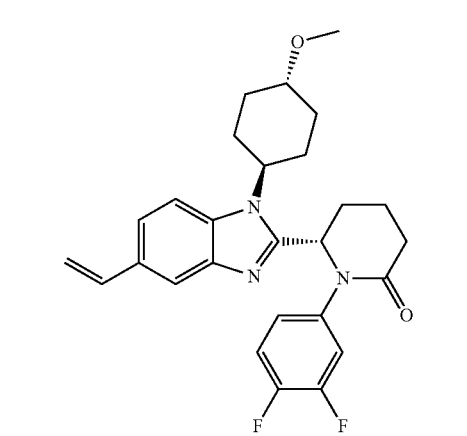 |
| 153 | 159 |
|---|---|
| 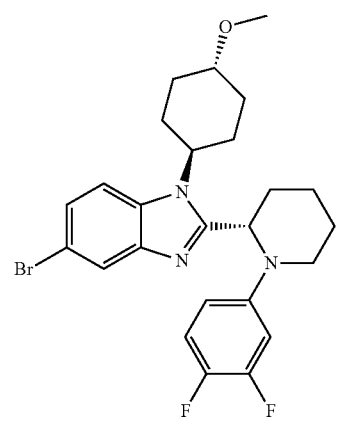 | 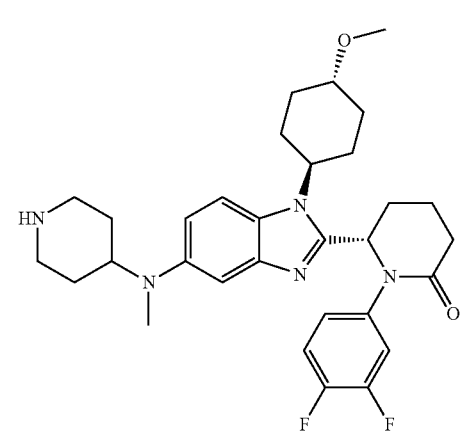 |
| 154 | 160 |
|---|---|
| 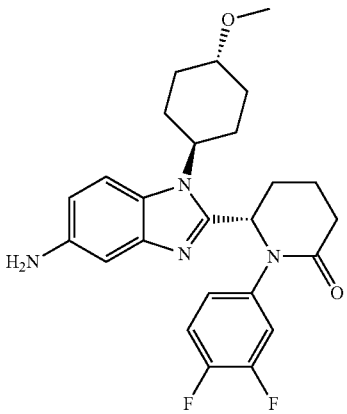 | 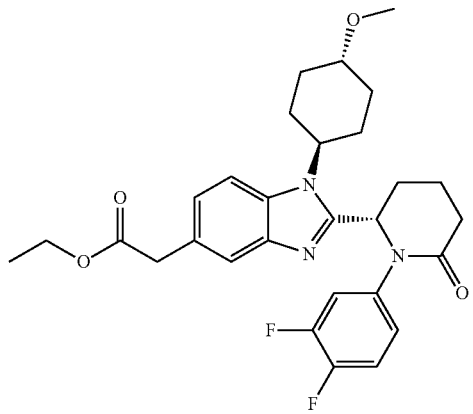 |

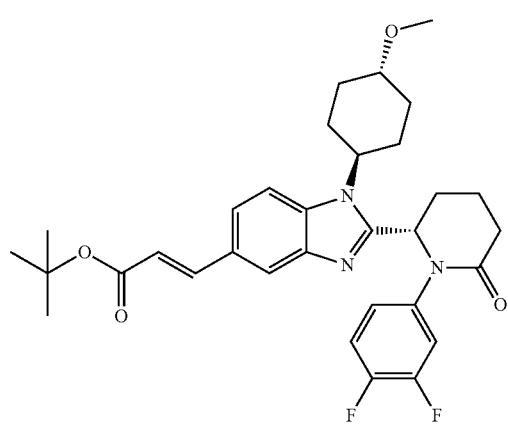
161
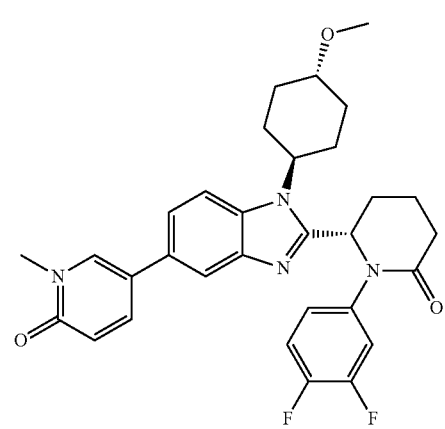
162
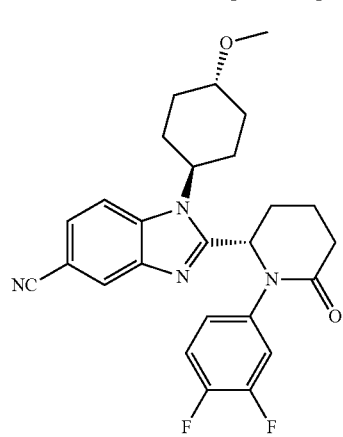
163
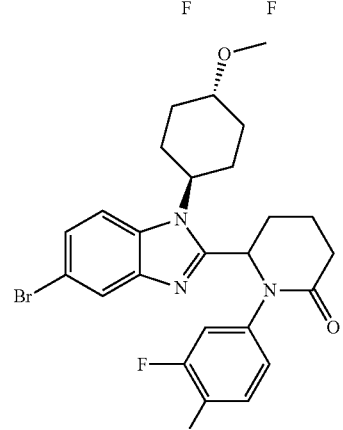
164
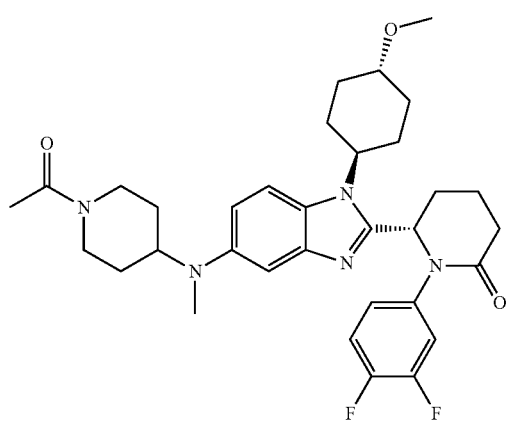
165
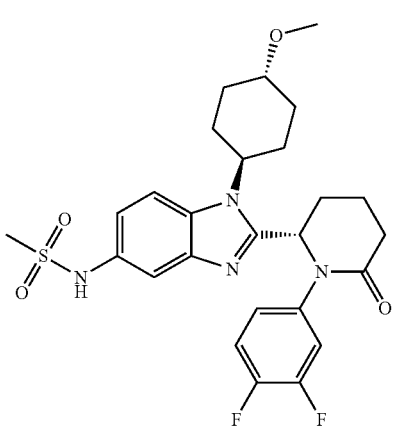
166
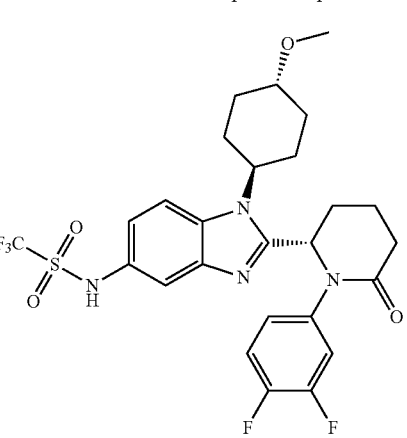
167
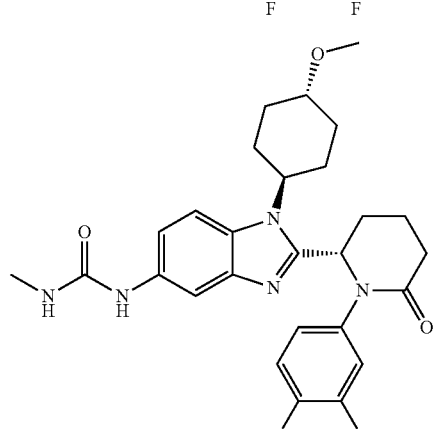
168

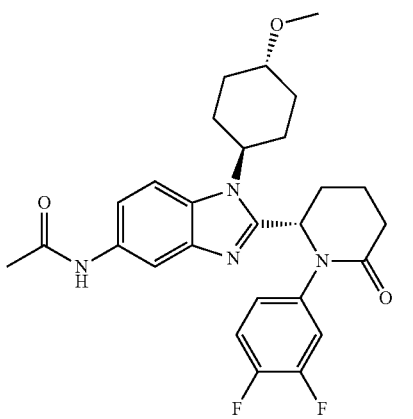

169

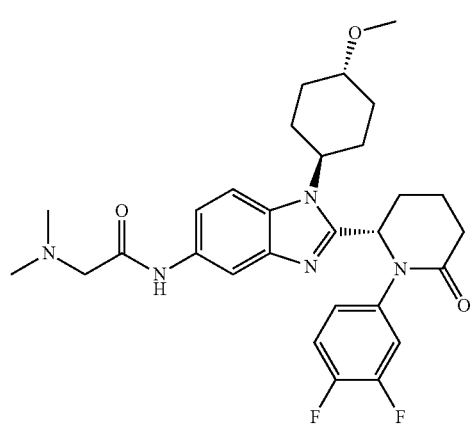

170

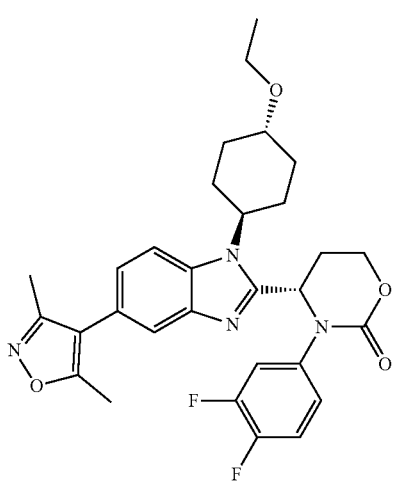

171

172

The present invention also provides the use of the compound mentioned above, or a deuterated product thereof, or a salt thereof, or a conformational isomer thereof, or a crystal form thereof, or a solvate thereof in the preparation of EP300 inhibitors, CBP inhibitors or EP300/CBP inhibitors. Further, said EP300/CBP inhibitor is a medicament for preventing and/or treating tumors and myeloid hematopoietic stem/progenitor cells malignant diseases, and regulating regulatory T cells;

preferably, said tumor is selected from the group consisting of hematological malignancy, gastric cancer, intestinal cancer, cervical cancer, bladder cancer, laryngeal cancer, liver cancer, lung cancer, breast cancer, ovarian cancer, prostate cancer, lymphoma or multiple myeloma; said myeloid hematopoietic stem/progenitor cell malignant disease is leukemia;

more preferably, said lymphoma is non-Hodgkin's lymphoma and diffuse large B-cell lymphoma; said leukemia is acute myeloid leukemia.

The present invention also provides a medicament for the treatment of diseases, which is a preparation containing an active ingredient that is a compound mentioned above, or a deuterated product thereof, or a salt thereof, or a conformational isomer thereof, or a crystal form thereof, or a solvate thereof, and pharmaceutically acceptable excipients.

The present invention also provides a pharmaceutical composition, which contains a same or different dosage unit of a compound mentioned above, or a deuterated product thereof, or a salt thereof, or a conformational isomer thereof, or a crystal form thereof, or a solvate thereof, and other medicaments having antitumor effects for simultaneous or separate administration, and pharmaceutically acceptable carriers.

Further, said other medicament having anti-tumor effects is a chemotherapeutic drug or a radiotherapeutic drug, and preferably, the chemotherapeutic drug is a targeted medicine.

Further, said other medicament having anti-tumor effects is selected from one or more of CDK4/6 inhibitors, PARP inhibitors, androgen receptor inhibitors, and immune checkpoint inhibitors, said CDK4/6 inhibitor is preferably palbociclib.

For the definition of the term used in the present invention: unless otherwise specified, the initial definition provided for the group or the term herein is applicable to those in the whole specification; for terms not specifically defined herein, according to the disclosure content and the context, the term should have the meaning commonly given by those skilled in the field. "EP300/CBP inhibitor" refers to an inhibitor capable of inhibiting the activities of both EP300 and CBP. "EP300" means "P300", and "EP300/CBP inhibitor" means "P300/CBP inhibitor".

The minimum and the maximum for the content of carbon atoms in hydrocarbon groups are represented by prefixes, such as the prefix $C_{a-b}$ alkyl indicates any alkyl having "a" to "b" carbon atoms. For example, $C_{1-5}$ alkyl means a straight or branched alkyl having 1-5 carbon atoms.

Similarly, $C_{1-5}$ alkoxy means a straight or branched alkoxy having 1-5 carbon atoms.

Herein, "substitution" means that one, two or more hydrogens in a molecule are substituted by other different atoms or molecules, including one, two or more substitutions on the same or different atoms in the molecule.

"Cycloalkyl" refers to a saturated or unsaturated cyclic hydrocarbon substituents; cyclic hydrocarbon can have one or more rings. For example, "5-6-membered saturated or unsaturated cycloalkyl" denotes a saturated or unsaturated cycloalkyl having 5-6 carbons.

"Heterocyclic group" denotes a saturated or unsaturated cyclic hydrocarbon substituent; the cyclic hydrocarbon may be monocyclic or polycyclic, and carry at least one ring heteroatom (including but not limited to O, S or N). For example, "5-6 membered saturated or unsaturated heterocyclic group" denotes a saturated or unsaturated heterocyclic group having 5-6 carbons.

"Aromatic ring" refers to all-carbon monocyclic or fused polycyclic rings (i.e., rings sharing adjacent carbon pairs) with conjugated n electron system, such as benzene and naphthene. Said aromatic ring can be fused to other cyclic groups (including saturated and unsaturated rings), but can not contain hetero atoms such as N, O or S. At the same time, the point connecting with the parent must be on the carbon in the ring having the conjugated a electron system. "aryl" may be substituted or unsubstituted.

"Heteroaryl" means a heteroaromatic group containing one or more heteroatoms. The heteroatoms as used herein include O, S and N. For example, furyl, thienyl, pyridyl, pyrazolyl, pyrrolyl, N-alkylpyrrolyl, pyrimidyl, pyrazinyl, imidazolyl, tetrazolyl, etc. The heteroaromatic ring may be fused with an aryl, a heterocyclyl or a cycloalkyl, in which the ring connected to the parent structure is a heteroaryl ring. Heteroaryl may be substituted or unsubstituted.

"Pharmaceutically acceptable" means that certain carrier, vehicle, diluent, excipient and/or formed salt is usually chemically or physically compatible with other ingredients constituting certain pharmaceutical dosage form, as well as physiologically compatible with the recipient.

"Salt" means an acid and/or basic salt that is formed by reaction of compound or its stereoisomer with inorganic and/or organic acid and/or base, and also includes zwitterionic salts (inner salts), and further includes quaternary ammonium salts, such as alkylammonium salt. These salts can be directly obtained during the final isolation and purification of a compound. The salts can also be obtained by mixing the compound or its stereoisomers with a certain amount of acid or base appropriately (for example, in equivalent). These salts may form a precipitate in the solution, and be collected by filtration, or recovered after evaporation of the solvent, or obtained by freeze-drying after reaction in an aqueous medium.

In the present invention, the salt may be compounds' hydrochloride, sulfate, citrate, benzenesulfonate, hydrobromide, hydrofluoride, phosphate, acetate, propionate, succinate, oxalate, malate, succinate, fumarate, maleate, tartrate or trifluoroacetate.

"A solvate thereof" means a solvate formed by the compound of the present invention and a solvent, wherein the solvent includes (but is not limited to) water, ethanol, methanol, isopropanol, propanediol, tetrahydrofuran, and dichloromethane.

"A deuterated product" refers to the compound obtained by substituting one or more hydrogens in a compound of the present invention with deuteriums.

For the compound of formula I' of the present invention, "$L_0$ is selected from none or $C_{1-2}$ alkylene" means that $L_0$ is none or $C_{1-2}$ alkylene; wherein, when $L_0$ is none, the compound of formula I' has the following structure:

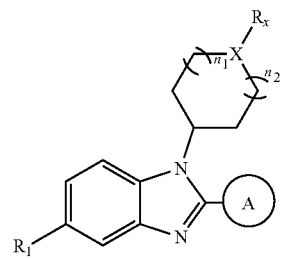

The experimental results indicated that the compound of the present invention has a high selectivity for EP300/CBP, and can effectively inhibit the activity of EP300/CBP; in addition, the compound of the present invention has an excellent inhibitory effect on various tumor cells including prostate cancer cells, leukemia cells, breast cancer cells and multiple myeloma cells. Thus, the compound of the present invention has broad application prospects in the preparation of an EP300/CBP inhibitor, and drugs for preventing and/or treating tumors, myeloid hematopoietic stem/progenitor cell malignant diseases, and regulating regulatory T cells.

The compound of the present invention can also be used in combination with other anti-tumor drugs (such as CDK4/6 inhibitors), to prepare a pharmaceutical composition for preventing and/or treating tumors, and has a very good application prospect.

Obviously, based on the above content of the present invention, according to the common technical knowledge and the conventional means in the field, without department from the above basic technical spirits, other various modifications, alternations, or changes can further be made.

By following specific examples of said embodiments, the above content of the present invention is further illustrated. But it should not be construed that the scope of the above subject matter of the present invention is limited to the following examples. The techniques realized based on the above content of the present invention are all within the scope of the present invention.

EXAMPLES

The starting materials and equipments used in the present invention were known products, which were commercially available.

The Following was the Synthetic Ways of Intermediate Compounds:

1. Synthesis of Intermediate 4-bromo-N-((trans)-4-methoxycyclohexyl)-2-nitroaniline (Intermediate 1)

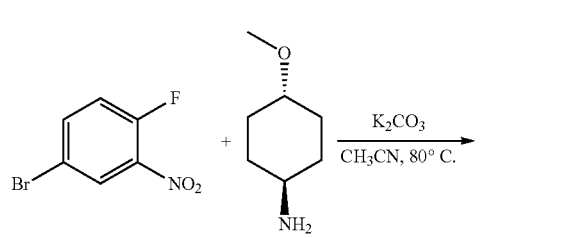

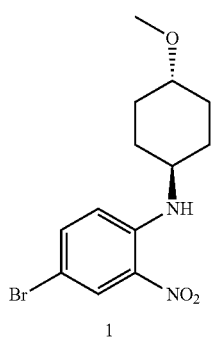

4-Bromo-1-fluoro-2-nitrobenzene (3.38 g, 15.4 mmol), (trans)-4-methoxycyclohexyl-1-amine (2 g, 15.4 mmol) and potassium carbonate (5.34 g, 38.6 mmol) were dissolved in acetonitrile (50 mL), and then the solution was heated to 80° C. and stirred for 5 h. Then, the solution was cooled, to which was added 200 mL of water. The resultant solution was filtered, and the filter cake was rinsed with water. The filter cake was purified by column chromatography to obtain 4.5 g of solid (intermediate 1), with a yield of 88.9%.

2. Synthesis of Intermediate 4-bromo-N1-((trans)-4-methoxycyclohexyl) benzene-1,2-diamine (Intermediate 2)

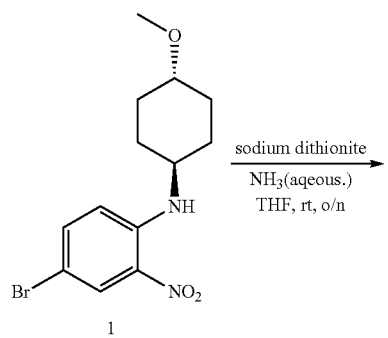

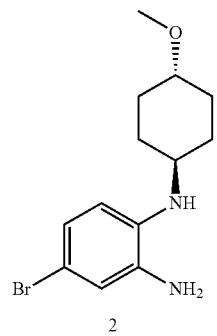

Intermediate 1 (4.5 g, 13.7 mmol) and ammonia (10 mL) were dissolved in 150 mL of tetrahydrofuran and 150 mL of water, to which was added sodium dithionite (38 g, 185 mmol), and then the solution was stirred overnight at room temperature. Then, the solution was allowed to stand for separation of layers, and the organic layer was separated. The aqueous layer was extracted with ethyl acetate. The organic layers were combined, dried over anhydrous sodium sulfate, and then concentrated. The residue was separated by column chromatography to provide 3.5 g of solid (intermediate 2), with a yield of 85.6%.

3. Synthesis of Intermediate 4-(3,5-dimethylisoxazol-4-yl)-N1-((trans)-4-methoxycyclohexyl)benzene-1,2-diamine (Intermediate 3)

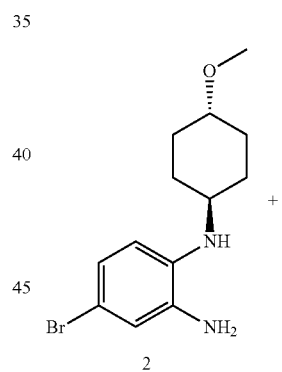

37
-continued

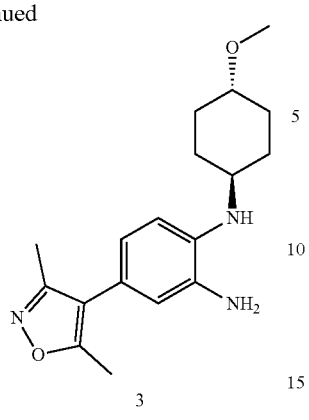
3

Intermediate 2 (3.5 g, 11.7 mmol), 3,5-dimethyl-4-(4,4,5,5-tetramethyl-1,3,2-dioxaborolan-2-yl)isoxazole (2.87 g, 12.8 mmol), [1,1'-bis(diphenylphosphino)ferrocene]dichloropalladium (IT) (80 mg, 0.12 mmol), and potassium carbonate (3.23 g, 23.4 mmol) were dissolved in 60 mL of dioxane and 10 mL of water, and then the system was purged with nitrogen three times and stirred at 100° C. for 10 h. The solution was cooled, and then extracted with ethyl acetate three times. The organic layer was dried over anhydrous sodium sulfate and then concentrated. The residue was purified by column chromatography to obtain 2.5 g of solid (intermediate 3), with a yield of 68%.

4. Synthesis of Intermediate 4-bromo-N-((trans)-4-hydroxycyclohexyl)-2-nitroaniline (Intermediate 4)

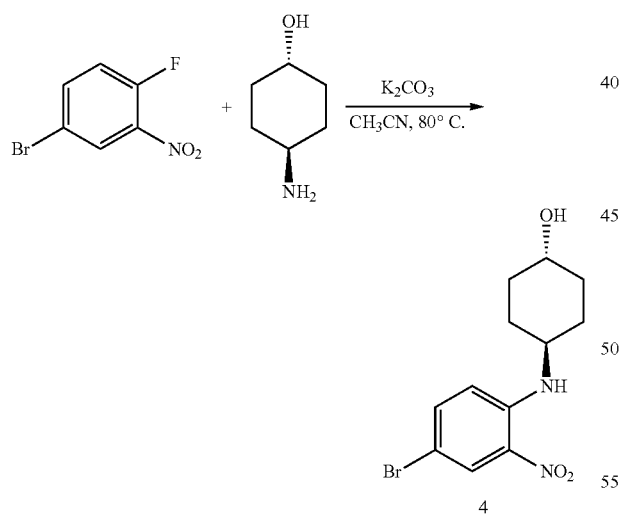

4-Bromo-1-fluoro-2-nitrobenzene (3.38 g, 15.4 mmol), (trans)-4-hydroxycyclohexyl-1-amine (1.77 g, 15.4 mmol) and potassium carbonate (5.34 g, 38.6 mmol) were dissolved in acetonitrile (50 mL), and then the solution was heated to 80° C. and stirred for 5 h. The solution was cooled, to which was added 200 mL of water. The resultant solution was filtered, and the filter cake was rinsed with water. The filter cake was purified by column chromatography to obtain 4.1 g of solid (intermediate 4), with a yield of 84.9%.

38

5. Synthesis of Intermediate 4-bromo-N-(((trans)-4-(methoxy-d$_3$) cyclohexyl)-2-nitroaniline (Intermediate 5)

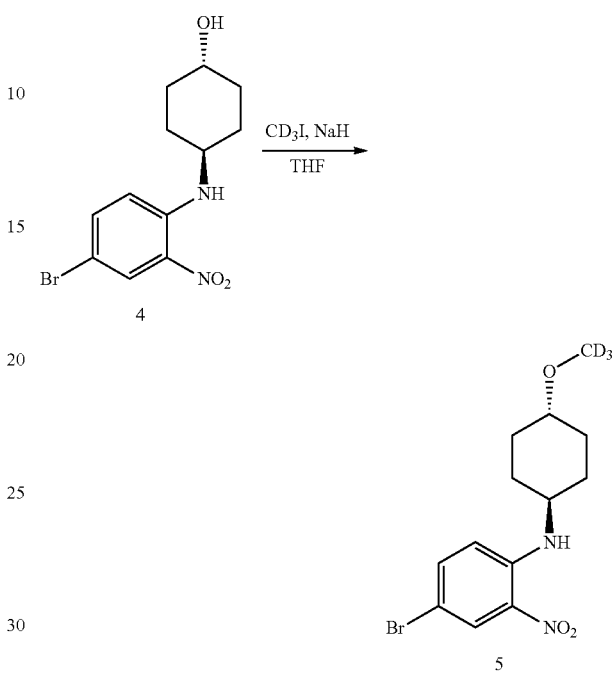

Intermediate 4 (4 g, 12.7 mmol) and sodium hydride (0.6 g, 25.4 mmol) were dissolved in 40 mL of tetrahydrofuran, to which was added iodomethane-d$_3$ (2.8 g, 19 mmol) dropwise in an ice bath, and the mixture was allowed to react overnight. The solution was poured into ice water, and extracted with ethyl acetate. The organic layer was dried over anhydrous sodium sulfate and concentrated. The residue was purified by column chromatography, to obtain 2.8 g of product (intermediate 5), with a yield of 66%.

6. Synthesis of Intermediate 4-bromo-N1-((trans)-4-(methoxy-d$_3$) cyclohexyl)benzene-1,2-diamine (Intermediate 6)

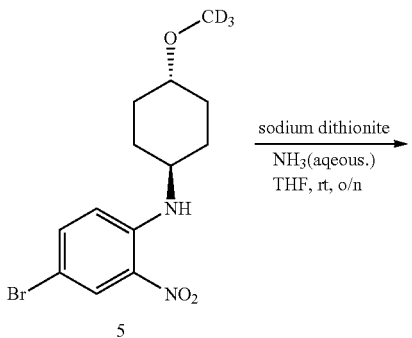

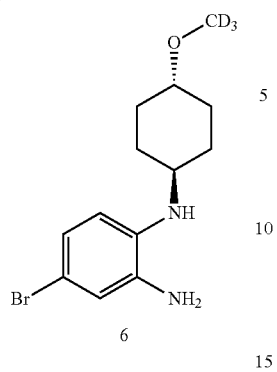

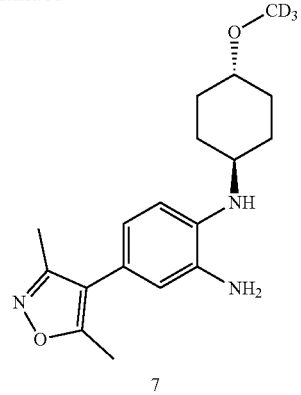

Intermediate 5 (4.5 g, 13.7 mmol) and ammonia (10 mL) were dissolved in 150 mL of tetrahydrofuran and 150 mL of water, to which was added sodium dithionite (38 g, 185 mmol), and then the solution was stirred overnight at room temperature. Then, the solution was allowed to stand for separation of layers, and the organic layer was separated. The aqueous layer was extracted with ethyl acetate. The organic layers were combined, dried over anhydrous sodium sulfate, and then concentrated. The residue was separated by column chromatography to provide 3.4 g of solid (intermediate 6), with a yield of 83%.

7. Synthesis of Intermediate 4-(3,5-dimethylisoxazol-4-yl)-N1-((trans)-4-(methoxy-d₃)cyclohexyl)benzene-1,2-diamine (Intermediate 7)

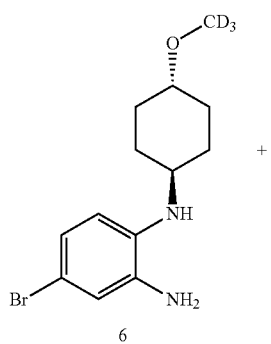

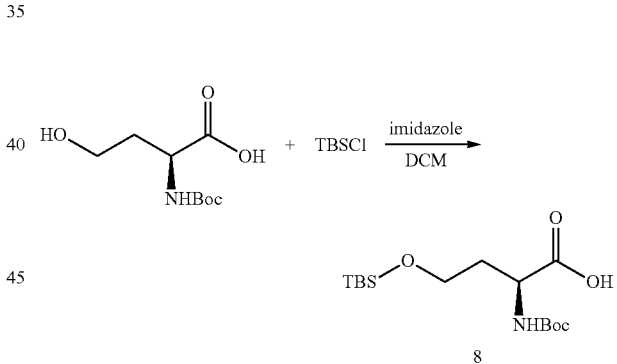

Intermediate 6 (3.5 g, 11.7 mmol), 3,5-dimethyl-4-(4,4,5,5-tetramethyl-1,3,2-dioxaborolan-2-yl)isoxazole (2.87 g, 12.8 mmol), [1,1'-bis(diphenylphosphino)ferrocene]dichloropalladium (11) (80 mg, 0.12 mmol), and potassium carbonate (3.23 g, 23.4 mmol) were dissolved in 60 mL of dioxane and 10 mL of water, and then the system was purged with nitrogen three times and stirred at 100° C. for 10 h. The solution was cooled, and then extracted with ethyl acetate three times. The organic layer was dried over anhydrous sodium sulfate and then concentrated. The residue was purified by column chromatography to obtain 2.4 g of solid (intermediate 7), with a yield of 66%.

8. Synthesis of Intermediate N-(t-butoxycarbonyl)-O-(t-butyldimethylsilyl)-L-homoserine (Intermediate 8)

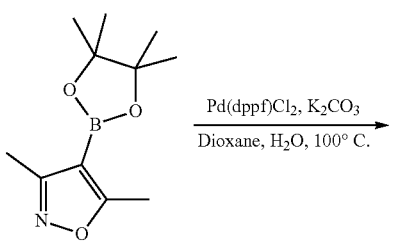

To the solution of N-bochomoserine (15 g, 68 mmol) and imidazole (11.6 g, 170 mmol) in dichloromethane (150 mL), was added the solution of t-butyldimethylchlorosilane (22.6 g, 150 mmol) in dichloromethane dropwise, and then mixture was allowed to react overnight. The reaction solution was washed with water, and extracted with dichloromethane. The organic phase was dried over anhydrous sodium sulfate and then concentrated. To the residue, were added 30 mL of methanol, 30 mL of tetrahydrofuran, 30 mL of water and 15 g of potassium carbonate, and then the mixture was stirred overnight at room temperature. Most of methanol and tetrahydrofuran was removed by concentration. The pH value of the reaction solution was adjusted to be 3-4. Then, the resultant solution was extracted with ethyl acetate. The organic phase was dried over anhydrous sodium sulfate and concentrated, to obtain 22 g of product (intermediate 8), which was directly used in the next reaction.

9. Synthesis of Intermediate N-(t-butoxycarbonyl)-O-(t-butyldimethylsilyl)-L-homoserine methyl ester (Intermediate 9)

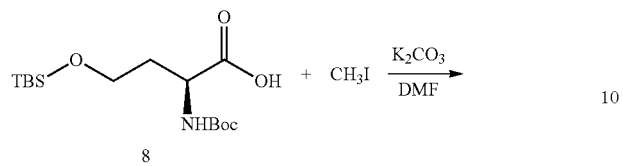

Intermediate 8 (22 g, 66 mmol) and potassium carbonate (26 g, 188 mmol) were dissolved in N,N-dimethylformamide (100 mL), to which was added methyl iodide (22.4 g, 158 mmol) dropwise at room temperature, and then the mixture was allowed to react overnight. Then, 200 mL of water was added to the reaction solution, and the resultant solution was extracted with ethyl acetate. The organic phase was dried over anhydrous sodium sulfate and concentrated. The residue was purified by column chromatography, to obtain 16 g of product (intermediate 9), with a two-step yield of 67.5%.

10. Synthesis of Intermediate t-butyl (S)-(4-((t-butyldimethylsilyl)oxy)-1-oxobutan-2-yl)carbamate (Intermediate 10)

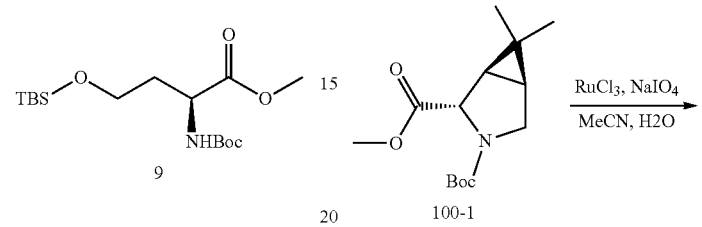

Intermediate 9 (9 g, 26 mmol) was dissolved in toluene (50 mL), to which was added DIBAL-H (31 mL, 1.5 M) dropwise in a nitrogen atmosphere at −78° C., and then the mixture was allowed to react for 1 h. Then, 3 mL of methanol was added dropwise to quench the reaction. After stirring for 10 min, the reaction solution was poured into 1 N hydrochloric acid in an ice bath, and the resultant solution was extracted with ethyl acetate. The organic phase was dried over anhydrous sodium sulfate and concentrated. The residue was purified by column chromatography to obtain 7.2 g of product (intermediate 10), with a yield of 87.8%.

The Following is the Synthetic Method of the Specific Target Compound of the Present Invention:

Example 100 Synthesis of (1S,4S,5R)-3-(3,4-difluorophenyl)-4-(5-(3,5-dimethylisoxazol-4-yl)-1-((1r,4S)-4-methoxycyclohexyl)-1H-benzo[d]imidazol-2-yl)-6,6-dimethyl-3-azabicyclo[3.1.0]hexan-2-one (Compound 100)

Synthesis of (1R,2S,5S)-3-t-butyl-2-methyl-6,6-dimethyl-4-oxo-3-azabicyclo[3.1.0]hexane-2,3-dicarboxylate (Compound 100-2)

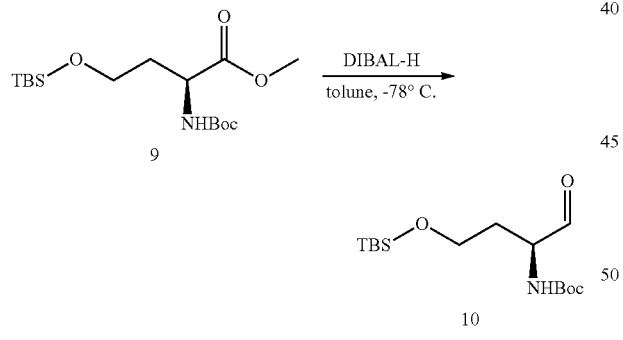

The starting material 100-1 (269 mg, 1 mmol) and sodium periodate (850 mg, 4 mmol) were dissolved in 8 mL of acetonitrile and 8 mL of water, to which was added 5 mg of ruthenium trichloride under cooling in an ice-water bath, and then the mixture was allowed to react for 5 h. The reaction solution was poured into water, and then extracted with ethyl acetate (EA). The organic phase was washed with saturated brine, dried over anhydrous sodium sulfate, and concentrated. The residue was purified by column chromatography to obtain 112 mg of product (intermediate 100-2), with a yield of 40%.

MS: M/Z m/z 284 [M+H]$^+$

Synthesis of methyl (1R,2S,5S)-6,6-dimethyl-4-oxo-3-azabicyclo[3.1.0] hexane-2-carboxylate (Intermediate 100-3)

Intermediate 100-2 (283 mg, 1 mmol) was dissolved in dichloromethane, to which was added 2 M solution of HCl in isopropyl acetate, and then the mixture was allowed to react for 1 h at room temperature. The reaction solution was concentrated to yield 165 mg of product (intermediate 100-3), with a yield of 90%. MS: M/Z m/z 184 [M+H]⁺

Synthesis of methyl (1R,2S,5S)-3-(3,4-difluorophenyl)-6,6-dimethyl-4-oxo-3-azabicyclo[3.1.0]hexane-2-carboxylate (Intermediate 100-4)

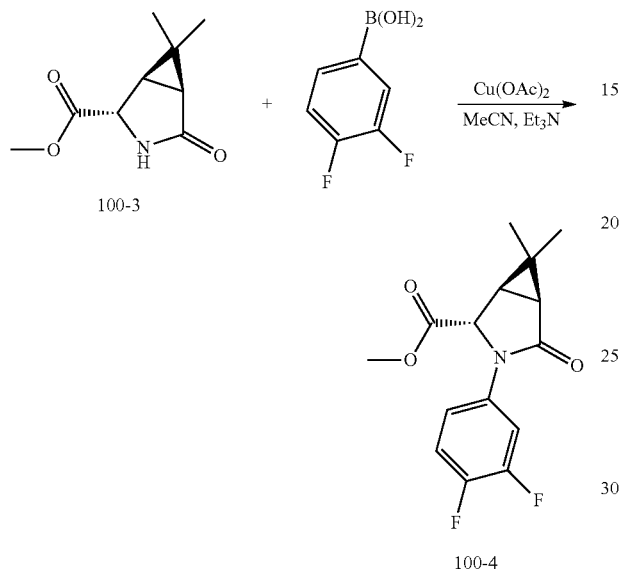

Intermediate 100-3 (183 mg, 1 mmol), 3,4-difluorophenylboronic acid (632 mg, 4 mmol), copper acetate monohydrate (300 mg, 1.5 mmol) and triethylamine (150 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 148 mg of product (intermediate 100-4), with a yield of 50%. MS: m/z 296 [M+H]⁺.

Synthesis of (1S,4S,5R)-3-(3,4-difluorophenyl)-4-(hydroxymethyl)-6,6-dimethyl-3-azabicyclo[3.1.0]hexan-2-one (Intermediate 100-5)

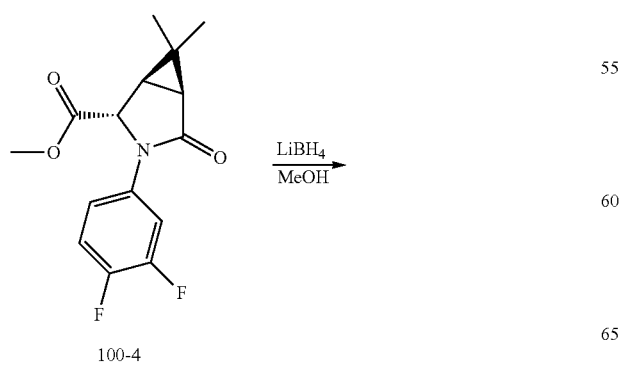

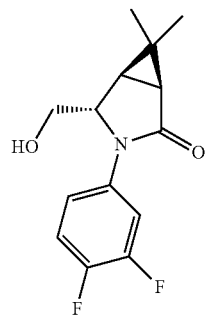

100-5

Intermediate 100-4 (295 mg, 1 mmol) was dissolved in 10 mL of methanol, and then the solution of lithium borohydride in tetrahydrofuran was added dropwise. The mixture was reacted overnight at room temperature. Then, the reaction solution was poured into water and extracted. The organic phase was washed with saturated brine, dried over anhydrous sodium sulfate, and concentrated, to obtain 260 mg of crude product (intermediate 100-5), with a yield of 90%. MS: m/z 268 [M+H]⁺

Synthesis of (1R,2S,5S)-3-(3,4-difluorophenyl)-6,6-dimethyl-4-oxo-3-azabicyclo[3.1.0]hexane-2-formaldehyde (Intermediate 100-6)

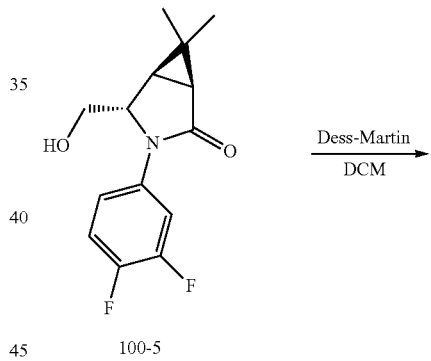

Intermediate 100-5 (267 mg, 1 mmol) was dissolved in 10 mL of dichloromethane, to which was added Dess-Martin (2167 mg, 5 mmol), and the mixture was allowed to react overnight at room temperature. The reaction solution was filtered, and the filtrate was concentrated, to obtain 250 mg of crude product (intermediate 100-6), with a yield of 90%. MS: m/z 266 [M+H]⁺.

Synthesis of (1S,4S,5R)-3-(3,4-difluorophenyl)-4-(5-(3,5-dimethylisoxazol-4-yl)-1-((1r,4S)-4-methoxycyclohexyl)-1H-benzo[d]imidazol-2-yl)-6,6-dimethyl-3-azabicyclo[3.1.0]hexan-2-one (Compound 100)

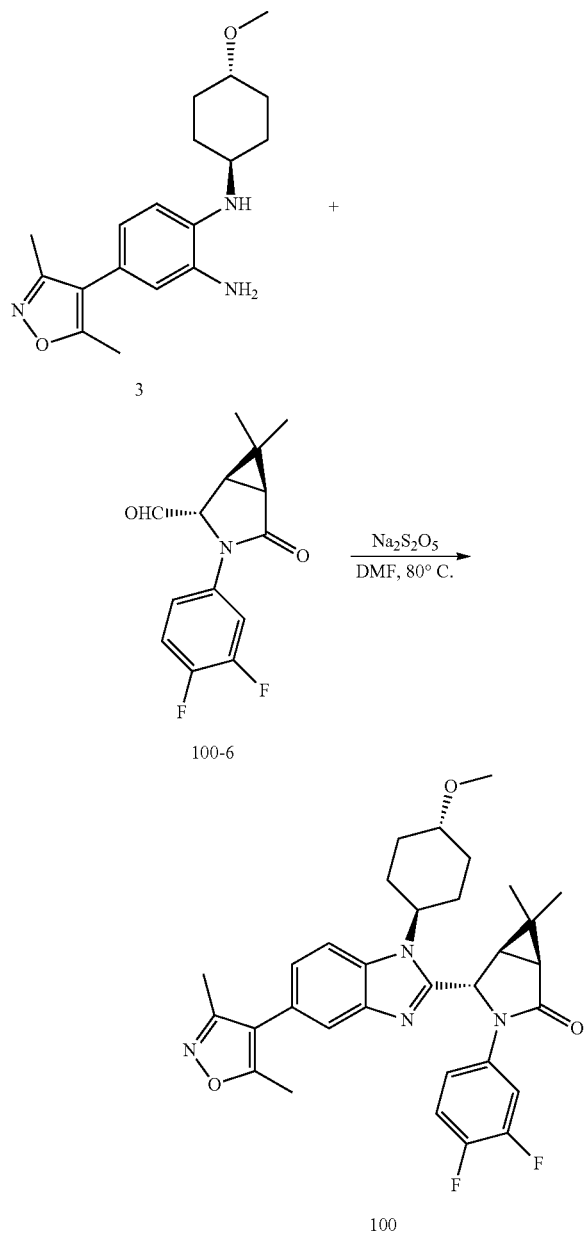

Intermediate 100-6 (290 mg, 1.1 mmol) was dissolved in N,N-dimethylformamide (20 mL), to which were added intermediate 3 (315 mg, 1 mmol) and sodium metabisulfite (360 mg, 1.9 mmol), and then the mixture was allowed to react for 5 h at 80° C. 80 mL of water was added to the reaction solution, and then the solution was extracted with ethyl acetate. The organic phase was dried over anhydrous sodium sulfate, and concentrated. The residue was purified by column chromatography to obtain 392 mg of product (compound 100), with a yield of 70%. MS: m/z 561 [M+H]⁺.

¹HNMR (400 MHz, CDCl₃) δ 7.71 (m, 3H), 7.28 (m, 1H), 7.12 (m, 2H), 5.78 (s, 1H), 4.60 (s, 1H), 3.42 (s, 3H), 3.33 (s, 1H), 2.42-2.28 (m, 9H), 2.09-1.00 (m, 13H).

Example 101 Synthesis of Compound 2-(3,4-difluorophenyl)-1-(5-(3,5-dimethylisoxazol-4-yl)-1-((trans)-4-methoxycyclohexyl)-1H-benzo[d]imidazol-2-yl)-2-azabicyclo[3.1.0]hexane-3-one (101)

Synthesis of 4-(2-hydroxyethyl)-1,3,2-dioxathiolane-2,2-dioxide (Intermediate 101-1)

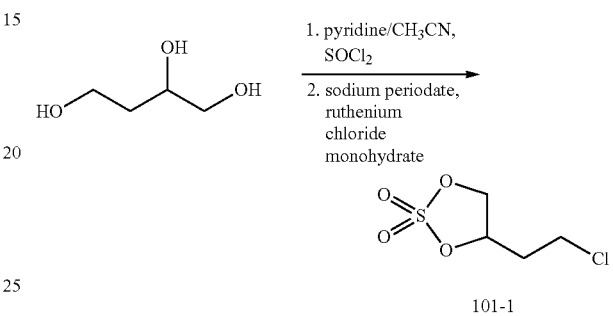

Butane-1,2,4-triol (10.0 g, 94.2 mmol) was added to pyridine (15.2 mL) and acetonitrile (100 mL), to which was added dichlorosulfoxide (34.4 mL) dropwise at 0° C., and then the reaction solution was further stirred and reacted at room temperature for 15 h. After the reaction was completed, ethyl acetate (20 mL) and 0.1 M hydrochloric acid solution (10 mL) were added to the reaction solution, and then the solution was extracted with ethyl acetate (10 mL×2). The organic phase was washed once with saturated brine (20 mL), dried over anhydrous sodium sulfate, and filtered to obtain the filtrate. The filtrate was evaporated under reduced pressure to remove the solvent and obtain 14.5 g of oil.

14.5 g of oil mentioned above was dissolved in acetonitrile (200 mL) and water (40 mL), to which were added sodium periodate (19.6 g) and ruthenium chloride hydrate (172 mg), and then the mixture was stirred and reacted for 15 h. After completion of the reaction, acetonitrile was removed by evaporation under reduced pressure, and then the solution was extracted with ethyl acetate (100 mL×2). The organic phase was washed once with saturated saline (20 mL), dried over anhydrous sodium sulfate, and filtered to obtain filtrate. The filtrate was evaporated under reduced pressure to remove the solvent and obtain 13.8 g of oil (intermediate 101-1), with a yield of 78.4%.

Synthesis of ethyl 2-(2-chloroethyl)-1-((diphenylmethylene)amino) cyclopropanecarboxylate (Intermediate 101-2)

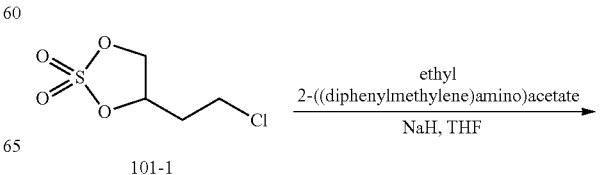

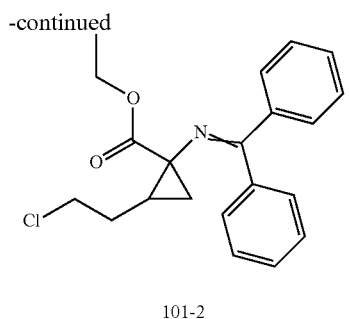

101-2

Ethyl 2-((diphenylmethylene)amino)acetoacetate (10.7 g, 40 mmol) was added to tetrahydrofuran (50 mL), to which was added NaH (3.2 g, 80 mmol) at 0° C., and then the reaction solution was stirred and reacted at room temperature for 1 h. The solution of intermediate 101-1 (7.5 g, 40 mmol) in tetrahydrofuran (20 mL) was added dropwise to the reaction solution. After the reaction solution was stirred and reacted at room temperature for 1 h, the reaction solution was heated to 40° C., and then stirred and reacted for additional 2 h. After the reaction solution was cooled to room temperature, it was poured into water (100 mL) and extracted with ethyl acetate (50 mL×2). The organic phase was washed once with saturated saline (20 mL), dried over anhydrous sodium sulfate, and filtered to obtain the filtrate. The filtrate was evaporated under reduced pressure to remove the solvent and obtain 11.6 g of oil (intermediate 101-2), with a yield of 81.5%.

Synthesis of 2-azabicyclo[3.1.0]hexane-1-carboxylic acid ethyl ester-2-carboxylic acid t-butyl ester (Intermediate 101-3)

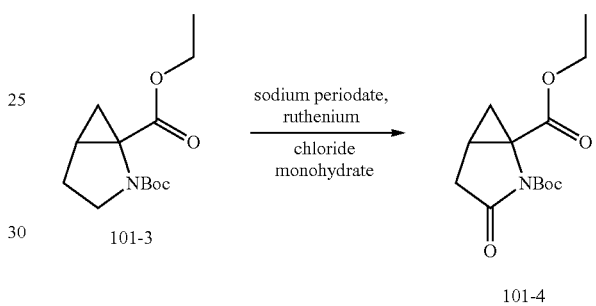

Intermediate 101-2 (10.7 g, 30 mmol) was added to tetrahydrofuran (50 mL) and 1M hydrochloric acid (100 mL), and the reaction solution was stirred and reacted at 40° C. for 3 h. After completion of the reaction, the solvent was removed by evaporation under reduced pressure, to obtain an oil.

The oil mentioned above was dissolved in ethanol (50 mL), to which was added potassium carbonate (27.6 g, 0.2 mol), and then the reaction solution was stirred and reacted at room temperature for 4 h. (Boc)₂O (7.8 g, 36 mmol) was added to the reaction solution, and the solution was further stirred and reacted for 6 h. After completion of the reaction, the solvent was removed by evaporation under reduced pressure, and to the residue, were added ethyl acetate (50 mL) and water (30 mL). The resultant solution was extracted with ethyl acetate (30 mL×2). The organic phase was washed once with saturated saline (20 mL), dried over anhydrous sodium sulfate, and filtered to obtain filtrate. The filtrate was evaporated under reduced pressure to remove the solvent, and the residue was purified by column chromatography to obtain 6.6 g of oil (intermediate 101-3), with a yield of 85.2%.

Synthesis of 3-oxo-2-azabicyclo[3.1.0]hexane-1-carboxylic acid ethyl ester-2-carboxylic acid t-butyl ester (Intermediate 101-4)

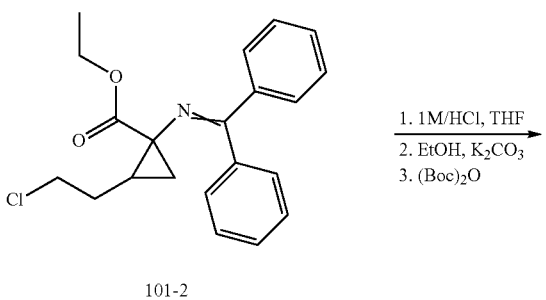

Oily intermediate 101-3 (7.7 g, 30 mmol) was dissolved in acetonitrile (50 mL) and water (10 mL), to which were added sodium periodate (6.6 g) and ruthenium chloride hydrate (58 mg), and then the mixture was stirred and reacted for 15 h at room temperature. After completion of the reaction, acetonitrile was removed by evaporation under reduced pressure, and then the solution was extracted with ethyl acetate (30 mL×2). The organic phase was washed once with saturated saline (20 mL), dried over anhydrous sodium sulfate, and filtered to obtain filtrate. The filtrate was evaporated under reduced pressure to remove the solvent, and the residue was purified by column chromatography to obtain 2.1 g of intermediate 101-4, with a yield of 25.5%.

Synthesis of t-butyl 1-(hydroxymethyl)-3-oxo-2-azabicyclo[3.1.0]hexane-2-carboxylate (Intermediate 101-5)

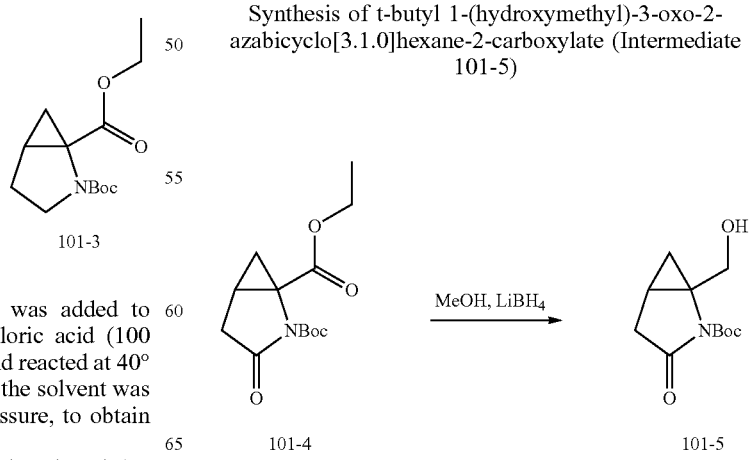

Intermediate 101-4 (1.3 g, 5 mmol) was dissolved in 10 mL of methanol, and then lithium borohydride (219 mg, 10 mmol) was added. The reaction solution was stirred and reacted for 3 h at 40° C. After completion of the reaction, ethyl acetate (30 mL) and water (10 mL) were added to the reaction solution, and the resultant solution was extracted with ethyl acetate (20 mL×2). The organic phase was washed once with saturated saline (20 mL), dried over anhydrous sodium sulfate, and filtered to obtain filtrate. The filtrate was evaporated under reduced pressure to remove the solvent, and the residue was purified by column chromatography to obtain 1.02 g of intermediate 101-5, with a yield of 89.5%.

Synthesis of t-butyl 1-formyl-3-oxo-2-azabicyclo[3.1.0]hexane-2-carboxylate (Intermediate 101-6)

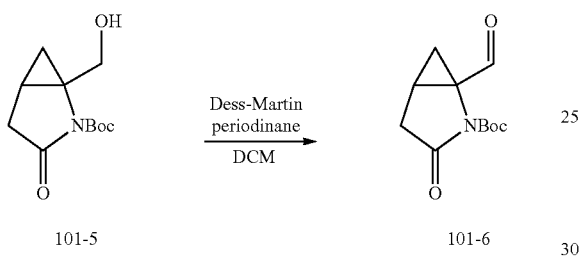

Intermediate 101-5 (909 mg, 4 mmol) was dissolved in dichloromethane (10 mL), to which was added Dess-Martin periodinane (2.5 g, 6 mmol), and the reaction solution was stirred and reacted for 3 h at room temperature. After completion of the reaction, the reaction solution was filtered to remove the insoluble material, and the filtrate was evaporated under reduced pressure to remove the solvent. The residue was purified by column chromatography to obtain 785 mg of intermediate 101-6, with a yield of 87.2%.

Synthesis of 1-(5-(3,5-dimethylisoxazol-4-yl)-1-((trans)-4-methoxycyclohexyl)-1H-benzo[d]imidazole-2-yl)-3-oxo-2-azabicyclo[3.1.0]hexane-2-carboxylic acid t-butyl ester (Intermediate 101-7)

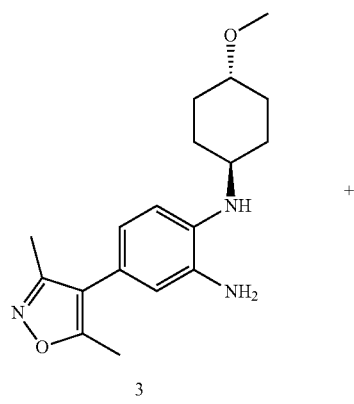

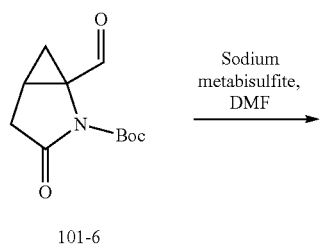

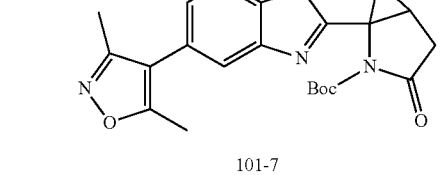

Intermediate 3 (535 mg, 1.7 mmol) was dissolved in N,N-dimethylformamide (10 mL), to which were added intermediate 101-6 (428 mg, 1.9 mmol) and sodium metabisulfite (720 mg, 3.8 mmol), and then the mixture was allowed to react for 5 h at 80° C. Water (40 mL) was added to the reaction solution, and then the solution was extracted with ethyl acetate. The organic phase was dried over anhydrous sodium sulfate, and concentrated. The residue was purified by column chromatography to obtain 604 mg of product (compound 101-7), with a yield of 68.2%.

Synthesis of 1-(5-(3,5-dimethylisoxazol-4-yl)-1-((trans)-4-methoxycyclohexyl)-1H-benzo[d]imidazol-2-yl)-2-azabicyclo[3.1.0]hexane-3-one (Intermediate 101-8)

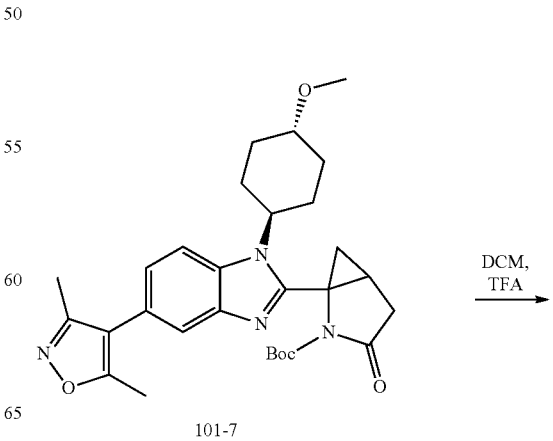

-continued

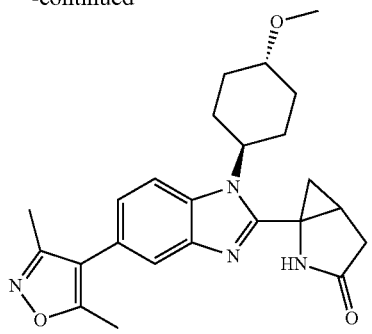

101-8

Intermediate 101-7 (521 mg, 1 mmol) was dissolved in dichloromethane (4 mL), to which was added trifluoroacetic acid (2 mL), and then the reaction solution was stirred and reacted at room temperature for 3 h. After the reaction was completed, the solvent was removed by evaporation under reduced pressure to obtain crude product, which was directly used in the next reaction without further purification.

Synthesis of 2-(3,4-difluorophenyl)-1-(5-(3,5-dimethylisoxazol-4-yl)-1-((trans)-4-methoxycyclohexyl)-1H-benzo[d]imidazol-2-yl)-2-azabicyclo[3.1.0]hexane-3-one (Compound 101)

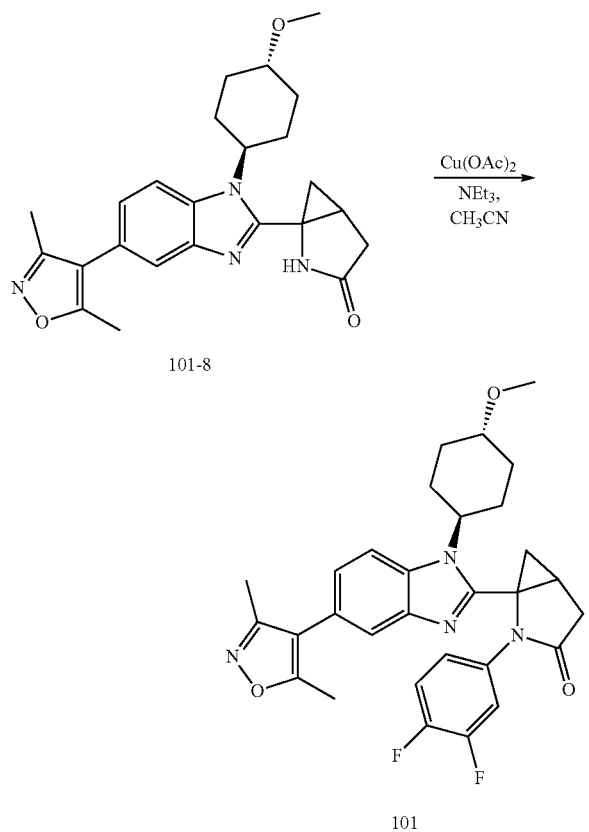

Intermediate 101-8 (84 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 51 mg of product (compound 101), with a yield of 47.7%. MS: m/z 533 [M+H]$^+$, $^1$H NMR: (400 MHz, d$_6$-DMSO) δ 7.77 (d, J=8.5 Hz, 1H), 7.68-7.56 (m, 2H), 7.47-7.33 (m, 2H), 7.16 (d, J=7.4 Hz, 1H), 4.25 (t, J=11.8 Hz, 1H), 3.29 (s, 31H), 2.79 (d, J=18.7 Hz, 1H), 2.37 (s, 3H), 2.29-2.12 (m, 8H), 2.07 (dd, J=13.7, 7.8 Hz, 1H), 1.88 (s, 1H), 1.50-1.14 (m, 6H).

Example 102 Synthesis of Compound (1S,5S)-2-(3,4-difluorophenyl)-1-(5-(3,5-dimethylisoxazol-4-yl)-1-((trans)-4-(methoxy-d3)cyclohexyl)-1H-benzo[d]imidazol-2-yl)-2-azabicyclo[3.1.0]hexane-3-one (102)

Synthesis of (S)-4-(2-hydroxyethyl)-1,3,2-dioxathiolane-2,2-dioxide (Intermediate 102-1)

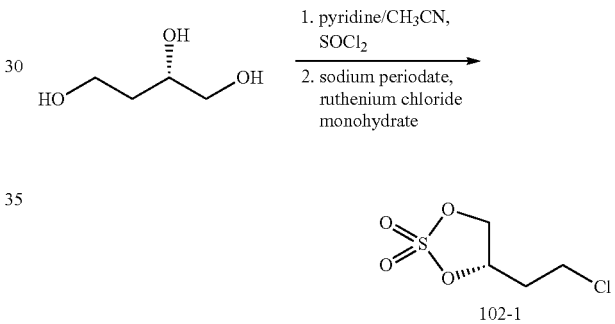

(S)-butane-1,2,4-triol (10.0 g, 94.2 mmol) was added to pyridine (15.2 mL) and acetonitrile (100 mL), to which was added dichlorosulfoxide (34.4 mL) dropwise at 0° C., and then the reaction solution was further stirred and reacted at room temperature for 15 h. After the reaction was completed, ethyl acetate (20 mL) and 0.1 M hydrochloric acid solution (10 mL) were added to the reaction solution, and then the solution was extracted with ethyl acetate (10 mL×2). The organic phase was washed once with saturated brine (20 mL), dried over anhydrous sodium sulfate, and filtered to obtain the filtrate. The filtrate was evaporated under reduced pressure to remove the solvent and obtain 14.2 g of oil.

14.2 g of oil mentioned above was dissolved in acetonitrile (200 mL) and water (40 mL), to which were added sodium periodate (19.2 g) and ruthenium chloride hydrate (168 mg), and then the mixture was stirred and reacted for 15 h. After completion of the reaction, acetonitrile was removed by evaporation under reduced pressure, and then the solution was extracted with ethyl acetate (100 mL×2). The organic phase was washed once with saturated saline (20 mL), dried over anhydrous sodium sulfate, and filtered to obtain filtrate. The filtrate was evaporated under reduced pressure to remove the solvent and obtain 13.2 g of oil (intermediate 102-1), with a yield of 75%.

Synthesis of (1S)-2-(2-chloroethyl)-1-((diphenylmethylene)amino)ethyl cyclopropanecarboxylate (Intermediate 102-2)

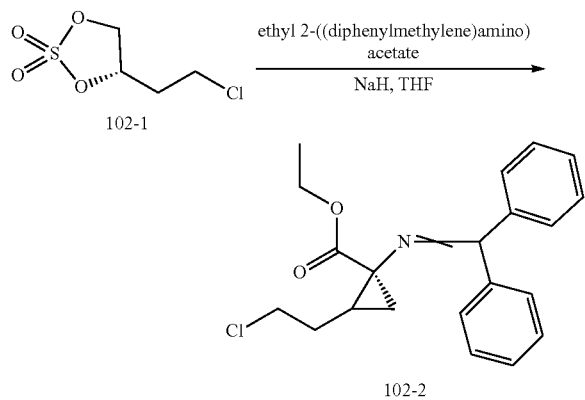

Ethyl 2-((diphenylmethylene)amino)acetate (10.7 g, 40 mmol) was added in tetrahydrofuran (50 mL), to which was then added NaH (3.2 g, 80 mmol) at ° C. The reaction solution was stirred and reacted for 1 h at room temperature, to which was added the solution of intermediate 102-1 (7.5 g, mmol) in tetrahydrofuran (20 mL). After the reaction solution was further stirred and reacted at room temperature for 1 h, the solution was warmed to 40° C., stirred and reacted for additional 2 h. After the reaction solution was cooled to room temperature, it was poured into water (100 mL) and extracted with ethyl acetate (50 mL×2). The organic phase was washed once with saturated saline (20 mL), dried over anhydrous sodium sulfate, and filtered to obtain filtrate. The filtrate was evaporated under reduced pressure to remove the solvent, and obtain 11.5 g of oil (intermediate 102-2), with a yield of 80.5%.

Synthesis of (1S,5R)-2-azabicyclo[3.1.0]hexane-1-carboxylic acid ethyl ester-2-carboxylic acid t-butyl ester (Intermediate 102-3)

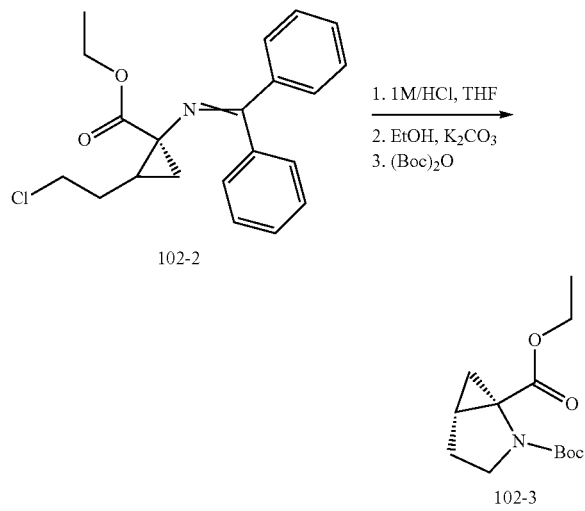

Intermediate 102-2 (10.7 g, 30 mmol) was added to tetrahydrofuran (50 mL) and 1M hydrochloric acid (100 mL), and the reaction solution was stirred and reacted at 40° C. for 3 h. After completion of the reaction, the solvent was removed by evaporation under reduced pressure, to obtain an oil.

The oil mentioned above was dissolved in ethanol (50 mL), to which was added potassium carbonate (27.6 g, 0.2 mol), and then the reaction solution was stirred and reacted at room temperature for 4 h. (Boc)$_2$O (7.8 g, 36 mmol) was added to the reaction solution, and the solution was further stirred and reacted for 6 h. After completion of the reaction, the solvent was removed by evaporation under reduced pressure, and to the residue, were added ethyl acetate (50 mL) and water (30 mL). The resultant solution was extracted with ethyl acetate (30 mL×2). The organic phase was washed once with saturated saline (20 mL), dried over anhydrous sodium sulfate, and filtered to obtain filtrate. The filtrate was evaporated under reduced pressure to remove the solvent, and the residue was purified by column chromatography to obtain 6.4 g of oil (intermediate 102-3), with a yield of 82.6%.

Synthesis of (1S,5R)-3-oxo-2-azabicyclo[3.1.0]hexane-1-carboxylic acid ethyl ester-2-carboxylic acid t-butyl ester (Intermediate 102-4)

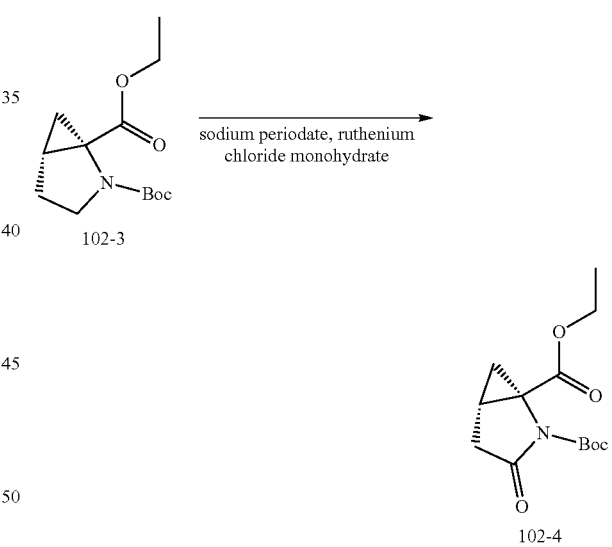

Oily intermediate 102-3 (7.7 g, 30 mmol) was dissolved in acetonitrile (50 mL) and water (10 mL), to which were added sodium periodate (6.6 g) and ruthenium chloride hydrate (58 mg), and then the mixture was stirred and reacted for 15 h at room temperature. After completion of the reaction, acetonitrile was removed by evaporation under reduced pressure, and then the solution was extracted with ethyl acetate (30 mL×2). The organic phase was washed once with saturated saline (20 mL), dried over anhydrous sodium sulfate, and filtered to obtain filtrate. The filtrate was evaporated under reduced pressure to remove the solvent and obtain 2.3 g of intermediate 102-4, with a yield of 27.5%.

Synthesis of t-butyl (1S,5R)-1-(hydroxymethyl)-3-oxo-2-azabicyclo[3.1.0]hexane-2-carboxylate (Intermediate 102-5)

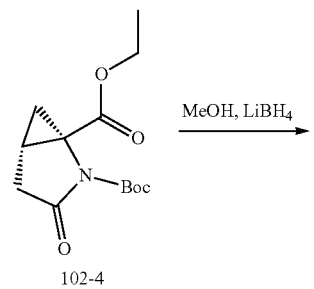

Intermediate 102-4 (1.3 g, 5 mmol) was dissolved in 10 mL of methanol, and then lithium borohydride (219 mg, 10 mmol) was added. The reaction solution was stirred and reacted for 3 h at 40° C. After completion of the reaction, ethyl acetate (30 mL) and water (10 mL) were added to the reaction solution, and the resultant solution was extracted with ethyl acetate (20 mL×2). The organic phase was washed once with saturated saline (20 mL), dried over anhydrous sodium sulfate, and filtered to obtain filtrate. The filtrate was evaporated under reduced pressure to remove the solvent, and the residue was purified by column chromatography to obtain 1.04 g of intermediate 102-5, with a yield of 91.5%.

Synthesis of t-butyl (1S,5S)-1-formyl-3-oxo-2-azabicyclo[3.1.0]hexane-2-carboxylate (Intermediate 102-6)

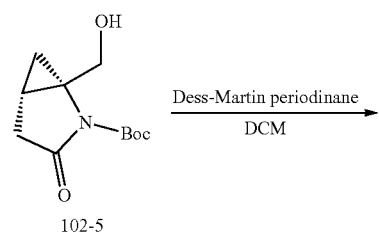

Intermediate 10-5 (909 mg, 4 mmol) was dissolved in dichloromethane (10 mL), to which was added Dess-Martin periodinane (2.5 g, 6 mmol), and the reaction solution was stirred and reacted for 3 h at room temperature. After completion of the reaction, the reaction solution was filtered to remove the insoluble material, and the filtrate was evaporated under reduced pressure to remove the solvent. The residue was purified by column chromatography to obtain 761 mg of intermediate 102-6, with a yield of 84.5%.

Synthesis of t-butyl (1S,5S)-1-(5-(3,5-dimethyl-isoxazol-4-yl)-1-((trans)-4-(methoxy-d$_3$)cyclohexyl)-1H-benzo[d]imidazol-2-yl)-3-oxo-2-azabicyclo[3.1.0]hexane-2-carboxylate (Intermediate 102-7)

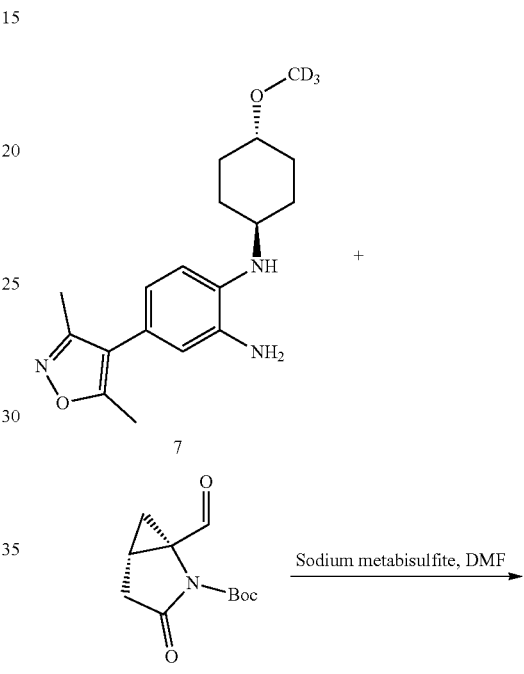

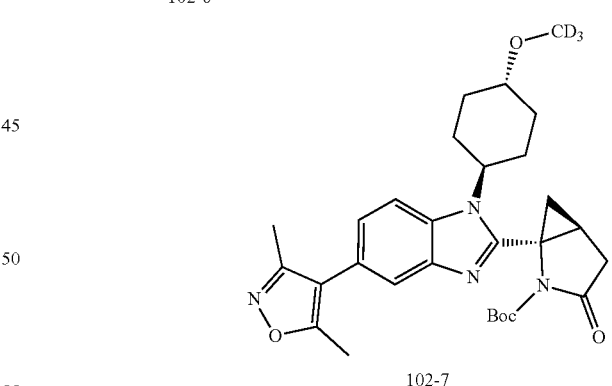

Intermediate 7 (541 mg, 1.7 mmol) was dissolved in N,N-dimethylformamide (10 mL), to which were added intermediate 102-6 (428 mg, 1.9 mmol) and sodium metabisulfite (720 mg, 3.8 mmol), and then the mixture was allowed to react for 5 h at 80° C. Water (40 mL) was added to the reaction solution, and then the solution was extracted with ethyl acetate. The organic phase was dried over anhydrous sodium sulfate, and concentrated. The residue was purified by column chromatography to obtain 609 mg of product (intermediate 102-7), with a yield of 68.8%.

Synthesis of (1S,5S)-1-(5-(3,5-dimethylisoxazol-4-yl)-1-((trans)-4-(methoxy-d₃)cyclohexyl)-1H-benzo[d]imidazol-2-yl)-2-azabicyclo[3.1.0]hexane-3-one (Intermediate 102-8)

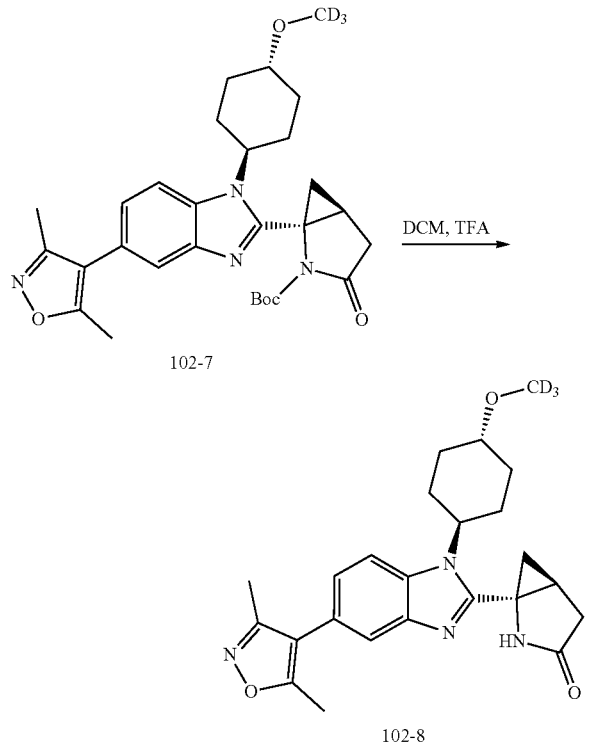

Intermediate 102-7 (524 mg, 1 mmol) was dissolved in dichloromethane (4 mL), to which was added trifluoroacetic acid (2 mL), and then the reaction solution was stirred and reacted at room temperature for 3 h. After the reaction was completed, the solvent was removed by evaporation under reduced pressure to obtain crude product, which was directly used in the next reaction without further purification.

Synthesis of (1S,5S)-2-(3,4-difluorophenyl)-1-(5-(3,5-dimethylisoxazol-4-yl)-1-((trans)-4-(methoxy-d3)cyclohexyl)-1H-benzo[d]imidazol-2-yl)-2-azabicyclo[3.1.0]hexane-3-one (Compound 102)

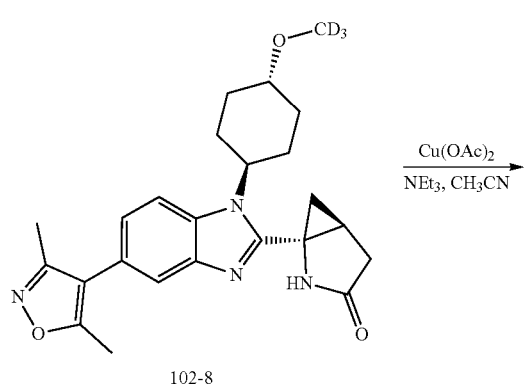

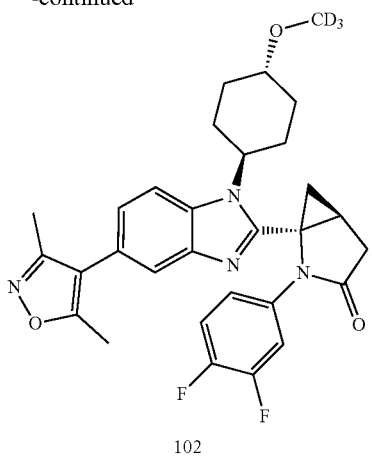

Intermediate 102-8 (85 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 49 mg of product (compound 102), with a yield of 46.2%. MS: m/z 536 (M+H⁺), ¹H NMR: (400 MHz, d₆-DMSO) δ 7.77 (d, J=8.5 Hz, 1H), 7.66 (s, 1H), 7.59 (d, J=10.1 Hz, 1H), 7.51-7.30 (m, 2H), 7.16 (d, J=8.2 Hz, 1H), 4.25 (s, 1H), 2.79 (d, J=18.7 Hz, 1H), 2.37 (s, 3H), 2.30-2.09 (m, 8H), 2.09-2.00 (m, 1H), 1.88 (s, 1H), 1.57-1.09 (m, 6H).

Example 103 Synthesis of compound (1S,5S)-2-(3,4-difluorophenyl)-1-(5-(3,5-dimethylisoxazol-4-yl)-1-((trans)-4-methoxycyclohexyl)-1H-benzo[d]imidazol-2-yl)-2-azabicyclo[3.1.0]hexane-3-one (103)

Synthesis of t-butyl (1S,5S)-1-(5-(3,5-dimethylisoxazol-4-yl)-1-((trans)-4-methoxycyclohexyl)-1H-benzo[d]imidazol-2-yl)-3-oxo-2-azabicyclo[3.1.0]hexane-2-carboxylate (Intermediate 103-1)

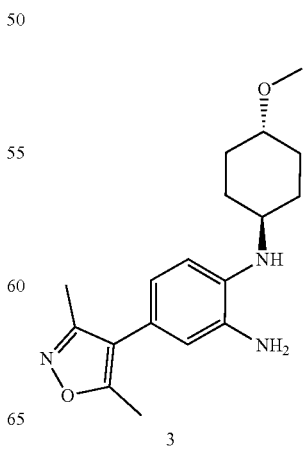

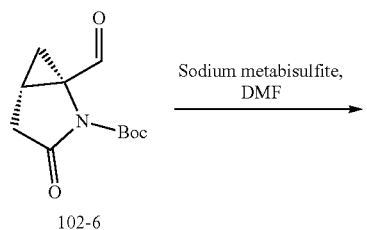

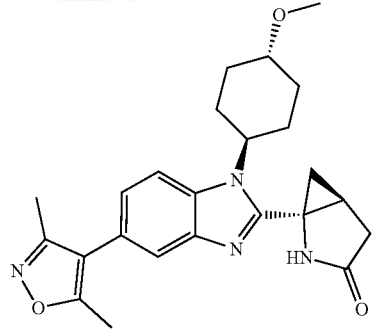

Intermediate 103-1 (521 mg, 1 mmol) was dissolved in dichloromethane (4 mL), to which was added trifluoroacetic acid (2 mL), and then the reaction solution was stirred and reacted at room temperature for 3 h. After the reaction was completed, the solvent was removed by evaporation under reduced pressure to obtain crude product, which was directly used in the next reaction without further purification.

Synthesis of (1S,5S)-2-(3,4-difluorophenyl)-1-(5-(3, 5-dimethylisoxazol-4-yl)-1-((trans)-4-methoxycyclohexyl)-1H-benzo[d]imidazol-2-yl)-2-azabicyclo [3.1.0]hexane-3-one (Compound 103)

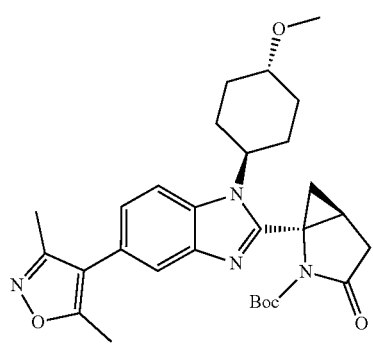

Intermediate 3 (535 mg, 1.7 mmol) was dissolved in N,N-dimethylformamide (10 mL), to which were added intermediate 102-6 (428 mg, 1.9 mmol) and sodium metabisulfite (720 mg, 3.8 mmol), and then the mixture was allowed to react for 5 h at 80° C. Water (40 mL) was added to the reaction solution, and then the solution was extracted with ethyl acetate. The organic phase was dried over anhydrous sodium sulfate, and concentrated. The residue was purified by column chromatography to obtain 589 mg of product (intermediate 103-1), with a yield of 66.5%.

Synthesis of (1R,5R)-1-(5-(3,5-dimethylisoxazol-4-yl)-1-((trans)-4-methoxycyclohexyl)-1H-benzo[d] imidazol-2-yl)-2-azabicyclo[3.1.0]hexane-3-one (Intermediate 103-2)

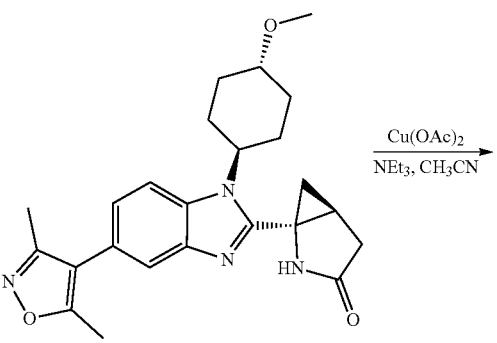

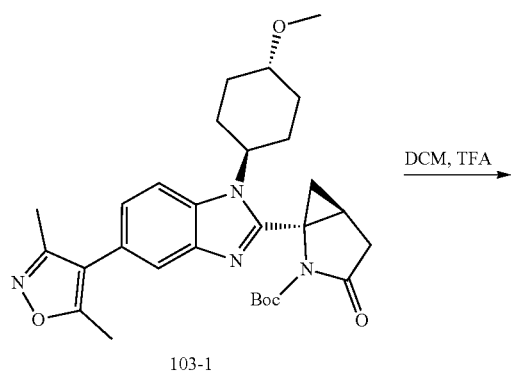

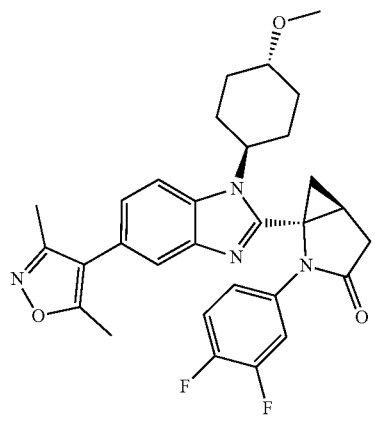

Intermediate 103-2 (84 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 51 mg of product (compound 103), with a yield of 47.5%. MS: m/z 533 [M+H]$^+$, $^1$H NMR: (400 MHz, d$_6$-DMSO) δ 7.77 (d, J=8.5 Hz, 1H), 7.66 (d, J=1.3 Hz, 1H), 7.60 (ddd, J=12.1, 7.2, 2.3 Hz, 1H), 7.41 (dt, J=17.5, 9.0 Hz, 2H), 7.16 (dd, J=8.5, 1.5 Hz, 1H), 4.25 (t, J=12.3 Hz, 1H), 3.29 (s, 3H), 2.79 (d, J=18.7 Hz, 1H), 2.37 (s, 3H), 2.29-2.12 (m, 8H), 2.05 (dd, J=8.5, 5.8 Hz, 1H), 1.88 (s, 1H), 1.44 (dd, J=16.9, 11.3 Hz, 2H), 1.35-1.19 (m, 4H).

Example 104 Synthesis of (R)-3-(3,4-difluorophenyl)-4-(5-(3,5-dimethylisoxazol-4-yl)-1-((trans)-4-methoxycyclohexyl)-1H-benzo[d]imidazol-2-yl)oxazolidine-2-one (104)

Synthesis of (R)-t-butyl 4-(5-(3,5-dimethylisoxazol-4-yl)-1-((trans)-4-methoxycyclohexyl)-1H-benzo[d]imidazol-2-yl)-2,2-dimethyloxazolidine-3-carboxylate (104-2)

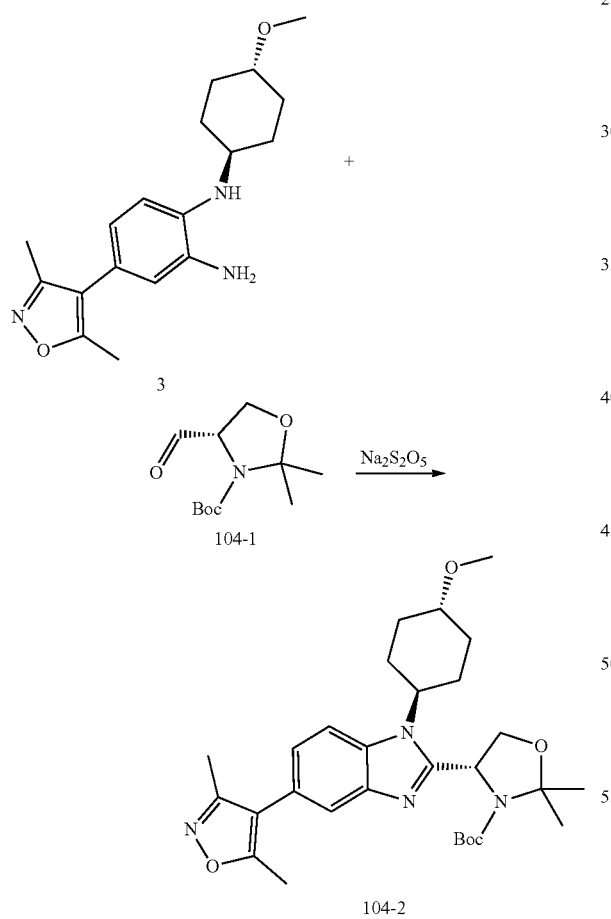

Compound 104-1 (230 mg, 1 mmol), intermediate 3 (315 mg, 1 mmol) and sodium pyrosulfite (380 mg, 2 mmol) were dissolved in N,N-dimethylformamide (4 mL), and then the reaction solution was heated to 80° C. and allowed to react for 3-4 h. After completion of the reaction, water was added to the reaction solution, and then the solution was extracted with ethyl acetate. The organic phase was dried over anhydrous sodium sulfate, and concentrated. The residue was purified by column chromatography to obtain 300 mg of 104-2, with a yield of 57%.

Synthesis of (R)-2-amino-2-(5-(3,5-dimethylisoxazol-4-yl)-1-((trans)-4-methoxycyclohexyl)-1H-benzo[d]imidazol-2-yl)ethanol hydrochloride (104-3)

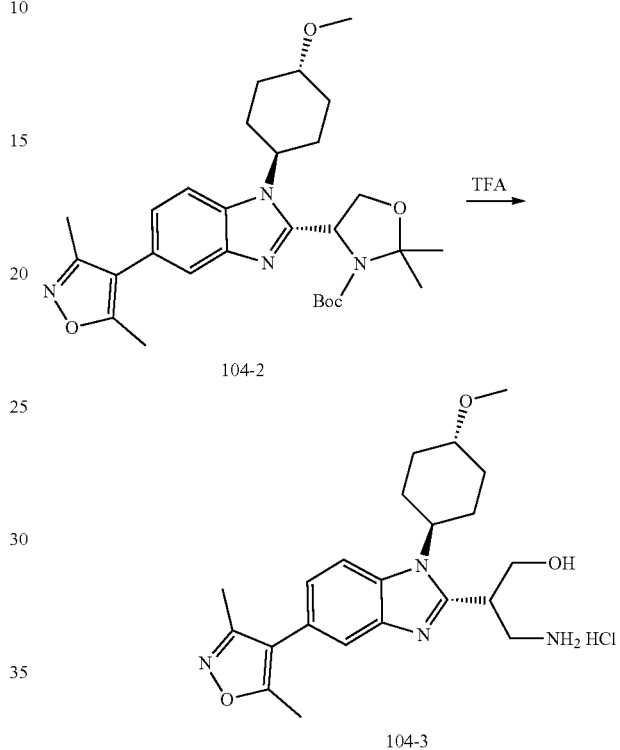

Compound 104-2 (300 mg, 1 mmol) was dissolved in methanol (2 mL) and concentrated hydrochloric acid (2 mL), and the reaction solution was allowed to react overnight. After completion of the reaction, the reaction solution was concentrated to provide 230 mg of 104-3, with a yield of 96%.

(R)-4-(5-(3,5-dimethylisoxazol-4-yl)-1-((trans)-4-methoxycyclohexyl)-1H-benzo[d]imidazol-2-yl)oxazolidine-2-thione (Intermediate 104-4)

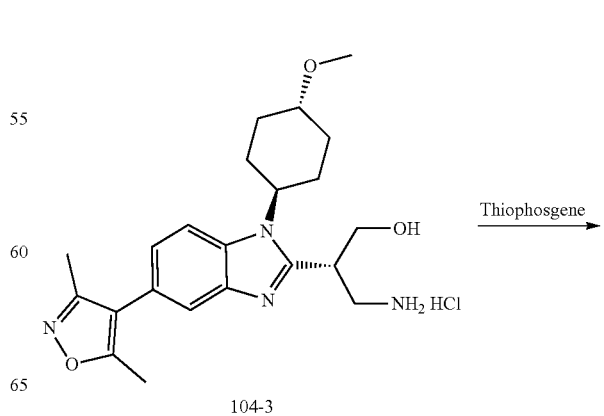

-continued

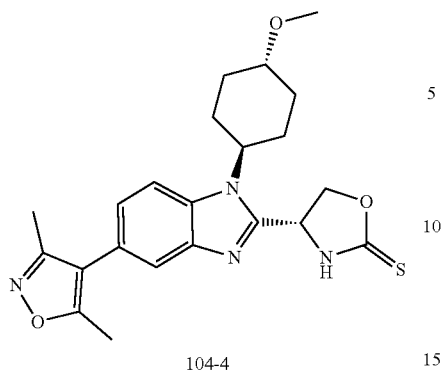

104-4

Intermediate 104-3 (130 mg, 0.34 mmol) and triethylamine (9 mg, 0.48 mmol were dissolved in 20 mL of tetrahydrofuran, to which was added thiophosgene (20 mg, 0.17 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 85 mg of product (intermediate 104-4), with a yield of 60%.

Synthesis of (R)-3-(3,4-difluorophenyl)-4-(5-(3,5-dimethylisoxazol-4-yl)-1-((trans)-4-methoxycyclohexyl)-1H-benzo[d]imidazol-2-yl)oxazolidine-2-one (Compound 104)

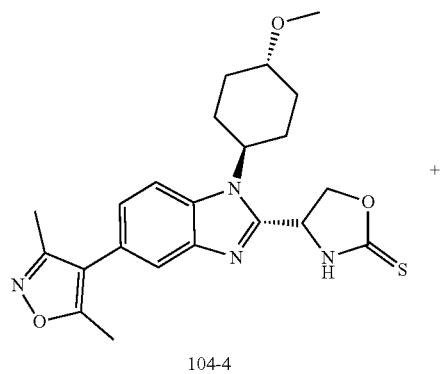

104-4

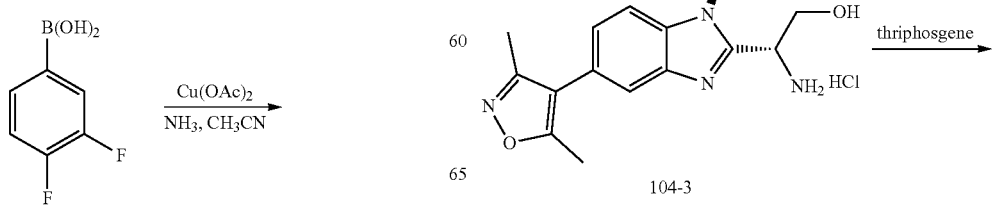

-continued

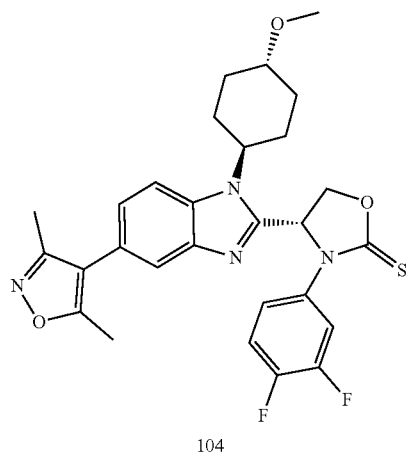

104

Intermediate 104-4 (83 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 50 mg of product (compound 104), with a yield of 48.9%. MS: m/z 539 [M+H]$^+$, $^1$H NMR (400 MHz, d$_6$-DMSO) δ 7.8-7.7 (m, 2H), 7.65-7.61 (m, 1H), 7.55-7.48 (m, 2H), 7.4-7.3 (m, 1H), 5.75-5.73 (m, 1H), 5.47-5.45 (m, 1H), 4.71-4.65 (m, 1H), 4.58-4.55 (m, 1H), 3.25 (s, 3H), 2.41 (s, 3H), 2.35-2.30 (m, 2H), 2.25 (s, 3H), 2.15-2.1 (m, 2H), 2.01-1.95 (m, 1H), 1.80-1.75 (m, 1H), 1.55-1.5 (m, 1H), 1.37-1.22 (m, 2H).

Example 105 Synthesis of Compound (R)-3-(3,4-difluorophenyl)-4-(5-(3,5-dimethylisoxazol-4-yl)-1-((trans)-4-methoxycyclohexyl)-1H-benzo[d]imidazol-2-yl)oxazolidine-2-one (105)

(R)-4-(5-(3,5-dimethylisoxazol-4-yl)-1-(trans)-4-methoxycyclohexyl)-1H-benzo[d]imidazol-2-yl)oxazolidine-2-one (Intermediate 105-1)

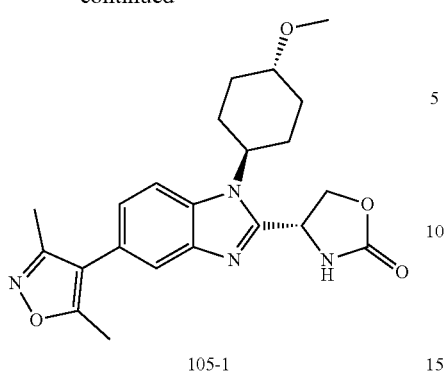

105-1

Intermediate 104-3 (130 mg, 0.34 mmol) and triethylamine (49 mg, 0.48 mmol) were dissolved in 20 mL of tetrahydrofuran, to which was added triphosgene (48.3 mg, 0.17 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 85 mg of product (intermediate 105-1), with a yield of 60%.

Synthesis of (R)-3-(3,4-difluorophenyl)-4-(5-(3,5-dimethylisoxazol-4-yl)-1-((trans)-4-methoxycyclohexyl)-1H-benzo[d]imidazol-2-yl)oxazolidine-2-one (Compound 105)

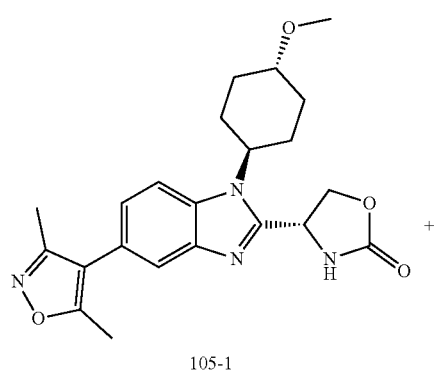

105-1

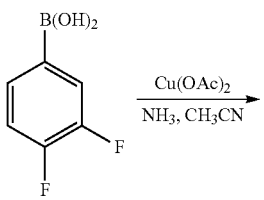

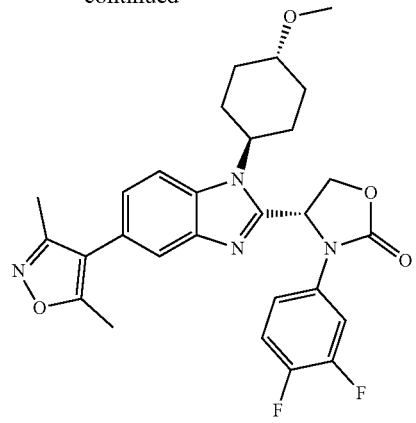

105

Intermediate 105-1 (83 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 50 mg of product (compound 105), with a yield of 48.9%. MS: m/z 523 [M+H]$^+$, $^1$H NMR (400 MHz, d$_6$-DMSO) δ 7.72 (d, J=8.5 Hz, 1H), 7.53-7.58 (m, 2H), 7.36-7.16 (m, 1H), 7.00-7.08 (m, 2H), 6.21 (d, J=5.9 Hz, 1H), 4.71 (t, J=8.4 Hz, 1H), 4.37 (m, 2H), 3.31 (s, 1H), 3.17 (s, 3H), 2.23 (s, 3H), 2.15 (d, J=12.3 Hz, 2H), 2.06 (s, 3H), 2.01 (d, J=9.3 Hz, 2H), 1.80 (d, J=13.2 Hz, 1H), 1.55 (d, J=12.3 Hz, 1H), 1.37-1.22 (m, 2H).

Example 106 Synthesis of Compound (S)-4-(3,4-difluorophenyl)-5-(5-(3,5-dimethylisoxazol-4-yl)-1-(trans)-4-methoxycyclohexyl)-1H-benzo[d]imidazol-2-yl)-1,4-oxazepan-3-one (106)

Synthesis of t-butyl ((S)-3-((t-butyldimethylsilyl)oxy)-1-(5-(3,5-dimethylisoxazol-4-yl)-1-((trans)-4-methoxycyclohexyl)-1H-benzo[d]imidazol-2-yl)propylcarbamate (Intermediate 106-1)

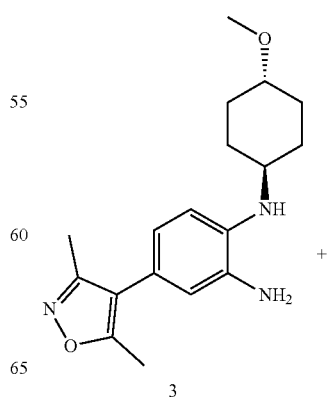

3

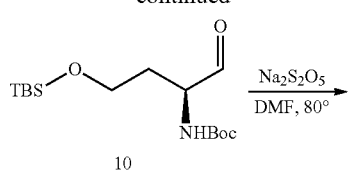

Intermediate 10 (600 mg, 1.9 mmol) was dissolved in N,N-dimethylformamide (30 mL), to which were added intermediate 3 (535 mg, 1.7 mmol) and sodium metabisulfite (720 mg, 3.8 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 720 mg of product (compound 106-1), with a yield of 70.6%.

Synthesis of t-butyl (S)-3-hydroxyl-1-(1-((trans)-4-methoxycyclohexyl)-5-(3-methylisoxazol-4-yl)-1H-benzo[d]imidazole-2-oxyformamidopropyl) (Intermediate 106-2)

Intermediate 106-1 (500 mg, 0.82 mmol) and potassium hydrogen difluoride (320 mg, 4.1 mmol) were dissolved in methanol (20 mL) and water (4 mL), and then the reaction solution was allowed to react overnight at 30° C. The solution was concentrated and extracted with dichloromethane. The organic phase was dried over anhydrous sodium sulfate and concentrated, to provide 356 mg of product (compound 106-2), with a yield of 90%.

Synthesis of t-butyl 2-((S)-3-(t-butoxycarbonylamino)-3-(1-(trans)-4-methoxycyclohexyl)-5-(3-methylisoxazol-4-yl)-1H-benzo[d]imidazol-2-yl) propoxy)acetate (Compound 106-3)

Intermediate 106-2 (300 mg, 0.62 mmol) was dissolved in anhydrous tetrahydrofuran (5 mL), to which was added sodium hydride (62 mg, 1.55 mmol) in batches in an ice bath. After addition, the ice bath was removed and the reaction solution was allowed to react for half an hour at room temperature. Then, t-butyl bromoacetate (157 mg, 0.81 mmol) was added to the reaction solution, and the resultant solution was reacted for about 2-3 h, to which was added aqueous ammonium chloride. The resultant solution was extracted with ethyl acetate. The organic phase was dried over anhydrous sodium sulfate and concentrated. The residue was purified by column chromatography to obtain 105 mg of product (compound 106-3), with a yield of 28%.

Synthesis of 2-((S)-3-amino-3-(1-(trans)-4-methoxy-cyclohexyl)-5-(3-methylisoxazol-4-yl)-1H-benzo[d]imidazole-2-acyl)propoxy)acetic acid hydrochloride (Compound 106-4)

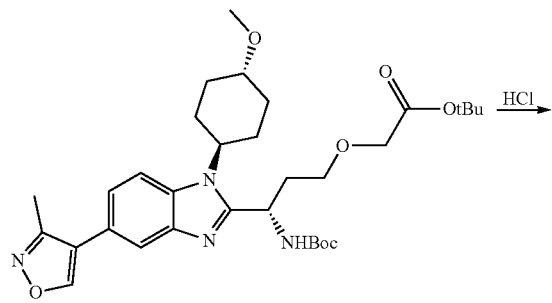

106-3

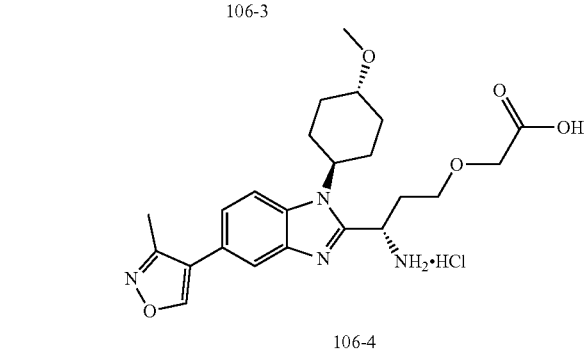

106-4

Compound 106-3 (105 mg, 0.18 mmol) was added in concentrated hydrochloric acid (2 mL), and the reaction solution was stirred for 3 h at room temperature. After completion of the reaction, the solvent was removed by rotatory evaporation to provide 80 mg of product (intermediate 106-4), with a yield of 93%.

Synthesis of (S)-5-(5-(3,5-dimethylisoxazol-4-yl)-1-((trans)-4-methoxycyclohexyl)-1H-benzo[d]imidazol-2-yl)-1,4-oxazepan-3-one (Intermediate 106-5)

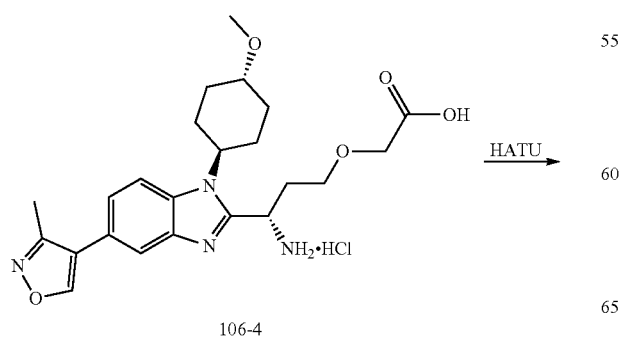

106-4

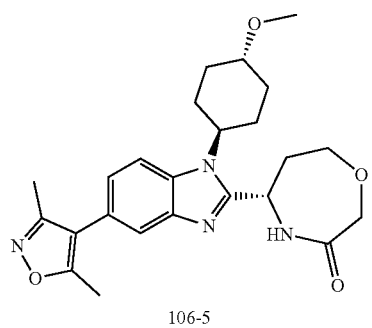

106-5

Intermediate 106-4 (80 mg, 0.17 mmol) and diisopropylethylamine (71 mg, 0.55 mmol) were dissolved in N,N-dimethylformamide, to which was added HATU (97 mg, 0.26 mmol) under stirring, and the reaction solution was stirred overnight at room temperature. After completion of the reaction, water was added to the reaction solution, and then the resultant solution was extracted with ethyl acetate. The organic phase was dried over anhydrous sodium sulfate and concentrated. The residue was purified by prep. TLC to obtain 48 mg of product (intermediate 106-5), with a yield of 65%.

Synthesis of (S)-4-(3,4-difluorophenyl)-5-(5-(3,5-dimethylisoxazol-4-yl)-1-(trans)-4-methoxycyclohexyl)-1H-benz[d]imidazol-2-yl)-1,4-oxazepan-3-one (Product 106)

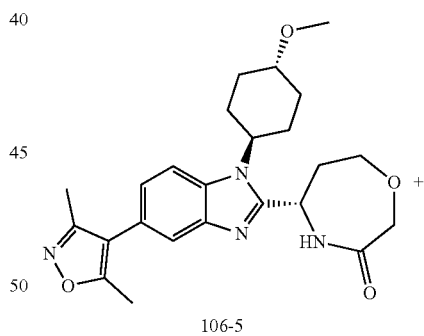

106-5

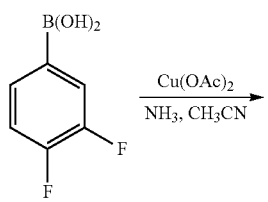

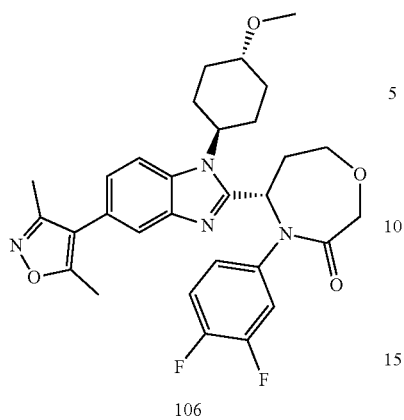

106

Intermediate 106-5 (30 mg, 0.07 mmol), 3,4-difluorophenylboronic acid (44 mg, 0.28 mmol), copper acetate monohydrate (22 mg, 0.11 mmol) and triethylamine (14 mg, 0.14 mmol) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by preparative TLC to obtain 21 mg of product (compound 106), with a yield of 56%. MS: m/z 551 [M+H]$^+$, $^1$H NMR (400 MHz, d$_6$-DMSO) δ 7.86 (d, J=8.5 Hz, 1H), 7.72 (d, J=1.2 Hz, 1H), 7.40 (dd, J=19.6, 9.1 Hz, 1H), 7.34-7.23 (m, 1H), 7.23-7.11 (m, 1H), 6.95 (d, J=8.6 Hz, 1H), 5.70 (s, 1H), 4.83 (d, J=15.1 Hz, 1H), 4.37 (d, J=15.0 Hz, 2H), 3.98 (d, J=12.2 Hz, 1H), 3.40 (d, J=11.3 Hz, 2H), 3.27 (s, 3H), 2.85-2.60 (m, 1H), 2.42 (s, 3H), 2.37-2.20 (m, 6H), 2.17-2.07 (m, 1H), 2.03 (d, J=12.2 Hz, 1H), 1.82 (d, J=11.2 Hz, 1H), 1.50 (d, J=12.5 Hz, 1H), 1.42-1.27 (m, 2H).

Example 107 Synthesis of Compound 4-(2-(((((2S,5S)-2-(3,4-difluorophenyl)-5-methylpyrrolidin-1-yl)methyl)-1-((trans)-4-methoxycyclohexyl)-1H-benzo[d]imidazole-5-yl)-3,5-dimethylisoxazole (107)

Synthesis of t-butyl 2-((2S,5S)-2-(3,4-difluorophenyl)-5-methylpyrrolidin-1-yl)acetate (Intermediate 107-2)

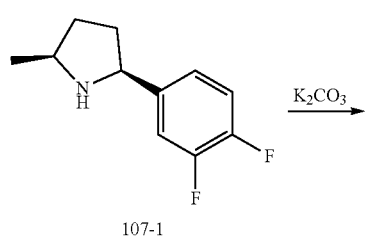

107-1

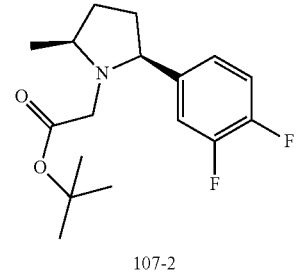

107-2

Compound 107-1 (100 mg, 0.51 mmol) and t-butyl bromoacetate (119 mg, 0.61 mmol) were dissolved in acetonitrile (3 mL), to which was added potassium carbonate (176 mg, 1.3 mmol), and then the reaction solution was stirred overnight at room temperature. After completion of the reaction, water was added to the reaction solution, and the resultant solution was extracted three times with ethyl acetate. The organic phase was combined, dried over anhydrous sodium sulfate, and concentrated, to provide 155 mg of crude product (107-2), with a yield of 97%.

Synthesis of 2-((2S,5S)-2-(3,4-difluorophenyl)-5-methylpyrrolidin-1-yl)acetic acid (Intermediate 107-3)

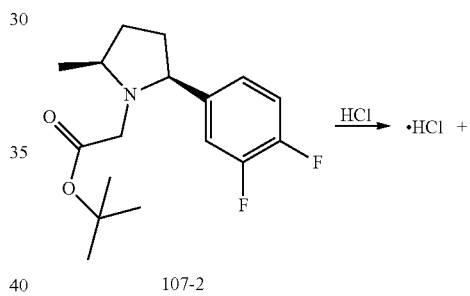

107-2

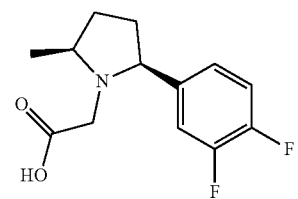

107-3

Compound 107-2 (155 mg, 0.5 mmol) was added in concentrated hydrochloric acid (3 mL), and the reaction solution was stirred overnight at room temperature. After completion of the reaction, the reaction solution was concentrated to provide 103 mg of crude product (107-3), with a yield of 71%.

73
Synthesis of 2-((2S,5S)-2-(3,4-difluorophenyl)-5-methylpyrrolidin-1-yl)-N-(5-(3,5-dimethylisoxazol-4-yl)-2-((trans)-4-methoxycyclohexylamino)phenyl)acetamide (Intermediate 107-4)

74
Synthesis of 4-(2-((((2S,5S)-2-(3,4-difluorophenyl)-5-methylpyrrolidin-1-yl)methyl)-1-((trans)-4-methoxycyclohexyl)-1H-benzo[d]imidazole-5-yl)-3,5-dimethylisoxazole (107)

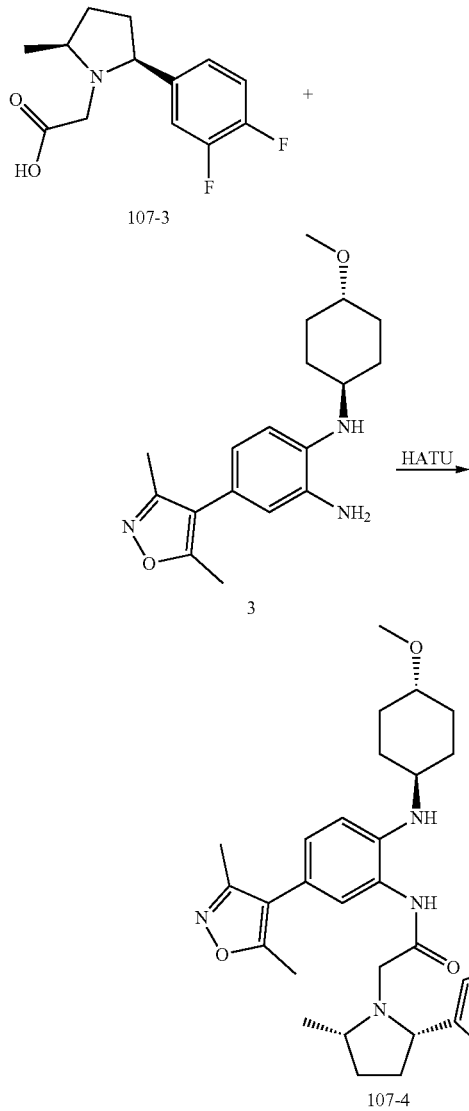

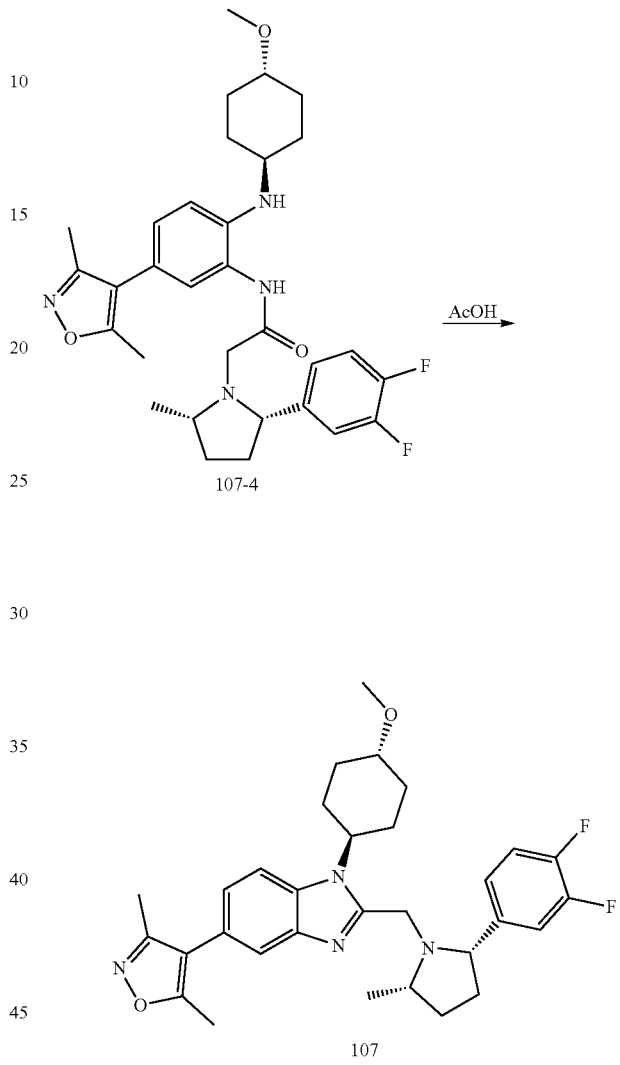

Compound 107-3 (30 mg, 0.1 mmol), intermediate 3 (36 mg, 0.11 mmol), and diisopropylethylamine (52 mg, 0.4 mmol) were dissolved in N,N-dimethylformamide (2 mL), to which was added HATU (57 mg, 0.15 mmol) under stirring, and then the reaction solution was stirred overnight at room temperature. After completion of the reaction, water was added to the reaction solution, and the resultant solution was extracted three times with ethyl acetate. The organic phase was combined, dried over anhydrous sodium sulfate, and concentrated. The residue was purified by prep. TLC, to provide 21 mg of product (intermediate 107-4), with a yield of 38%.

Intermediate 107-4 (21 mg, 0.04 mmol) was dissolved in acetic acid (3 mL), and the solution was heated to 60° C. and allowed to react overnight. After completion of the reaction, pH value was adjusted to be 9-10 with aqueous potassium carbonate solution. The resultant solution was extracted three times with ethyl acetate. The organic phase was combined, dried over anhydrous sodium sulfate, and concentrated. The residue was purified by prep. TLC, to provide 8 mg of product (107), with a yield of 37%. MS: m/z 535 [M+H]$^+$, $^1$H NMR (400 MHz, d$_6$-DMSO) δ 7.72 (d, J=8.5 Hz, 1H), 7.51 (d, J=1.3 Hz, 1H), 7.42-7.31 (m, 1H), 7.30-7.14 (m, 2H), 7.10 (dd, J=8.5, 1.5 Hz, 1H), 4.20 (t, J=12.2 Hz, 1H), 3.82 (s, 2H), 3.75 (t, J=7.5 Hz, 1H), 3.43-3.30 (m, 4H), 3.00 (dd, J=12.9, 6.6 Hz, 1H), 2.39 (s, 3H), 2.24-1.91 (m, 10H), 1.74-1.48 (m, 3H), 1.38-1.28 (m, 1H), 0.95 (dd, J=23.6, 9.7 Hz, 1H), 0.82 (d, J=6.0 Hz, 3H).

Example 108 Synthesis of (S)-3-(3,4-difluorophenyl)-4-(5-(3,5-dimethylisoxazol-4-yl)-1-((trans)-4-(methoxy-d₃)cyclohexyl)-1H-benzo[d]imidazol-2-yl)-1-methyltetrahydropyrimidine-2(1H)-one (108)

Synthesis of t-butyl ((S)-3-((t-butyldimethylsilyl)oxy)-1-(5-(3,5-dimethylisoxazol-4-yl)-1-((trans)-4-deuteromethoxycyclohexyl)-1H-benzo[d]imidazol-2-yl)propyl)carbamate (108-1)

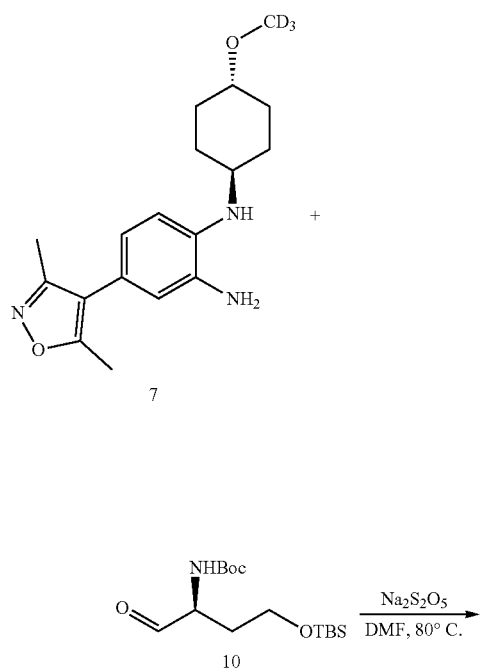

Intermediate 10 (380 mg, 1.2 mmol) was dissolved in N,N-dimethylformamide (15 mL), to which were added intermediate 7 (318 mg, 1 mmol) and sodium pyrosulfite (379 mg, 2 mmol), and then the reaction solution was allowed to react for 5 h at 80° C. 25 mL of water was added to the reaction solution, and then the solution was extracted with ethyl acetate. The organic phase was dried over anhydrous sodium sulfate, and concentrated. The residue was purified by column chromatography to obtain intermediate 108-1 (460 mg, 0.75 mmol), with a yield of 75%.

Synthesis of t-butyl (S)-1-(5-(3,5-dimethylisoxazol-4-yl)-1-((trans)-4-(methoxy-d₃)cyclohexyl)-1H-benzo[d]imidazol-2-yl)-3-hydroxypropyl) carbamate (Intermediate 108-2)

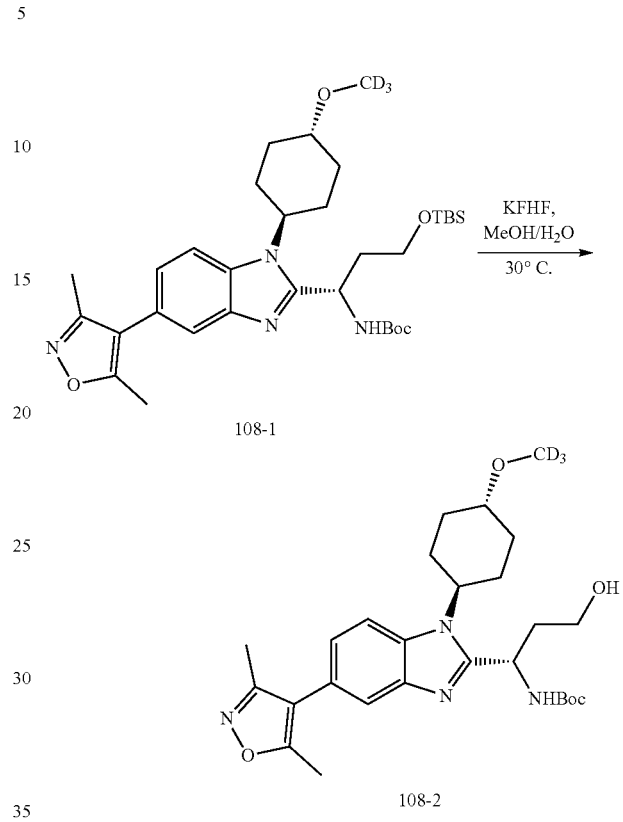

Intermediate 108-1 (460 mg, 0.75 mmol) was dissolved in methanol (4 mL) and water (1 mL), to which was added KHF₂ (117 mg, 1.5 mmol), and then the reaction solution was allowed to react overnight at 30° C. The solution was concentrated and extracted with dichloromethane. The organic phase was dried over anhydrous sodium sulfate and concentrated. The residue was purified by column chromatography, to provide 245 mg of intermediate 108-2, with a yield of 81.5%.

Synthesis of t-butyl (S)-1-(5-(3,5-dimethylisoxazol-4-yl)-1-((trans)-4-(methoxy-d₃)cyclohexyl)-1H-benzo[d]imidazol-2-yl)-3-oxopropyl)carbamate (Intermediate 108-3)

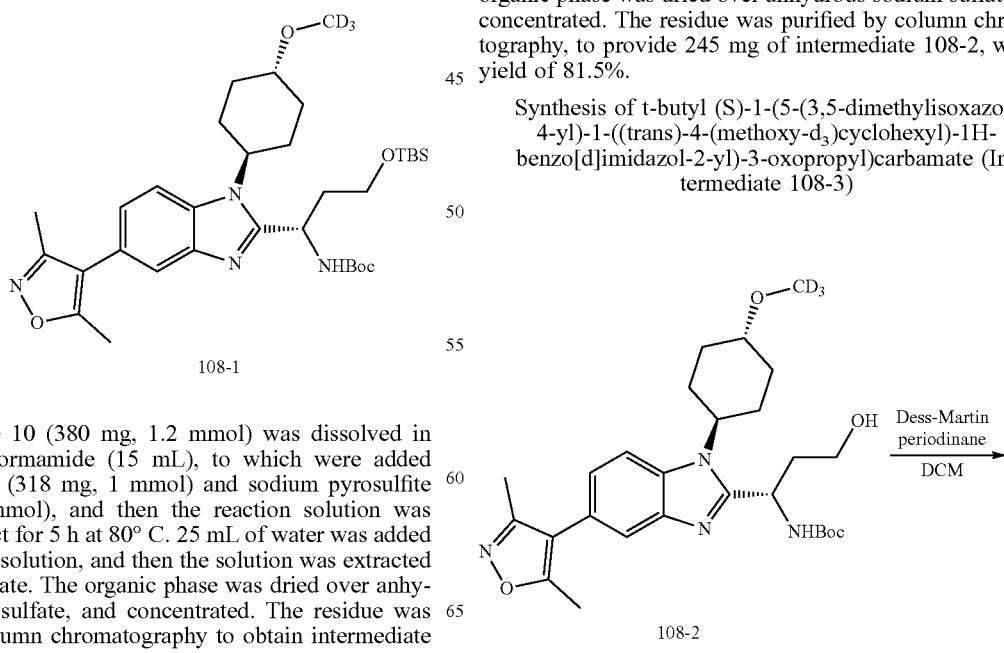

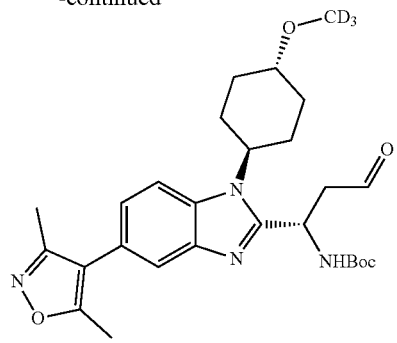

108-3

Intermediate 108-2 (502 mg, 1 mmol) was dissolved in dichloromethane (10 mL), to which was added Dess-Martin periodinane (625 mg, 1.5 mmol), and the reaction solution was stirred and reacted for 3 h at room temperature. After completion of the reaction, the reaction solution was filtered to remove the insoluble material, and the filtrate was evaporated under reduced pressure to remove the solvent. The residue was purified by column chromatography to obtain 475 mg of intermediate 108-3, with a yield of 95.1%.

Synthesis of t-butyl (S)-1-(5-(3,5-dimethylisoxazol-4-yl)-1-((trans)-4-(methoxy-d₃)cyclohexyl)-1H-benzo[d]imidazol-2-yl)-3-(methylamino)propyl) carbamate (Intermediate 108-4)

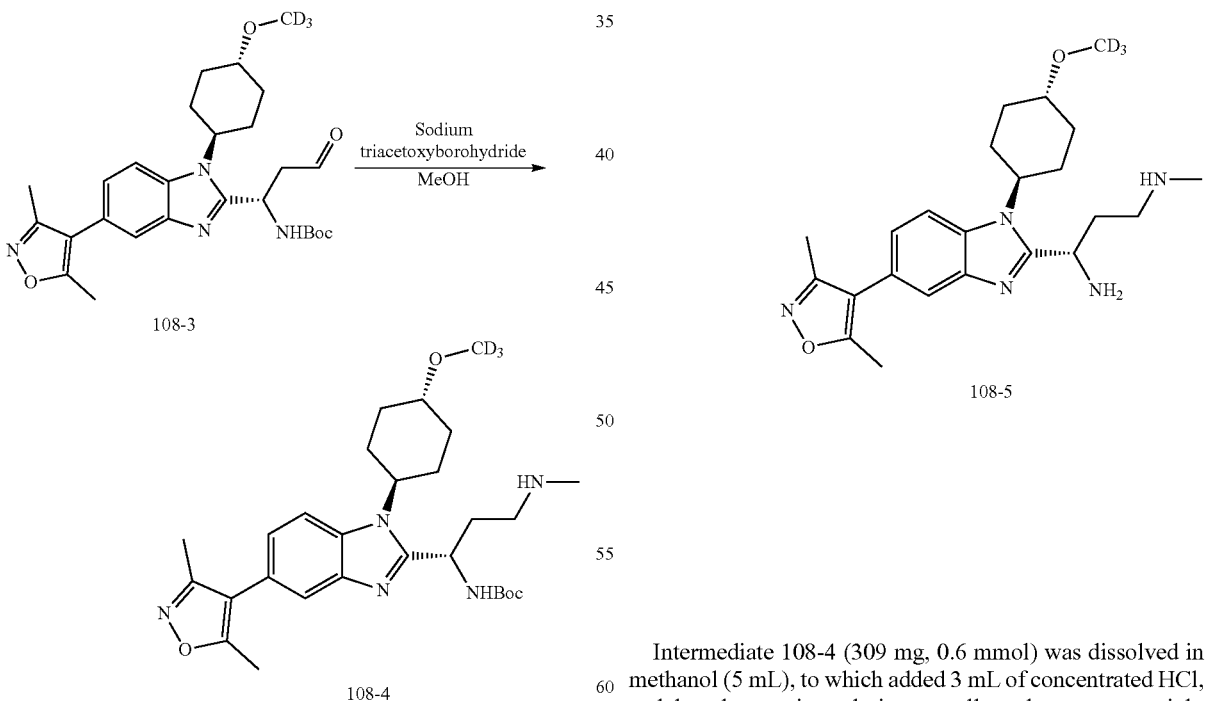

Intermediate 108-3 (400 mg, 0.8 mmol) was dissolved in methanol (5 mL), to which were added the solution of methylamine (25 mg, 0.8 mmol) in ethanol and sodium triacetoxyborohydride (170 mg, 0.8 mmol), and then the reaction solution was stirred and reacted for 5 h. After completion of the reaction, the reaction solution was concentrated and extracted with dichloromethane. The organic phase was dried over anhydrous sodium sulfate and concentrated. The residue was purified by column chromatography, to provide 371 mg of intermediate 108-4, with a yield of 90.2%.

Synthesis of (S)-1-(5-(3,5-dimethylisoxazol-4-yl)-1-((trans)-4-(methoxy-d₃)cyclohexyl)-1H-benzo[d]imidazol-2-yl)-N³-methylpropane-1,3-diamine (Intermediate 108-5)

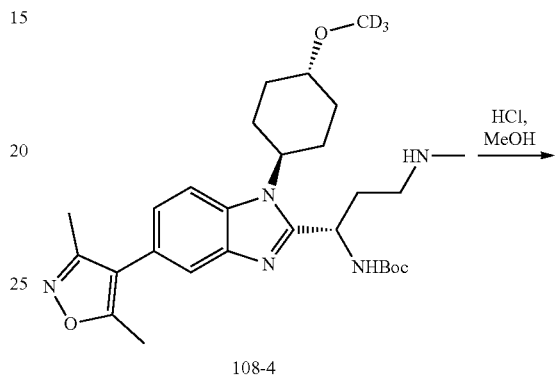

Intermediate 108-4 (309 mg, 0.6 mmol) was dissolved in methanol (5 mL), to which added 3 mL of concentrated HCl, and then the reaction solution was allowed to react overnight at 30° C. pH value was adjusted to be 9-10. Then, the reaction solution was concentrated and extracted with dichloromethane. The organic phase was dried over anhydrous sodium sulfate and concentrated. The residue was purified by column chromatography, to provide 228 mg of product (intermediate 108-5), with a yield of 92.5%.

Synthesis of (S)-4-(5-(3,5-dimethylisoxazol-4-yl)-1-((trans)-4-(methoxy-d₃)cyclohexyl)-1H-benzo[d]imidazol-2-yl)-1-methyltetrahydropyrimidine-2(1H)-one (Intermediate 108-6)

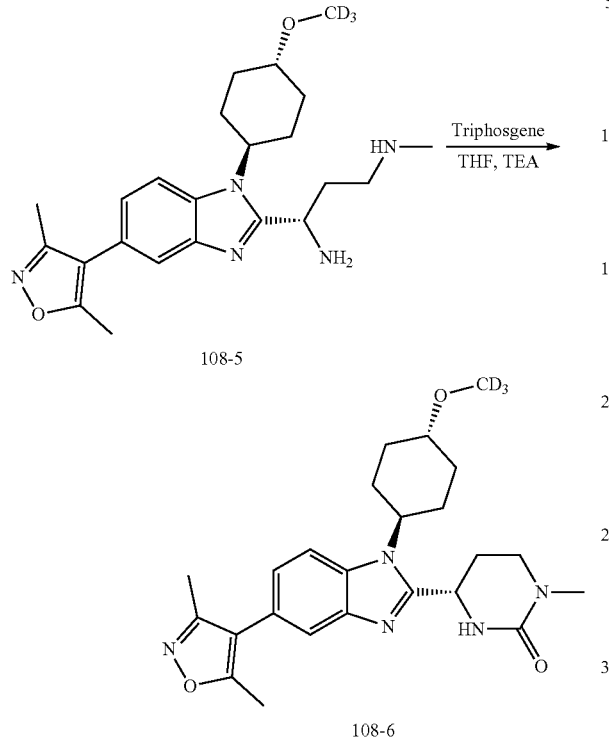

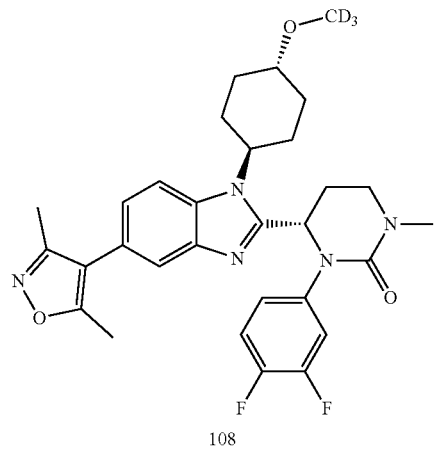

Intermediate 108-5 (137 mg, 0.33 mmol) and triethylamine (49 mg, 0.48 mmol) were dissolved in 20 mL of tetrahydrofuran, to which was added triphosgene (48.3 mg, 0.17 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 86 mg of product (intermediate 108-6), with a yield of 59.5%.

Synthesis of (S)-3-(3,4-difluorophenyl)-4-(5-(3,5-dimethylisoxazol-4-yl)-1-((trans)-4-(methoxy-d₃)cyclohexyl)-1H-benzo[d]imidazol-2-yl)-1-methyltetrahydropyrimidine-2(1H)-one (Compound 108)

Intermediate 108-6 (88 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 45 mg of product (compound 108), with a yield of 40.7%. MS: m/z 553 [M+H]⁺.

Example 109 Synthesis of Compound (S)-3-(4-chloro-3-fluorophenyl)-4-(5-(3,5-dimethylisoxazol-4-yl)-1-((trans)-4-(methoxy-d₃)cyclohexyl)-1H-benzo[d]imidazol-2-yl)-1-methyltetrahydropyrmidine-2(1H)-one (109)

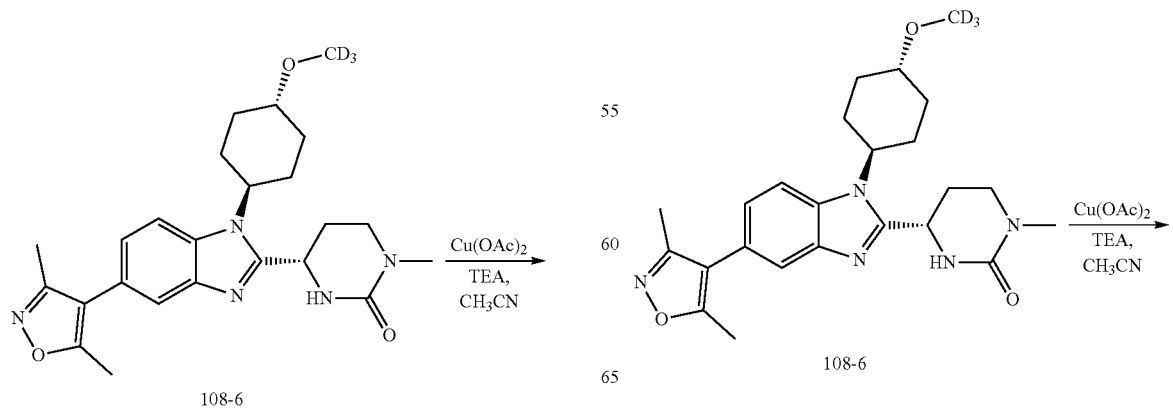

81

-continued

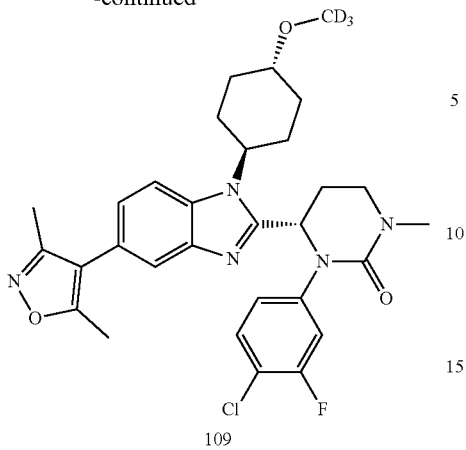

109

Intermediate 108-6 (88 mg, 0.2 mmol), 4-chloro-3-fluorophenylboronic acid (140 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 47 mg of product (compound 109), with a yield of 41.5%. MS: m/z 569 $[M+H]^+$.

Example 110 Synthesis of (S)-1-(3,4-difluorophenyl)-6-(5-(3,5-dimethylisoxazol-4-yl)-1-((trans)-4-methoxycyclohexyl)-1H-benzo[d]imidazol-2-yl)-3-methyldihydropyrimidine-2,4(1H,3H)-dione (110)

Synthesis of (S)—N-(5-(3,5-dimethylisoxazol-4-yl)-2-(((((trans)-4-methoxycyclohexyl)amino)phenyl)-1-methyl-2,6-dioxohexahydropyrimidine-4-carboxamide (Intermediate 110-1)

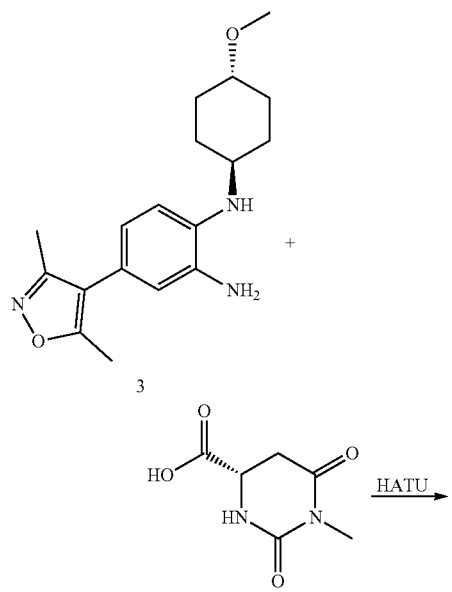

82

-continued

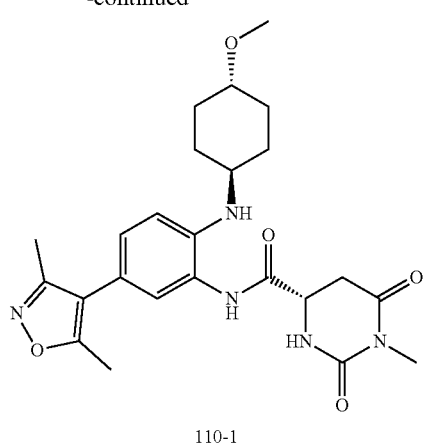

110-1

Intermediate 3 (630 mg, 2 mmol), (S)-1-methyl-2,6-dioxohexahydropyrimidine-4-carboxylic acid (340 mg, 2 mmol), and HATU (910 mg, 2.4 mmol) were dissolved in N,N-dimethylformamide (10 mL), to which was added triethylamine (400 mg, 4 mmol), and then the reaction solution was allowed to react for 5 h. To the reaction solution was added 50 mL of water, and the resultant solution was extracted with ethyl acetate. The organic phase was dried over anhydrous sodium sulfate, and concentrated. The residue was purified by column chromatography to obtain 620 mg of product (compound 110-1), with a yield of 66.1%.

Synthesis of (S)-6-(5-(3,5-dimethylisoxazol-4-yl)-1-((trans)-4-methoxycyclohexyl)-1H-benzo[d]imidazol-2-yl)-3-methyldihydropyrimidine-2,4(1H,3H)-dione (Intermediate 110-2)

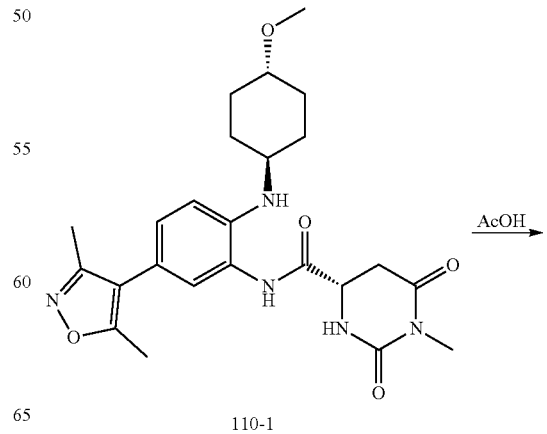

110-1

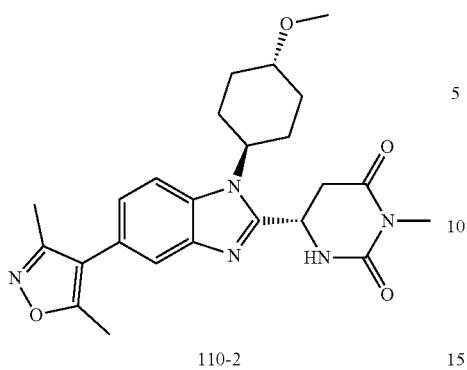

110-2

Intermediate 110-1 (620 mg, 1.3 mmol) was dissolved in acetic acid (20 mL), and then the reaction solution was allowed to react overnight. The solution was concentrated, to which was added water (20 ml). The resultant solution was extracted with dichloromethane. The organic phase was dried over anhydrous sodium sulfate, and concentrated. The residue was purified by column chromatography to obtain 180 mg of product (intermediate 110-2), with a yield of 29.8%.

Synthesis of (S)-1-(3,4-difluorophenyl)-6-(5-(3,5-dimethylisoxazol-4-yl)-1-((trans)-4-methoxycyclohexyl)-1H-benzo[d]imidazol-2-yl)-3-methyldihydropyrimidine-2,4(1H,3H)-dione (Compound 110)

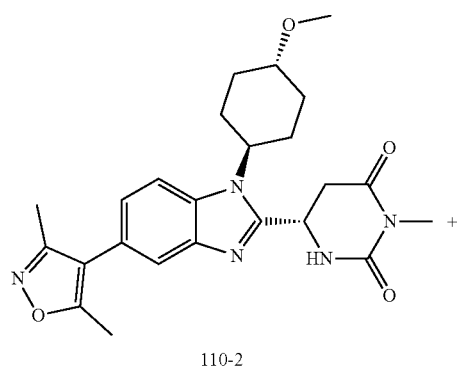

110-2

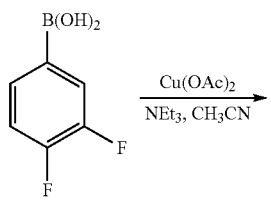

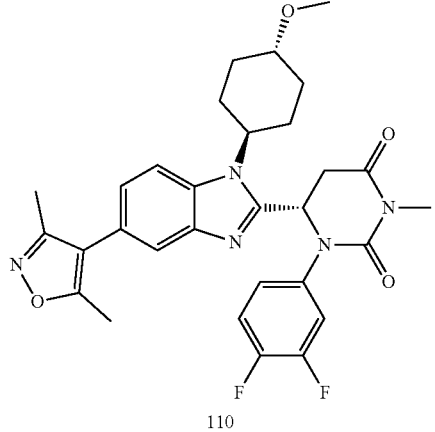

110

Intermediate 110-2 (90 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 35 mg of product (compound 110), with a yield of 31.4%. MS: m/z 564 [M+H]$^+$, $^1$H NMR (400 MHz, d$_6$-DMSO) δ 7.82 (d, J=8.5 Hz, 1H), 7.64 (d, J=1.5 Hz, 1H), 7.48 (ddd, J=26.0, 13.5, 5.8 Hz, 2H), 7.17 (dt, J=5.7, 2.8 Hz, 1H), 7.14-7.07 (m, 1H), 5.86 (d, J=5.0 Hz, 1H), 4.17 (t, J=12.0 Hz, 1H), 3.69 (dd, J=16.5, 6.9 Hz, 1H), 3.37 (dd, J=11.4, 7.3 Hz, 1H), 3.26 (s, 3H), 3.11 (s, 3H), 2.89 (dt, J=16.5, 8.1 Hz, 1H), 2.39 (s, 3H), 2.27-2.14 (m, 4H), 2.14-1.93 (m, 2H), 1.81 (d, J=12.1 Hz, 1H), 1.38-1.18 (m, 4H).

Example 111 Synthesis of (R)-4-(3,4-difluorophenyl)-5-(5-(3,5-dimethylisoxazol-4-yl)-1-((trans)-4-methoxycyclohexyl)-1H-benzo[d]imidazol-2-yl) morpholine-3-one (111)

Synthesis of 2-chloro-N—((R)-1-(5-(3,5-dimethylisoxazol-4-yl)-1-((trans)-4-methoxycyclohexyl)-1H-benzo[d]imidazole-2-yl)-2-hydroxyethyl)acetamide (Intermediate 111-1)

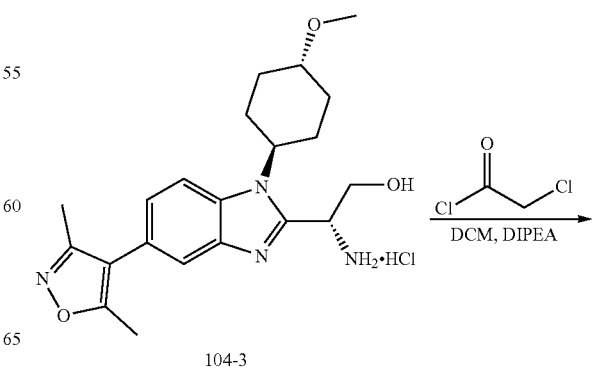

104-3

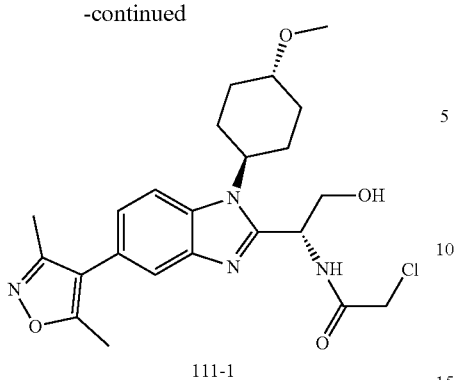

Intermediate 104-3 (100 mg, 0.24 mmol) and diisopropylethylamine (93 mg, 0.72 mmol) were dissolved in dichloromethane (3 mL), to which was added chloroacetyl chloride (30 mg, 0.26 mmol) dropwise in an ice bath. After addition, the ice bath was removed. After completion of the reaction, water was added to the reaction solution, and the resultant solution was extracted with dichloromethane. The organic phase was dried over anhydrous sodium sulfate, and concentrated. The residue was purified by column chromatography to obtain 63 mg of 111-1, with a yield of 57%.

Synthesis of (R)-5-(5-(3,5-dimethylisoxazol-4-yl)-1-((trans)-4-methoxycyclohexyl)-1H-benzo[d]imidazol-2-yl)morpholine-3-one (Intermediate 111-2)

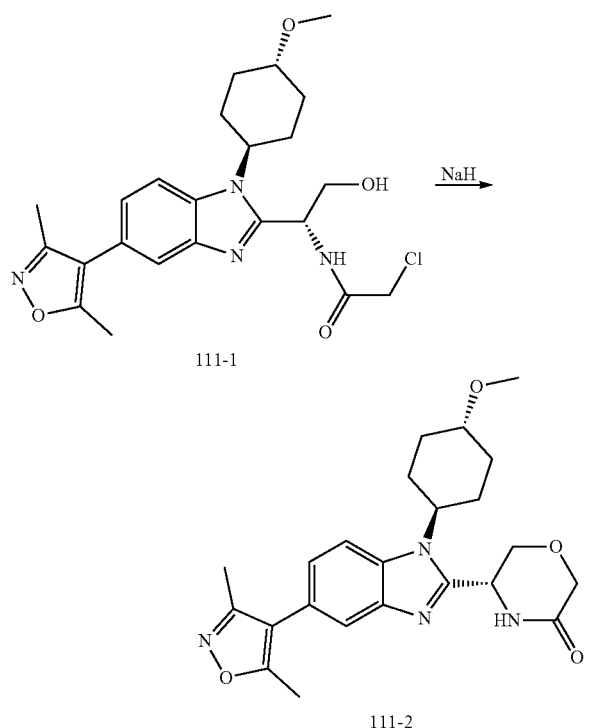

Intermediate 111-1 (63 mg, 0.14 mmol) was dissolved in anhydrous tetrahydrofuran (3 mL), to which was added sodium hydride (16 mg, 0.41 mmol) in batches in an ice bath. After addition, the ice bath was removed and the reaction solution was allowed to react at room temperature. After completion of the reaction, aqueous ammonium chloride was added. The resultant solution was extracted with ethyl acetate. The organic phase was dried over anhydrous sodium sulfate and concentrated. The residue was purified by prep. TLC to obtain 35 mg of 111-2, with a yield of 59%.

Synthesis of (R)-4-(3,4-difluorophenyl)-5-(5-(3,5-dimethylisoxazol-4-yl)-1-((trans)-4-methoxycyclohexyl)-1H-benzo[d]imidazol-2-yl)morpholine-3-one (Compound 111)

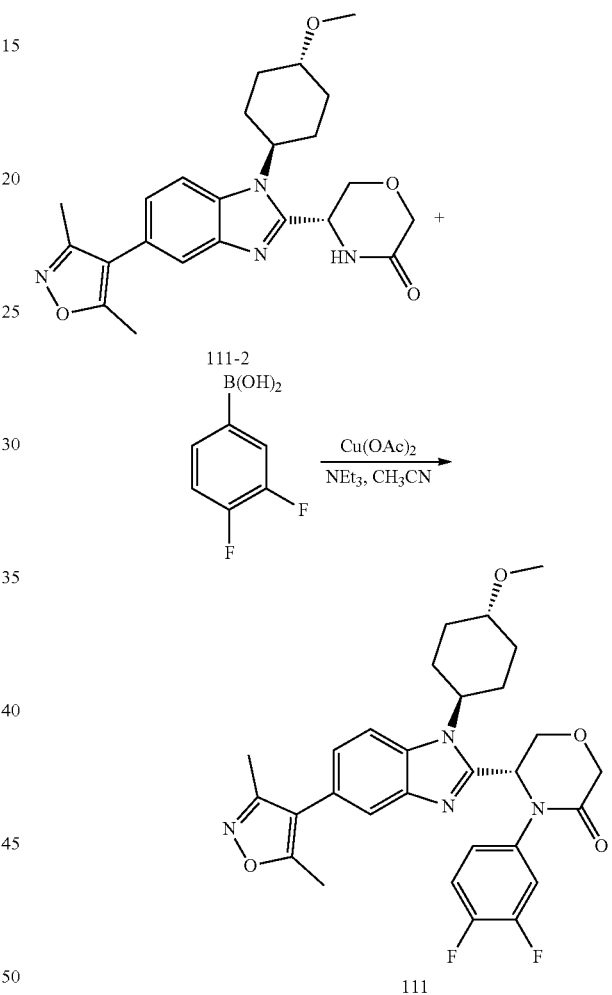

Intermediate 111-2 (35 mg, 0.08 mmol), 3,4-difluorophenylboronic acid (51 mg, 0.32 mmol), copper acetate monohydrate (24 mg, 0.12 mmol) and triethylamine (20 mg) were dissolved in 4 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain 21 mg of product (compound 111), with a yield of 48%. MS: m/z 537 [M+H]$^+$, $^1$H NMR (400 MHz, d$_6$-DMSO) δ 7.81 (d, J=8.5 Hz, 1H), 7.68 (d, J=1.3 Hz, 1H), 7.52 (ddd, J=11.9, 7.4, 2.3 Hz, 1H), 7.40 (dd, J=19.6, 9.1 Hz, 1H), 7.15 (dd, J=8.5, 1.5 Hz, 2H), 5.89 (s, 1H), 4.52-4.28 (m, 4H), 4.14 (dd, J=12.1, 3.7 Hz, 1H), 3.46-3.39 (m, 1H), 3.28 (s, 3H), 2.39 (s, 3H), 2.32-1.99 (m, 7H), 1.93-1.77 (m, 1H), 1.38 (dd, J=15.6, 12.8 Hz, 3H).

Example 112 Synthesis of Compound (S)-4-(3,4-difluorophenyl)-5-(5-(3,5-dimethylisoxazol-4-yl)-1-((trans)-4-methoxycyclohexyl)-1H-benzo[d]imidazol-2-yl)morphine-3-one (112)

Synthesis of t-butyl ((S)-2-((t-butyldimethylsilyl)oxy)-1-(5-(3,5-dimethylisoxazol-4-yl)-1-((trans)-4-methoxycyclohexyl)-1H-benzo[d]imidazol-2-yl)ethyl)carbamate (112-1)

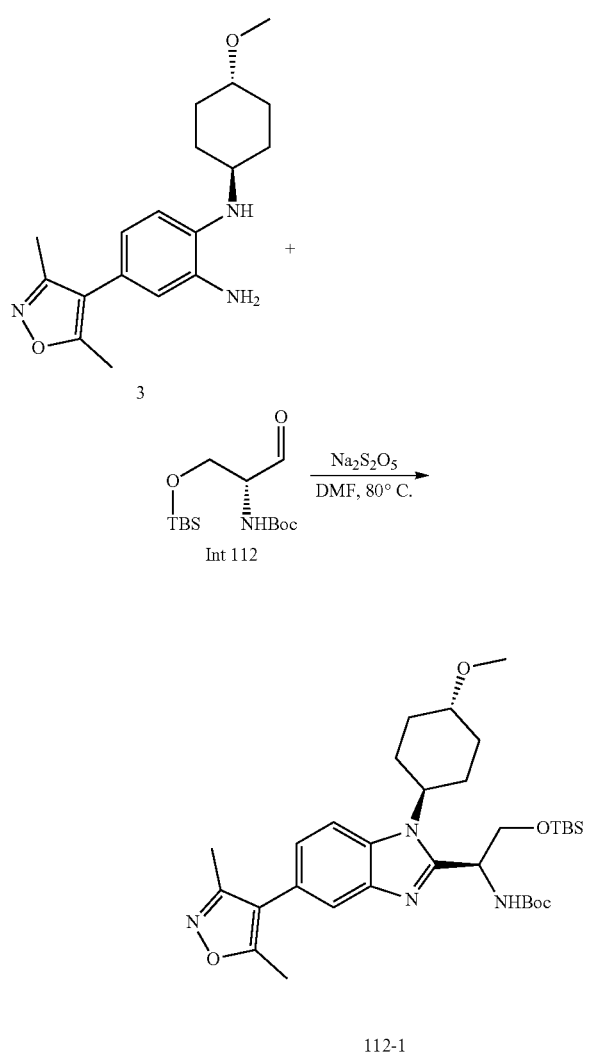

Intermediate 112 (300 mg, 1 mmol) was dissolved in N,N-dimethylformamide (15 mL), to which were added intermediate 3 (262 mg, 0.8 mmol) and sodium pyrosulfite (379 mg, 2 mmol), and then the reaction solution was allowed to react for 5 h at 80° C. 25 mL of water was added to the reaction solution, and then the solution was extracted with ethyl acetate. The organic phase was dried over anhydrous sodium sulfate, and concentrated. The residue was purified by column chromatography to obtain 420 mg of product (intermediate 112-1), with a yield of 70.2%.

Synthesis of (S)-2-amino-2-(5-(3,5-dimethylisoxazol-4-yl)-1-((trans)-4-methoxycyclohexyl)-1H-benzo[d]imidazol-2-yl)ethanol (112-2)

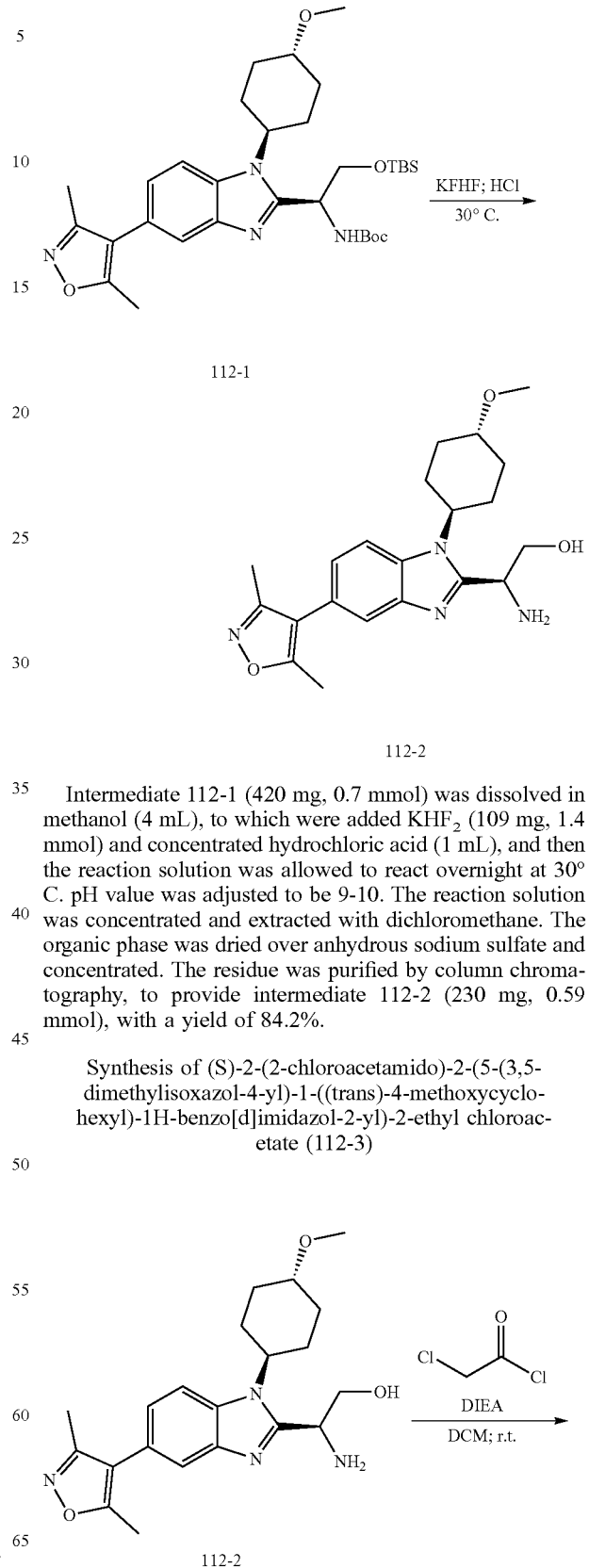

Intermediate 112-1 (420 mg, 0.7 mmol) was dissolved in methanol (4 mL), to which were added $KHF_2$ (109 mg, 1.4 mmol) and concentrated hydrochloric acid (1 mL), and then the reaction solution was allowed to react overnight at 30° C. pH value was adjusted to be 9-10. The reaction solution was concentrated and extracted with dichloromethane. The organic phase was dried over anhydrous sodium sulfate and concentrated. The residue was purified by column chromatography, to provide intermediate 112-2 (230 mg, 0.59 mmol), with a yield of 84.2%.

Synthesis of (S)-2-(2-chloroacetamido)-2-(5-(3,5-dimethylisoxazol-4-yl)-1-((trans)-4-methoxycyclohexyl)-1H-benzo[d]imidazol-2-yl)-2-ethyl chloroacetate (112-3)

-continued

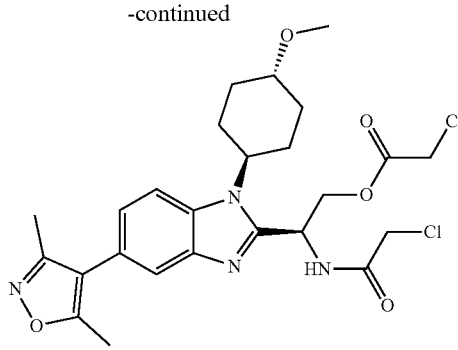

112-3

112-2 (230 mg, 0.59 mmol) was dissolved in dichloromethane (2 mL), to which were added N,N-diisopropylethylamine (155 mg, 1.18 mmol) and chloroacetyl chloride (133 mg, 1.18 mmol). The reaction solution was stirred for 4 h at room temperature, and then washed with water (2 mL). The solution was dried over anhydrous sodium sulfate, and concentrated, to obtain intermediate 112-3 (300 mg, 0.56 mmol), with a yield of 95%.

Synthesis of 2-chloro-N—((S)-1-(5-(3,5-dimethyl-isoxazol-4-yl)-1-((trans)-4-methoxycyclohexyl)-1H-benzo[d]imidazol-2-yl)-2-hydroxyethyl)acetamide (112-4)

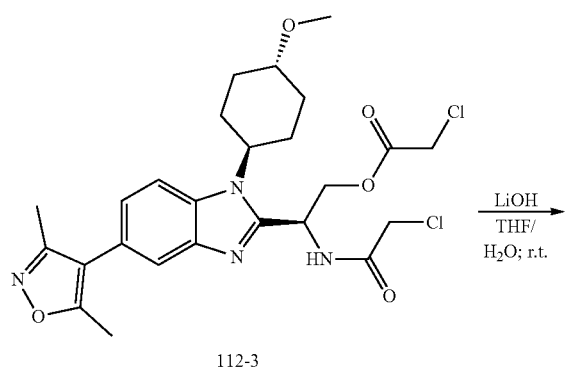

112-3

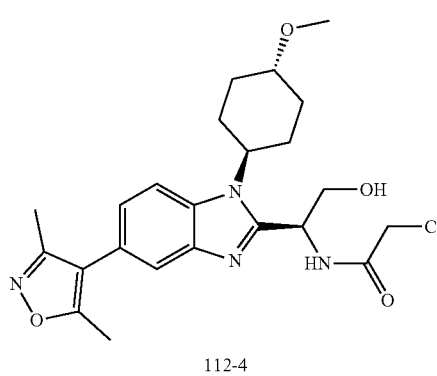

112-4

112-3 (300 mg, 0.56 mmol) was dissolved in tetrahydrofuran (3 mL), to which were added water (0.6 mL) and lithium hydroxide monohydrate (47 mg, 1.12 mmol), and the reaction solution was stirred at room temperature for 4 h. The solution was rotatory evaporated to dry, and then dichloromethane (5 mL) was added. The solution was successively washed with water (5 mL) and saturated brine (5 mL), and then dried over anhydrous sodium sulfate. The solution was rotatory evaporated to dry, to provide intermediate 112-4 (230 mg, 0.5 mmol), with a yield of 90%.

Synthesis of (S)-5-(5-(3,5-dimethylisoxazol-4-yl)-1-((trans)-4-methoxycyclohexyl)-1H-benzo[d]imidazol-2-yl)morphine-3-one (112-5)

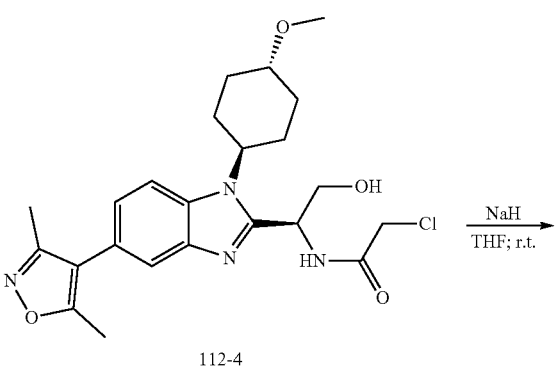

112-4

112-5

112-4 (230 mg, 0.5 mmol) was dissolved in tetrahydrofuran (2 mL), to which was added NaH (20 mg, 0.5 mmol), and then the reaction solution was stirred overnight at room temperature. Water (4 mL) was added to the reaction solution, and then the resultant solution was extracted with dichloromethane (4 mL×3). The organic phase was combined, washed with saturated brine (4 mL), and dried over anhydrous sodium sulfate. The solution was rotatory evaporated to dry, to provide intermediate 112-5 (191 mg, 0.45 mmol), with a yield of 90%.

Synthesis of (S)-4-(3,4-difluorophenyl)-5-(5-(3,5-dimethylisoxazol-4-yl)-1-((trans)-4-methoxycyclohexyl)-1H-benzo[d]imidazol-2-yl)morphine-3-one (112)

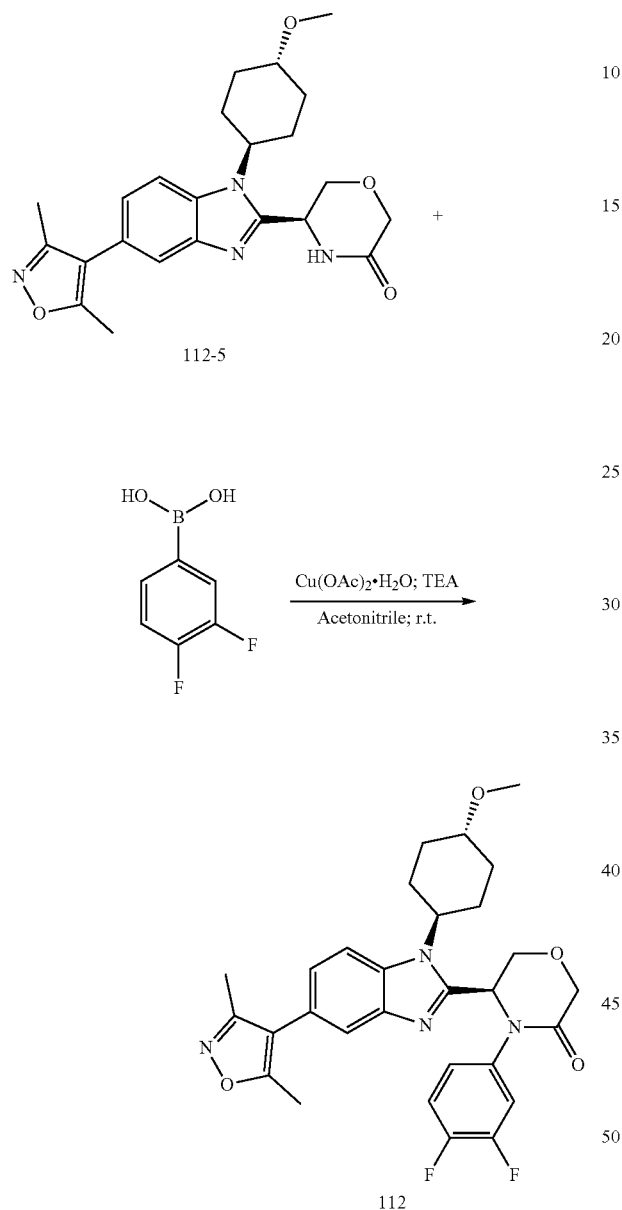

Example 113 Synthesis of (S)-4-(3,4-difluorophenyl)-5-(5-(3,5-dimethylisoxazol-4-yl)-1-((trans)-4-deuteromethoxycyclohexyl)-1H-benzo[d]imidazol-2-yl)morphine-3-one (113)

Synthesis of (S)-3-amino-3-(5-(3,5-dimethylisoxazol-4-yl)-1-((trans)-4-deuteromethoxycyclohexyl)-1H-benzo[d]imidazol-2-yl)propane-1-ol (113-1)

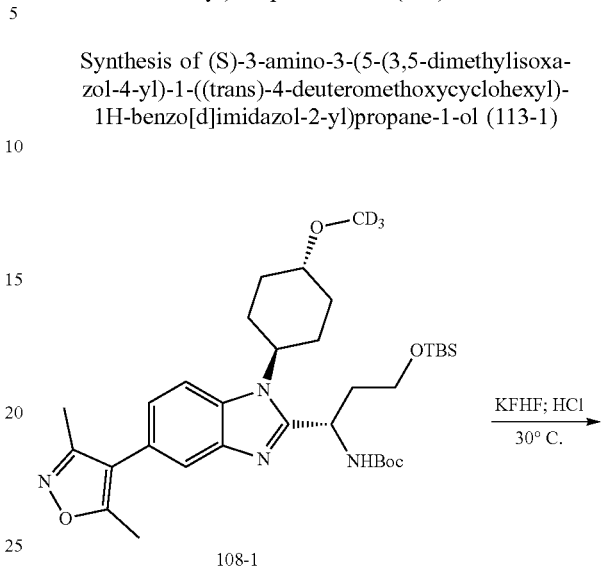

Intermediate 112-5 (191 mg, 0.45 mmol), 3,4-difluorophenylboronic acid (284 mg, 1.8 mmol), copper acetate monohydrate (135 mg, 0.68 mmol) and triethylamine (45 mg, 0.45 mmol) were dissolved in acetonitrile (20 mL), and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to obtain compound 112 (123 mg, 0.23 mmol), with a yield of 52%. MS: m/z 537 [M+H]$^+$.

Intermediate 108-2 (230 mg, 0.59 mmol) was dissolved in methanol (4 mL), to which were added KHF$_2$ (117 mg, 1.5 mmol) and concentrated hydrochloric acid (1 mL), and then the reaction solution was allowed to react overnight at 30° C. pH value was adjusted to be 9-10. The reaction solution was concentrated and extracted with dichloromethane. The organic phase was dried over anhydrous sodium sulfate and concentrated. The residue was purified by column chromatography, to provide intermediate 113-1 (240 mg, 0.60 mmol), with a yield of 80%.

Synthesis of (S)-4-(5-(3,5-dimethylisoxazol-4-yl)-1-((trans)-4-deuteromethoxycyclohexyl)-1H-benzo[d]imidazol-2-yl)-1,3-oxadiazine-2-one (113-2)

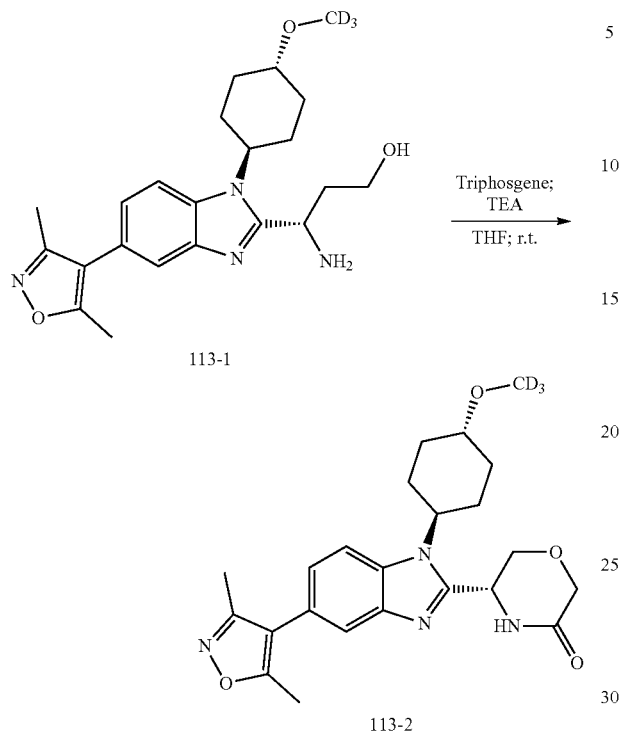

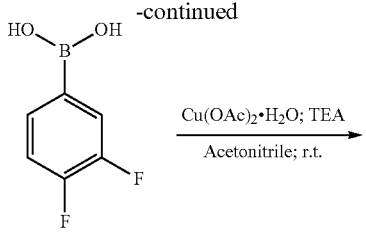

Intermediate 113-1 (240 mg, 0.60 mmol) and triethylamine (91 mg, 0.9 mmol) were dissolved in tetrahydrofuran (20 mL), to which was added triphosgene (71 mg, 0.24 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain intermediate 113-2 (161 mg, 0.38 mmol), with a yield of 63%.

Synthesis of (S)-4-(3,4-difluorophenyl)-5-(5-(3,5-dimethylisoxazol-4-yl)-1-((trans)-4-deuteromethoxycyclohexyl)-1H-benzo[d]imidazol-2-yl)morphine-3-one (113)

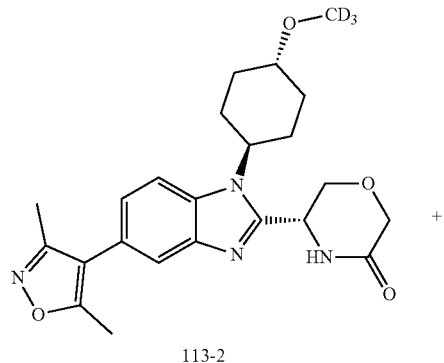

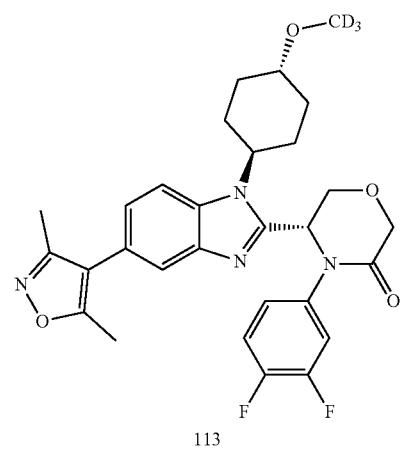

Intermediate 113-2 (161 mg, 0.38 mmol), 3,4-difluorophenylboronic acid (237 mg, 1.5 mmol), copper acetate monohydrate (115 mg, 0.57 mmol) and triethylamine (38 mg, 0.38 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 113 (160 mg, 0.3 mmol), with a yield of 78%. MS: m/z 540 [M+H]$^+$, $^1$H NMR (400 MHz, dc-DMSO) δ 7.81 (d, J=8.5 Hz, 1H), 7.73 (d, J=1.0 Hz, 1H), 7.47 (ddd, J=11.7, 7.4, 2.3 Hz, 1H), 7.37 (dd, J=19.5, 9.2 Hz, 1H), 7.17 (dd, J=8.5, 1.3 Hz, 1H), 7.11 (d, J=8.9 Hz, 1H), 5.83 (s, 1H), 4.58 (t, J=10.3 Hz, 1H), 4.44-4.28 (m, 2H), 3.40 (d, J=10.8 Hz, 1H), 2.68 (t, J=13.0 Hz, 1H), 2.40 (s, 3H), 2.30-2.01 (m, 8H), 1.85 (d, J=11.3 Hz, 1H), 1.33 (dt, J=29.3, 13.7 Hz, 3H).

Example 114 Synthesis of compound (S)-3-(3,4-difluorophenyl)-4-(5-(3,5-dimethylisoxazol-4-yl)-1-((trans)-4-methoxycyclohexyl)-1H-benzo[d]imidazol-2-yl)-1,3-oxazinane-2-one (Compound 114)

Synthesis of ((S)-3-amino-3-(5-(3,5-dimethylisoxazol-4-yl)-1-((trans)-4-methoxycyclohexyl)-1H-benzo[d]imidazol-2-ylpropan-1-ol (Intermediate 114-1)

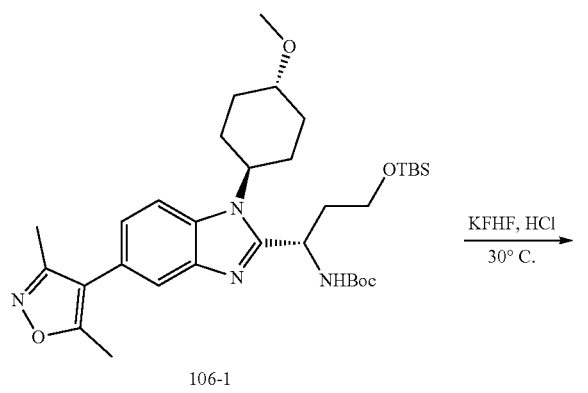

106-1

KFHF, HCl
30° C.

(S)-4-(5-(3,5-dimethylisoxazol-4-yl)-1-((trans)-4-methoxycyclohexyl)-1H-benzo[d]imidazol-2-yl)-1,3-oxadiazine-2-one (Intermediate 114-2)

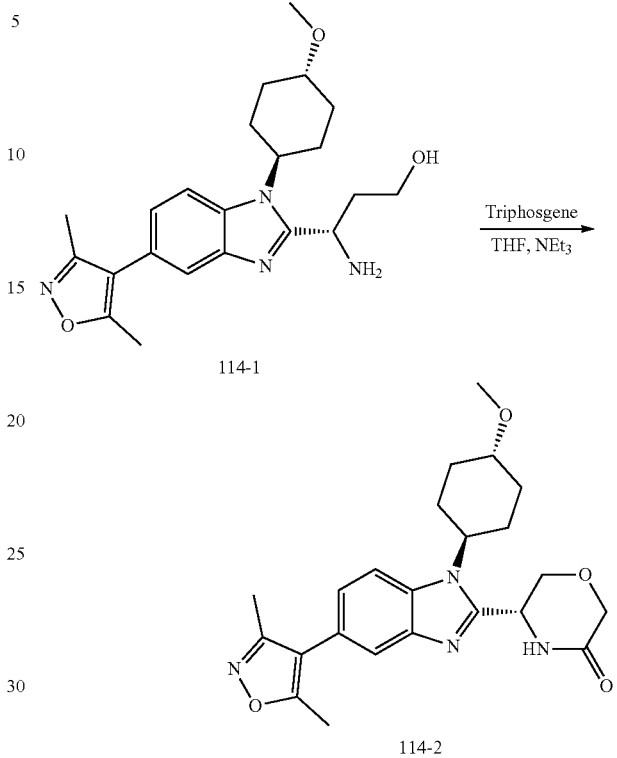

114-1

Triphosgene
THF, NEt₃

114-2

Intermediate 114-1 (130 mg, 0.34 mmol) and triethylamine (49 mg, 0.48 mmol) were dissolved in 20 mL of tetrahydrofuran, to which was added triphosgene (48.3 mg, 0.17 mmol) in portions, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 85 mg of product (intermediate 114-2), with a yield of 60%.

Synthesis of (S)-3-(3,4-difluorophenyl)-4-(5-(3,5-dimethylisoxazol-4-yl)-1-((trans)-4-methoxycyclohexyl)-1H-benzo[d]imidazol-2-yl)-1,3-oxazinane-2-one (Compound 114)

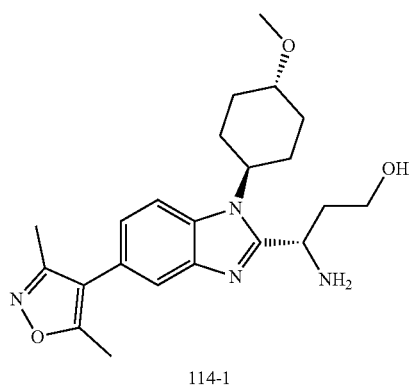

114-1

Intermediate 106-1 (720 mg, 1.2 mmol) and potassium hydrogen difluoride (190 mg) were dissolved in methanol (20 mL), to which was added 5 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 310 mg of product (intermediate 114-1), with a yield of 73.8%.

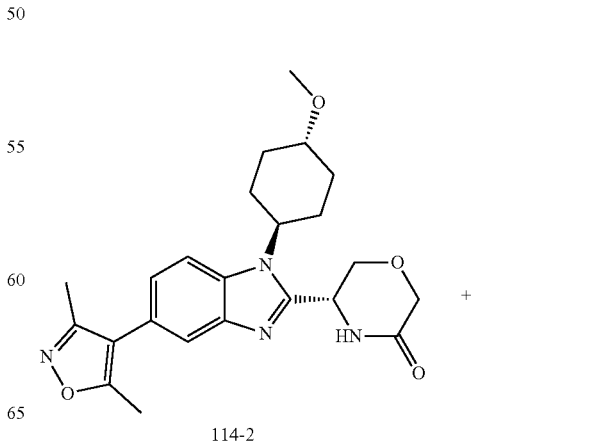

114-2

+

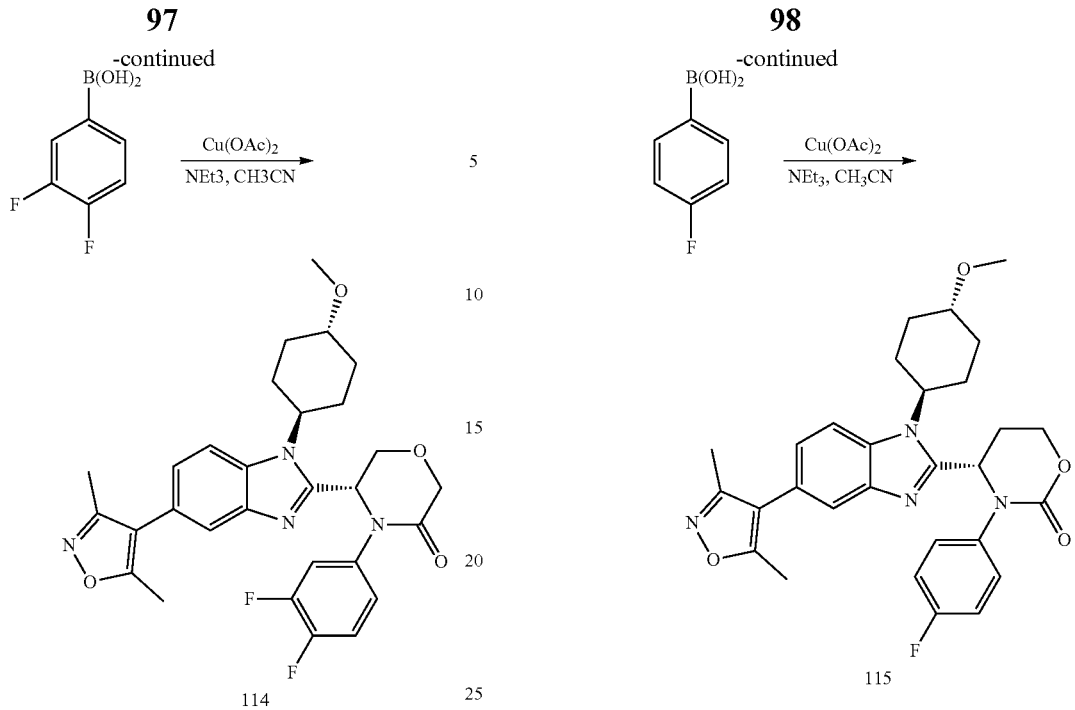

Intermediate 114-2 (85 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 55 mg of product (compound 114), with a yield of 51.4%. MS: m/z 537 [M+H]$^+$, $^1$H NMR (400 MHz, d$_6$-DMSO) δ 7.67 (d, J=8.6 Hz, 1H), 7.59 (s, 1H), 7.37-7.17 (m, 2H), 7.10-6.89 (m, 2H), 5.69 (s, 1H), 4.45 (t, J=10.5 Hz, 1H), 4.23 (br, 2H), 3.23 (br, 1H), 3.14 (s, 3H), 2.54 (br, 1H), 2.27 (s, 3H), 2.15-1.79 (m, 6H), 1.93-1.58 (m, 2H), 1.40-1.22 (m, 4H).

Intermediate 114-2 (85 mg, 0.2 mmol), 4-fluorophenylboronic acid (112 mg, 0.8 mmol), copper acetate monohydrate (60 mg, 0.3 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 45 mg of product (compound 115), with a yield of 43%. MS: m/z 519 [M+H]$^+$, $^1$H NMR (400 MHz, d$_6$-DMSO) δ 7.79 (d, J=8.4 Hz, 1H), 7.73 (s, 1H), 7.30 (dd, J=8.8, 5.1 Hz, 2H), 7.14 (dd, J=16.7, 8.3 Hz, 3H), 5.76 (s, 1H), 4.65 (t, J=10.0 Hz, 1H), 4.36 (d, J=10.5 Hz, 2H), 3.37 (d, J=5.4 Hz, 1H), 3.27 (s, 3H), 2.67 (s, 1H), 2.41 (s, 3H), 2.32-1.93 (m, 8H), 1.84 (s, 1H), 1.34 (t, J=12.6 Hz, 2H), 1.16 (s, 1H).

Example 115 Synthesis of Compound (S)-4-(5-(3,5-dimethylisoxazol-4-yl)-1-((trans)-4-methoxycyclohexyl)-1H-benzo[d]imidazol-2-yl)-3-(4-fluorophenyl)-1,3-oxazinane-2-one (115)

Example 116 Synthesis of Compound (S)-4-(5-(3,5-dimethylisoxazol-4-yl)-1-((trans)-4-methoxycyclohexyl)-1H-benzo[d]imidazol-2-yl)-3-(4-chlorophenyl)-1,3-oxazinane-2-one (Compound 116)

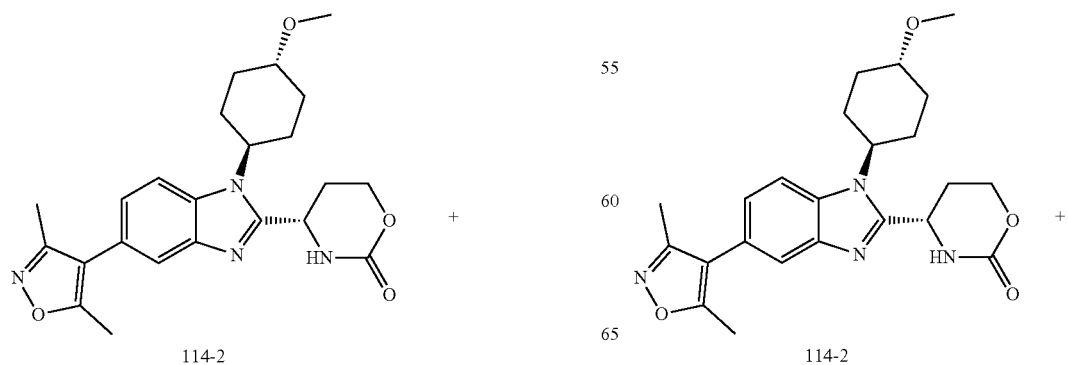

-continued

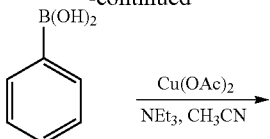

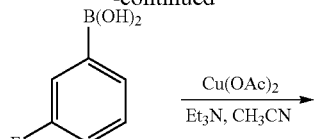

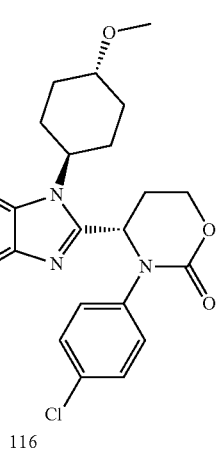

116

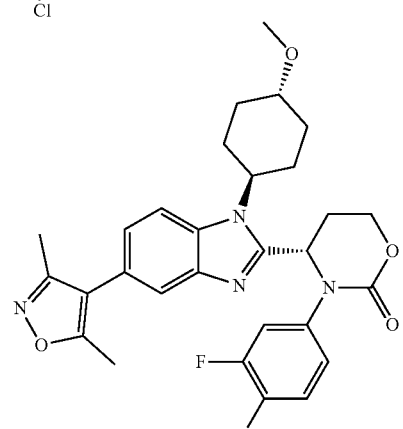

117

Intermediate 114-2 (85 mg, 0.2 mmol), 4-chlorophenylboronic acid (125 mg, 0.8 mmol), copper acetate monohydrate (60 mg, 0.3 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 50 mg of product (compound 116), with a yield of 47%. MS: m/z 535 [M+H]$^+$, $^1$H NMR (400 MHz, d$_6$-DMSO) δ 7.79 (dd, J=8.4, 5.1 Hz, 1H), 7.72 (d, J=1.3 Hz, 1H), 7.39-7.25 (m, 4H), 7.16 (dd, J=8.5, 1.5 Hz, 1H), 5.81 (s, 1H), 4.61 (t, J=10.0 Hz, 1H), 4.35 (d, J=10.2 Hz, 2H), 3.32 (s, 1H), 3.28 (s, 3H), 2.67 (s, 1H), 2.41 (s, 3H), 2.30-2.01 (m, 8H), 1.84 (d, J=12.3 Hz, 1H), 1.34 (dd, J=17.7, 12.1 Hz, 2H), 1.17 (d, J=7.1 Hz, 1H).

Example 117 Synthesis of Compound (S)-3-(3-fluoro-4-chlorophenyl)-4-(5-(3,5-dimethylisoxazol-4-yl)-1-((trans)-4-methoxycyclohexyl)-1H-benzo[d]imidazol-2-yl)-1, 3-oxazinane-2-one (Compound 117)

Intermediate 114-2 (85 mg, 0.2 mmol), 3-fluoro-4-chlorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 56 mg of product (compound 117), with a yield of 51%. MS: m/z 553 [M+H]$^+$, 1H NMR (400 MHz, CDCl$_3$) δ 7.9-7.71 (m, 1H), 7.65-7.48 (m, 1H), 7.42-7.1 (m, 4H), 4.87 (s, 1H), 4.46-4.17 (m, 1H), 3.41 (s, 3H), 2.45-2.31 (m, 8H), 1.90-1.11 (m, 11H).

Example 118 Synthesis of Compound (S)-3-(3,4,5-trifluorophenyl)-4-(5-(3,5-dimethylisoxazol-4-yl)-1-((trans)-4-methoxycyclohexyl)-1H-benzo[d]imidazol-2-yl)-1, 3-oxazinane-2-one (Compound 118)

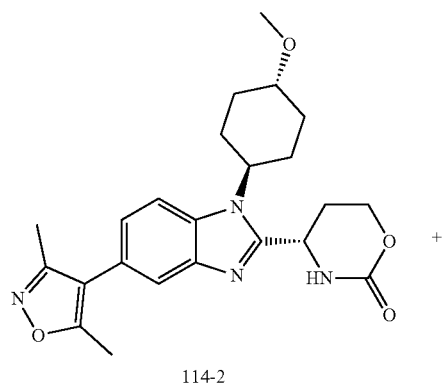 +

114-2

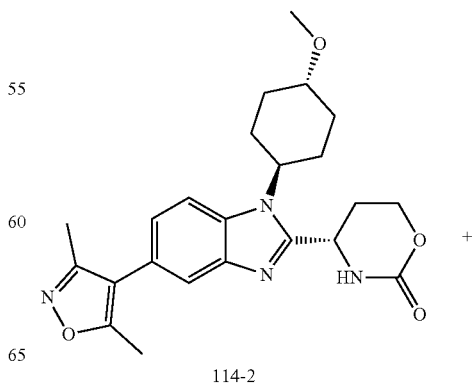 +

114-2

101

-continued

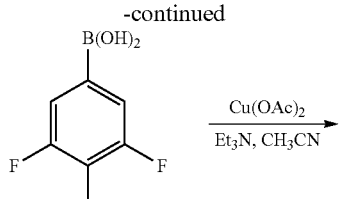

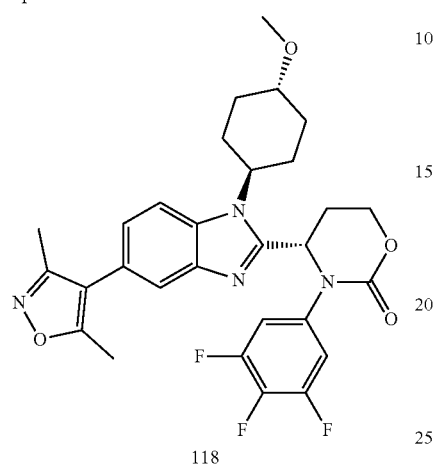

118

Intermediate 114-2 (85 mg, 0.2 mmol), 3,4,5-trifluorophenylboronic acid (132 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 58 mg of product (compound 118), with a yield of 51%. MS: m/z 555 [M+H]$^+$, 1H NMR (400 MHz, CDCl$_3$) δ 7.78-7.71 (m, 1H), 7.6-7.5 (m, 1H), 7.45-7.35 (m, 1H), 7.2-6.96 (m, 2H), 4.87 (s, 1H), 4.46-4.17 (m, 1H), 3.41 (s, 3H), 2.45-2.31 (m, 8H), 1.90-1.11 (m, 11H).

Example 119 Synthesis of Compound (S)-4-(4-fluorophenyl)-5-(5-(3,5-dimethylisoxazol-4-yl)-1-((trans)-4-deuteromethoxycyclohexyl)-1H-benzo[d]imidazol-2-yl)morphine-3-one (119)

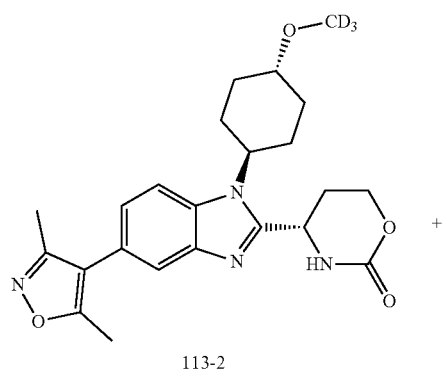

113-2

102

-continued

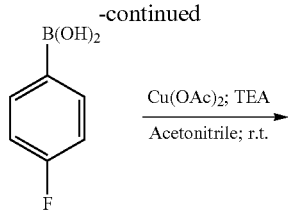

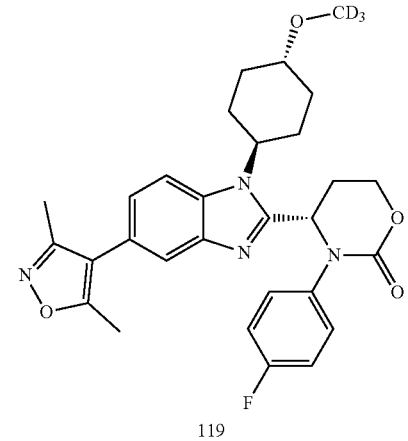

119

Intermediate 113-2 (161 mg, 0.38 mmol), 4-fluorophenylboronic acid (210 mg, 1.5 mmol), copper acetate monohydrate (115 mg, 0.57 mmol) and triethylamine (38 mg, 0.38 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 119 (149 mg, 0.29 mmol), with a yield of 75%. MS: m/z 522 [M+H]$^+$, $^1$H NMR (400 MHz, d$_6$-DMSO) δ 7.79 (d, J=8.6 Hz, 1H), 7.73 (s, 1H), 7.29 (s, 2H), 7.14 (d, J=7.3 Hz, 3H), 5.77 (s, 1H), 4.63 (d, J=9.0 Hz, 1H), 4.34 (s, 2H), 2.67 (s, 1H), 2.41 (s, 3H), 2.26-1.96 (m, 8H), 1.84 (s, 1H), 1.31 (d, J=14.5 Hz, 3H), 1.13 (s, 1H).

Example 120 Synthesis of Compound (S)-4-(3,4,5-trifluorophenyl)-5-(5-(3,5-dimethylisoxazol-4-yl)-1-((trans)-4-deuteromethoxycyclohexyl)-1H-benzo[d]imidazol-2-yl)morphine-3-one (120)

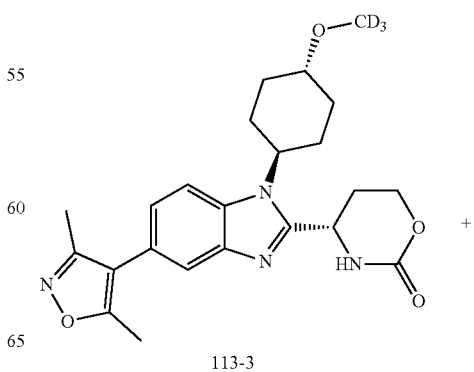

113-3

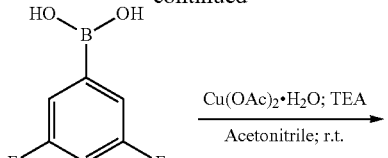

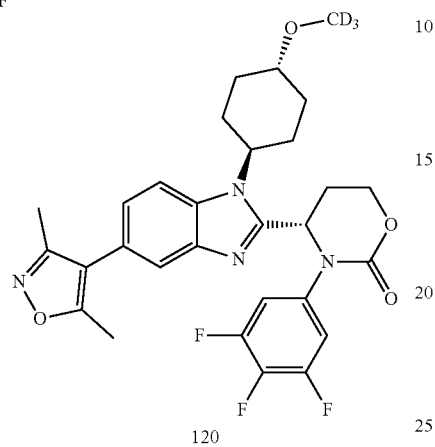

120

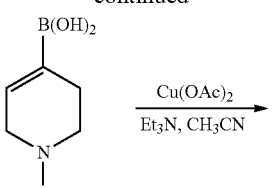

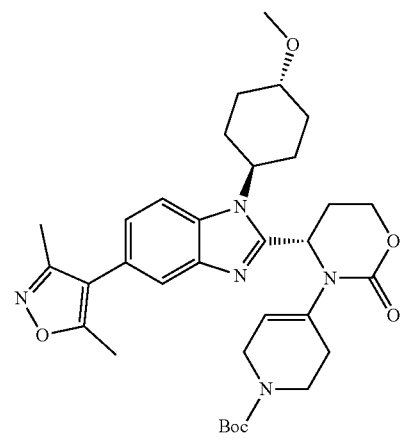

121

Intermediate 113-3 (161 mg, 0.38 mmol), 3,4,5-difluorophenylboronic acid (264 mg, 1.5 mmol), copper acetate monohydrate (115 mg, 0.57 mmol) and triethylamine (38 mg, 0.38 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 120 (162 mg, 0.29 mmol), with a yield of 75%. MS: m/z 558 [M+H]$^+$, $^1$H NMR (400 MHz, d$_6$-DMSO) δ 7.82 (d, J=8.5 Hz, 1H), 7.73 (d, J=1.3 Hz, 1H), 7.35 (dd, J=9.2, 6.5 Hz, 2H), 7.17 (dd, J=8.5, 1.5 Hz, 1H), 5.88 (d, J=2.3 Hz, 1H), 4.51 (t, J=10.3 Hz, 1H), 4.42-4.30 (m, 2H), 3.41 (dd, J=12.7, 8.8 Hz, 1H), 2.68 (dd, J=17.5, 8.6 Hz, 1H), 2.40 (s, 3H), 2.29-2.04 (m, 7H), 1.88 (d, J=11.8 Hz, 1H), 1.37 (dd, J=23.7, 9.3 Hz, 3H), 1.24 (d, J=6.2 Hz, 1H).

Example 121 Synthesis of Compound t-butyl 4-((S)-4-(5-(3,5-dimethylisoxazol-4-yl)-1-((trans)-4-methoxycyclohexyl)-1H-benzo[d]imidazole-2-yl)-1,3-oxazinane-2-one-3-yl)-5,6-dihydropyridine-1(2H)-carboxylate (121)

Intermediate 114-2 (85 mg, 0.2 mmol), (1-(t-butoxycarbonyl)-1,2,3,6-tetrahydropyridin-4-yl)boric acid (132 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 60 mg of product (compound 121), with a yield of 51%. MS: m/z 606 [M+H]$^+$.

Example 122 Synthesis of Compound (S)-3-(3-fluoro-4-chlorophenyl)-4-(5-(3,5-dimethylisoxazol-4-yl)-1-((trans)-4-trideuteromethoxycyclohexyl)-1H-benzo[d]imidazol-2-yl)-1,3-oxazinane-2-one (122)

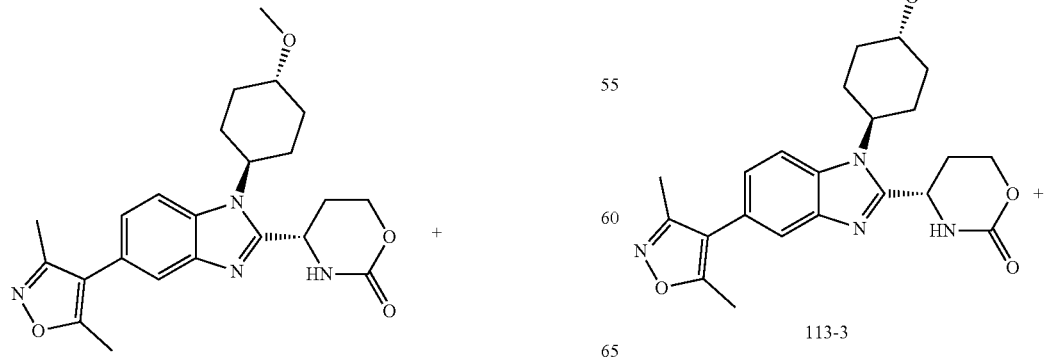

-continued

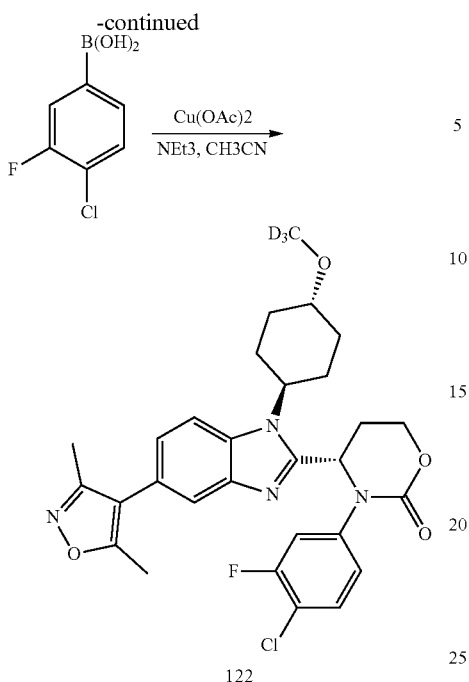

122

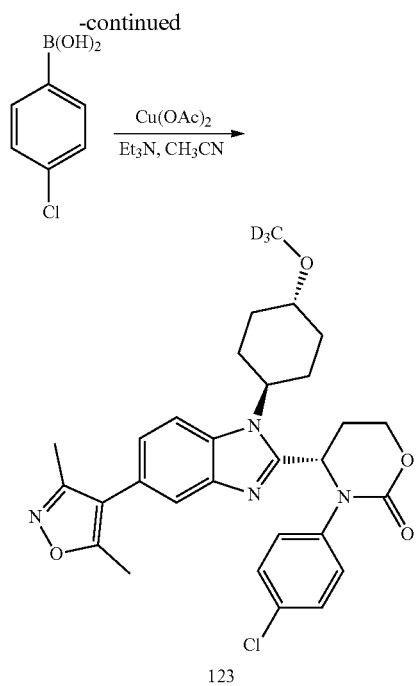

123

Intermediate 113-3 (42 mg, 0.1 mmol), 3-fluoro-4-chlorophenylboric acid (63 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 35 mg of product (compound 122), with a yield of 66.1%. MS: m/z 556 [M+H]$^+$, $^1$H NMR (400 MHz, d-DMSO) a 7.82 (d, J=8.3 Hz, 1H), 7.72 (s, 1H), 7.53 (t, J=8.6 Hz, 1H), 7.47 (d, J=10.7 Hz, 1H), 7.16 (t, J=9.9 Hz, 2H), 5.89 (s, 1H), 4.56 (t, J=10.7 Hz, 1H), 4.35 (d, J=11.1 Hz, 2H), 3.39 (br, 1H), 2.68 (br, 1H), 2.40 (s, 3H), 2.30-2.00 (m, 7H), 1.88 (br, 1H), 1.37-1.13 (m, 4H).

Example 123 Synthesis of Compound (S)-3-(4-chlorophenyl)-4-(5-(3,5-dimethylisoxazol-4-yl)-1-((trans)-4-deuteromethoxycyclohexyl)-1H-benzo[d]imidazol-2-yl)-1,3-oxazinane-2-one (Compound 123)

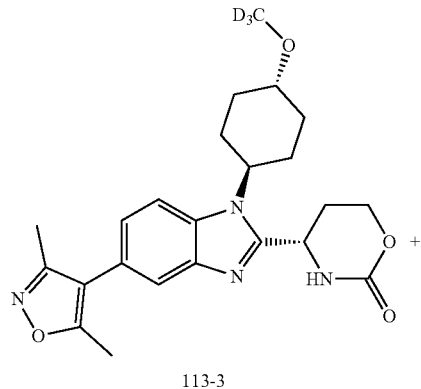

113-3

Intermediate 113-3 (85 mg, 0.2 mmol), 4-chlorophenylboric acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 56 mg of product (compound 123), with a yield of 51%. MS: m/z 538 [M+H]$^+$, $^1$H NMR (400 MHz, d$_6$-DMSO) δ 7.79 (dd, J=8.4, 5.1 Hz, 1H), 7.72 (d, J=1.3 Hz, 1H), 7.35 (dt, J=26.3, 8.6 Hz, 4H), 7.16 (dd, J=8.5, 1.5 Hz, 1H), 5.88 (d, J=2.3 Hz, 1H), 4.51 (t, J=10.3 Hz, 1H), 4.42-4.27 (m, 2H), 3.41 (dd, J=12.7, 8.8 Hz, 1H), 2.68 (dd, J=17.5, 8.6 Hz, 1H), 2.40 (s, 3H), 2.34-2.02 (m, 7H), 1.88 (d, J=11.8 Hz, 1H), 1.45-1.31 (m, 3H), 1.26-1.21 (m, 1H).

Example 124 Synthesis of Compound (S)-3-(6-chloropyridin-3-1)-4-(5-(3,5-dimethylisoxazol-4-yl)-1-((trans)-4-(methoxy-d$_3$)cyclohexyl)-1H-benzo[d]imidazol-2-yl)-1, 3-oxazinane-2-one (Compound 124)

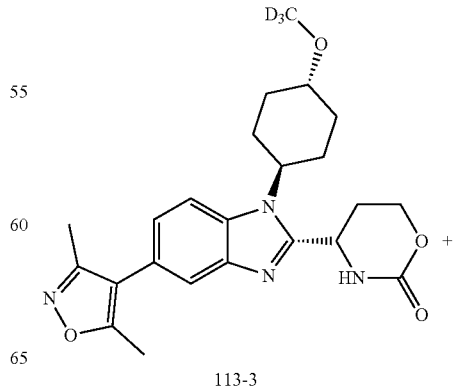

113-3

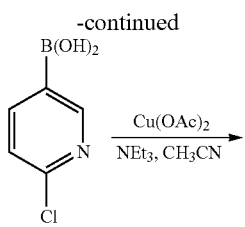

Example 125 Synthesis of Compound (S)-4-(5-(3,5-dimethylisoxazol-4-yl)-1-((trans)-4-deuteromethoxycyclohexyl)-1H-benzo[d]imidazol-2-yl)-3-(1-methyl-1,2,3,6-tetrahydropyridin-4-yl)-1,3-oxazinane-2-one (125)

Synthesis of t-butyl 4-((S)-4-(5-(3,5-dimethylisoxazol-4-yl)-1-((trans)-4-deuteromethoxycyclohexyl)-1H-benzo[d]imidazole-2-yl)-1,3-oxazinane-2-one-3-yl)-5,6-dihydro pyridine-1(2H)-carboxylate (Intermediate 125-1)

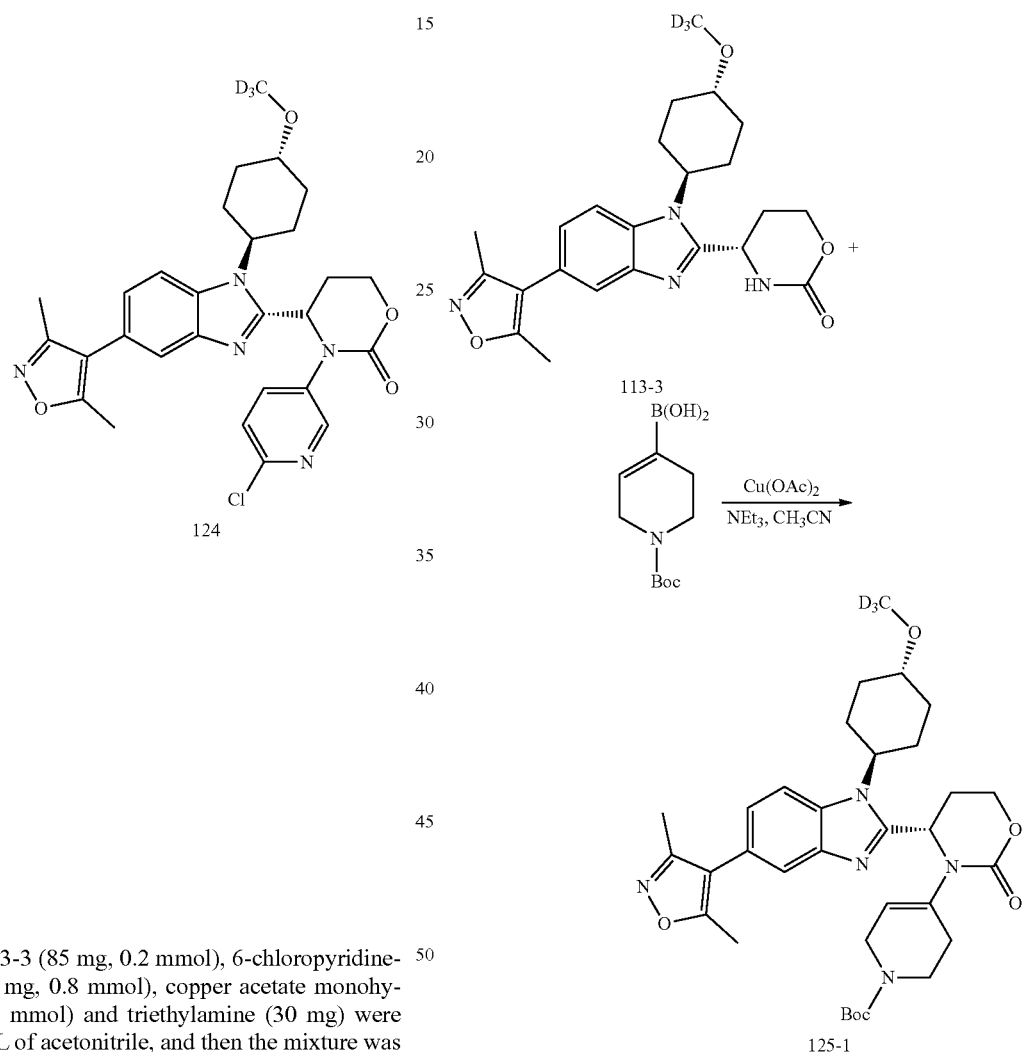

Intermediate 113-3 (85 mg, 0.2 mmol), 6-chloropyridine-3-boric acid (125 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 60 mg of product (compound 124), with a yield of 55.7%. MS: m/z 539 [M+H]$^+$, $^1$H NMR (400 MHz, d$_6$-DMSO) δ 8.4 (s, 1H), 7.78-7.75 (m, 1H), 7.75 (s, 1H), 7.51-7.49 (m, 1H), 7.3-7.25 (m, 1H), 7.20-7.15 (m, 1H), 5.88 (m, 1H), 4.51-4.50 (m, 1H), 4.42-4.27 (m, 2H), 2.75-2.7 (m, 1H), 2.40 (s, 3H), 2.34-2.02 (m, 8H), 1.88-1.8 (m, 1H), 1.45-1.31 (m, 3H), 1.26-1.21 (m, 1H).

Intermediate 113-3 (85 mg, 0.2 mmol), (1-(t-butoxycarbonyl)-1,2,3,6-tetrahydropyridin-4-yl)boric acid (132 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 60 mg of product (compound 125-1), with a yield of 51%. MS: m/z 609 [M+H]$^+$

109

Synthesis of 4-((S)-4-(5-(3,5-dimethylisoxazol-4-yl)-1-((trans)-4-deuteromethoxycyclohexyl)-1H-benzo[d]imidazole-2-yl)-1,3-oxazinane-2-one-3-yl)-5,6-dihydro pyridine-1(2H) (Intermediate 125-2)

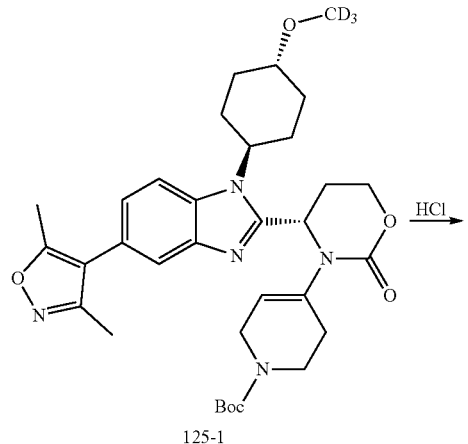

Intermediate 125-1 (61 mg, 0.1 mmol) was dissolved in the solution of HCl in isopropyl acetate, and then the solution was allowed to react overnight. The reaction solution was concentrated to dry, to provide 55 mg of product (intermediate 125-2), with a yield of 93%. MS: m/z 509 [M+H]$^+$ Synthesis of (S)-4-(5-(3,5-dimethylisoxazol-4-yl)-1-((trans)-4-deuteromethoxycyclohexyl)-1H-benzo[d]imidazol-2-yl)-3-(1-methyl-1,2,3,6-tetrahydropyridin-4-yl)-1,3-oxazinane-2-one (Compound 125)

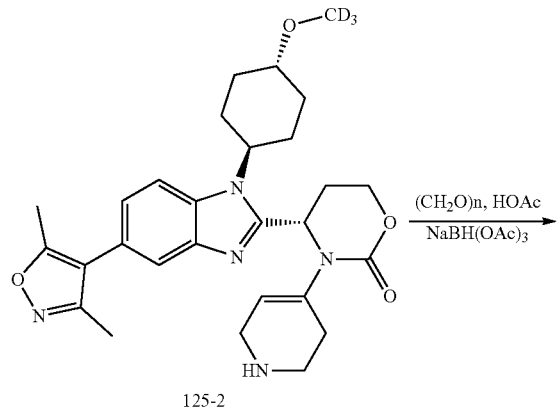

110

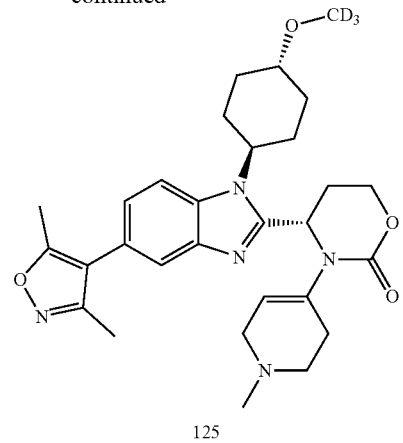

The hydrochloride of intermediate 125-2 (508 mg, 1 mmol) was dissolved in methanol, and then the solution was neutralized to be neutral with trimethylamine. Then, acetic acid (60 mg, 1 mmol) and paraformaldehyde (150 mg, 5 mmol) were added, followed by adding sodium triacetoxyborohydride (850 mg, 4 mmol) in batches. The reaction solution was allowed to react overnight, and then poured into water. The resultant solution was extracted. The organic phase was dried over anhydrous sodium sulfate, and concentrated. The residue was purified by column chromatography to provide 260 mg of product (compound 125), with a yield of 50%. MS: m/z 523 [M+H]$^+$, $^1$H NMR (400 MHz, CDCl$_3$) a 7.68 (d, J=1.1 Hz, 1H), 7.57 (d, J=8.4 Hz, 1H), 7.13 (dd, J=8.4, 1.5 Hz, 1H), 5.62 (s, 1H), 5.26 (s, 1H), 4.74 (t, J=10.6 Hz, 1H), 4.34-4.15 (m, 2H), 3.36 (t, J=11.0 Hz, 1H), 3.14 (s, 2H), 2.91-2.62 (m, 3H), 2.59-2.51 (m, 2H), 2.48-2.39 (m, 6H), 2.35-2.22 (m, 6H), 2.05-1.85 (m, 3H), 1.64-1.40 (m, 3H).

Example 126 Synthesis of Compound ((S)-3-(4-chloro-3-methoxyphenyl)-4-(5-(3,5-dimethylisoxazol-4-yl)-1-((trans)-4-(methoxy-d$_3$)cyclohexyl)-1H-benzo[d]imidazol-2-yl)-1,3-oxazinane-2-one (126)

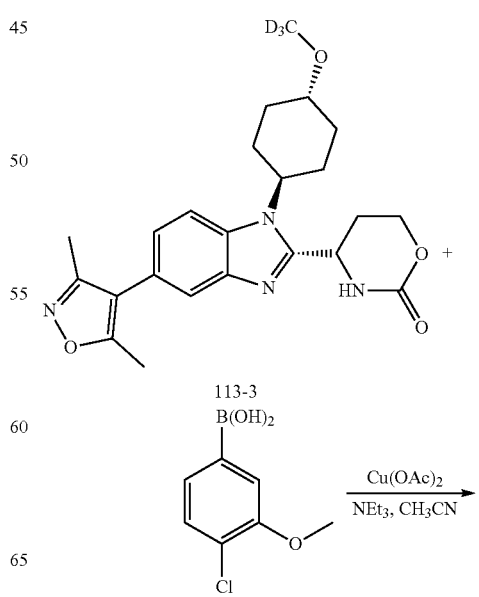

111
-continued

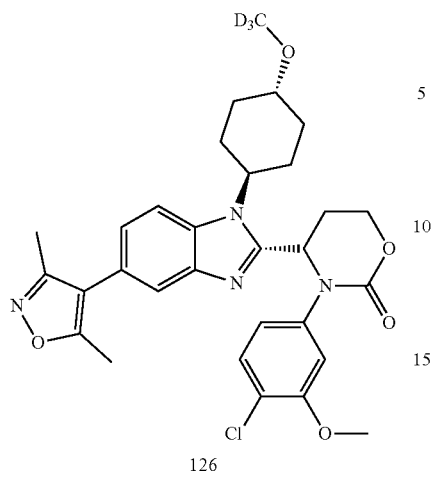

126

112
-continued

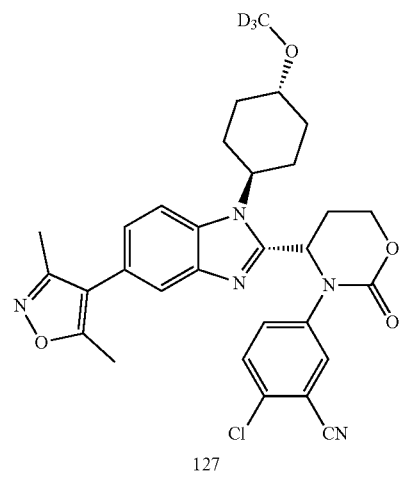

127

Intermediate 113-3 (85 mg, 0.2 mmol), 3-methoxy-4-chlorophenylboric acid (149 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 65 mg of product (compound 126), with a yield of 57.2%. MS: m/z 568 [M+H]$^+$ Example 127 Synthesis of Compound 2-chloro-5-((S)-4-(5-(3,5-dimethylisoxazol-4-yl)-1-((trans)-4-(methoxy-d$_3$)cyclohexyl)-1H-benzo[d]imidazol-2-yl)-2-oxo-1,3-oxazinane-3-yl)benzonitrile (127)

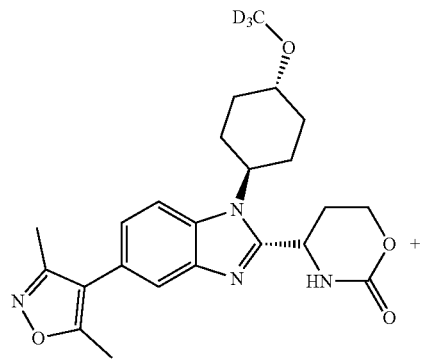

113-3

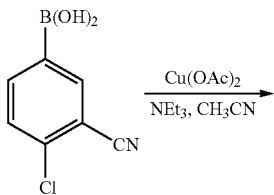

Intermediate 113-3 (85 mg, 0.2 mmol), 3-cyano-4-chlorophenylboric acid (145 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 64 mg of product (compound 127), with a yield of 56.9%. MS: m/z 563 [M+H]$^+$ Example 128 Synthesis of Compound (S)-3-(3,4-dichlorophenyl)-4-(5-(3,5-dimethylisoxazol-4-yl)-1-((trans)-4-deuteromethoxycyclohexyl)-1H-benzo[d]imidazol-2-yl)-1,3-oxazinane-2-one (128)

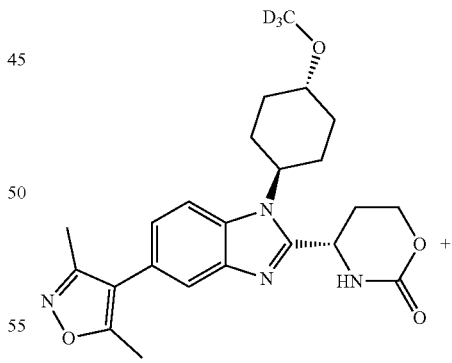

113-3

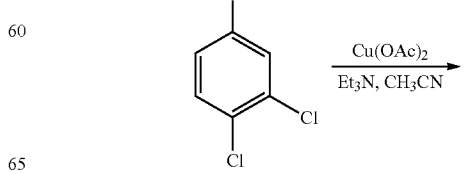

-continued

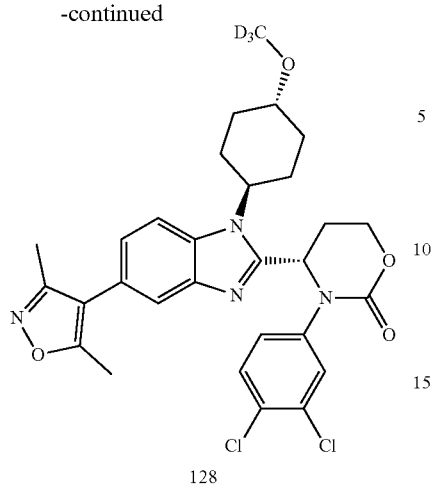

128

-continued

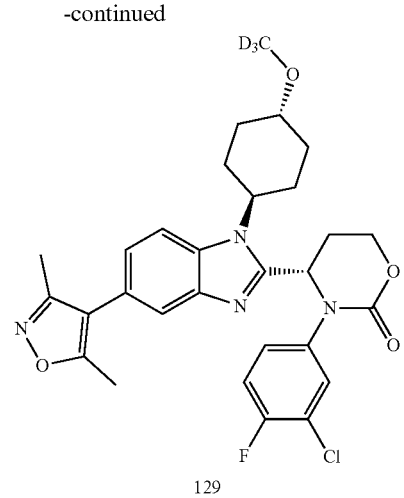

129

Intermediate 113-3 (85 mg, 0.2 mmol), 3,4-dichlorophenylboric acid (135 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 57 mg of product (compound 128), with a yield of 51%. MS: m/z 572 [M+H]$^+$, $^1$H NMR (400 MHz, CDCl$_3$) δ 7.79-7.4 (m, 3H), 7.35-7.05 (m, 3H), 5.88 (d, J=2.3 Hz, 1H), 4.51 (t, J=10.3 Hz, 1H), 4.42-4.27 (m, 2H), 3.41 (dd, J=12.7, 8.8 Hz, 1H), 2.68 (dd, J=17.5, 8.6 Hz, 1H), 2.40 (s, 3H), 2.34-2.02 (m, 7H), 1.88 (d, J=11.8 Hz, 1H), 1.45-1.31 (m, 3H), 1.26-1.21 (m, 1H).

Example 129 Synthesis of (S)-3-(3-chloro-4-fluorophenyl)-4-(5-(3,5-dimethylisoxazol-4-yl)-1-((trans)-4-deuteromethoxycyclohexyl)-1H-benzo[d]imidazol-2-yl)-1,3-oxazinane-2-one (129)

Intermediate 113-3 (85 mg, 0.2 mmol), 3-chloro-4-fluorophenylboric acid (135 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 56 mg of product (compound 129), with a yield of 51%. MS: m/z 556 [M+H]$^+$, $^1$H NMR (400 MHz, d$_6$-DMSO) δ 7.95-7.32 (m, 3H), 7.25-6.65 (m, 3H), 5.88 (d, J=2.3 Hz, 1H), 4.51 (t, J=10.3 Hz, 1H), 4.42-4.27 (m, 2H), 3.41 (dd, J=12.7, 8.8 Hz, 1H), 2.68 (dd, J=17.5, 8.6 Hz, 1H), 2.40 (s, 3H), 2.34-2.02 (m, 7H), 1.88 (d, J=11.8 Hz, 1H), 1.45-1.31 (m, 3H), 1.26-1.21 (m, 1H).

Example 130 Synthesis of (S)-4-(5-(3,5-dimethylisoxazol-4-yl)-1-((trans)-4-deuteromethoxycyclohexyl)-1H-benzo[d]imidazol-2-yl)-3-(3-chlorophenyl)-1,3-oxazinane-2-one (130)

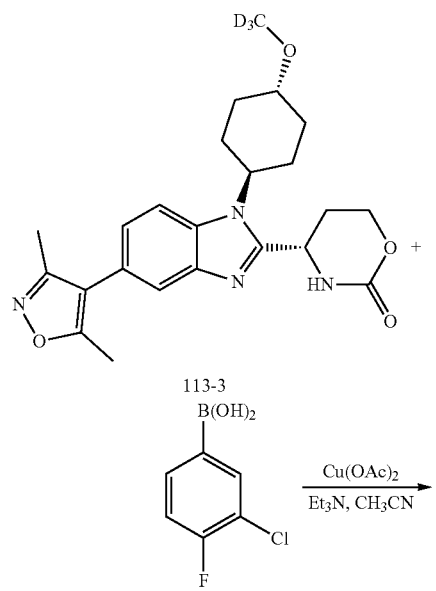

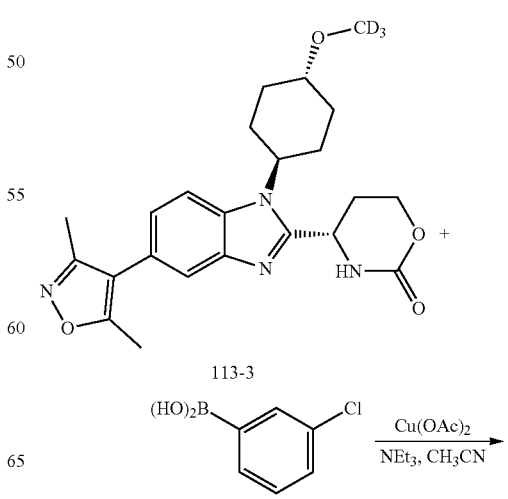

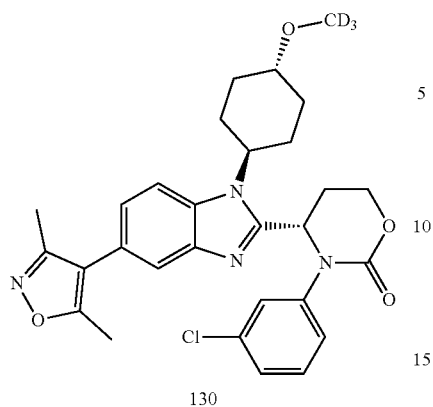

130

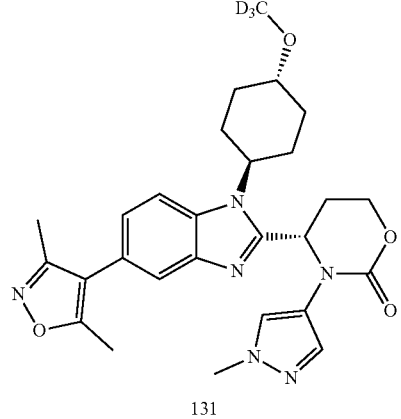

131

Intermediate 113-3 (85 mg, 0.2 mmol), 3-chlorophenylboric acid (125 mg, 0.8 mmol), copper acetate monohydrate (60 mg, 0.3 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 55 mg of product (compound 130), with a yield of 51%. MS: m/z 538 [M+H]+, $^1$H NMR (400 MHz, $d_6$-DMSO) δ 7.80 (d, J=8.5 Hz, 1H), 7.73 (d, J=1.3 Hz, 1H), 7.48 (d, J=1.9 Hz, 1H), 7.27 (dt, J=8.5, 4.9 Hz, 2H), 7.22-7.10 (m, 2H), 5.89 (s, 1H), 4.63 (t, J=10.0 Hz, 1H), 4.37 (d, J=10.5 Hz, 2H), 3.38 (s, 1H), 2.67 (t, J=12.6 Hz, 1H), 2.40 (s, 3H), 2.30-2.01 (m, 8H), 1.84 (d, J=12.9 Hz, 1H), 1.45-1.30 (m, 2H), 1.20-1.15 (m, 1H).

Example 131 Synthesis of Compound (S)-3-(1-methylpyrazol-4-yl)-4-(5-(3,5-dimethylisoxazol-4-yl)-1-((trans)-4-deuteromethoxycyclohexyl)-1H-benzo[d]imidazol-2-yl)-1,3-oxazinane-2-one (131)

Intermediate 113-3 (85 mg, 0.2 mmol), 1-methylpyrazol-4-phenylboric acid (105 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 51 mg of product (compound 131), with a yield of 51%. MS: m/z 508 [M+H]+, $^1$H NMR (400 MHz, $d_6$-DMSO) 97.68 (d, J=1.1 Hz, 1H), 7.57 (d, J=8.4 Hz, 1H), 7.45 (s, 1H), 7.35 (s, 1H), 7.13 (dd, J=8.4, 1.5 Hz, 1H), 5.88 (d, J=2.3 Hz, 1H), 4.51 (t, J=10.3 Hz, 1H), 4.42-4.27 (m, 2H), 3.85 (s, 3H), 3.41 (dd, J=12.7, 8.8 Hz, 1H), 2.68 (dd, J=17.5, 8.6 Hz, 1H), 2.40 (s, 3H), 2.34-2.02 (m, 7H), 1.88 (d, J=11.8 Hz, 1H), 1.45-1.31 (m, 3H), 1.26-1.21 (m, 1H).

Example 132 Synthesis of (S)-4-(5-(3,5-dimethylisoxazol-4-yl)-1-((trans)-4-trideuteromethoxycyclohexyl)-1H-benzo[d]imidazol-2-yl)-3-(4-methoxyphenyl)-1,3-oxazinane-2-one (Compound 132)

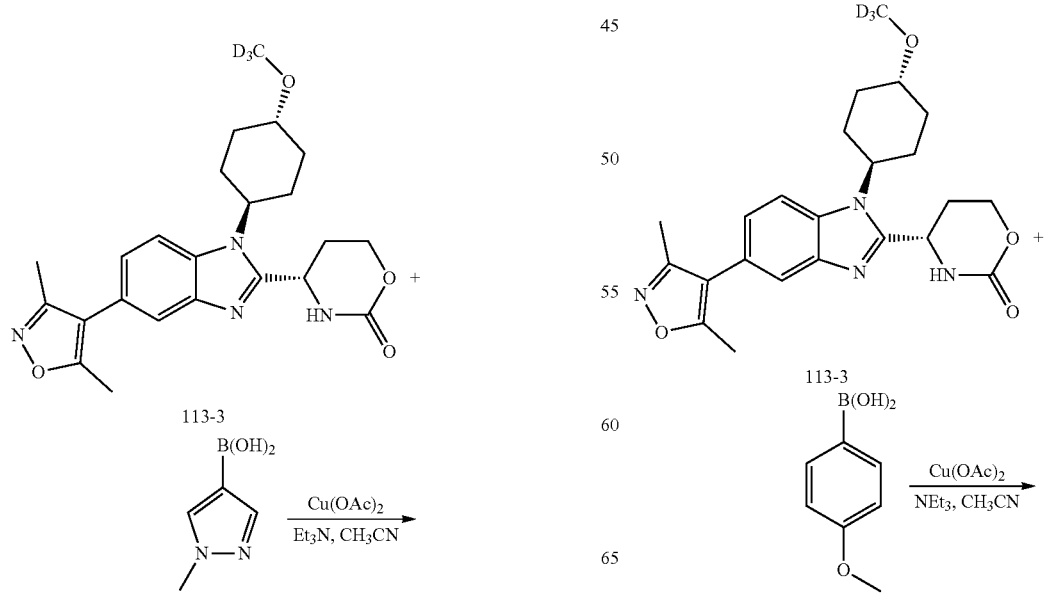

117

-continued

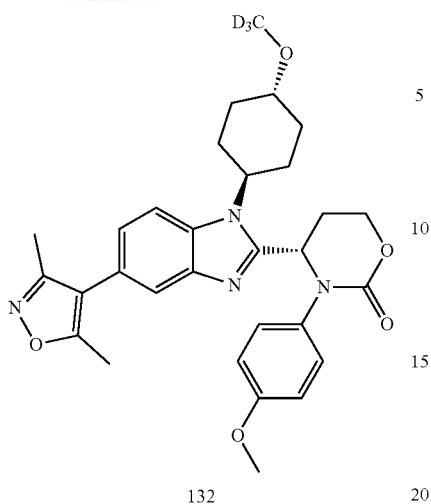

132

Intermediate 113-3 (40 mg, 0.1 mmol), 4-methoxyphenylboric acid (60 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 45 mg of product (compound 132), with a yield of 90.3%. MS: m/z 534 [M+H]$^+$, $^1$H NMR (400 MHz, d$_6$-DMSO) δ 7.77 (d, J=8.5 Hz, 1H), 7.73 (s, 1H), 7.15 (d, J=8.8 Hz, 3H), 6.82 (d, J=8.9 Hz, 2H), 5.71 (s, 1H), 4.69 (t, J=9.9 Hz, 1H), 4.41-4.21 (m, 2H), 3.67 (s, 3H), 3.35 (br, 1H), 2.71-2.55 (m, 1H), 2.41 (s, 3H), 2.29-1.94 (m, 7H), 1.82 (br, 1H), 1.40-1.22 (m, 4H).

Example 133 Synthesis of Compound (S)-4-(5-(3,5-dimethylisoxazol-4-yl)-1-((1trans)-4-trideuteromethoxycyclohexyl)-1H-benzo[d]imidazol-2-yl)-3-(3-fluoro-4-meth oxyphenyl)-1,3-oxazinane-2-one (133)

118

-continued

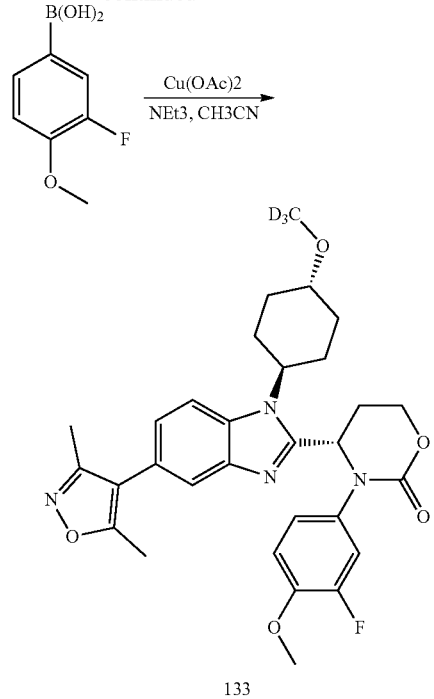

133

Intermediate 113-3 (40 mg, 0.1 mmol), 3-fluoro-4-methoxyphenylboric acid (65 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 35 mg of product (compound 133), with a yield of 63.7%. MS: m/z 552 [M+H]$^+$, $^1$H NMR (400 MHz, d$_6$-DMSO) δ 7.79 (d, J=8.5 Hz, 1H), 7.73 (s, 1H), 7.25-7.12 (m, 2H), 7.11-6.96 (m, 2H), 5.71 (s, 1H), 4.69 (t, J=9.9 Hz, 1H), 4.41-4.21 (m, 2H), 3.67 (s, 3H), 3.35 (br, 1H), 2.71-2.55 (m, 1H), 2.41 (s, 3H), 2.29-1.94 (m, 7H), 1.82 (br, 1H), 1.40-1.22 (m, 4H).

Example 134 Synthesis of (S)-4-(5-(3,5-dimethylisoxazol-4-yl)-1-((trans)-4-trideuteromethoxycyclohexyl)-1H-benzo[d]imidazol-2-yl)-3-(3,5-difluorophenyl)-1, 3-oxazinane-2-one (Compound 134)

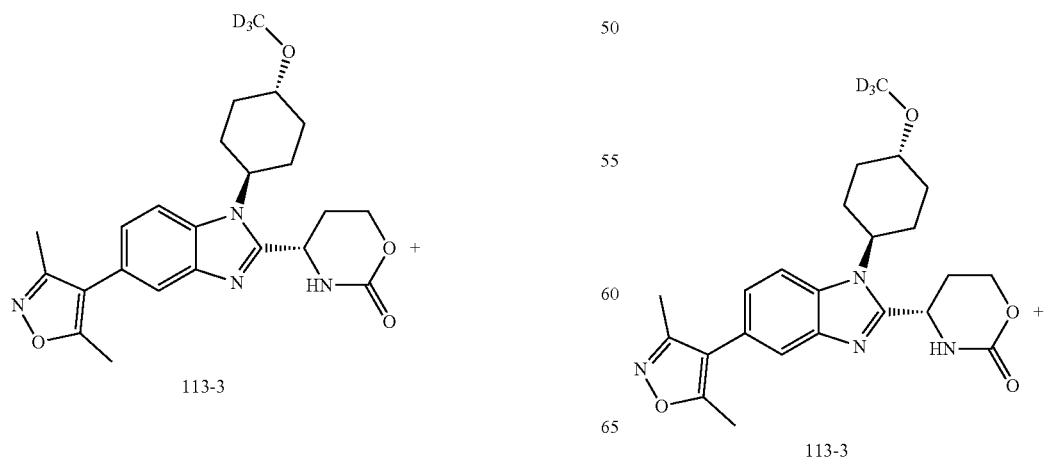

113-3

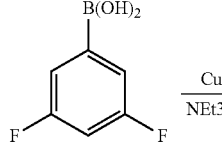
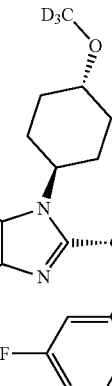
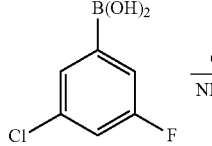
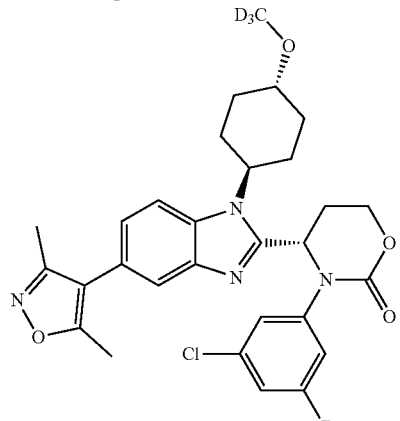

Intermediate 113-3 (40 mg, 0.1 mmol), 3,5-difluorophenylboric acid (65 mg, 0.8 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 33 mg of product (compound 134), with a yield of 61.4%. MS: m/z 540 [M+H]$^+$, $^1$H NMR (400 MHz, d$_6$-DMSO) δ 7.83 (d, J=8.0 Hz, 1H), 7.73 (s, 1H), 7.14 (dd, J=31.5, 8.0 Hz, 4H), 5.91 (s, 1H), 4.59 (t, J=9.9 Hz, 1H), 4.41-4.21 (m, 2H), 3.35 (br, 1H), 2.71-2.55 (m, 1H), 2.41 (s, 3H), 2.29-1.94 (m, 7H), 1.82 (br, 1H), 1.40-1.22 (m, 4H).

Example 135 Synthesis of compound (S)-4-(5-(3,5-dimethylisoxazol-4-yl)-1-((trans)-4-trideuteromethoxycyclohexyl)-1H-benzo[d]imidazol-2-yl)-3-(3-chloro-5-fluoro phenyl)-1,3-oxazinane-2-one (135)

Intermediate 113-3 (40 mg, 0.1 mmol), 3-chloro-5-fluorophenylboric acid (68 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 25 mg of product (compound 135), with a yield of 45.4%. MS: m/z 556 [M+H]$^+$, $^1$H NMR (400 MHz, d$_6$-DMSO) δ 7.82 (d, J=8.9 Hz, 1H), 7.73 (s, 1H), 7.34 (s, 1H), 7.30 (d, J=8.8 Hz, 1H), 7.18 (t, J=9.0 Hz, 2H), 5.91 (s, 1H), 4.59 (t, J=9.9 Hz, 1H), 4.41-4.21 (m, 2H), 3.35 (br, 1H), 2.71-2.55 (m, 1H), 2.41 (s, 3H), 2.29-1.94 (m, 7H), 1.82 (br, 1H), 1.40-1.22 (m, 4H).

Example 136 Synthesis of Compound (S)-4-(5-(3,5-dimethylisoxazol-4-yl)-1-((trans)-4-trideuteromethoxycyclohexyl)-1H-benzo[d]imidazol-2-yl)-3-(4-bromophenyl)-1,3-oxazinane-2-one (136)

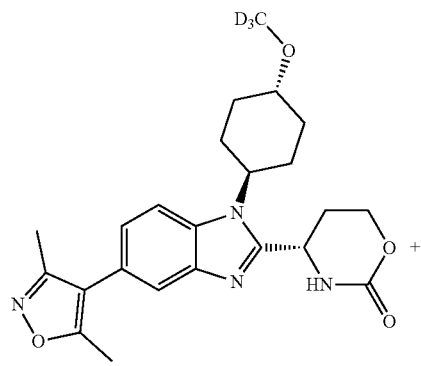
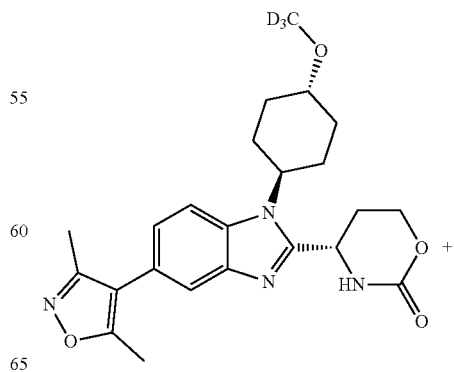

| 121 | 122 |
|---|---|
| 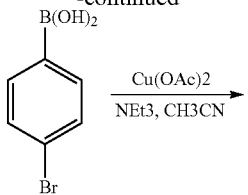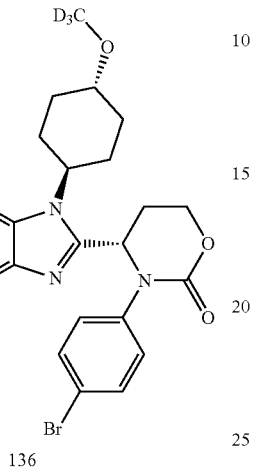136 | 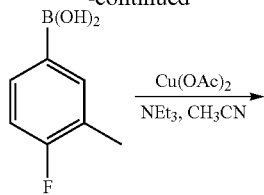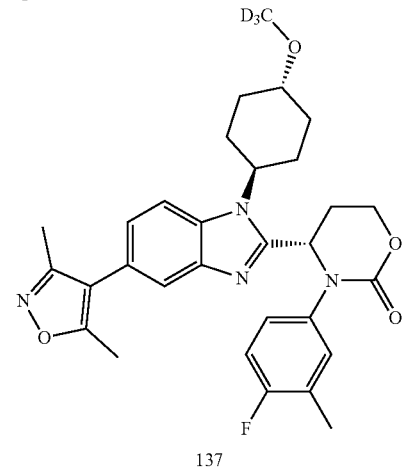137 |

Intermediate 113-3 (40 mg, 0.1 mmol), 4-bromophenylboric acid (65 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 40 mg of product (compound 136), with a yield of 69.3%. MS: m/z 582, 584 [M+H]+, 1H NMR (400 MHz, d6-DMSO) δ 7.80 (d, J=8.5 Hz, 1H), 7.72 (s, 1H), 7.50 (d, J=8.7 Hz, 2H), 7.24 (d, J=8.7 Hz, 2H), 7.16 (d, J=8.4 Hz, 1H), 5.82 (s, 1H), 4.61 (t, J=10.1 Hz, 1H), 4.35 (d, J=10.8 Hz, 2H), 3.36 (br, 1H), 2.65 (br, 1H), 2.41 (s, 3H), 2.28-1.98 (m, 7H), 1.86 (br, 1H), 1.42-1.12 (m, 4H).

Example 137 Synthesis of Compound (S)-4-(5-(3,5-dimethylisoxazol-4-yl)-1-((trans)-4-trideuteromethoxycyclohexyl)-1H-benzo[d]imidazol-2-yl)-3-(3-methyl-4-fluorophenyl)-1,3-oxazinane-2-one (137)

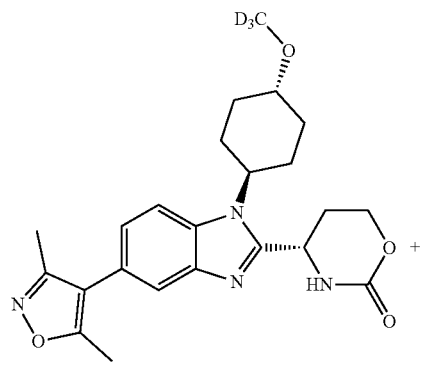
113-3

Intermediate 113-3 (40 mg, 0.1 mmol), 3-methyl-4-fluorophenylboric acid (61 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 38 mg of product (compound 137), with a yield of 71.4%. MS: m/z 536 [M+H]+, 1H NMR (400 MHz, d6-DMSO) δ 7.78 (d, J=8.5 Hz, 1H), 7.73 (s, 1H), 7.29 (d, J=7.1 Hz, 1H), 7.16 (d, J=8.4 Hz, 1H), 7.02 (d, J=7.8 Hz, 2H), 5.77 (s, 1H), 4.66 (t, J=9.8 Hz, 1H), 4.35 (d, J=11.1 Hz, 2H), 3.41-3.34 (m, 1), 2.71-2.57 (m, 1H), 2.41 (s, 3H), 2.24 (s, 3H), 2.21-1.91 (m, 7H), 1.82 (d, J=10.5 Hz, 1H), 1.46-1.01 (m, 4H).

Example 138 Synthesis of Compound 4-(2-(3',4'-difluoro-6-methoxy-[1,1'-biphenyl]-2-yl)-1-((trans)-4-methoxycyclohexyl)-1H-benzo[d]imidazol-5-yl)-3,5-dimethylisoxazole (138)

Synthesis of 3',4'-difluoro-6-methoxy-[1,1'-biphenyl]-2-formaldehyde (Intermediate 138-1)

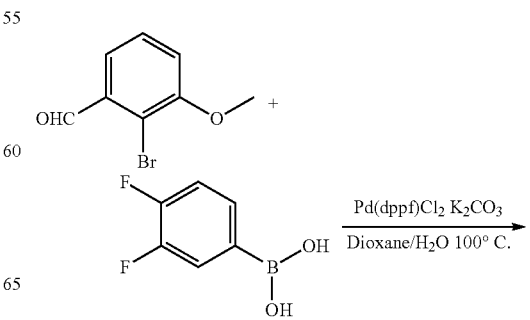

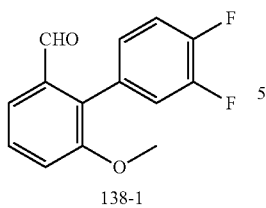

2-Bromo-3-methoxybenzaldehyde (100 mg, 0.47 mmol), 3,4-difluorophenylboric acid (96 mg, 0.61 mmol), [1,1'-bis(diphenylphosphino)ferrocene]dichloropalladium (II) (17 mg, 0.023 mmol), and potassium carbonate (129 mg, 0.94 mmol) were dissolved in 15 mL of dioxane and 3 mL of water, and then the system was purged with nitrogen for three times. The reaction solution was stirred for 6 h at 100° C. The solution was cooled, and then extracted with ethyl acetate (30 mL×3). The ethyl acetate layer was combined, and washed with saturated brine (20 mL). The organic layer was dried over anhydrous sodium sulfate, and concentrated. The residue was purified by column chromatography to provide 83 mg of oil (intermediate 138-1), with a yield of 71.6%.

Synthesis of 4-(2-(3',4'-difluoro-6-methoxy-[1,1'-biphenyl]-2-yl)-1-((trans)-4-methoxycyclohexyl)-1H-benzo[d]imidazole-5-yl)-3,5-dimethylisoxazole (Compound 138)

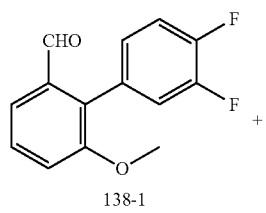

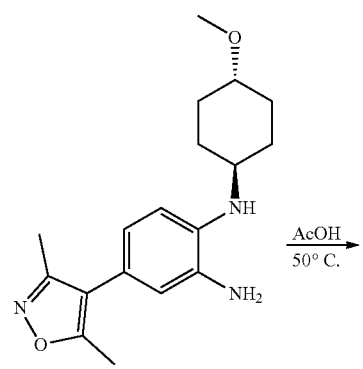

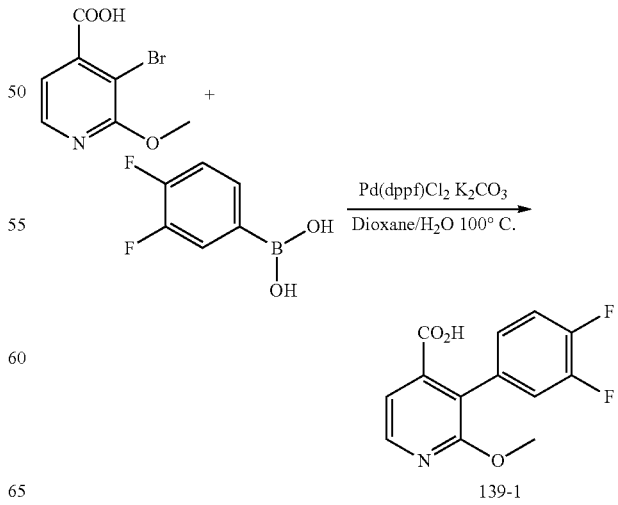

Intermediate 138-1 (33 mg, 0.13 mmol) and intermediate 3 (35 mg, 0.11 mmol) were dissolved in glacial acetic acid (5 mL), and then the solution was stirred for 3 h at 50° C. The reaction solution was cooled, and then its pH value was adjusted to be 8-9 with saturated potassium carbonate solution and extracted with ethyl acetate (20 mL×2). The organic phase was combined, washed once with saturated brine (15 mL), dried over anhydrous sodium sulfate, and concentrated. The residue was purified by column chromatography to provide 36 mg of white solid (compound 138), with a yield of 59.7%. MS: m/z 554 [M+H]$^+$, $^1$H NMR (400 MHz, d$_6$-DMSO) δ 7.74 (d, J=8.5 Hz, 1H), 7.64 (s, 1H), 7.55 (t, J=8.0 Hz, 1H), 7.39 (t, J=13.3 Hz, 2H), 7.27 (dd, J=19.0, 8.7 Hz, 1H), 7.12 (dd, J=13.8, 8.0 Hz, 2H), 6.97 (s, 1H), 3.82 (s, 3H), 3.73 (t, J=12.3 Hz, 1H), 3.22 (s, 3H), 2.41 (s, 3H), 2.24 (s, 3H), 2.15-2.04 (m, 2H), 1.96 (s, 2H), 1.64 (s, 1H), 1.24 (d, J=9.8 Hz, 2H), 1.18-0.98 (m, 2H).

Example 139 Synthesis of Compound 4-(2-(3-(3,4-difluorophenyl)-2-methoxypyridin-4-yl)-1-((trans)-4-methoxycyclohexyl)-1H-benzo [d]imidazole-5-yl)-3,5-dimethylisoxazole (139)

Synthesis of 3-(3,4-difluorophenyl)-2-methoxyisonicotinic acid (139-1)

3-Bromo-2-methoxyisonicotinic acid (350 mg, 1.52 mmol), 3,4-difluorophenylboric acid (360 mg, 2.28 mmol), [1,1'-bis(diphenylphosphino)ferrocene]dichloropalladium (II) (30 mg, 0.041 mmol) and potassium carbonate (627 mg, 4.55 mmol) were dissolved in 60 mL of dioxane and 20 mL of water, and then the system was purged with nitrogen for three times. The reaction solution was stirred for 6 h at 100° C. The solution was cooled and filtered by suction. Then, pH value was adjusted to be 2-3 with diluted HCl. The resultant solution was extracted with ethyl acetate (50 mL×3). The organic phase was combined, washed once with saturated brine (20 mL), dried over anhydrous sodium sulfate, and concentrated. The residue was purified by column chromatography to provide 280 mg of solid (intermediate 139-1).

Synthesis of 3-(3,4-difluorophenyl)-2-methoxypyridin-4-yl)methanol (139-2)

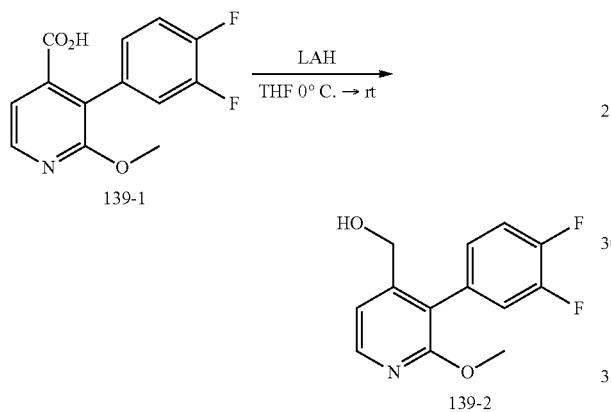

LAH (80 mg, 2.11 mmol) was dissolved in 20 mL of tetrahydrofuran, and the solution was stirred for 30 min at room temperature. Intermediate 139-1 (280 mg, 1.06 mmol) was added in batches in an ice bath, and then the reaction solution was allowed to react at room temperature for 2 h. 2 mL of acetone was added to quench the reaction. After that, 2 mL of 15% sodium hydroxide solution, 3 mL of water, and 20 g of magnesium sulfate were added to the reaction solution. The resultant solution was stirred for 1 h at room temperature and filtered, followed by concentration. The residue was purified by column chromatography to provide 185 mg of oil (intermediate 139-2), with a yield of 69.8%.

Synthesis of 3-(3,4-difluorophenyl)-2-methoxyisonicotinaldehyde (139-3)

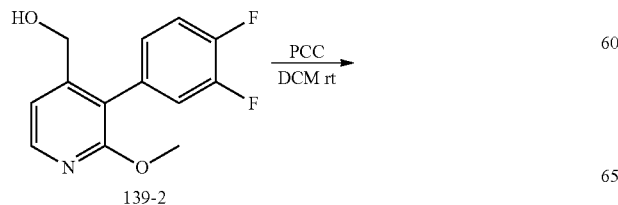

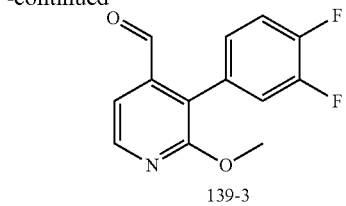

Intermediate 139-2 (185 mg, 0.74 mmol) was dissolved in 30 mL of dichloromethane, to which was added PCC (557 mg, 2.21 mmol) in portions. The reaction solution was heated for 1 h at room temperature, and filtered by suction. The filtrate was concentrated, and the residue was purified by column chromatography to provide 130 mg of oil (139-3), with a yield of 70.8%.

Synthesis of 4-(2-(3-(3,4-difluorophenyl)-2-methoxypyridin-4-yl)-1-((trans)-4-methoxycyclohexyl)-1H-benzo[d]imidazole-5-yl)-3,5-dimethylisoxazole (Compound 139)

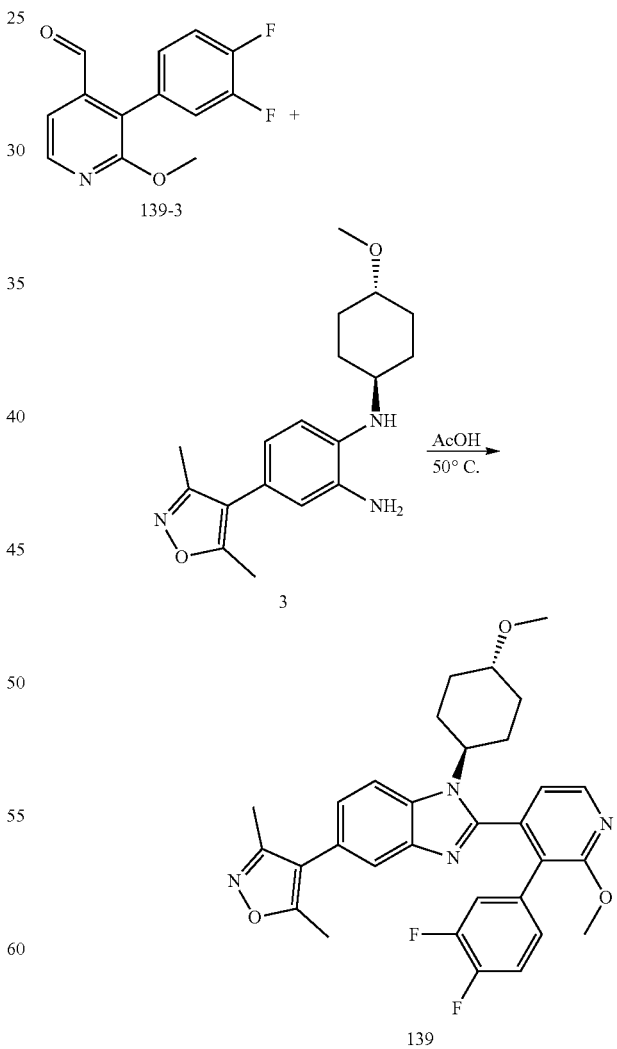

Intermediate 139-3 (40 mg, 0.16 mmol) and intermediate 3 (45.6 mg, 0.15 mmol) were dissolved in 5 mL of glacial acetic acid, and then the solution was stirred for 3 h at 50° C. The reaction solution was cooled, and then its pH value was adjusted to be 8-9 with saturated potassium carbonate solution. The solution was extracted with ethyl acetate (30 mL×3). The organic phase was combined, washed once with saturated brine (20 mL), dried over anhydrous sodium sulfate, and concentrated. The residue was purified by column chromatography to provide 45 mg of solid (compound 139), with a yield of 57%. MS: m/z 545 [M+H]$^+$, $^1$H NMR (400 MHz, CDCl$_3$) δ 8.35 (s, 1H), 7.72 (s, 1H), 7.49 (t, J=11.7 Hz, 1H), 7.13 (d, J=8.2 Hz, 2H), 7.02 (d, J=3.8 Hz, 2H), 4.03 (s, 3H), 3.72 (s, 1H), 3.35 (s, 3H), 3.17 (d, J=10.9 Hz, 1H), 2.45 (s, 3H), 2.32 (s, 3H), 2.10 (dd, J=42.9, 23.2 Hz, 4H), 1.27 (d, J=12.5 Hz, 5H).

Example 140 Synthesis of Compound 6-(5-(3,5-dimethylisoxazol-4-yl)-1-((trans)-4-methoxycyclohexyl)-1H-benzo[d]imidazol-2-yl)-4'-fluorobiphenyl-2-nitrile (140)

Synthesis of 2-bromo-3-(5-(3,5-dimethylisoxazol-4-yl)-1-((trans)-4-methoxycyclohexyl)-1H-benzo[d]imidazol-2-yl)benzonitrile (Intermediate 140-1)

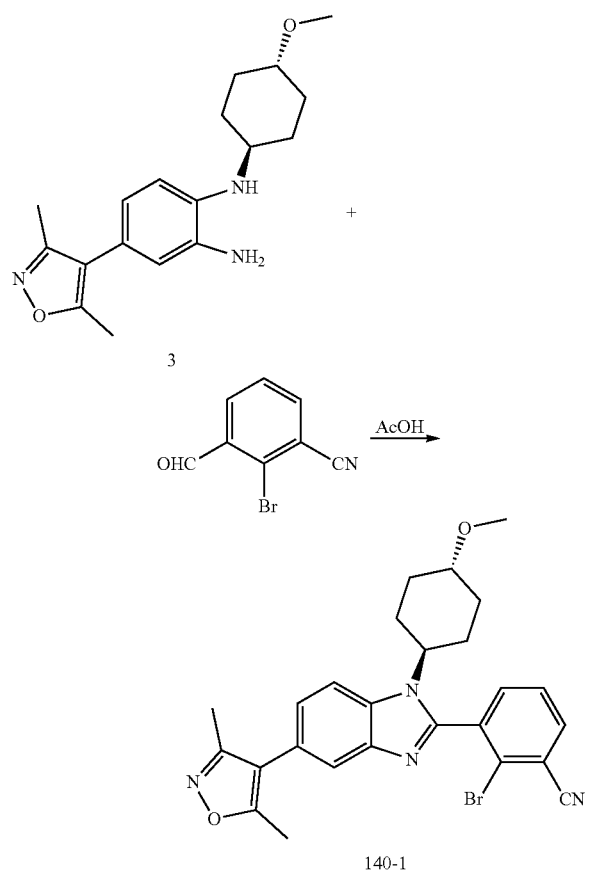

Compound 3 (315 mg, 1 mmol) and 2-bromo-3-cyanobenzaldehyde (210 mg, 1 mmol) were dissolved in acetic acid (5 mL), and the reaction solution was heated to 60° C. and allowed to react. After completion of the reaction, pH value of the reaction solution was adjusted to be 9-10 with aqueous potassium carbonate. The resultant solution was extracted with ethyl acetate. The organic phase was dried over anhydrous sodium sulfate, and concentrated. The residue was purified by column chromatography to provide 285 mg of intermediate 140-1, with a yield of 57%.

Synthesis of 6-(5-(3,5-dimethylisoxazol-4-yl)-1-((trans)-4-methoxycyclohexyl)-1H-benzo[d]imidazol-2-yl)-4'-fluorobiphenyl-2-nitrile (Compound 140)

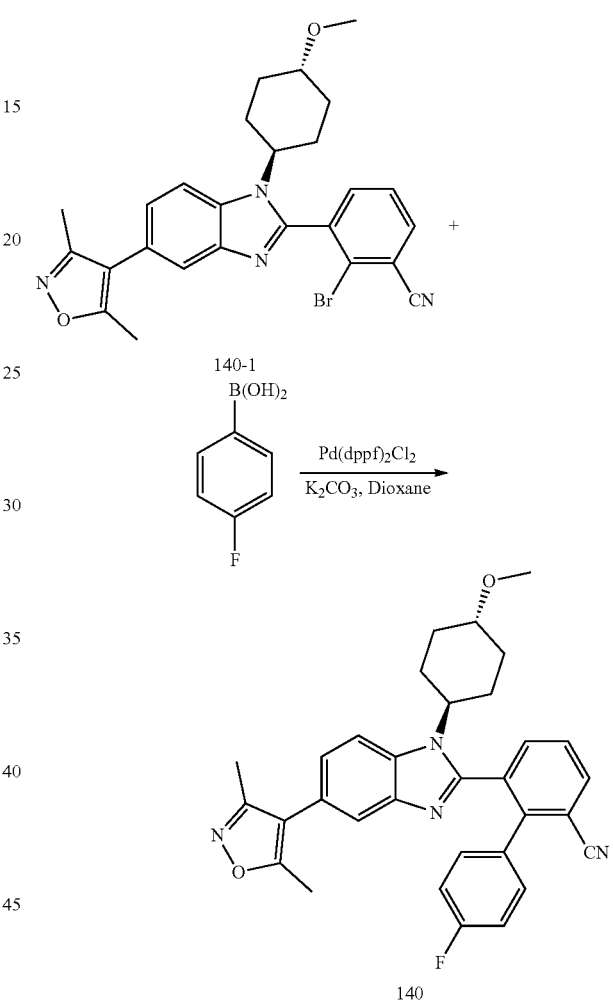

Intermediate 140-1 (285 mg, 0.57 mmol), p-fluorophenylboric acid (95 mg, 0.68 mmol), potassium carbonate, and [1,1'-bis(diphenylphosphino)ferrocene]dichloropalladium (II) (44 mg, 0.06 mmol) were dissolved in dioxane (5 mL) and water (1 mL), and then the reaction solution was purged with nitrogen. The solution was heated to 80° C. and reacted overnight. After completion, water was added to the resultant solution, and then the solution was extracted with ethyl acetate. The organic phase was dried over anhydrous sodium sulfate, and concentrated. The residue was purified by column chromatography to provide 187 mg of compound 140, with a yield of 63%. MS: m/z 521 [M+H]$^+$, $^1$H NMR (400 MHz, d$_6$-DMSO) δ 8.22 (dd, J=7.8, 1.2 Hz, 1H), 7.89 (dd, J=7.7, 1.2 Hz, 1H), 7.85-7.57 (m, 4H), 7.44-6.89 (m, 4H), 3.65 (d, J=12.4 Hz, 1H), 3.28 (d, J=11.0 Hz, 1H), 3.21 (s, 3H), 2.42 (s, 3H), 2.24 (s, 3H), 2.11-2.00 (m, 2H), 1.91 (s, 2H), 1.62 (s, 1H), 1.19-1.02 (m, 3H).

Example 141 Synthesis of Compound 4-(2-(3',4'-difluoro-6-methoxy-[1,1'-biphenyl]-2-yl)-1-((trans)-4-methoxycyclohexyl)-1H-benzo[d]imidazole-5-yl)-3,5-dimethyl isoxazole (Compound 141)

Synthesis of 4'-fluoro-6-methoxy-[1,1'-biphenyl]-2-formaldehyde (Intermediate 141-1)

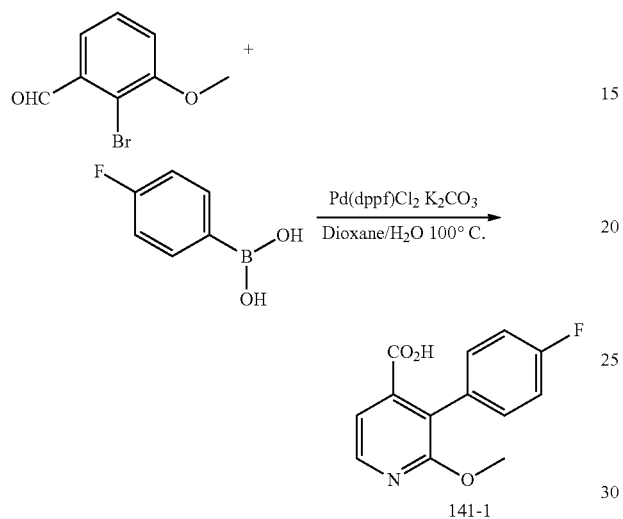

2-Bromo-3-methoxybenzaldehyde (100 mg, 0.47 mmol), 4-fluorophenylboric acid (85 mg, 0.61 mmol), [1,1'-bis(diphenylphosphino)ferrocene]dichloropalladium (II) (17 mg, 0.023 mmol) and potassium carbonate (129 mg, 0.93 mmol) were dissolved in 15 mL of dioxane and 3 mL of water, and then the system was purged with nitrogen for three times. The reaction solution was stirred for 6 h at 100° C. The solution was cooled and extracted with ethyl acetate (30 mL×3). The organic phase was combined, washed once with saturated brine (20 mL×2), dried over anhydrous sodium sulfate, and concentrated. The residue was purified by column chromatography to provide 80 mg of oil (intermediate 141-1), with a yield of 74.4%.

Synthesis of 4-(2-(3',4'-difluoro-6-methoxy-[1,1'-biphenyl]-2-yl)-1-((trans)-4-methoxycyclohexyl)-1H-benzo[d]imidazole-5-yl)-3,5-dimethylisoxazole (Compound 141)

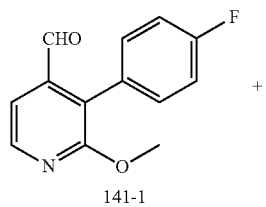

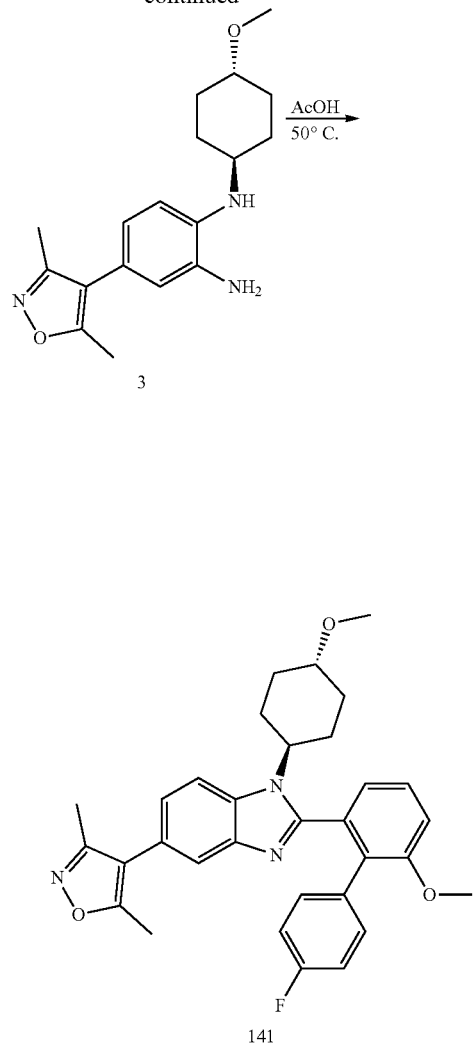

Intermediate 141-1 (30 mg, 0.13 mmol) and intermediate 3 (34 mg, 0.11 mmol) were dissolved in 5 mL of glacial acetic acid, and then the solution was stirred for 3 h at 50° C. The reaction solution was cooled, and then its pH value was adjusted to be 8-9 with saturated potassium carbonate solution. The solution was extracted with ethyl acetate (20 mL×2). The organic phase was combined, washed once with saturated brine (15 mL), dried over anhydrous sodium sulfate, and concentrated. The residue was purified by column chromatography to provide 35 mg of white solid (compound 141), with a yield of 61.7%. MS: m/z 526 [M+H]$^+$, $^1$H NMR (400 MHz, d$_6$-DMSO) δ 7.71 (d, J=8.5 Hz, 1H), 7.63 (d, J=1.2 Hz, 1H), 7.52 (t, J=8.0 Hz, 1H), 7.36 (d, J=8.1 Hz, 1H), 7.26 (s, 2H), 7.10 (ddd, J=25.8, 13.2, 4.9 Hz, 4H), 3.82 (d, J=14.8 Hz, 3H), 3.67 (t, J=12.0 Hz, 1H), 3.26 (s, 1H), 3.21 (s, 3H), 2.41 (s, 3H), 2.24 (s, 3H), 2.13-1.87 (m, 5H), 1.57 (d, J=12.7 Hz, 1H), 1.08-0.94 (m, 2H).

Example 142 Synthesis of Compound (S)-3-(3,4-difluorophenyl)-4-(5-(3,5-dimethylisoxazol-4-yl)-1-((R)-tetrahydrofuran-3-yl)-1H-benzo[d]imidazol-2-yl)-1,3-oxazinane-2-one (142)

Synthesis of (R)—N-(4-bromo-2-nitrophenyl)tetrahydrofuran-3-amine (Intermediate 142-1)

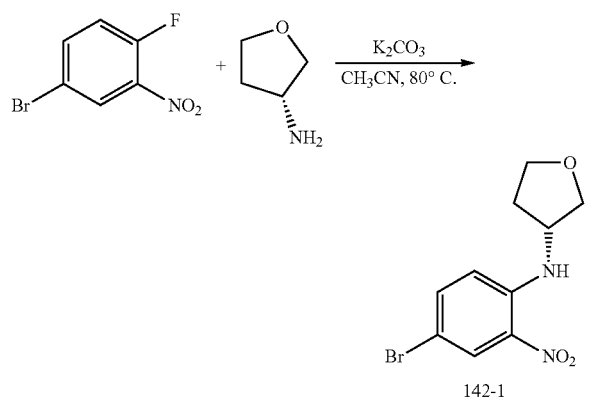

4-Bromo-1-fluoro-2-nitrobenzene (1.1 g, 5 mmol), (R)-tetrahydrofuran-3-amine (0.43 g, 5 mmol) and potassium carbonate (1.4 g, 10 mmol) were dissolved in acetonitrile (50 mL), and the solution was heated to 80° C. and stirred for 5 h. The solution was cooled, and then 200 mL of water was added. The resultant solution was filtered, and the filter cake was rinsed with water. The filter cake was purified by column chromatography, to provide 1.2 g of solid (intermediate 142-1), with a yield of 83.9%. MS: m/z 287 [M+H]$^+$ Synthesis of (R)-4-bromo-N1-(tetrahydrofuran-3-yl)benzene-1,2-diamine (Intermediate 142-2)

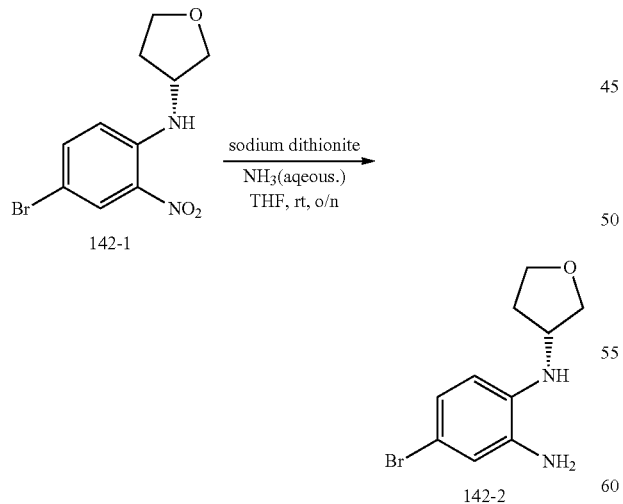

Intermediate 142-1 (1.2 g, 4.2 mmol) and ammonia (10 mL) were dissolved in 50 mL of tetrahydrofuran and 50 mL of water, to which was added sodium dithionite (10.9 g, 63 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 0.8 g of solid (intermediate 142-2), with a yield of 74.4%. MS: m/z 257 [M+H]$^+$ Synthesis of (R)-4-(3,5-dimethylisoxazol-4-yl)-N1-(tetrahydrofuran-3-yl) benzene-1,2-diamine (Intermediate 142-3)

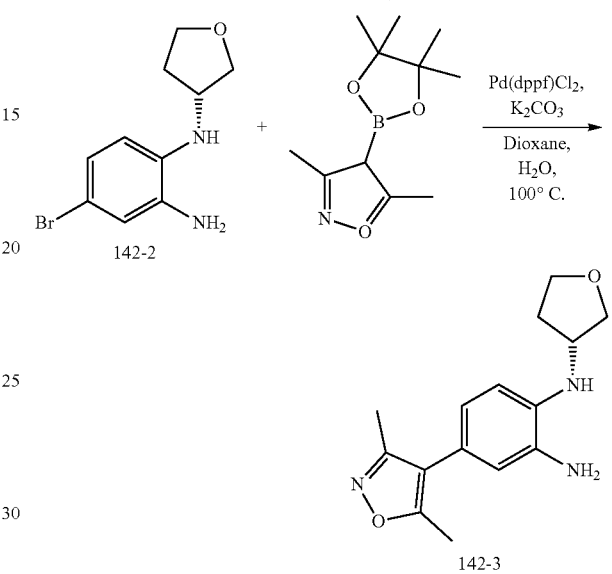

Intermediate 142-2 (0.8 g, 3 mmol), 3,5-dimethyl-4-(4,4,5,5-tetramethyl-1,3,2-dioxaborolan-2-yl)isoxazole (0.74 g, 3.3 mmol), [1,1'-bis(diphenylphosphino)ferrocene]dichloropalladium (II) (20 mg, 0.03 mmol), and potassium carbonate (0.8 g, 6 mmol) were dissolved in 20 mL of dioxane and 4 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 0.65 g of solid (intermediate 142-3), with a yield of 79%. MS: m/z 274 [M+H]$^+$ Synthesis of t-butyl ((S)-3-((t-butyldimethylsilyl)oxy)-1-(5-(3,5-dimethylisoxazol-4-yl)-1-((R)-tetrahydrofuran-3-yl)-1H-benzo[d]imidazol-2-yl)propylcarbamate (Intermediate 142-4)

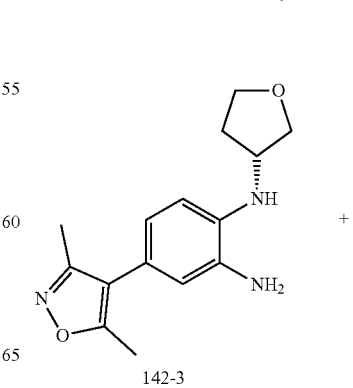

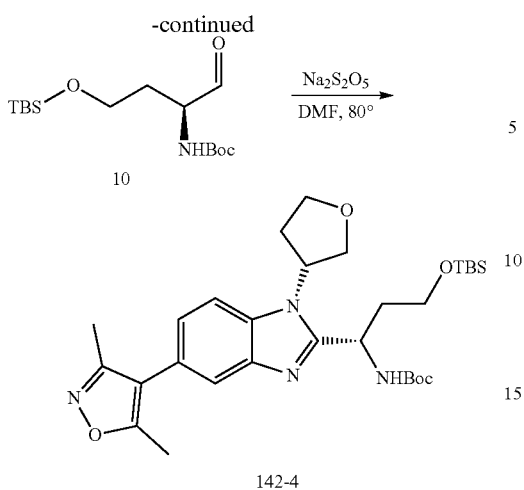

Intermediate 10 (600 mg, 1.9 mmol) was dissolved in N,N-dimethylformamide (30 mL), to which were added intermediate 142-3 (491 mg, 1.8 mmol) and sodium metabisulfite (720 mg, 3.8 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 564 mg of product (intermediate 142-4), with a yield of 55%.

Synthesis of (S)-3-amino-3-(5-(3,5-dimethylisoxazol-4-yl)-1-((R)-tetrahydrofuran-3-yl)-1H-benzo[d]imidazol-2-yl-propan-1-ol (Intermediate 142-5)

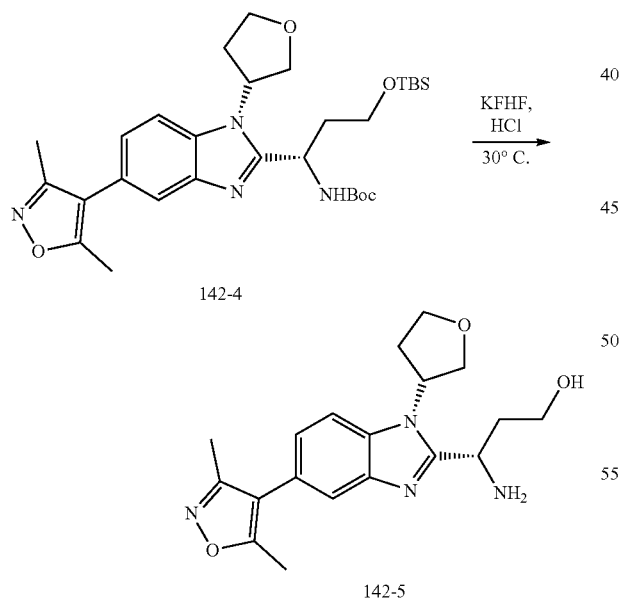

Intermediate 142-4 (684 mg, 1.2 mmol) and potassium hydrogen difluoride (190 mg) were dissolved in methanol (20 mL), to which was added 5 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 300 mg of product (intermediate 142-5), with a yield of 70%, MS: m/z 357 [M+H]$^+$.

(S)-4-(5-(3,5-dimethylisoxazol-4-yl)-1-((R-tetrahydrofuran-3-yl)-1H-benzo[d]imidazol-2-yl)-1,3-oxadiazine-2-one (Intermediate 142-6)

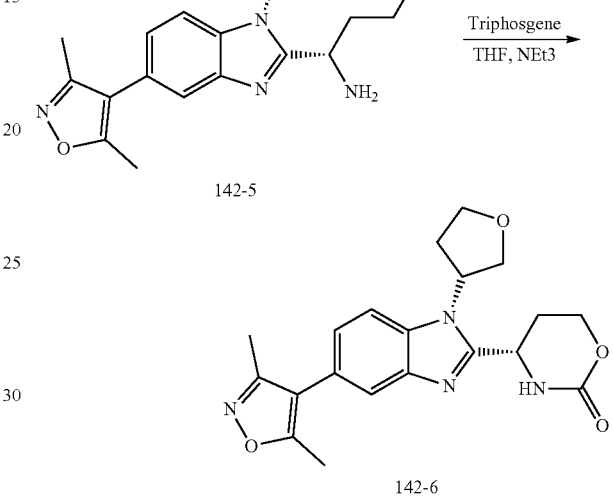

Intermediate 142-5 (117 mg, 0.33 mmol) and triethylamine (49 mg, 0.48 mmol) were dissolved in 20 mL of tetrahydrofuran, to which was added triphosgene (48.3 mg, 0.17 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 80 mg of product (intermediate 142-6), with a yield of 63.4%. MS: m/z 383 [M+H]$^+$ Synthesis of (S)-3-(3,4-difluorophenyl)-4-(5-(3,5-dimethylisoxazol-4-yl)-1-((R)-tetrahydrofuran-3-yl)-1H-benzo[d]imidazol-2-yl)-1,3-oxazinane-2-one (Compound 142)

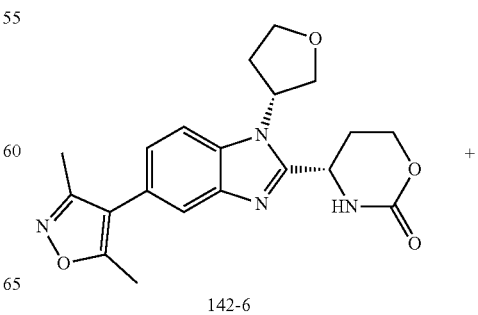

+

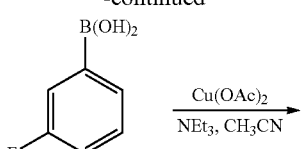

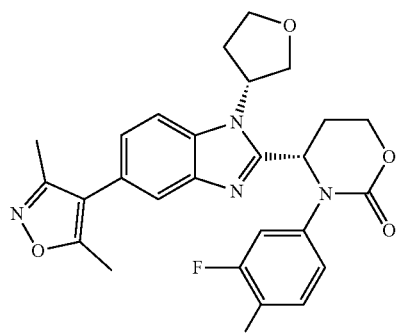

142

Intermediate 142-6 (46 mg, 0.12 mmol), 3,4-difluorophenylboronic acid (77 mg, 0.5 mmol), copper acetate monohydrate (30 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 27 mg of product (compound 142), with a yield of 45%. MS: m/z 495 [M+H]$^+$, $^1$H NMR (400 MHz, d$_6$-DMSO) δ 7.73 (dd, J=19.0, 10.5 Hz, 2H), 7.54-7.30 (m, 2H), 7.25 (d, J=8.4 Hz, 1H), 7.12 (d, J=8.7 Hz, 1H), 5.80 (s, 1H), 5.32 (s, 1H), 4.48 (t, J=10.2 Hz, 1H), 4.41-4.16 (m, 2H), 3.91 (d, J=10.5 Hz, 1H), 3.68 (dt, J=27.2, 8.4 Hz, 2H), 2.83-2.61 (m, 1H), 2.50-2.44 (m, 1H), 2.41 (s, 3H), 2.26 (d, J=11.9 Hz, 4H), 2.03 (dd, J=18.8, 10.6 Hz, 1H).

Example 143 Synthesis of Compound ((S)-3-(3,4-difluorophenyl)-4-(5-(3,5-dimethylisoxazol-4-yl)-1-((cis)-3-methoxycyclobutyl)-1H-benzo[d]imidazol-2-yl)-1,3-oxazinane-2-one (143)

Synthesis of 4-bromo-N-(((cis)-3-methoxycyclobutyl)-2-nitroaniline (Intermediate 143-1)

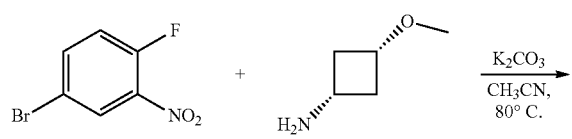

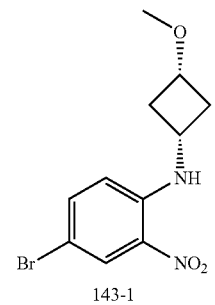

143-1

4-Bromo-1-fluoro-2-nitrobenzene (1.1 g, 5 mmol), (cis)-3-methoxycyclobutyl-1-amine (0.55 g, 5.5 mmol) and potassium carbonate (2.1 g, 15 mmol) were dissolved in acetonitrile (50 mL), and then the solution was heated to 80° C. and stirred for 5 h. The solution was cooled, to which was added 200 mL of water, and then filtered. The filter cake was rinsed with water, and purified by column chromatography to provide 1.2 g of solid (intermediate 143-1), with a yield of 79.7%.

Synthesis of 4-bromo-N1-((cis)-3-methoxycyclobutyl)benzene-1,2-diamine (Intermediate 143-2)

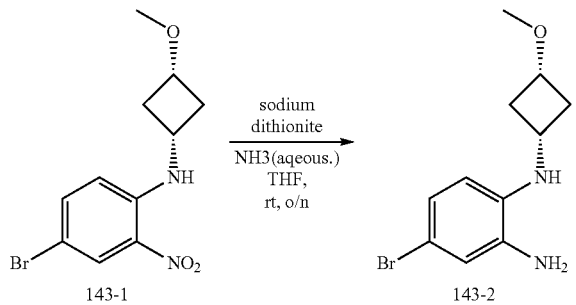 [SMILES: CO[C@H]1C[C@@H](Nc2ccc(Br)cc2[N+](=O)[O-])C1 ; CO[C@H]1C[C@@H](Nc2ccc(Br)cc2N)C1]

Intermediate 143-1 (1.2 g, 4 mmol) and ammonia (5 mL) were dissolved in 30 mL of tetrahydrofuran and 30 mL of water, to which was added sodium dithionite (8.2 g, 40 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 0.9 g of solid (intermediate 143-2), with a yield of 7483.4%.

Synthesis of 4-(3,5-dimethylisoxazol-4-yl)-N1-(((cis)-3-methoxycyclobutyl)benzene-1,2-diamine (Intermediate 143-3)

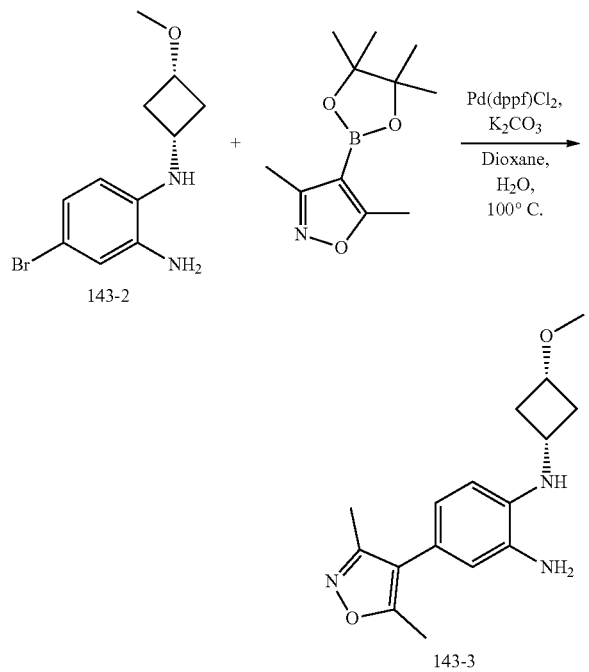

Intermediate 143-2 (0.9 g, 3.3 mmol), 3,5-dimethyl-4-(4,4,5,5-tetramethyl-1,3,2-dioxaborolan-2-yl)isoxazole (0.81 g, 3.6 mmol), [1,1'-bis(diphenylphosphino)ferrocene]dichloropalladium (II) (80 mg, 0.12 mmol), and potassium carbonate (0.91 g, 6.6 mmol) were dissolved in 30 mL of dioxane and 3 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 530 mg of solid (intermediate 143-3), with a yield of 55%.

Synthesis of t-butyl ((S)-3-((t-butyldimethylsilyl)oxy)-1-(5-(3,5-dimethylisoxazol-4-yl)-1-((cis)-3-methoxycyclobutyl)-1H-benzo[d]imidazol-2-yl)propylcarbamate (Intermediate 143-4)

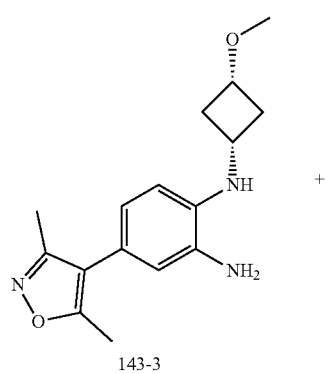

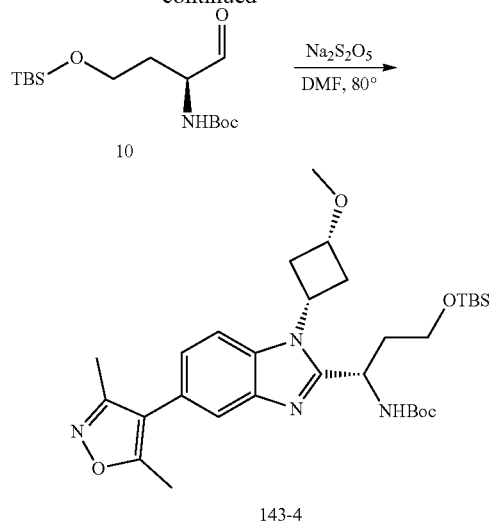

Intermediate 10 (600 mg, 1.9 mmol) was dissolved in N,N-dimethylformamide (30 mL), to which were added intermediate 143-3 (530 mg, 1.8 mmol) and sodium metabisulfite (720 mg, 3.8 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 620 mg of product (intermediate 143-4), with a yield of 57%.

Synthesis of (S)-3-amino-3-(5-(3,5-dimethylisoxazol-4-yl)-1-((cis)-3-methoxycyclobutyl)-1H-benzo[d]imidazol-2-yl)propan-1-ol (Intermediate 143-5)

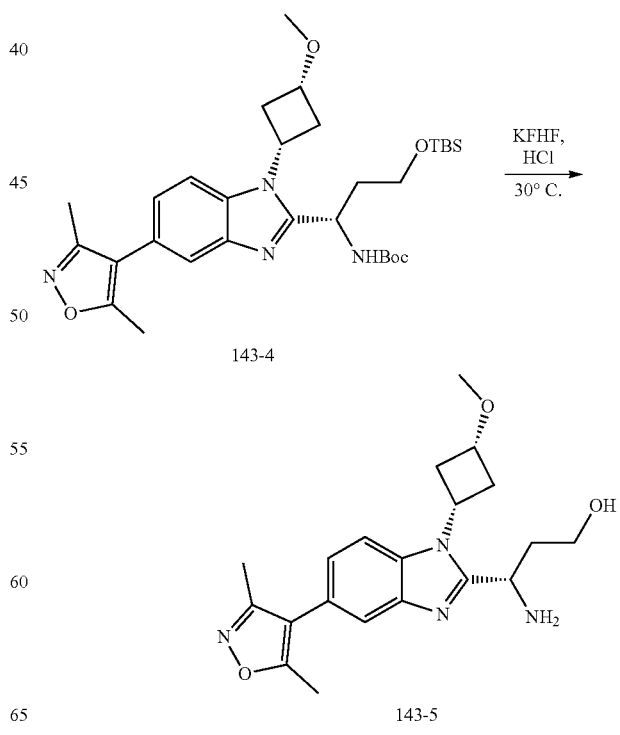

Intermediate 143-4 (620 mg, 1.06 mmol) and potassium hydrogen difluoride (190 mg) were dissolved in methanol (20 mL), to which was added 5 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 230 mg of product (intermediate 143-5), with a yield of 58.9%.

(S)-4-(1-(((cis)-3-methoxycyclobutyl)-5-(3-methylisoxazol-4-yl)-1H-benzo[d]imidazol-2-yl)-1,3-oxazinane-2-one (Intermediate 143-6)

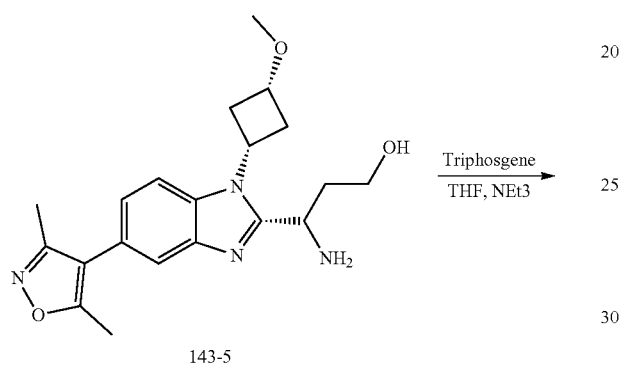

143-5

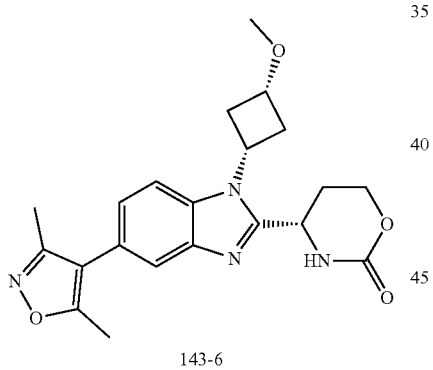

143-6

Intermediate 143-5 (230 mg, 0.60 mmol) and triethylamine (190 mg, 1.86 mmol) were dissolved in 20 mL of tetrahydrofuran, to which was added triphosgene (48.3 mg, 0.17 mmol) in portions, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 150 mg of product (intermediate 143-6), with a yield of 61%.

Synthesis of ((S)-3-(3,4-difluorophenyl)-4-(5-(3,5-dimethylisoxazol-4-yl)-1-((cis)-3-methoxycyclobutyl)-1H-benzo[d]imidazol-2-yl)-1,3-oxazinane-2-one (Compound 143)

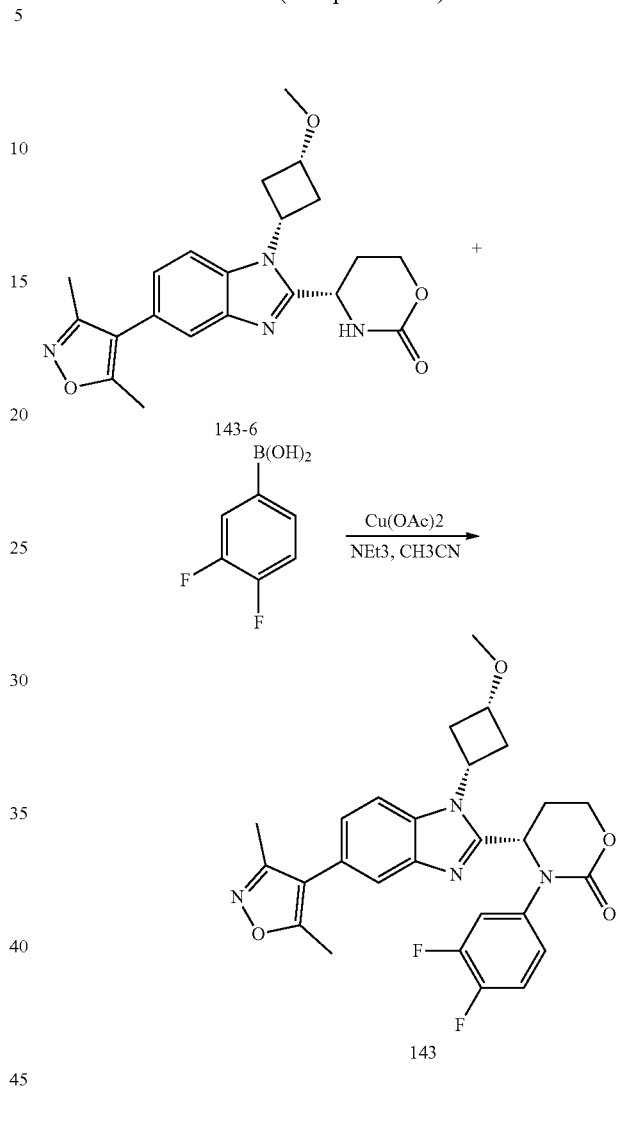

Intermediate 143-6 (50 mg, 0.12 mmol), 3,4-difluorophenylboronic acid (77 mg, 0.5 mmol), copper acetate monohydrate (30 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 25 mg of product (compound 143), with a yield of 43.4%. MS: m/z 509 [M+H]$^+$, $^1$H NMR (400 MHz, d$_6$-DMSO) δ 7.67 (d, J=8.6 Hz, 1H), 7.59 (s, 1H), 7.37-7.17 (m, 2H), 7.10-6.89 (m, 2H), 5.69 (s, 1H), 4.93-4.75 (m, 1H), 4.38-4.27 (m, 1H), 4.27-4.15 (m, 1H), 3.84 (p, J=6.9 Hz, 1H), 3.28 (s, 3H), 3.02-2.85 (m, 2H), 2.85-2.65 (m, 2H), 2.41 (s, 3H), 2.35-2.27 (m, 1H), 2.24 (s, 3H), 2.05 (dd, J=9.6, 4.3 Hz, 1H).

Example 114 Synthesis of Compound (S)-3-(3,4-difluorophenyl)-4-(5-(3,5-dimethylisoxazol-4-yl)-1-((trans)-3-methoxycyclobutyl)-1H-benzo[d]imidazol-2-yl)-1,3-oxazinane-2-one (144)

Synthesis of (trans)-3-((4-bromo-2-nitrophenyl)amino)cyclobutanol (Intermediate 144-1)

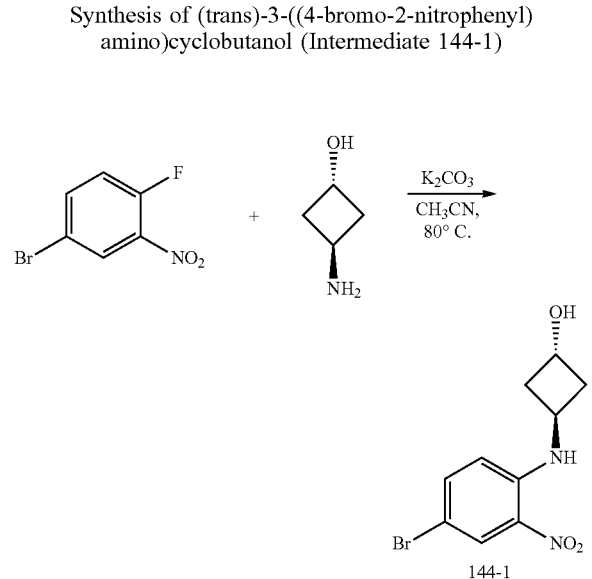

4-Bromo-1-fluoro-2-nitrobenzene (2.53 g, 11.5 mmol), (trans)-3-aminocyclobutanol (1.0 g, 11.5 mmol) and potassium carbonate (3.97 g, 28.8 mmol) were dissolved in acetonitrile (30 mL), and then the solution was heated to 80° C. and stirred for 5 h. The solution was cooled, to which was added 50 mL of water, and then filtered. The filter cake was rinsed with water, and purified by column chromatography to provide 2.8 g of solid (intermediate 144-1), with a yield of 85.2%.

Synthesis of 4-bromo-N-((trans)-3-methoxycyclobutyl)-2-nitroaniline (Intermediate 144-2)

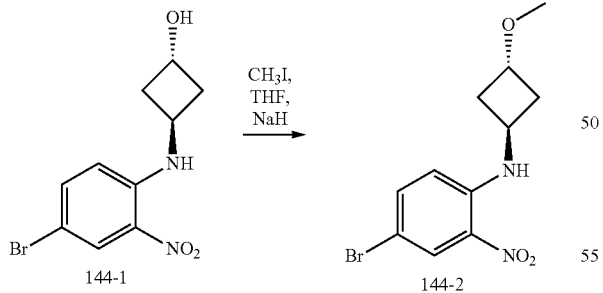

Intermediate 144-1 (2.58 g, 9 mmol) and NaH (0.72 g, 18 mmol) were dissolved in 20 mL of tetrahydrofuran, to which was added methyl iodide (1.92 g, 13.5 mmol) in an ice bath, and then the solution was allowed to react overnight. The reaction solution was poured to ice-water, and then extracted with ethyl acetate. The organic phase was dried over anhydrous sodium sulfate, and concentrated. The residue was purified by column chromatography to provide 1.86 g of product (intermediate 144-2), with a yield of 68.5%.

Synthesis of 4-bromo-$N^1$-((trans)-3-methoxycyclobutyl)benzene-1,2-diamine (Intermediate 144-3)

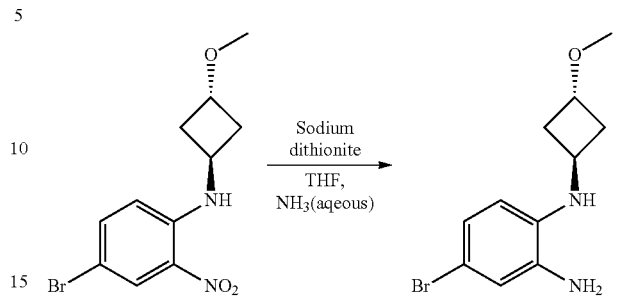

Intermediate 144-2 (1.8 g, 6 mmol) and ammonia (5 mL) were dissolved in 75 mL of tetrahydrofuran and 75 mL of water, to which was added sodium dithionite (16.6 g, 81 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 1.4 g of solid (intermediate 144-3), with a yield of 85.5%.

Synthesis of 4-(3,5-dimethylisoxazol-4-yl)-$N^1$-((trans)-3-methoxycyclobutyl)benzene-1,2-diamine (Intermediate 144-4)

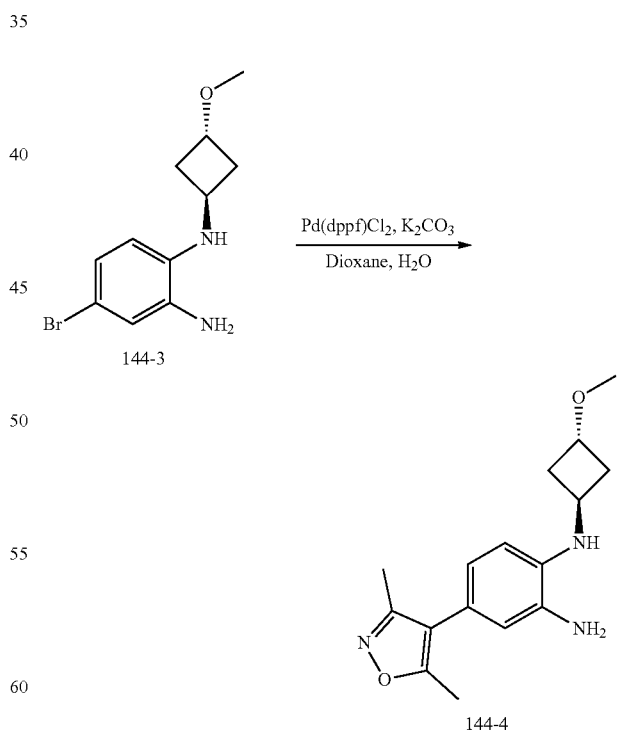

Intermediate 144-3 (1.6 g, 6 mmol), 3,5-dimethyl-4-(4,4,5,5-tetramethyl-1,3,2-dioxaborolan-2-yl)isoxazole (1.48 g, 6.6 mmol), [1,1'-bis(diphenylphosphino)ferrocene] dichloropalladium (II) (40 mg, 0.06 mmol), and potassium carbonate (1.66 g, 12 mmol) were dissolved in 30 mL of dioxane and 5 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 1.2 g of solid (intermediate 144-4), with a yield of 68.5%.

Synthesis of t-butyl ((S)-3-((t-butyldimethylsilyl)oxy)-1-(5-(3,5-dimethylisoxazol-4-yl)-1-((trans)-3-methoxycyclobutyl)-1H-benzo[d]imidazol-2-yl)propyl)carbamate (Intermediate 144-5)

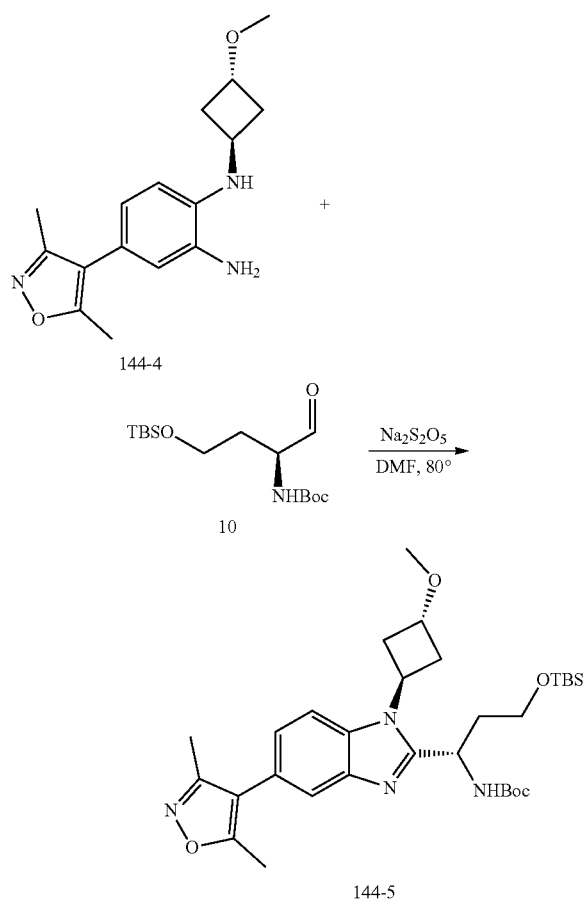

Intermediate 10 (600 mg, 1.9 mmol) was dissolved in N,N-dimethylformamide (30 mL), to which were added intermediate 144-4 (461 mg, 1.7 mmol) and sodium metabisulfite (720 mg, 3.8 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 732 mg of product (intermediate 114-5), with a yield of 73.6%.

Synthesis of (S)-3-amino-3-(5-(3,5-dimethylisoxazol-4-yl)-1-((trans)-3-methoxycyclobutyl)-1H-benzo[d]imidazol-2-yl)propan-1-ol (Intermediate 144-6)

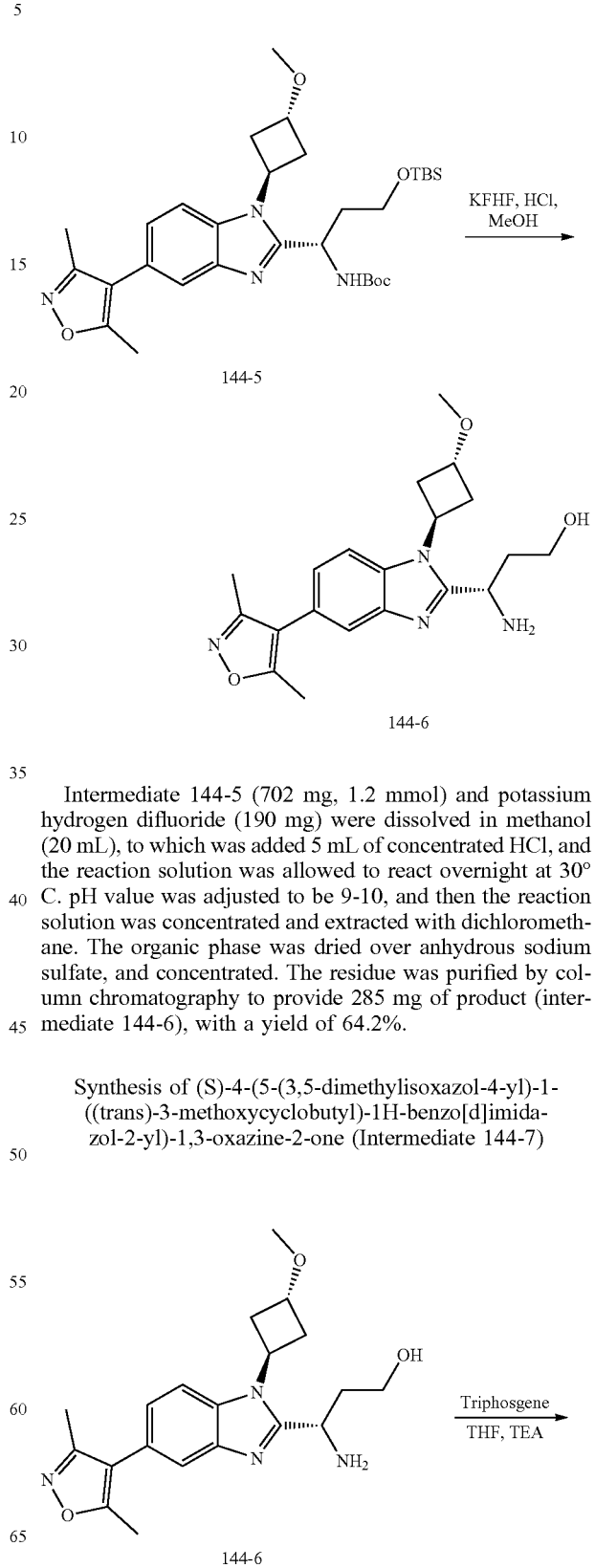

Intermediate 144-5 (702 mg, 1.2 mmol) and potassium hydrogen difluoride (190 mg) were dissolved in methanol (20 mL), to which was added 5 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 285 mg of product (intermediate 144-6), with a yield of 64.2%.

Synthesis of (S)-4-(5-(3,5-dimethylisoxazol-4-yl)-1-((trans)-3-methoxycyclobutyl)-1H-benzo[d]imidazol-2-yl)-1,3-oxazine-2-one (Intermediate 144-7)

145
-continued

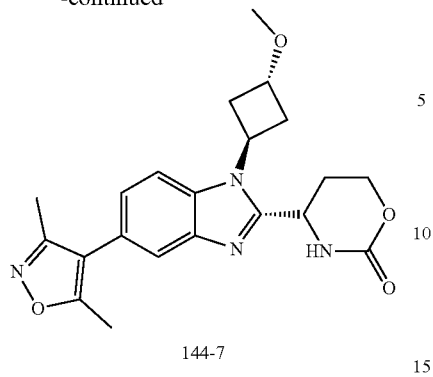

144-7

Intermediate 144-6 (122 mg, 0.33 mmol) and triethylamine (49 mg, 0.48 mmol) were dissolved in 20 mL of tetrahydrofuran, to which was added triphosgene (48.3 mg, 0.17 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 82 mg of product (intermediate 144-7), with a yield of 62.4%.

Synthesis of (S)-3-(3,4-difluorophenyl)-4-(5-(3,5-dimethylisoxazol-4-yl)-1-((trans)-3-methoxycyclobutyl)-1H-benzo[d]imidazol-2-yl)-1,3-oxazinane-2-one (Compound 144)

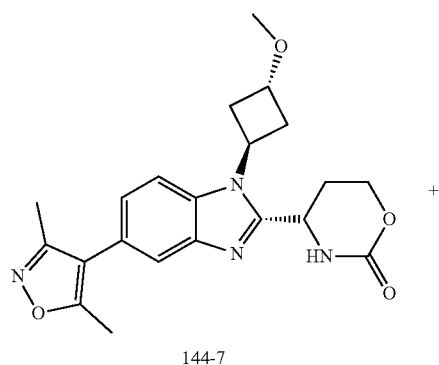

144-7

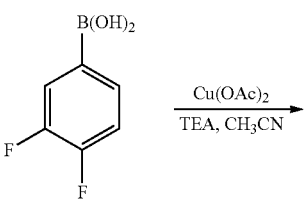

146
-continued

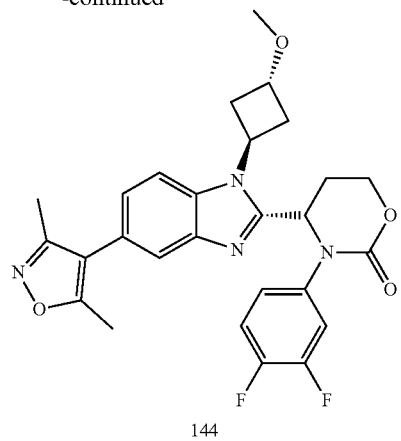

144

Intermediate 144-7 (79 mg, 0.2 mmol), 3,4-difluorophenylboronic acid (127 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 43 mg of product (compound 144), with a yield of 42.5%. MS: m/z 509 [M+H]$^+$, $^1$HNMR (400 MHz, $d_6$-DMSO) δ 7.87-7.74 (m, 2H), 7.55-7.43 (m, 1H), 7.37 (dd, J=19.4, 9.2 Hz, 1H), 7.22 (d, J=7.5 Hz, 1H), 7.16 (s, 1H), 5.76 (s, 1H), 5.23-5.10 (m, 1H), 4.43 (t, J=10.0 Hz, 1H), 4.32 (d, J=10.6 Hz, 1H), 4.21 (s, 1H), 3.23 (s, 3H), 2.99-2.77 (m, 2H), 2.66 (d, J=11.9 Hz, 1H), 2.54 (d, J=6.9 Hz, 1H), 2.44-2.27 (m, 4H), 2.27-2.10 (m, 4H).

Example 145 Synthesis of (S)-3-(3,4-difluorophenyl)-4-(5-(3,5-dimethylisoxazol-4-yl)-1-(tetrahydro-2H-pyran-4-yl)-1H-benzo[d]imidazol-2-yl)-1,3-oxadiazine-2-one (145)

Synthesis of Intermediate N-(4-bromo-2-nitrophenyl)tetrahydro-2H-pyran-4-amine (145-1)

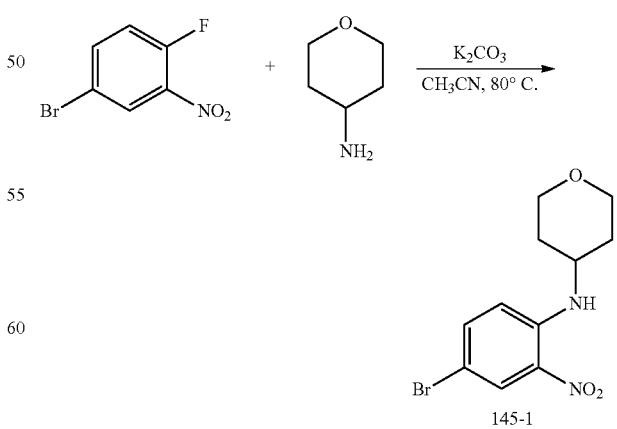

145-1

4-Bromo-1-fluoro-2-nitrobenzene (3.38 g, 15.4 mmol), 4-aminotetrahydropyran (1.56 g, 15.4 mmol) and potassium carbonate (5.34 g, 38.6 mmol) were dissolved in acetonitrile (50 mL), and then the solution was heated to 80° C. and stirred for 5 h. The solution was cooled, to which was added water (200 mL), and then filtered. The filter cake was rinsed with water, and purified by column chromatography to provide compound 145-1 as a solid (3.9 g, 13.1 mmol), with a yield of 85%.

Synthesis of 4-bromo-N¹-(tetrahydro-2H-pyran-4-yl)benzene-1,2-diamine (145-2)

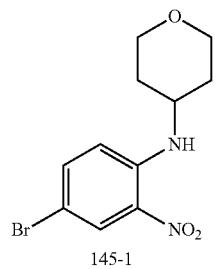

145-1 sodium dithionite; NH₃(aqueous)
────────────────────────────→
THF/H₂O, rt, o/n

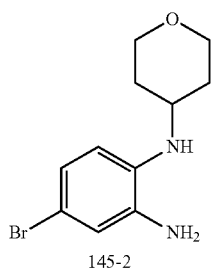

145-2

Intermediate 145-1 (3.9 g, 13.1 mmol) and ammonia (10 mL) were dissolved in tetrahydrofuran (150 mL) and water (150 mL), to which was added sodium dithionite (9.2 g, 52.4 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide solid 145-2 (2.14 g, 7.9 mmol), with a yield of 60%.

Synthesis of 4-(3,5-dimethylisoxazol-4-yl)-N¹-(tetrahydro-2H-pyran-4-yl) benzene-1,2-diamine 145-3)

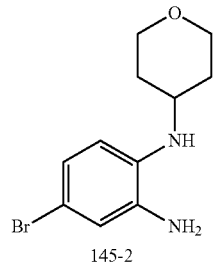

145-2

+

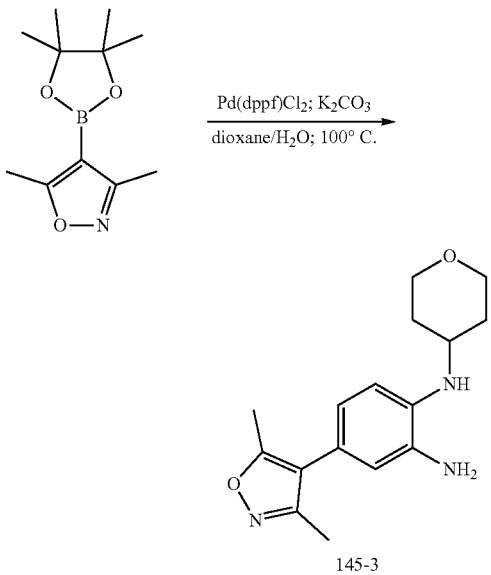

Pd(dppf)Cl₂; K₂CO₃
──────────────────→
dioxane/H₂O; 100° C.

145-3

Intermediate 145-2 (2.14 g, 7.9 mmol, 3,5-dimethyl-4-(4,4,5,5-tetramethyl-1,3,2-dioxaborolan-2-yl)isoxazole (2.11 g, 9.48 mmol), [1,1'-bis(diphenylphosphino)ferrocene] dichloropalladium (TI) (58 mg, 0.08 mmol), and potassium carbonate (2.18 g, 15.8 mmol) were dissolved in dioxane (60 mL) and water (10 mL), and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide solid 145-3 (1.54 g, 5.37 mmol), with a yield of 68%.

Synthesis of t-butyl (S)-(3-((t-butyldimethylsilyl)oxy)-1-(5-(3,5-dimethylisoxazol-4-yl)-1-(tetrahydro-2H-pyran-4-yl)-1H-benzo[d]imidazol-2-yl)propyl) carbamate (145-4)

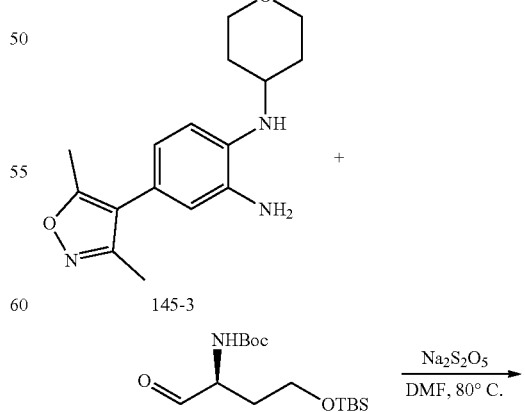

Na₂S₂O₅
────────→
DMF, 80° C.

149

-continued

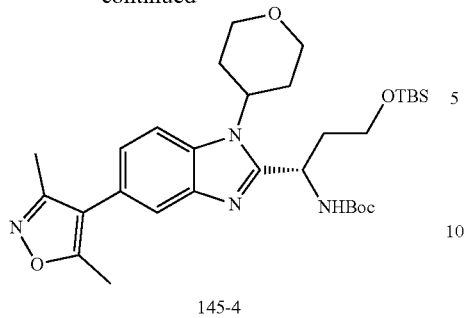

145-4

Intermediate 10 (380 mg, 1.2 mmol) was dissolved in N,N-dimethylformamide (15 mL), to which were added intermediate 7 (287 mg, 1 mmol) and sodium pyrosulfite (379 mg, 2 mmol), and then the reaction solution was allowed to react for 5 h at 80° C. 25 mL of water was added to the reaction solution, and then the solution was extracted with ethyl acetate. The organic phase was dried over anhydrous sodium sulfate, and concentrated. The residue was purified by column chromatography to obtain intermediate 145-4 (420 mg, 0.72 mmol), with a yield of 72%.

Synthesis of (S)-3-amino-3-(5-(3,5-dimethylisoxazol-4-yl)-1-(tetrahydro-2H-pyran-4-yl)-1H-benzo[d]imidazol-2-yl)propane-1-ol (145-5)

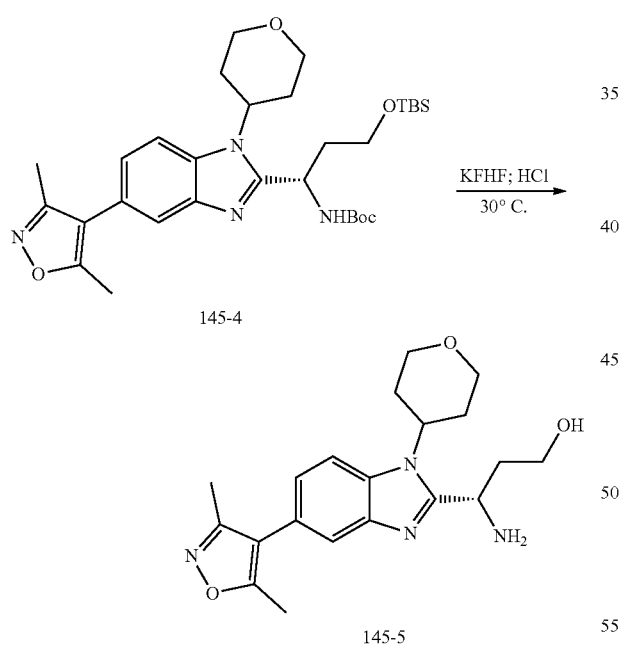

Intermediate 145-4 (420 mg, 0.72 mmol) was dissolved in methanol (4 mL), to which were added KHF$_2$ (109 mg, 1.4 mmol) and concentrated hydrochloric acid (1 mL), and then the reaction solution was allowed to react overnight at 30° C. pH value was adjusted to be 9-10. The reaction solution was concentrated and extracted with dichloromethane. The organic phase was dried over anhydrous sodium sulfate and concentrated. The residue was purified by column chromatography, to provide intermediate 145-5 (213 mg, 0.58 mmol), with a yield of 80%.

150

Synthesis of (S)-4-(5-(3,5-dimethylisoxazol-4-yl)-1-(tetrahydro-2H-pyran-4-yl)-1-benzo[d]imidazol-2-yl)-1,3-oxadiazine-2-one (145-6)

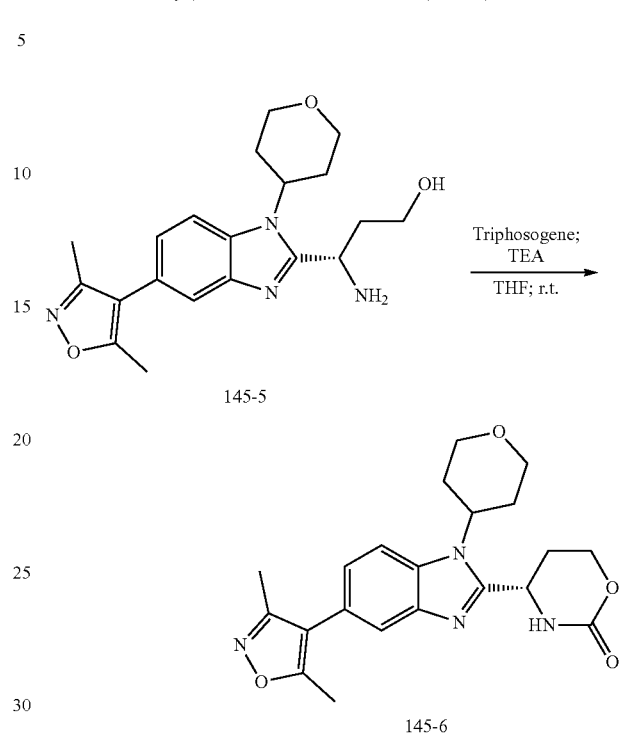

Intermediate 145-5 (213 mg, 0.58 mmol) and triethylamine (87 mg, 0.87 mmol) were dissolved in tetrahydrofuran (20 mL), to which was added triphosgene (68 mg, 0.23 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain the product intermediate 145-6 (149 mg, 0.37 mmol), with a yield of 65%.

Synthesis of (S)-3-(3,4-difluorophenyl)-4-(5-(3,5-dimethylisoxazol-4-yl)-1-(tetrahydro-2H-pyran-4-yl)-1H-benzo[d]imidazol-2-yl)-1,3-oxadiazine-2-one (145)

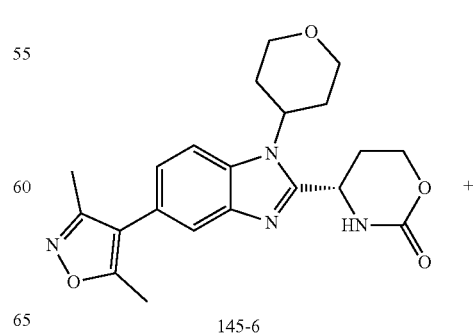

145-6

+

-continued

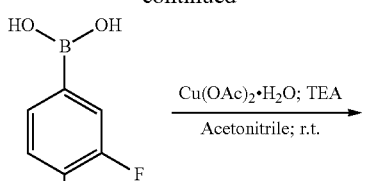

Cu(OAc)₂·H₂O; TEA
Acetonitrile; r.t.

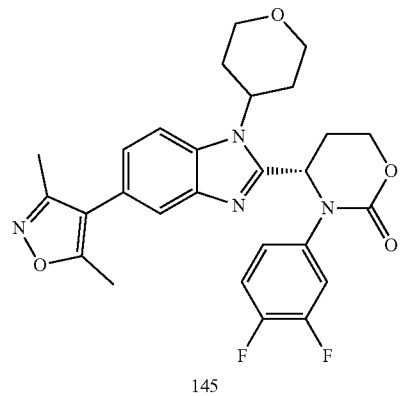

145

Intermediate 145-6 (149 mg, 0.37 mmol), 3,4-difluorophenylboronic acid (230 mg, 1.48 mmol), copper acetate monohydrate (110 mg, 0.55 mmol) and triethylamine (37 mg, 0.37 mmol) were dissolved in acetonitrile (20 mL), and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide compound 145 (141 mg, 0.27 mmol), with a yield of 75%. MS: m/z 509 [M+H]⁺, ¹H NMR (400 MHz, d₆-DMSO) δ 7.76 (d, J=1.1 Hz, 1H), 7.74 (d, J=8.5 Hz, 1H), 7.46 (ddd, J=11.9, 7.4, 2.5 Hz, 1H), 7.37 (dd, J=19.6, 9.1 Hz, 1H), 7.21 (dd, J=8.5, 1.6 Hz, 1H), 7.16-7.09 (m, 1H), 5.85 (s, 1H), 4.69-4.52 (m, 2H), 4.36 (d, J=10.6 Hz, 1H), 4.06-3.91 (m, 2H), 3.51 (dd, J=22.0, 11.0 Hz, 2H), 2.81-2.65 (m, 1H), 2.41 (s, 3H), 2.33 (ddd, J=20.5, 12.5, 4.4 Hz, 2H), 2.24 (s, 3H), 1.92 (s, 1H), 1.82 (d, J=12.2 Hz, 1H), 1.29 (d, J=9.9 Hz, 1H).

Example 146 Synthesis of Compound (S)-3-(3,4-difluorophenyl)-4-(5-(3,5-dimethylisoxazol-4-yl)-1-((S)-tetrahydrofuran-3-yl)-1H-benzo[d]imidazol-2-yl)-1,3-oxazinane-2-one (146)

Synthesis of (S)—N-(4-bromo-2-nitrophenyl)tetrahydrofuran-3-amine (146-1)

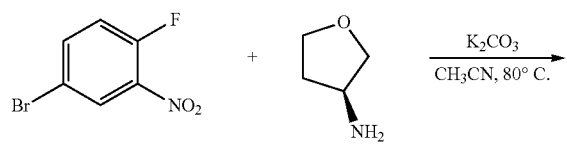

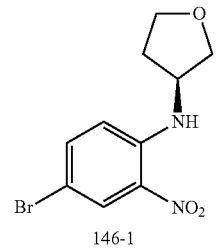

146-1

4-Bromo-1-fluoro-2-nitrobenzene (3.38 g, 15.4 mmol), (S)-tetrahydrofuran-3-amine hydrochloride (1.9 g, 15.4 mmol) and potassium carbonate (5.34 g, 38.6 mmol) were dissolved in acetonitrile (50 mL), and then the solution was heated to 80° C. and stirred for 5 h. The solution was cooled, to which was added water (200 mL), and then filtered. The filter cake was rinsed with water, and purified by column chromatography to provide 4 g solid (intermediate 146-1), with a yield of 91%.

Synthesis of (S)-4-bromo-N1-(tetrahydrofuran-3-yl)benzene-1,2-diamine (146-2)

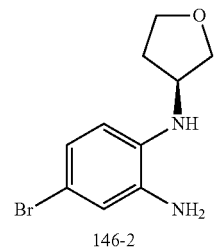

146-1 sodium dithionite
NH₃(aqueous.)
THF, rt, o/n

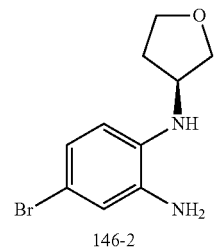

146-2

Intermediate 146-1 (4 g, 14 mmol) and ammonia (10 mL) were dissolved in 50 mL of tetrahydrofuran and 50 mL of water, to which was added sodium dithionite (9.8 g, 56 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 2.5 g of solid (intermediate 146-2), with a yield of 70%.

Synthesis of (S)-4-(3,5-dimethylisoxazol-4-yl)-N1-(tetrahydrofuran-3-yl) benzene-1,2-diamine (146-3)

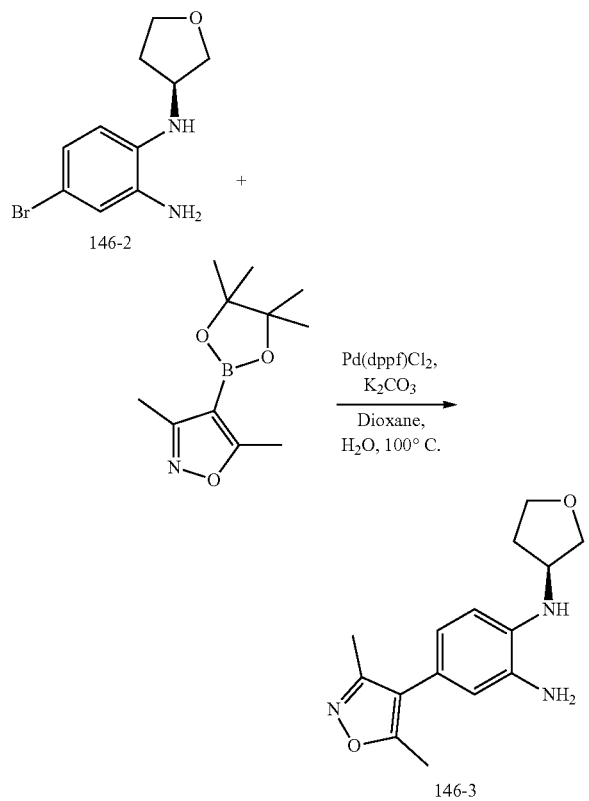

Intermediate 146-2 (2.5 g, 10 mmol), 3,5-dimethyl-4-(4,4,5,5-tetramethyl-1,3,2-dioxaborolan-2-yl)isoxazole (2.7 g, 1.2 mmol), [1,1'-bis(diphenylphosphino)ferrocene] dichloropalladium (II) (770 mg, 1 mmol), and potassium carbonate (3.3 g, 24 mmol) were dissolved in 60 mL of dioxane and 10 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 1.3 g of solid (intermediate 146-3), with a yield of 48%.

Synthesis of t-butyl (S)-3-(t-butyldimethylsiloxy)-1-(5-(3,5-dimethylisoxazol-4-yl)-1-((S)-tetrahydrofuran-3-yl)-1H-benzo[d]imidazol-2-yl)propylcarbamate (146-4)

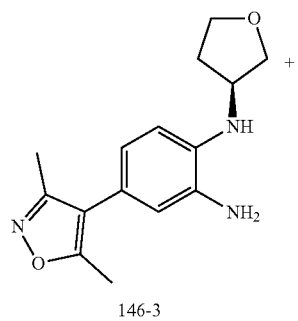

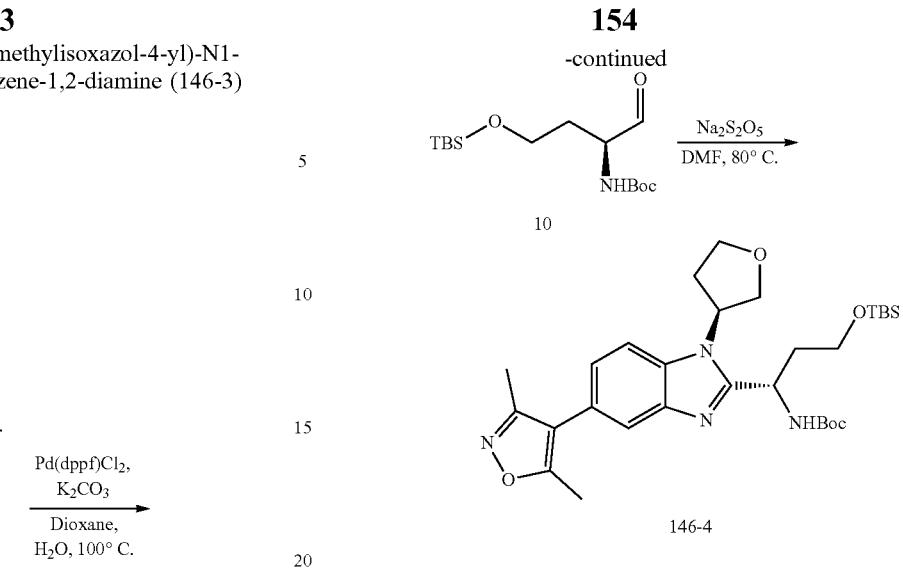

Intermediate 146-3 (273 mg, 1 mmol) was dissolved in N,N-dimethylformamide (3 mL), to which were added intermediate 3 (380 mg, 1.2 mmol) and sodium pyrosulfite (380 mg, 2 mmol), and then the reaction solution was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 260 mg of product (intermediate 146-4), with a yield of 46%.

Synthesis of (S)-3-amino-3-(5-(3,5-dimethylisoxazol-4-yl)-1-((S)-tetrahydrofuran-3-yl)-1H-benzo[d]imidazol-2-yl)propan-1-ol (146-5)

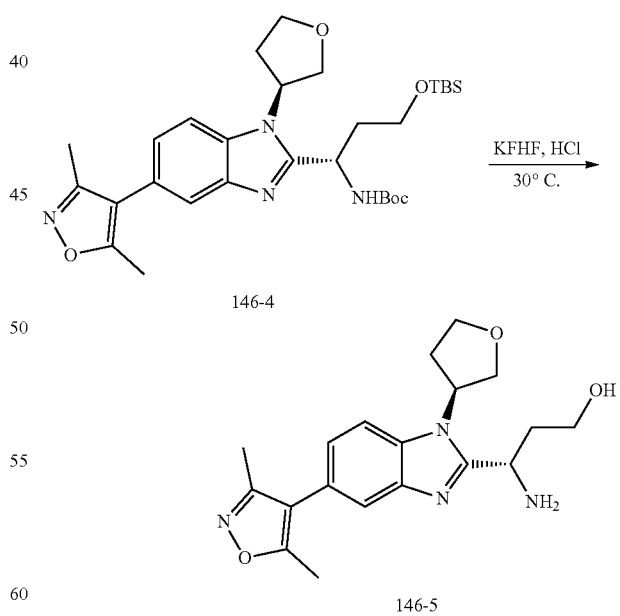

Intermediate 146-4 (260 mg, 0.46 mmol) and potassium hydrogen difluoride (144 mg, 1.84 mmol) were dissolved in methanol (5 mL), to which was added 5 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 145 mg of product (intermediate 146-5), with a yield of 88%.

Synthesis of (S)-4-(5-(3,5-dimethylisoxazol-4-yl)-1-((S)-tetrahydrofuran-3-yl)-1H-benzo[d]imidazol-2-yl)-1,3-oxadiazine-2-one (146-6)

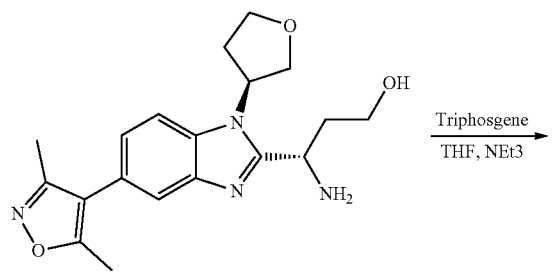

146-5

Triphosgene
THF, NEt3

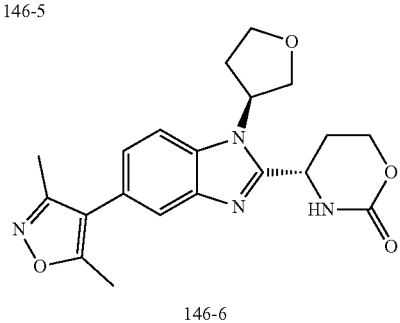

146-6

Intermediate 146-5 (145 mg, 0.41 mmol) and triethylamine (166 mg, 1.64 mmol) were dissolved in 20 mL of tetrahydrofuran, to which was added triphosgene (38 mg, 0.13 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 88 mg of product (intermediate 146-6), with a yield of 56%.

Synthesis of (S)-3-(3,4-difluorophenyl)-4-(5-(3,5-dimethylisoxazol-4-yl)-1-((S)-tetrahydrofuran-3-yl)-1H-benzo[d]imidazol-2-yl)-1,3-oxazinane-2-one (Compound 146)

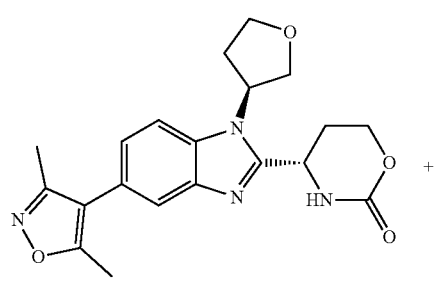

146-6

+

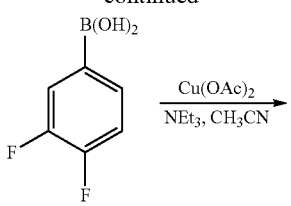

Cu(OAc)2
NEt3, CH3CN

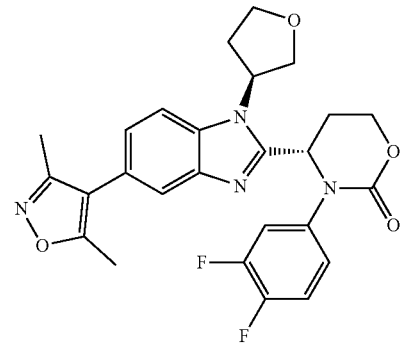

146

Intermediate 146-6 (88 mg, 0.23 mmol), 3,4-difluorophenylboronic acid (144 mg, 0.9 mmol), copper acetate monohydrate (69 mg, 0.35 mmol) and triethylamine (47 mg, 0.46 mmol) were dissolved in 5 mL acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 58 mg of product (compound 146), with a yield of 51%. MS: m/z 595 [M+H]$^+$, $^1$H NMR (400 MHz, d$_6$-DMSO) δ 7.73 (dd, J=19.0, 10.5 Hz, 2H), 7.54-7.30 (m, 2H), 7.25 (d, J=8.4 Hz, 1H), 7.12 (d, J=8.7 Hz, 1H), 5.80 (s, 1H), 5.32 (s, 1H), 4.48 (t, J=10.2 Hz, 1H), 4.41-4.16 (m, 2H), 3.91 (d, J=10.5 Hz, 1H), 3.68 (dt, J=27.2, 8.4 Hz, 2H), 2.83-2.61 (m, 1H), 2.50-2.44 (m, 1H), 2.41 (s, 3H), 2.26 (d, J=11.9 Hz, 4H), 2.03 (dd, J=18.8, 10.6 Hz, 1H).

Example 147 Synthesis of Compound (S)-4-(1-(1-acetylpiperidin-4-yl)-5-(3,5-dimethylisoxazol-4-yl)-1H-benzo[d]imidazol-2-yl)-3-(3,4-difluorophenyl)-1,3-oxadiazine-2-one (147)

Synthesis of t-butyl 4-((4-bromo-2-nitrophenyl)amino)piperidine-1-carboxylate (147-1)

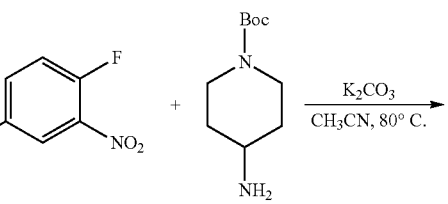

K2CO3
CH3CN, 80° C.

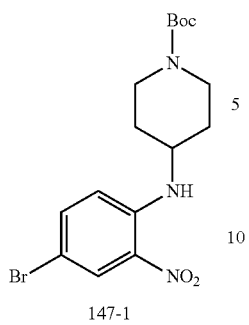

147-1

Synthesis of 1-(4-((4-bromo-2-nitrophenyl)amino)piperidine-1-yl)ethanone (147-3)

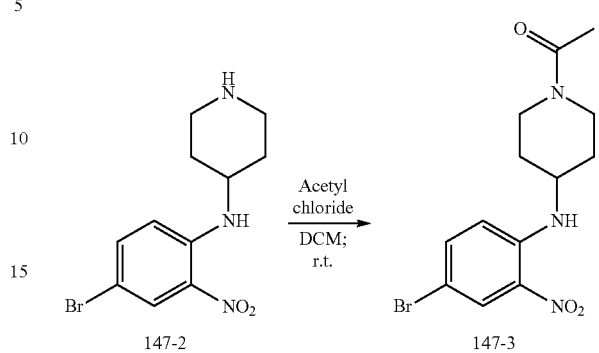

4-Bromo-1-fluoro-2-nitrobenzene (3.38 g, 15.4 mmol), t-butyl 4-aminopiperidine-1-carboxylate (3.08 g, 15.4 mmol) and potassium carbonate (5.34 g, 38.6 mmol) were dissolved in acetonitrile (50 mL), and then the solution was heated to 80° C. and stirred for 5 h. The solution was cooled, to which was added water (200 mL), and then filtered. The filter cake was rinsed with water, and purified by column chromatography to provide compound 147-1 as a solid (5.5 g, 13.9 mmol), with a yield of 90%.

147-2 (3.96 g, 13.2 mmol) was dissolved in DCM (40 mL), to which was added acetyl chloride (1.1 g, 14.5 mmol) dropwise at room temperature under stirring, and after addition, the solution was further stirred at room temperature. After completion of the reaction, the reaction solution was successively washed with water (10 mL) and saturated saline (10 mL), dried over anhydrous sodium sulfate, and rotatory evaporated to dry, to obtain 147-3 (4.06 g, 11.9 mmol), with a yield of 90%.

Synthesis of N-(4-bromo-2-nitrophenyl)piperidine-4-amine (147-2)

Synthesis of 1-(4-((2-amino-4-bromophenyl)amino)piperidine-1-yl) ethanone (147-4)

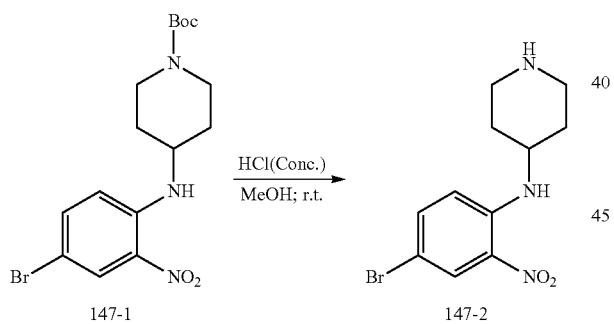

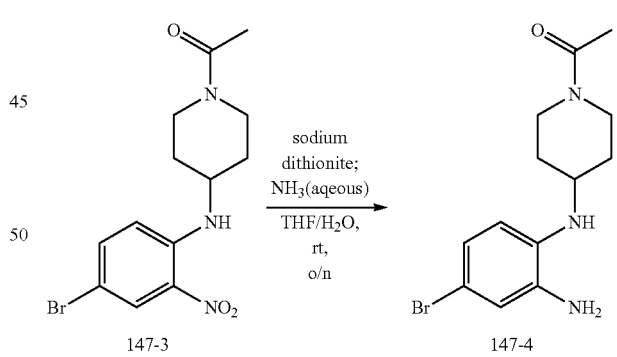

147-1 (5.5 g, 13.9 mmol) was dissolved in methanol (50 mL), to which was added concentrated hydrochloric acid (10 mL), and then the solution was stirred overnight at room temperature. the pH value of the reaction solution was adjusted to 8 with a saturated aqueous solution of sodium bicarbonate. The resultant solution was extracted with dichloromethane, dried over anhydrous sodium sulfate, and rotatory evaporated to dry, to obtain a solid 147-2 (3.96 g, 13.2 mmol), with a yield of 95%.

Intermediate 147-3 (4.06 g, 11.9 mmol) and ammonia (10 mL) were dissolved in tetrahydrofuran (150 mL) and water (150 mL), to which was added sodium dithionite (8.3 g, 47.6 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide solid 147-4 (2.41 g, 7.7 mmol), with a yield of 65%.

159

Synthesis of 1-(4-((2-amino-4-(3,5-dimethylisoxazol-4-yl)phenyl)amino) piperidine-1-yl)ethanone (147-5)

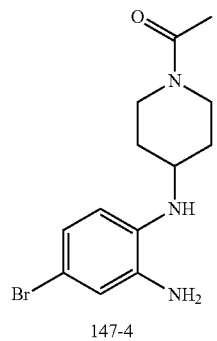

147-4

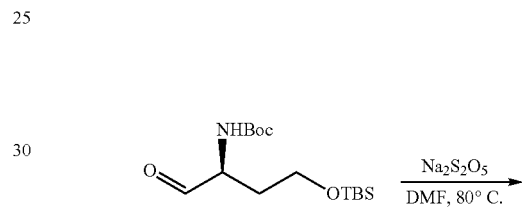

147-5

Intermediate 147-4 (2.41 g, 7.7 mmol), 3,5-dimethyl-4-(4,4,5,5-tetramethyl-1,3,2-dioxaborolan-2-yl)isoxazole (2.06 g, 9.24 mmol), [1,1'-bis(diphenylphosphino)ferrocene]dichloropalladium (II) (58 mg, 0.08 mmol), and potassium carbonate (2.18 g, 15.8 mmol) were dissolved in dioxane (60 mL) and water (10 mL), and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide solid 147-5 (1.77 g, 5.39 mmol), with a yield of 70%.

160

Synthesis of t-butyl (S)-(1-(1-(1-acetylpiperidine-4-yl)-5-(3,5-dimethylisoxazol-4-yl)-1H-benzo[d]imidazol-2-yl)-3-((t-butyldimethylsilyl)oxy)propyl)carbamate (147-6)

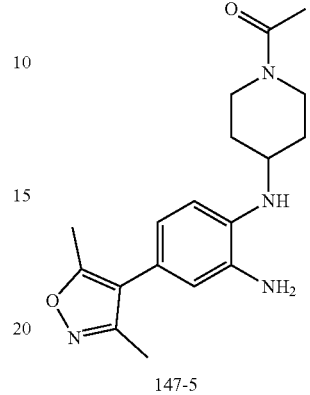

147-5

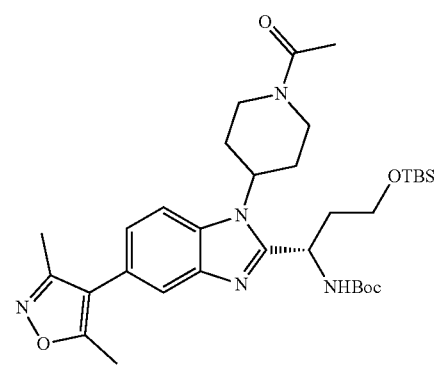

147-6

Intermediate 10 (380 mg, 1.2 mmol) was dissolved in N,N-dimethylformamide (15 mL), to which were added intermediate 147-5 (328 mg, 1 mmol) and sodium pyrosulfite (379 mg, 2 mmol), and then the reaction solution was allowed to react for 5 h at 80° C. 25 mL of water was added to the reaction solution, and then the solution was extracted with ethyl acetate. The organic phase was dried over anhydrous sodium sulfate, and concentrated. The residue was purified by column chromatography to obtain 450 mg of intermediate 147-6 (450 mg, 0.72 mmol), with a yield of 72%.

Synthesis of (S)-3-amino-3-(5-(3,5-dimethylisoxazol-4-yl)-1-(tetrahydro-2H-pyran-4-yl)-1H-benzo[d]imidazol-2-yl)propane-1-ol (147-7)

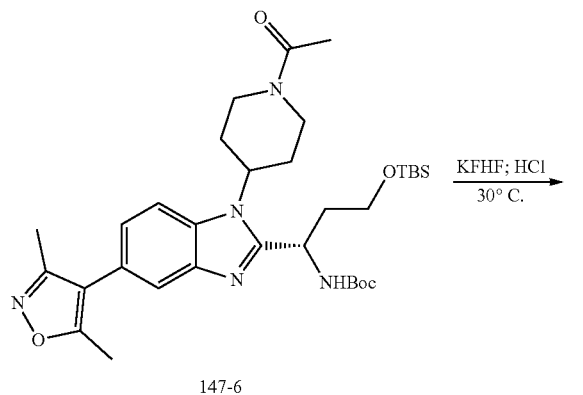

147-6

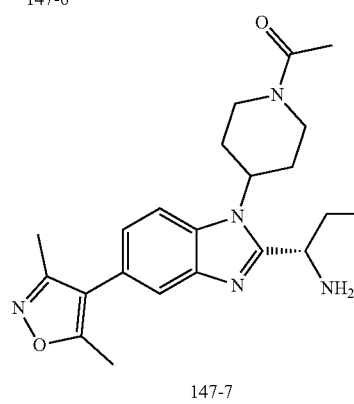

147-7

Intermediate 147-6 (450 mg, 0.72 mmol) was dissolved in methanol (4 mL), to which were added $KHF_2$ (109 mg, 1.4 mmol) and concentrated hydrochloric acid (1 mL), and then the reaction solution was allowed to react overnight at 30° C. pH value was adjusted to be 9-10. The reaction solution was concentrated and extracted with dichloromethane. The organic phase was dried over anhydrous sodium sulfate and concentrated. The residue was purified by column chromatography, to provide intermediate 147-7 (237 mg, 0.58 mmol), with a yield of 80%.

Synthesis of (S)-4-(1-(1-acetylpiperidin-4-yl)-5-(3,5-dimethylisoxazol-4-yl)-1H-benzo[d]imidazol-2-yl)-1,3-oxadiazine-2-one (147-8)

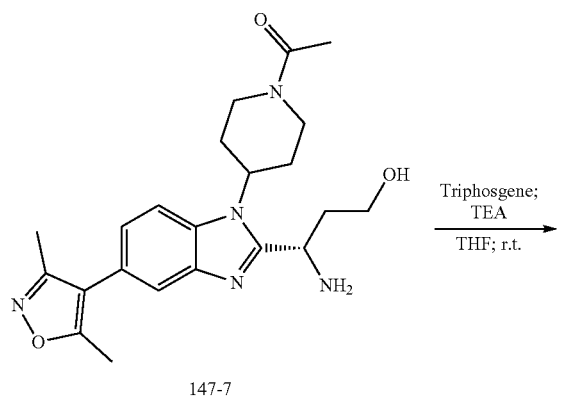

147-7

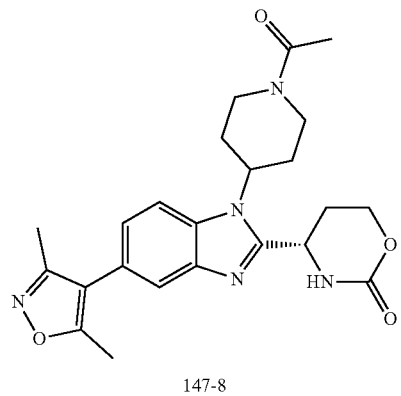

147-8

Intermediate 147-7 (237 mg, 0.58 mmol) and triethylamine (87 mg, 0.87 mmol) were dissolved in tetrahydrofuran (20 mL), to which was added triphosgene (68 mg, 0.23 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain intermediate 147-8 (161 mg, 0.37 mmol), with a yield of 65%.

Synthesis of (S)-4-(1-(1-acetylpiperidin-4-yl)-5-(3,5-dimethylisoxazol-4-yl)-1H-benzo[d]imidazol-2-yl)-3-(3,4-difluorophenyl)-1,3-oxadiazine-2-one (147)

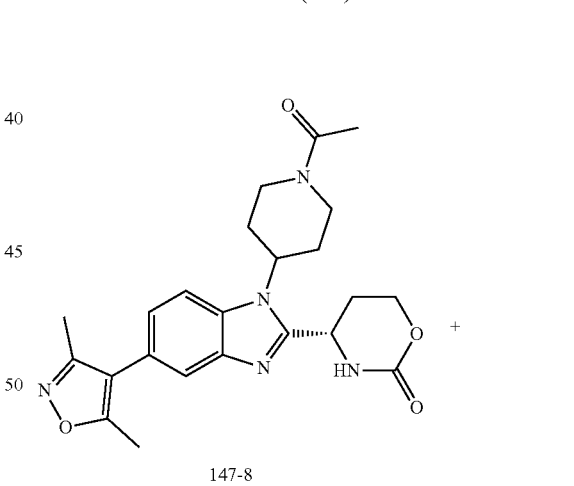

147-8

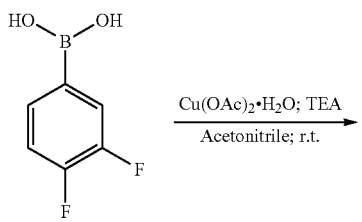

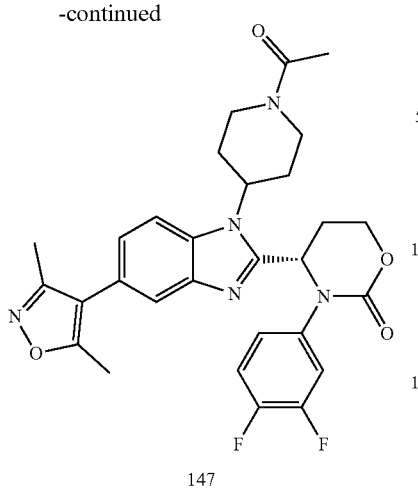

147

Intermediate 147-8 (161 mg, 0.37 mmol), 3,4-difluorophenylboronic acid (230 mg, 1.48 mmol), copper acetate monohydrate (110 mg, 0.55 mmol) and triethylamine (37 mg, 0.37 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 147 (148 mg, 0.27 mmol), with a yield of 75%. MS: m/z 550 [M+H]$^+$, $^1$H NMR (400 MHz, d$_6$-DMSO) δ 7.75 (d, J=1.4 Hz, 1H), 7.72 (d, J=8.2 Hz, 1H), 7.51-7.43 (m, 1H), 7.38 (dd, J=19.0, 9.6 Hz, 1H), 7.18 (d, J=8.5 Hz, 1H), 7.12 (d, J=7.6 Hz, 1H), 5.84 (s, 1H), 4.57 (dd, J=23.4, 11.8 Hz, 3H), 4.35 (d, J=10.8 Hz, 1H), 4.05-3.88 (m, 1H), 3.19 (dd, J=24.5, 12.3 Hz, 1H), 2.67 (dt, J=24.7, 12.5 Hz, 2H), 2.40 (s, 3H), 2.31 (d, J=12.7 Hz, 1H), 2.22 (d, J=8.0 Hz, 4H), 2.15-1.99 (m, 4H), 1.89 (s, 1H), 1.31 (s, 1H).

Example 148 Synthesis of Compound (S)-3-(3,4-difluorophenyl)-4-(5-(3,5-dimethylisoxazol-4-yl)-1-(1-methylpiperidin-4-yl)-1H-benzo[d]imidazol-2-yl)-1,3-oxadiazine-2-one (148)

Synthesis of N-(4-bromo-2-nitrophenyl)-1-methylpiperidin-4-amine (148-1)

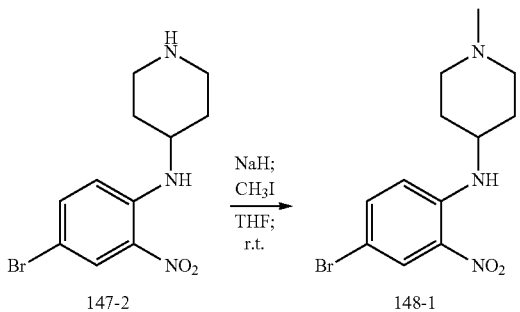 [SMILES: O=[N+]([O-])c1cc(Br)ccc1NC1CCNCC1 ; CN1CCC(Nc2ccc(Br)cc2[N+](=O)[O-])CC1]

147-2 (3.96 g, 13.2 mmol) was dissolved in THF (40 mL), to which was added NaH (60% dispersion in mineral oil, 0.79 g, 19.8 mmol), and then the solution was stirred for 15 min at room temperature, followed by addition of methyl iodide (3.7 g, 26.4 mmol). After addition, the reaction solution was further stirred at room temperature. After completion of the reaction, the reaction solution was washed with water (40 mL), and then extracted with dichloromethane (20 mL×3). The organic phase was washed with saturated brine (40 mL), dried over anhydrous sodium sulfate, and rotatory evaporated to dry, to provide compound 148-1 (3.74 g, 11.9 mmol), with a yield of 90%.

Synthesis of 4-bromo-N$^1$-(1-methylpiperidin-4-yl) benzene-1,2-diamine (148-2)

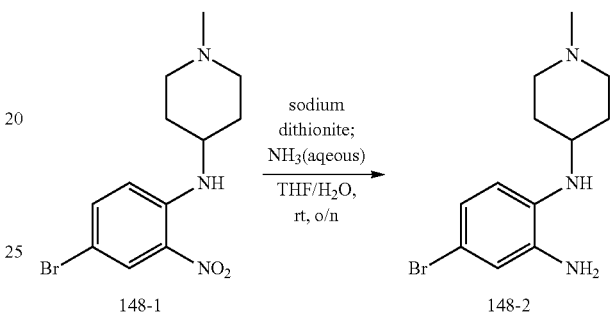

Intermediate 148-1 (3.74 g, 11.9 mmol) and ammonia (10 mL) were dissolved in tetrahydrofuran (150 mL) and water (150 mL), to which was added sodium dithionite (8.3 g, 47.6 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide solid 148-2 (2.19 g, 7.7 mmol), with a yield of 65%.

Synthesis of 4-(3,5-dimethylisoxazol-4-yl)-N$^1$-(1-methylpiperidin-4-yl) benzene-1,2-diamine (148-3)

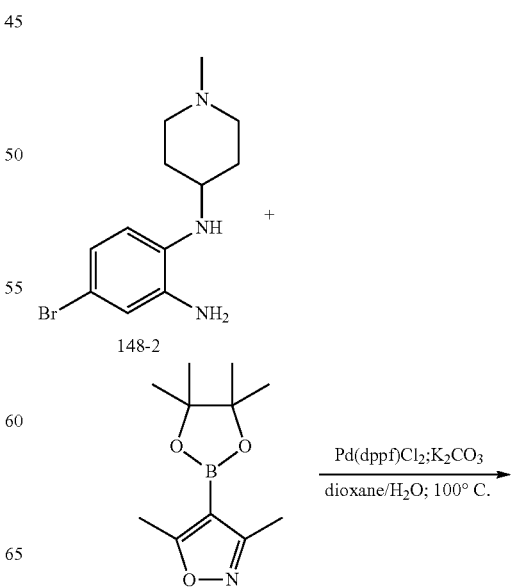

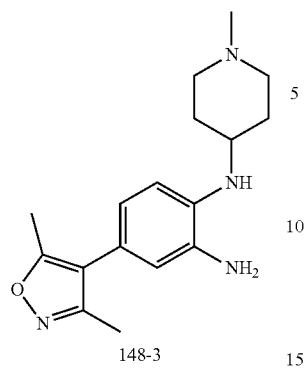

148-3

Intermediate 148-2 (2.19 g, 7.7 mmol), 3,5-dimethyl-4-(4,4,5,5-tetramethyl-1,3,2-dioxaborolan-2-yl)isoxazole (2.06 g, 9.24 mmol), [1,1'-bis(diphenylphosphino)ferrocene]dichloropalladium (II) (58 mg, 0.08 mmol), and potassium carbonate (2.18 g, 15.8 mmol) were dissolved in dioxane (60 mL) and water (10 mL), and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide solid 148-3 (1.62 g, 5.39 mmol), with a yield of 70%.

Synthesis of t-butyl (S)-(3-((t-butyldimethylsilyl)oxy)-1-(5-(3,5-dimethylisoxazol-4-yl)-1-(1-methylpiperidin-4-yl)-1H-benzo[d]imidazol-2-yl)propyl)carbamate (148-4)

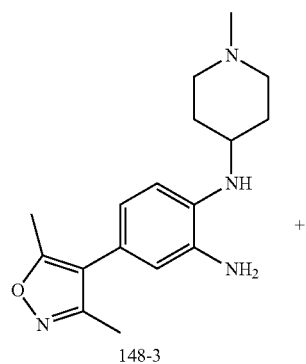

148-3

+

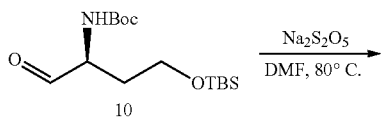

10

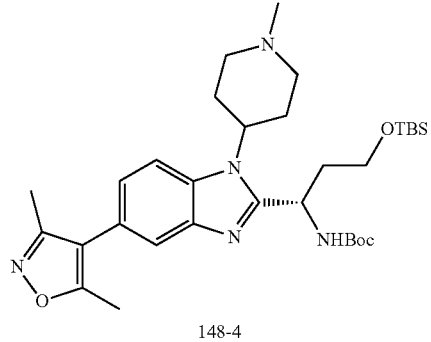

148-4

Intermediate 10 (380 mg, 1.2 mmol) was dissolved in N,N-dimethylformamide (15 mL), to which were added intermediate 148-3 (300 mg, 1 mmol) and sodium pyrosulfite (379 mg, 2 mmol), and then the reaction solution was allowed to react for 5 h at 80° C. 25 mL of water was added to the reaction solution, and then the solution was extracted with ethyl acetate. The organic phase was dried over anhydrous sodium sulfate, and concentrated. The residue was purified by column chromatography to obtain intermediate 148-4 (430 mg, 0.72 mmol), with a yield of 72%.

Synthesis of (S)-3-amino-3-(5-(3,5-dimethylisoxazol-4-yl)-1-(1-methylpiperidin-4-yl)-1H-benzo[d]imidazol-2-yl)propane-1-ol (148-5)

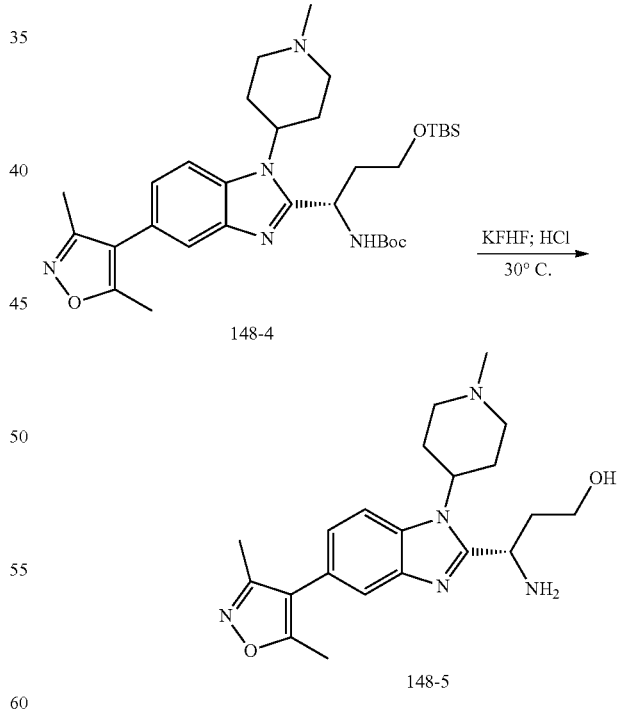

Intermediate 148-4 (430 mg, 0.72 mmol) was dissolved in methanol (4 mL), to which were added KHF$_2$ (109 mg, 1.4 mmol) and concentrated hydrochloric acid (1 mL), and then the reaction solution was allowed to react overnight at 30° C. pH value was adjusted to be 9-10. The reaction solution was concentrated and extracted with dichloromethane. The organic phase was dried over anhydrous sodium sulfate and concentrated. The residue was purified by column chromatography, to provide intermediate 148-5 (222 mg, 0.58 mmol), with a yield of 80%.

Synthesis of (S)-4-(1-(1-methylpiperidin-4-yl)-5-(3,5-dimethylisoxazol-4-yl)-1H-benzo[d]imidazol-2-yl)-1,3-oxadiazine-2-one (148-6)

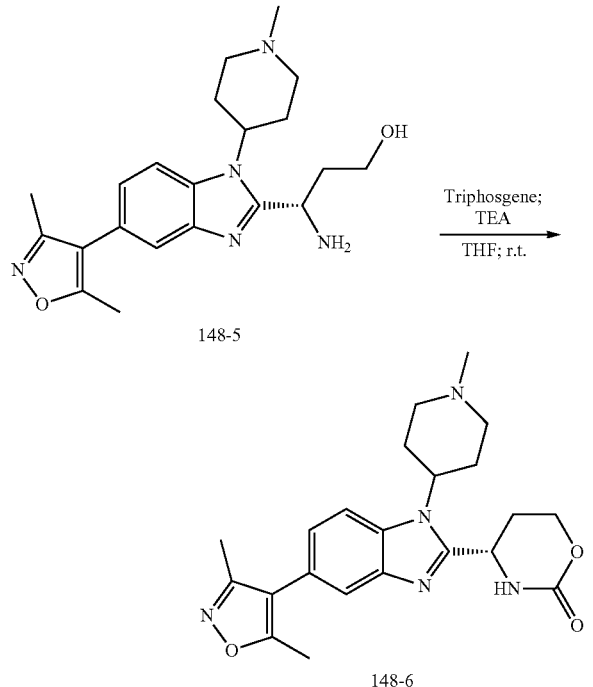

Intermediate 148-5 (222 mg, 0.58 mmol) and triethylamine (87 mg, 0.87 mmol) were dissolved in tetrahydrofuran (20 mL), to which was added triphosgene (68 mg, 0.23 mmol) in portions in an ice bath, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain intermediate 148-6 (151 mg, 0.37 mmol), with a yield of 65%.

Synthesis of (S)-3-(3,4-difluorophenyl)-4-(5-(3,5-dimethylisoxazol-4-yl)-1-(1-methylpiperidin-4-yl)-1H-benzo[d]imidazol-2-yl)-1,3-oxadiazine-2-one (148)

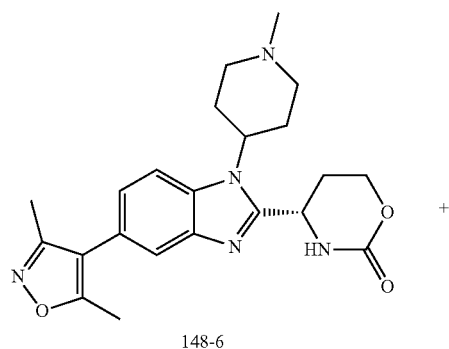

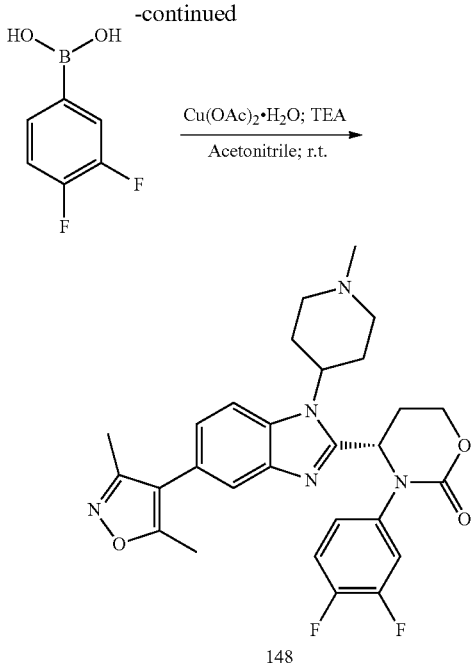

Intermediate 148-6 (151 mg, 0.37 mmol), 3,4-difluorophenylboronic acid (230 mg, 1.48 mmol), copper acetate monohydrate (110 mg, 0.55 mmol) and triethylamine (37 mg, 0.37 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 148 (140 mg, 0.27 mmol), with a yield of 75%. MS: m/z 522 [M+H]$^+$, $^1$H NMR (400 MHz, d$_6$-DMSO) δ 7.75 (s, 1H), 7.69 (d, J=8.4 Hz, 1H), 7.54-7.43 (m, 1H), 7.36 (dd, J=19.2, 9.5 Hz, 1H), 7.19 (d, J=8.4 Hz, 1H), 7.12 (s, 1H), 5.82 (s, 1H), 4.58 (t, J=10.2 Hz, 1H), 4.43-4.24 (m, 2H), 2.88 (dd, J=24.3, 9.5 Hz, 2H), 2.69 (s, 1H), 2.40 (s, 3H), 2.32-2.17 (m, 8H), 2.08 (s, 4H), 1.79 (d, J=11.2 Hz, 1H).

Example 149 Synthesis of Compound (S)-3-(3,4-difluorophenyl)-4-(5-(3,5-dimethylisoxazol-4-yl)-1-((R)-1-methylpyrrolidin-3-yl)-1H-benzo[d]imidazol-2-yl)-1,3-oxazinane-2-one (Compound 149)

Synthesis of (R)-t-butyl 3-((4-bromo-2-nitrophenyl)amino)pyrrolidine-1-carboxylate (Intermediate 149-1)

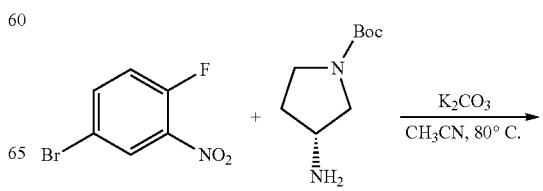

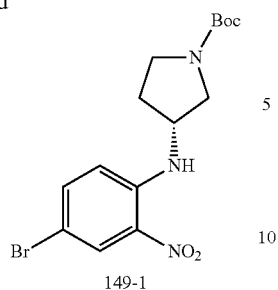

149-1

4-Bromo-1-fluoro-2-nitrobenzene (1.1 g, 5 mmol), t-butyl (R)-3-aminopyrrolidine-1-carboxylate (1.1 g, 6 mmol), and potassium carbonate (1.38 g, 10 mmol) were dissolved in acetonitrile (20 mL), and then the solution was heated to 80° C. and stirred for 5 h. The solution was cooled, to which was added water (100 mL), and then filtered. The filter cake was rinsed with water, and purified by column chromatography to provide compound 1.4 g solid (intermediate 149-1), with a yield of 69%.

Synthesis of (R)—N-(4-bromo-2-nitrophenyl)pyrrolidine-3-amine (intermediate 149-2)

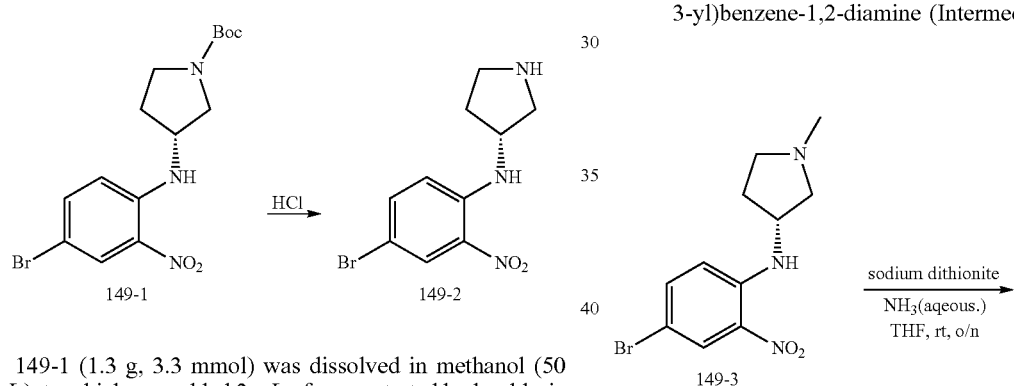

149-1 (1.3 g, 3.3 mmol) was dissolved in methanol (50 mL), to which was added 2 mL of concentrated hydrochloric acid, and then the solution was stirred for 5 h at room temperature. The solution was concentrated to remove methanol, and then the pH value of the reaction solution was adjusted to 9-10 with aqueous sodium carbonate. The resultant solution was extracted for 5 times with dichloromethane. The organic phase was combined and concentrated, to obtain 0.7 g solid (intermediate 149-2), with a yield of 64%.

Synthesis of (R)—N-(4-bromo-2-nitrophenyl)-1-methylpyrrolidin-3-amine (Intermediate 149-3)

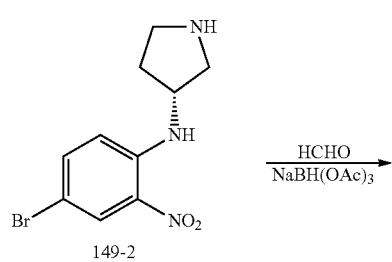

149-2 (0.6 g, 2.1 mmol) was dissolved in 1,2-dichloroethane (20 mL), to which was added 5 ml of aqueous formaldehyde, and then sodium triacetoxyborohydride (2.1 g, 10 mmol) was added. The solution was heated to 40° C. and stirred for 10 h. The solution was cooled, and then 50 mL of water was added. The organic phase was separated, and the water phase was extracted two times with dichloromethane. The organic phase was combined and concentrated. The residue was purified by column chromatography to provide 420 mg of solid (intermediate 149-3), with a yield of 68%.

Synthesis of (R)-4-bromo-N1-(1-methylpyrrolidin-3-yl)benzene-1,2-diamine (Intermediate 149-4)

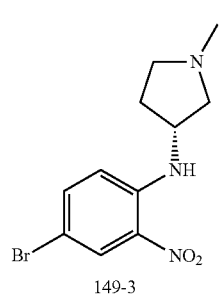

149-3

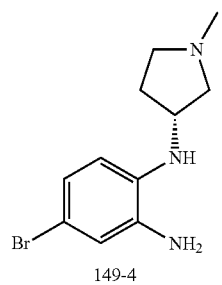

149-4

Intermediate 149-3 (430 mg, 1.4 mmol) and ammonia (5 mL) were dissolved in 20 mL of tetrahydrofuran and 20 mL of water, to which was added sodium dithionite (3.2 g, 14 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 340 mg of solid (intermediate 149-4), with a yield of 88%.

171

Synthesis of (R)-4-(3,5-dimethylisoxazol-4-yl)-N1-(1-methylpyrrolidin-3-yl)benzene-1,2-diamine (Intermediate 149-5)

172

Synthesis of t-butyl ((S)-3-((t-butyldimethylsilyl)oxy)-1-(5-(3,5-dimethylisoxazol-4-yl)-1-((R)-1-methylpyrrolidin-3-yl)-1H-benzo[d]imidazol-2-yl)propylcarbamate (Intermediate 149-6)

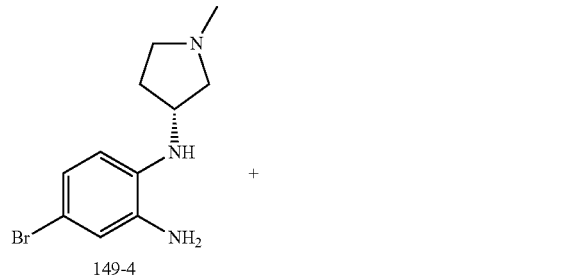

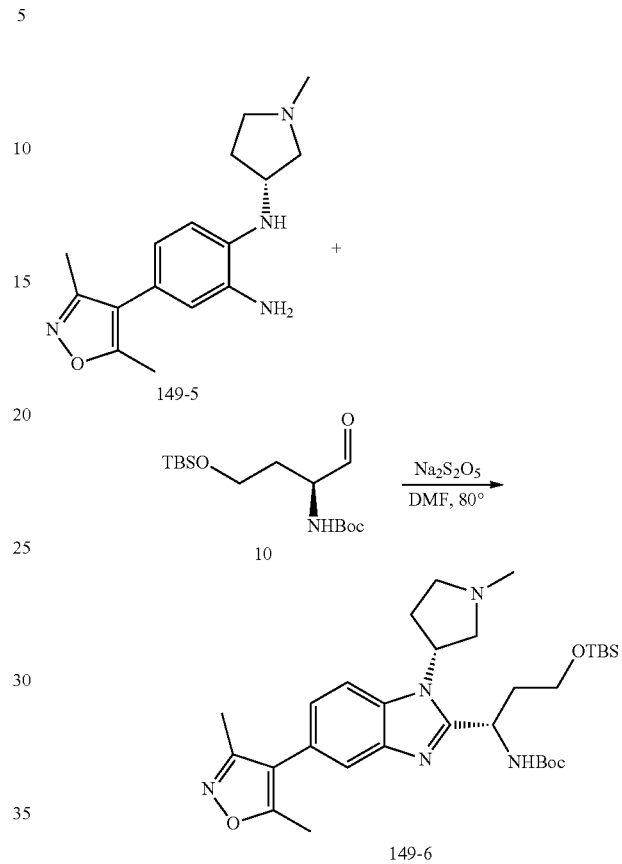

Intermediate 10 (310 mg, 1 mmol) was dissolved in N,N-dimethylformamide (10 mL), to which were added intermediate 150-5 (240 mg, 0.84 mmol) and sodium metabisulfite (570 mg, 3 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 120 mg of product (intermediate 149-6), with a yield of 19%.

Synthesis of (S)-3-amino-3-(5-(3,5-dimethylisoxazol-4-yl)-1-((R)-1-methylpyrrolidin-3-yl)-1H-benzo[d]imidazol-2-yl)propane-1-ol (Intermediate 149-7)

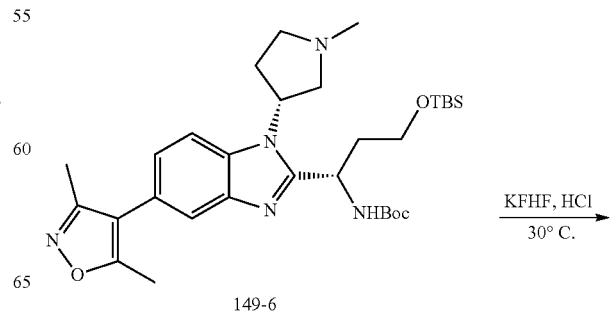

Intermediate 149-4 (340 mg, 1.2 mmol), 3,5-dimethyl-4-(4,4,5,5-tetramethyl-1,3,2-dioxaborolan-2-yl)isoxazole (300 mg, 1.3 mmol), [1,1'-bis(diphenylphosphino)ferrocene]dichloropalladium (II) (80 mg, 0.12 mmol), and potassium carbonate (330 g, 2.4 mmol) were dissolved in 10 mL of dioxane and 1 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 240 mg of solid (intermediate 149-5), with a yield of 67%.

-continued

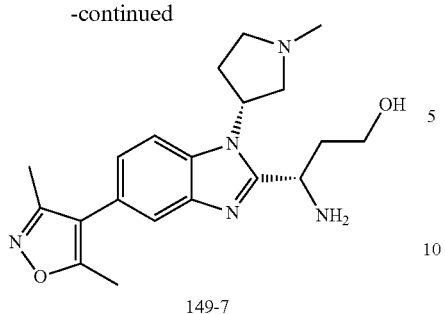

149-7

Intermediate 149-6 (120 mg, 0.2 mmol) and potassium hydrogen difluoride (100 mg) were dissolved in methanol (10 mL), to which was added 2 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 60 mg of product (intermediate 149-7), with a yield of 79%.

(S)-4-(5-(3,5-dimethylisoxazol-4-yl)-1-((R)-1-methylpyrrolidin-3-yl)-1H-benzo[d]imidazol-2-yl)-1,3-oxazinane-2-one (Intermediate 149-8)

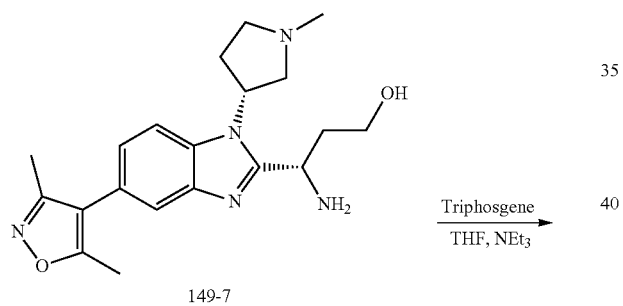

149-7

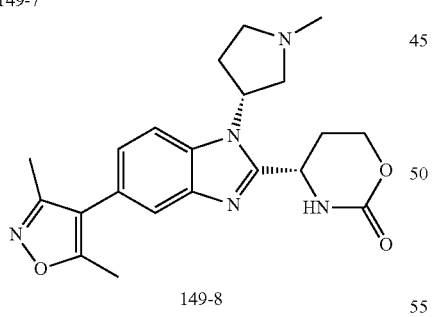

149-8

Intermediate 149-7 (60 mg, 0.16 mmol) and triethylamine (32 mg, 0.32 mmol) were dissolved in 20 mL of tetrahydrofuran, to which was added triphosgene (12 mg, 0.04 mmol) in portions, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 45 mg of product (intermediate 149-8), with a yield of 71%.

Synthesis of (S)-3-(3,4-difluorophenyl)-4-(5-(3,5-dimethylisoxazol-4-yl)-1-((R)-1-methylpyrrolidin-3-yl)-1H-benzo[d]imidazol-2-yl)-1,3-oxazinane-2-one (Compound 149)

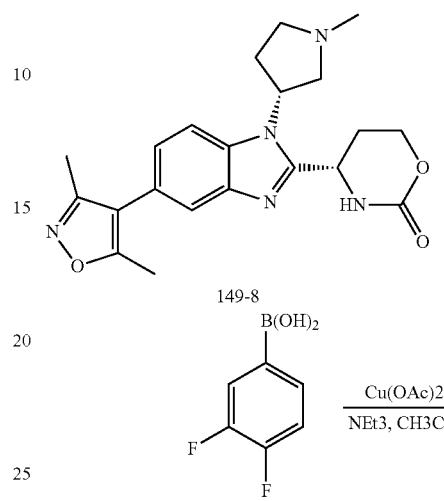

149-8

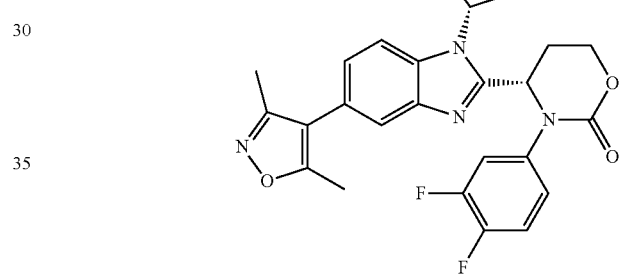

149

Intermediate 149-8 (45 mg, 0.11 mmol), 3,4-difluorophenylboronic acid (60 mg, 0.40 mmol), copper acetate monohydrate (30 mg, 0.15 mmol) and triethylamine (30 mg) were dissolved in 5 mL acetonitrile, and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide 25 mg of product (compound 149), with a yield of 54.3%. MS: m/z 508 [M+H]$^+$, $^1$H NMR (400 MHz, d$_6$-DMSO) δ 8.07 (t, J=8.5 Hz, 1H), 7.74 (s, 1H), 7.51-7.29 (m, 2H), 7.23 (d, J=9.1 Hz, 1H), 7.10 (d, J=8.6 Hz, 1H), 5.88 (br, 1H), 5.19 (br, 1H), 4.60-4.45 (m, 1H), 4.35 (d, J=10.8 Hz, 1H), 3.10 (br, 11H), 2.93-2.85 (m, 1H), 2.70-2.67 (m, 1H), 2.41 (s, 3H), 2.33 (s, 3H), 2.38-2.12 (m, 2H), 2.24 (s, 3H), 2.12-1.80 (m, 2H), 1.60-1.44 (m, 1H).

Example 150 Synthesis of Compound (S)-3-(3,4-difluorophenyl)-4-(5-(3,5-dimethylisoxazol-4-yl)-1-((S)-1-methylpyrrolidin-3-yl)-1H-benzo[d]imidazol-2-yl)-1,3-oxazinane-2-one (150)

Synthesis of (S)-t-butyl 3-((4-bromo-2-nitrophenyl)amino)pyrrolidine-1-carboxylate (Intermediate 150-1)

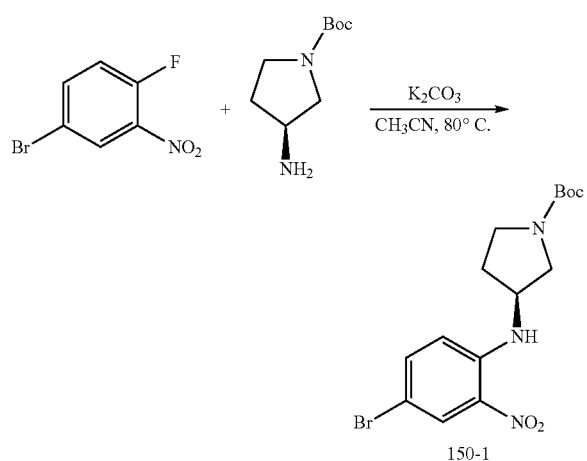

4-Bromo-1-fluoro-2-nitrobenzene (1.1 g, 5 mmol), t-butyl (S)-3-aminopyrrolidine-1-carboxylate (1.1 g, 6 mmol) and potassium carbonate (1.38 g, 10 mmol) were dissolved in acetonitrile (20 mL), and then the solution was heated to 80° C. and stirred for 5 h. The solution was cooled, to which was added water (100 mL), and then filtered. The filter cake was rinsed with water, and purified by column chromatography to provide 1.3 g solid (intermediate 150-1), with a yield of 67.5%.

Synthesis of (S)—N-(4-bromo-2-nitrophenyl)pyrrolidine-3-amine (intermediate 150-2)

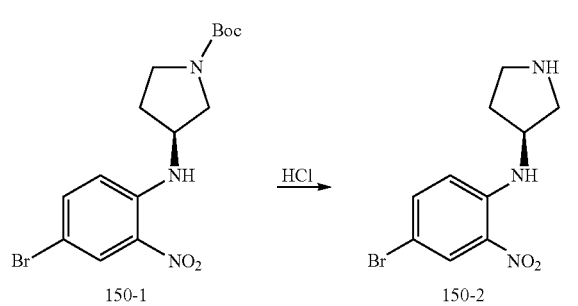 [SMILES: CC(C)(C)OC(=O)N1CC[C@H](Nc2ccc(Br)cc2[N+](=O)[O-])C1 ; Cl ; O=[N+]([O-])c1cc(Br)ccc1N[C@H]1CCNC1]

150-1 (1.3 g, 3.3 mmol) was dissolved in methanol (50 mL), to which was added 2 mL of concentrated hydrochloric acid, and then the solution was stirred for 5 h at room temperature. The solution was concentrated to remove methanol, and then the pH value of the reaction solution was adjusted to 9-10 with aqueous sodium carbonate. The resultant solution was extracted for 5 times with dichloromethane. The organic phase was combined and concentrated, to obtain 0.6 g solid (intermediate 150-2), with a yield of 62.3%.

Synthesis of (S)—N-(4-bromo-2-nitrophenyl)-1-methylpyrrolidin-3-amine (Intermediate 150-3)

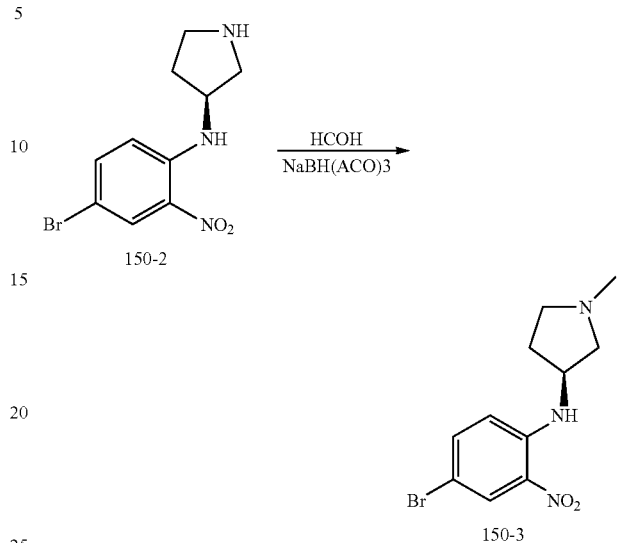

150-2 (0.6 g, 2.1 mmol) was dissolved in 1,2-dichloroethane (20 mL), to which was added 5 ml of aqueous formaldehyde, and then sodium triacetoxyborohydride (2.1 g, 10 mmol) was added. The solution was heated to 40° C. and stirred for 10 h. The solution was cooled, and then 50 mL of water was added. The organic phase was separated, and the water phase was extracted two times with dichloromethane. The organic phase was combined and concentrated. The residue was purified by column chromatography to provide 430 mg of solid (intermediate 150-3), with a yield of 69.8%.

Synthesis of (S)-4-bromo-N1-(1-methylpyrrolidin-3-yl)benzene-1,2-diamine (Intermediate 150-4)

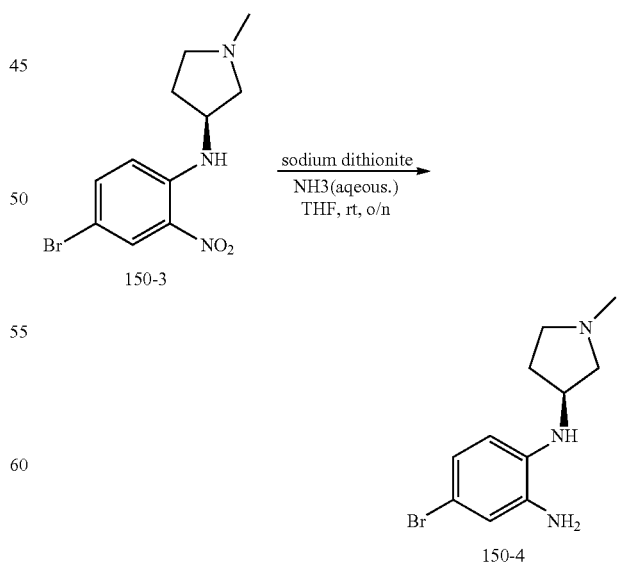

Intermediate 150-3 (430 mg, 1.4 mmol) and ammonia (5 mL) were dissolved in 20 mL of tetrahydrofuran and 20 mL of water, to which was added sodium dithionite (3.2 g, 14 mmol), and then the reaction solution was stirred overnight at room temperature. The solution was allowed to stand for separation of layers. The organic layer was separated, while the aqueous layer was extracted with ethyl acetate. The organic layers were combined, dried over anhydrous sodium sulfate, and concentrated. The residue was purified by column chromatography, to provide 340 mg of solid (intermediate 150-4), with a yield of 88%.

Synthesis of (S)-4-(3,5-dimethylisoxazol-4-yl)-N1-(1-methylpyrrolidin-3-yl)benzene-1,2-diamine (Intermediate 150-5)

Intermediate 150-4 (340 mg, 1.2 mmol), 3,5-dimethyl-4-(4,4,5,5-tetramethyl-1,3,2-dioxaborolan-2-yl)isoxazole (300 mg, 1.3 mmol), [1,1'-bis(diphenylphosphino)ferrocene]dichloropalladium (II) (80 mg, 0.12 mmol), and potassium carbonate (330 mg, 2.4 mmol) were dissolved in 10 mL of dioxane and 1 mL of water, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 240 mg of solid (intermediate 150-5), with a yield of 67%.

Synthesis of t-butyl ((S)-3-((t-butyldimethylsilyl)oxy)-1-(5-(3,5-dimethylisoxazol-4-yl)-1-((S)-1-methylpyrrolidin-3-yl)-1H-benzo[d]imidazol-2-yl)propylcarbamate (Intermediate 105-6)

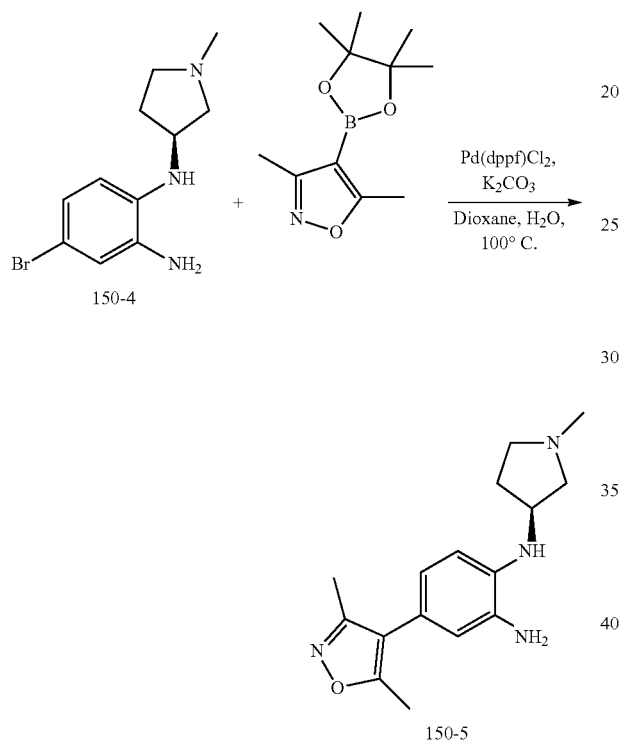

Intermediate 10 (310 mg, 1 mmol) was dissolved in N,N-dimethylformamide (10 mL), to which were added intermediate 150-5 (240 mg, 0.84 mmol) and sodium metabisulfite (570 mg, 3 mmol), and then the mixture was allowed to react for 5 h at 80° C. 50 mL of water was added to the reaction solution, and then the solution was extracted with ethyl acetate. The organic phase was dried over anhydrous sodium sulfate, and concentrated. The residue was purified by column chromatography to obtain 120 mg of product (intermediate 150-6), with a yield of 19%.

Synthesis of (S)-3-amino-3-(5-(3,5-dimethylisoxazol-4-yl)-1-((S)-1-methylpyrrolidin-3-yl)-1H-benzo[d]imidazol-2-yl)propane-1-ol (Intermediate 150-7)

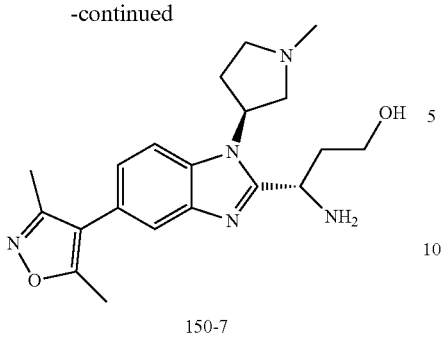

150-7

Intermediate 150-6 (120 mg, 0.2 mmol) and potassium hydrogen difluoride (100 mg) were dissolved in methanol (10 mL), to which was added 2 mL of concentrated HCl, and the reaction solution was allowed to react overnight at 30° C. pH value was adjusted to be 9-10, and then the reaction solution was concentrated and extracted with dichloromethane. The organic phase was dried over anhydrous sodium sulfate, and concentrated. The residue was purified by column chromatography to provide 60 mg of product (intermediate 150-7), with a yield of 79%.

(S)-4-(5-(3,5-dimethylisoxazol-4-yl)-1-((S)-1-methylpyrrolidin-3-yl)-1H-benzo[d]imidazol-2-yl)-1,3-oxazinane-2-one (Intermediate 150-8)

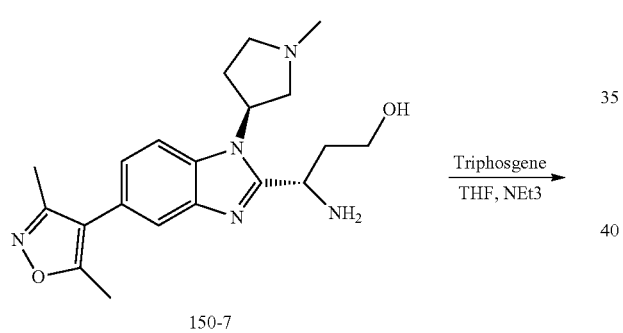

150-7

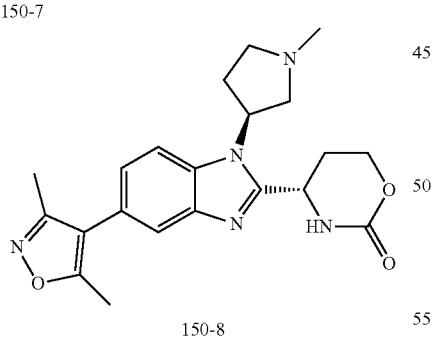

150-8

Intermediate 150-7 (60 mg, 0.16 mmol) and triethylamine (32 mg, 0.32 mmol) were dissolved in 20 mL of tetrahydrofuran, to which was added triphosgene (12 mg, 0.04 mmol) in portions, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 45 mg of product (intermediate 150-8), with a yield of 71%.

Synthesis of (S)-3-(3,4-difluorophenyl)-4-(5-(3,5-dimethylisoxazol-4-yl)-1-((S)-1-methylpyrrolidin-3-yl)-1H-benzo[d]imidazol-2-yl)-1,3-oxazinane-2-one (Compound 150)

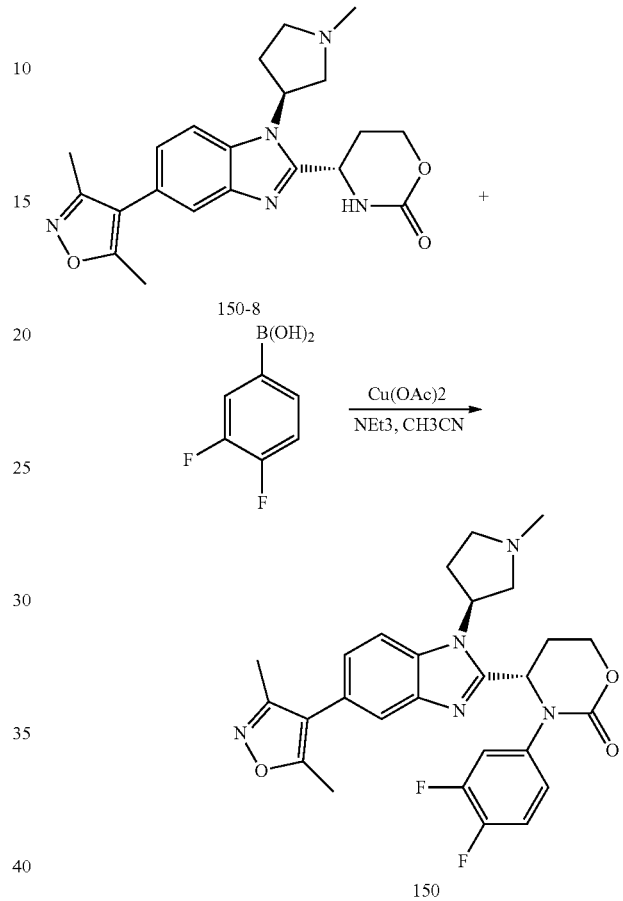

Intermediate 150-8 (45 mg, 0.11 mmol), 3,4-difluorophenylboronic acid (60 mg, 0.4 mmol), copper acetate monohydrate (30 mg, 0.15 mmol) and triethylamine (30 mg) were dissolved in 5 mL of acetonitrile, and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide 25 mg of product (compound 150), with a yield of 54.3%. MS: m/z 508 [M+H]$^+$, $^1$H NMR (400 MHz, d$_6$-DMSO) δ 8.07 (t, J=8.5 Hz, 1H), 7.74 (s, 1H), 7.51-7.29 (m, 2H), 7.23 (d, J=9.1 Hz, 1H), 7.10 (d, J=8.6 Hz, 1H), 5.88 (br, 1H), 5.19 (br, 1H), 4.60-4.45 (m, 1H), 4.35 (d, J=10.8 Hz, 1H), 3.10 (br, 1H), 2.93-2.85 (m, 1H), 2.70-2.67 (m, 1H), 2.41 (s, 3H), 2.33 (s, 3H), 2.38-2.12 (m, 2H), 2.24 (s, 3H), 2.12-1.80 (m, 2H), 1.60-1.44 (m, 1H).

Example 151 Synthesis of Compound (S)-3-(4-chloro-3-fluorophenyl)-4-(5-(3,5-dimethylisoxazol-4-yl)-1-((trans)-3-methoxycyclobutyl)-1H-benzo[d]imidazol-2-yl)-1,3-oxazinane-2-one (Compound 151)

Example 152 Synthesis of Compound (S)-6-(5-bromo-1-((trans)-4-methoxycyclohexyl)-1H-benzo[d]imidazol-2-yl)-1-(3,4-difluorophenyl)piperidine-2-one (152) (S)—N-(5-bromo-2-(((trans)-4-methoxycyclohexyl)amino)phenyl)-6-oxopiperidine-2-formamide (152-1)

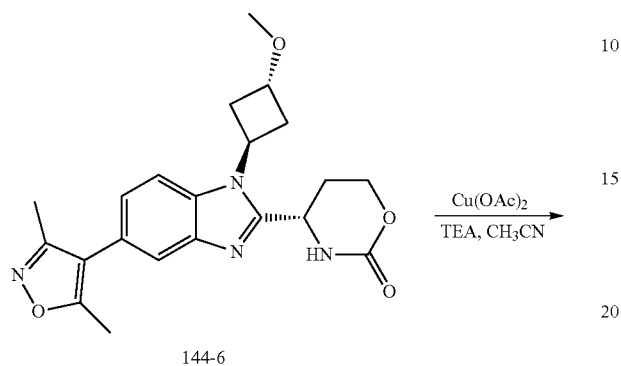

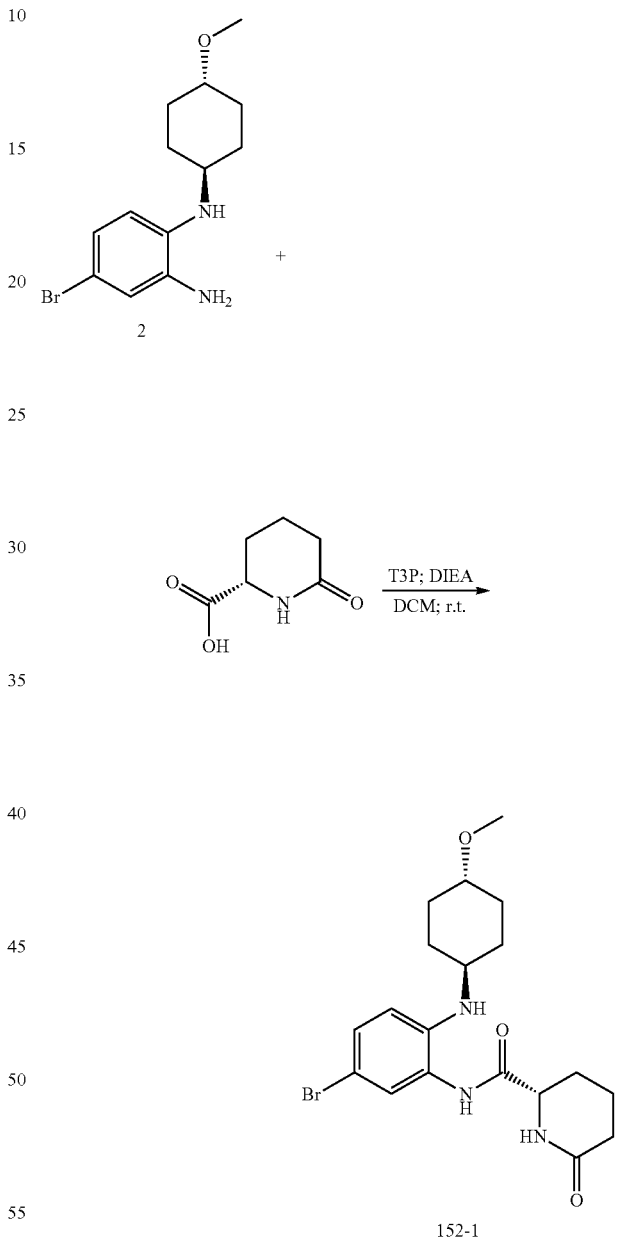

Intermediate 144-6 (79 mg, 0.2 mmol), 4-chloro-3-fluorophenylboric acid (140 mg, 0.8 mmol), copper acetate monohydrate (60 mg, 0.3 mmol) and triethylamine (30 mg) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 46 mg of product (compound 151), with a yield of 43.4%. MS: m/z 525 [M+H]$^+$, $^1$H NMR (400 MHz, d$_6$-DMSO) δ 7.82 (d, J=8.5 Hz, 1H), 7.75 (s, 1H), 7.59-7.40 (m, 2H), 7.26-7.15 (m, 2H), 5.81 (s, 1H), 5.21 (p, J=8.7 Hz, 1H), 4.47-4.36 (m, 1H), 4.33 (d, J=10.8 Hz, 1H), 4.22 (t, J=6.5 Hz, 1H), 3.22 (d, J=12.5 Hz, 3H), 3.00-2.82 (m, 2H), 2.68 (t, J=12.8 Hz, 1H), 2.55 (s, 1H), 2.38 (d, J=20.6 Hz, 4H), 2.27-2.12 (m, 4H).

Intermediate 2 (2.98 g, 10 mmol) was dissolved in dichloromethane (30 mL), to which were added (S)-2-piperidone-6-carboxylic acid (1.43 g, 10 mmol), propanephosphonic acid cyclic anhydride (50% in EA, 6.36 g, 10 mmol) and DIEA (1.54 g, 12 mmol). After addition, the reaction solution was stirred overnight at room temperature. The solution was rotatory evaporated to dry, and the residue was purified by column chromatography, to provide 152-1 (3.4 g, 8 mmol), with a yield of 80%.

Synthesis of (S)-6-(5-bromo-1-((trans)-4-methoxy-cyclohexyl)-1H-benzo[d]imidazol-2-yl)piperidine-2-one (Intermediate 152-2)

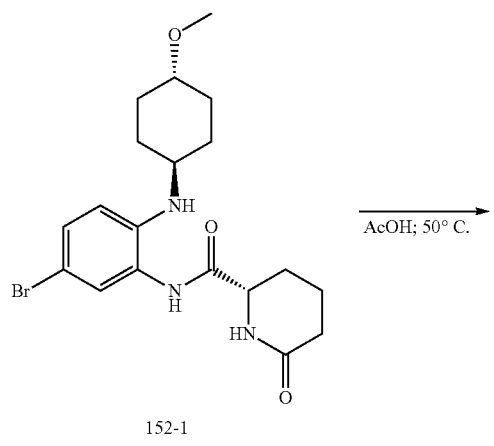

152-1 (3.4 g, 8 mmol) was dissolved in acetic acid (30 mL), and then the reaction solution was stirred for three days at 50° C. The solution was rotatory evaporated to dry, and the residue was dissolved in dichloromethane. The resultant solution was washed with saturated NaHCO₃ solution, dried over anhydrous sodium sulfate, and rotatory evaporated to dry. The residue was purified by column chromatography to obtain 152-2 (1.95 g, 4.8 mmol), with a yield of 60%.

Synthesis of (S)-6-(5-bromo-1-((trans)-4-methoxy-cyclohexyl)-11H-benzo[d]imidazol-2-yl)-1-(3,4-difluorophenyl)piperidine-2-one (152)

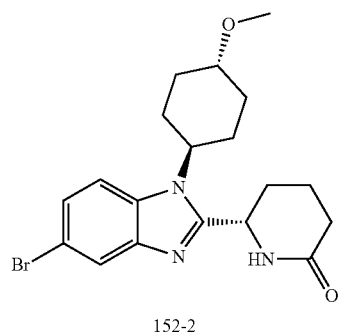

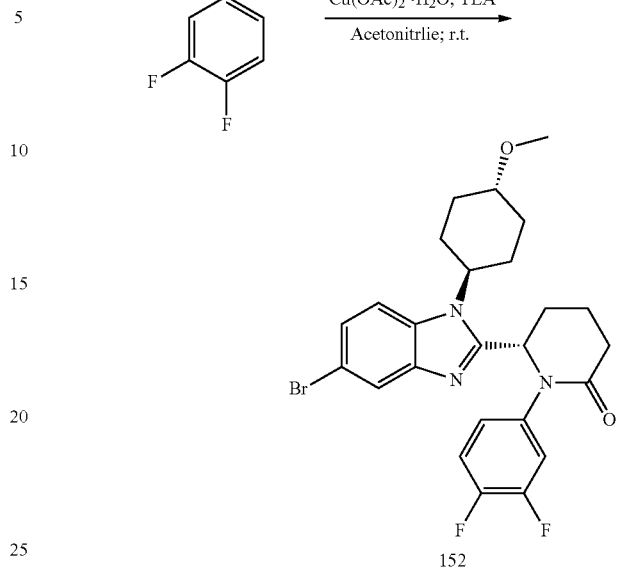

152-2 (1.95 g, 4.8 mmol), 3,4-difluorophenylboronic acid (230 mg, 1.48 mmol), copper acetate monohydrate (1.4 g, 7.2 mmol) and triethylamine (0.48 g, 4.8 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 152 (1.99 g, 3.84 mmol), with a yield of 80%. MS: m/z 518 [M+H]⁺, ¹H NMR (400 MHz, d₆-DMSO) δ 7.88 (d, J=1.9 Hz, 1H), 7.70 (d, J=8.8 Hz, 1H), 7.38-7.25 (m, 3H), 6.99 (d, J=8.9 Hz, 1H), 5.74 (d, J=4.7 Hz, 1H), 4.33 (d, J=11.9 Hz, 1H), 3.38 (d, J=10.8 Hz, 1H), 3.31 (s, 1H), 3.27 (s, 3H), 2.57-2.52 (m, 1H), 2.35 (d, J=11.6 Hz, 1H), 2.19 (d, J=12.1 Hz, 1H), 2.15-1.90 (m, 5H), 1.78 (s, 2H), 1.36 (dd, =24.1, 13.1 Hz, 2H), 1.10 (s, 1H).

Example 153 Synthesis of Compound 5-bromo-2-((S)-1-(3,4-difluorophenyl)piperidine-2-yl)-1-((trans)-4-methoxycyclohexyl)-1H-benzo[d]imidazole (153)

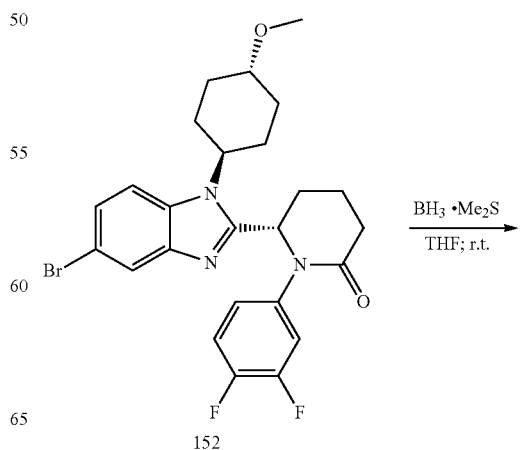

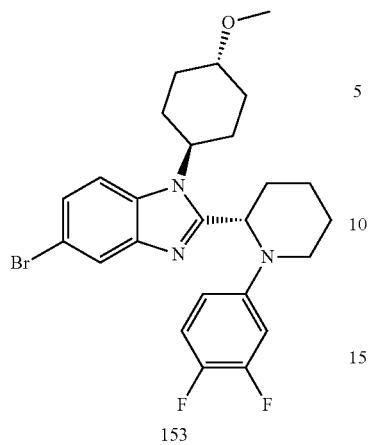

153

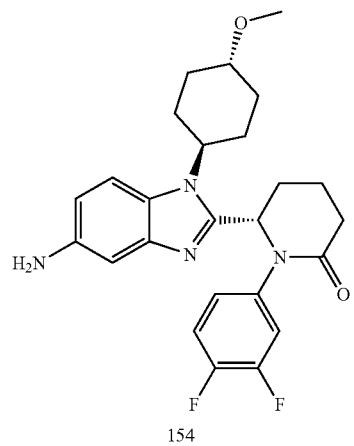

154

152 (52 mg, 0.1 mmol) was dissolved in THF (1 mL), to which was added the solution of borane-dimethyl sulfide in tetrahydrofuran (2 M, 0.08 mL, 0.15 mmol) dropwise at room temperature under stirring. The solution was stirred for 2 h, and then acetone and a small amount of dilute hydrochloric acid were added. The resultant solution was rotatory evaporated to dry, and the residue was purified by column chromatography to provide 153 (37 mg, 0.073 mmol), with a yield of 73%. MS: m/z 504 [M+H]$^+$, $^1$H NMR (400 MHz, d$_6$-DMSO) δ 7.77 (d, J=1.7 Hz, 1H), 7.68 (d, J=8.7 Hz, 1H), 7.25 (dd, J=8.7, 1.8 Hz, 1H), 7.19 (dd, J=19.7, 9.6 Hz, 1H), 7.09 (ddd, J=14.5, 6.9, 2.7 Hz, 1H), 6.77 (d, J=9.0 Hz, 1H), 5.46 (s, 1H), 4.49 (t, J=12.1 Hz, 1H), 3.47-3.37 (m, 2H), 3.25 (s, 3H), 2.30-2.14 (m, 2H), 2.14-2.03 (m, 2H), 1.94 (d, J=23.2 Hz, 3H), 1.62 (dd, J=37.1, 12.3 Hz, 5H), 1.30-1.11 (m, 3H).

Example 154 Synthesis of Compound (S)-6-(5-amino-1-((trans)-4-methoxycyclohexyl)-1H-benzo[d]imidazol-2-yl)-1-(3,4-difluorophenyl)piperidine-2-one (154)

152 (518 mg, 1 mmol) was dissolved in DMSO (5 mL), to which were added ammonia (1 mL), DMA (17 mg, 0.2 mmol) and CuI (19 mg, 0.1 mmol), and then under protection of nitrogen, the reaction solution was heated to 100° C. and stirred overnight. After completion of the reaction, the solution was cooled, poured into water (25 mL), and extracted with ethyl acetate (5 mL×3). The organic phase was combined, washed with saturated saline (10 mL), dried over anhydrous sodium sulfate, and rotatory evaporated to dry, to obtain 154 (222 mg, 0.49 mmol), with a yield of 49%. MS: m/z 455 [M+H]$^+$.

Example 155 Synthesis of Compound (S)-1-(3,4-difluorophenyl)-6-(1-((trans)-4-methoxycyclohexyl)-5-(3-methyl-2-oxoimidazolin-1-yl)-1H-benzo[d]imidazol-2-yl) piperidine-2-one (155)

Synthesis of 1-(2-chloroethyl)-3-(2-((S)-1-(3,4-difluorophenyl)-6-oxopiperidine-2-yl)-1-((trans)-4-methoxycyclohexyl)-1H-benzo[d]imidazole-5-yl) urea (155-1)

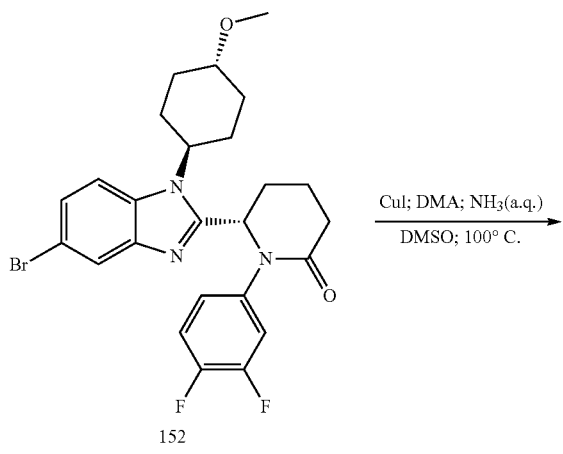

152

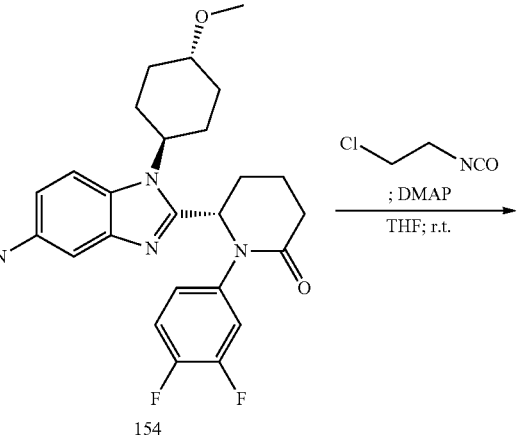

154

187

-continued

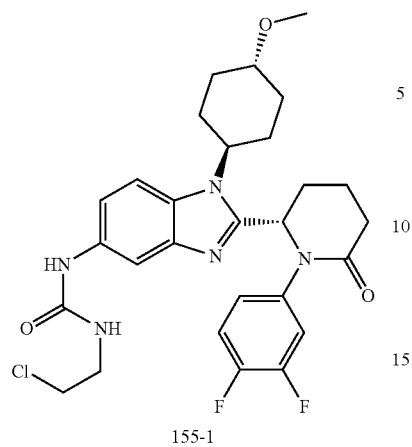

155-1

154 (454 mg, 1 mmol) and DMAP (12 mg, 0.1 mmol) were added into THF (5 mL), to which was then added chloroethyl isocyanate (105 mg, 1 mmol) in portions. After addition, the reaction solution was stirred for 2 h at room temperature, and then water was added. The resultant solution was extracted with ethyl acetate, to provide 155-1 (450 mg, 0.8 mmol), with a yield of 80%.

Synthesis of (S)-1-(3,4-difluorophenyl)-6-(1-((trans)-4-methoxycyclohexyl)-5-(3-methyl-2-oxo-imidazoline-1-yl)-1H-benzo[d]imidazol-2-yl)piperidine-2-one (155)

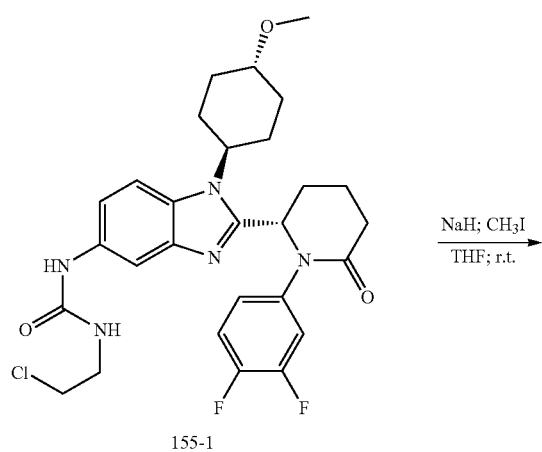

155-1

188

-continued

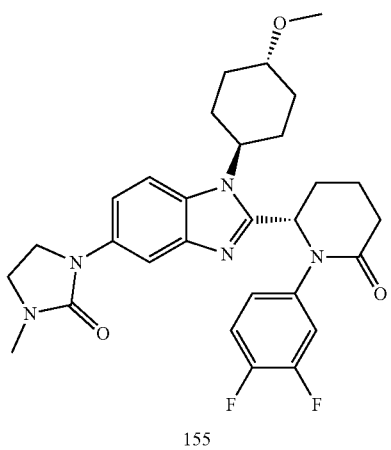

155

155-1 (450 mg, 0.8 mmol) was dissolved in THF (5 mL), to which was added NaH (96 mg, 2.4 mmol) at room temperature, and then the solution was stirred for 2 h, followed by addition of methyl iodide (227 mg, 1.6 mmol). The solution was further stirred for 1 h, and then water (15 mL) was poured. The resultant solution was extracted with DCM (5 mL×3), followed by purification by column chromatography, to provide 155 (257 mg, 0.48 mmol), with a yield of 60%. MS: m/z 538 [M+H]⁺

Example 156 Synthesis of Compound (E)-3-(2-((S)-1-(3,4-difluorophenyl)-6-oxopiperidine-2-yl)-1-((trans)-4-methoxycyclohexyl)-1H-benzo[d]imidazole-5-yl)-N,N-dimethylacrylamide (156)

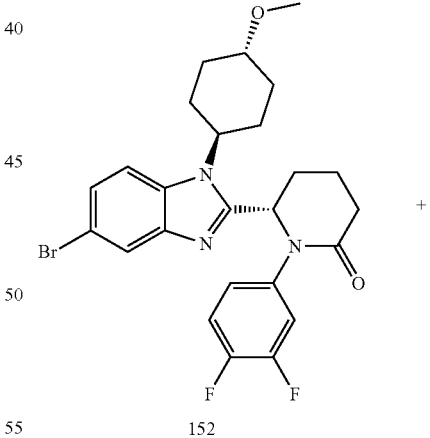

152

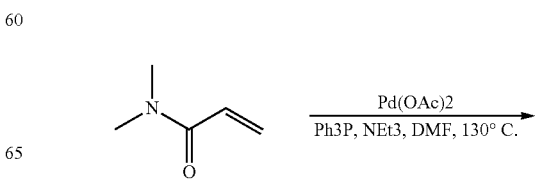

NaH; CH₃I
THF; r.t.

Pd(OAc)2
Ph3P, NEt3, DMF, 130° C.

-continued

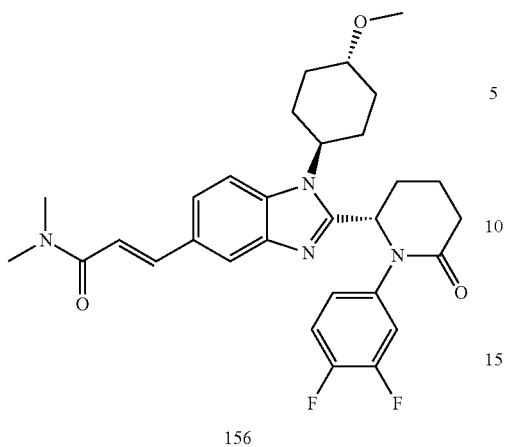

156

To a sealed tube, were added compound 152 (100 mg, 0.19 mmol), N,N-dimethylacrylamide (128 mg, 1 mmol), palladium acetate (2 mg, 0.009 mmol), triphenylphosphorus (3 mg, 0.011 mmol) and triethylamine (100 mg, 1 mmol), and then the solution was heated to 130° C. and reacted overnight. The reaction solution was cooled, and then water was added. The solution was extracted with ethyl acetate. The organic phase was dried over anhydrous sodium sulfate, followed by column chromatography, to provide 100 mg of solid (compound 156), with a yield of 96%, MS: m/z 537 [M+H]$^+$.

Example 157 Synthesis of Compound (S)-1-(3,4-difluorophenyl)-6-(1-(((trans)-4-methoxycyclo-hexyl)-5-vinyl-1H-benzo[d]imidazol-2-yl)piperidine-2-one (Compound 157)

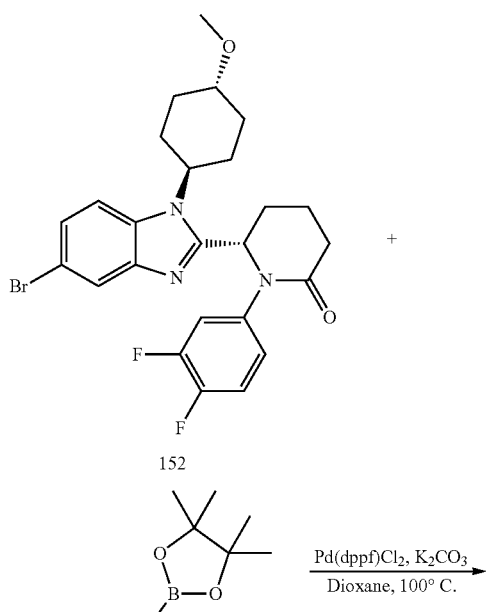

-continued

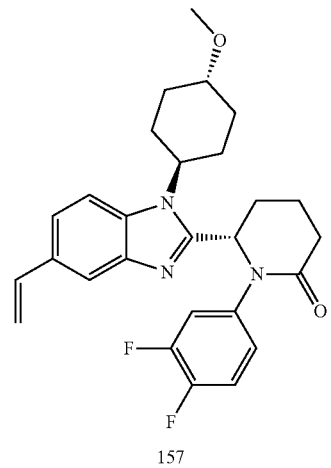

157

Compound 152 (50 mg, 0.1 mmol), 4,4,5,5-tetramethyl-2-vinyl-1,3,2-dioxaborolane (20 mg, 0.2 mmol), [1,1'-bis(diphenylphosphino)ferrocene] dichloropalladium (II) (8 mg, 0.01 mmol), and potassium carbonate (30 mg, 0.2 mmol) were dissolved in 5 mL of dioxane, and then the system was purged with nitrogen for three times. The reaction solution was stirred for 10 h at 100° C. The solution was cooled and extracted with ethyl acetate for three times. The organic layer was dried over anhydrous sodium sulfate, and concentrated. The residue was purified by column chromatography to provide 30 mg of solid (compound 157), with a yield of 67%. MS: m/z 466 [M+H]$^+$, $^1$H NMR (400 MHz, d$_6$-DMSO) δ 7.88 (d, J=1.9 Hz, 1H), 7.70 (d, J=8.8 Hz, 1H), 7.38-7.22 (m, 3H), 6.99 (d, J=8.9 Hz, 1H), 6.62 (dd, J=16.8 Hz, 10.0 Hz, 1H), 5.74 (d, J=4.7 Hz, 1H), 5.61 (dd, J=16.8 Hz, 2.1 Hz, 1H), 5.20 (dd, J=10.0 Hz, 2.1 Hz, 1H), 4.33 (d, 0.1=11.9 Hz, 1H), 3.40-3.35 (m, 1H), 3.27 (s, 3H), 2.62-2.53 (m, 2H), 2.27-1.78 (m, 9H), 1.45-1.24 (m, 2H), 1.22-1.02 (m, 1H).

Example 158 Synthesis of Compound 5-(2-((S)-1-(3,4-difluorophenyl)-6-oxopiperidine-2-yl)-1-((trans)-4-methoxycyclohexyl)-1H-benzo[d]imidazole-5-yl)-1,3-dimethylpyridine-2(1H)-one (158)

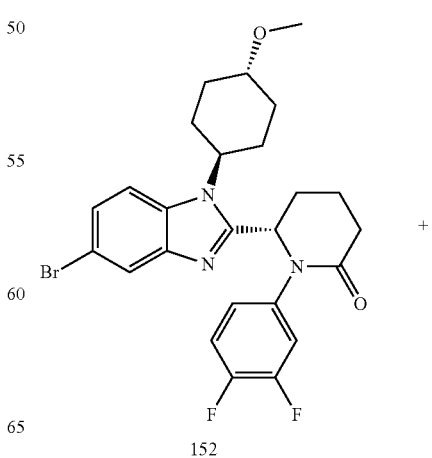

152

191

-continued

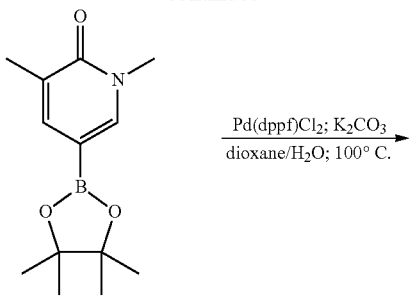

Pd(dppf)Cl$_2$; K$_2$CO$_3$
dioxane/H$_2$O; 100° C.

152 (518 mg, 1 mmol) was dissolved in dioxane, to which was added one drop of water, followed by addition of Pd(dppf)Cl$_2$ (73 mg, 0.1 mmol), potassium carbonate (276 mg, 2 mmol) and 1,3-dimethyl-5-(4,4,5,5-tetramethyl-1,3,2-dioxaborolan-2-yl)pyridine-2(1H)-one (747 mg, 3 mmol). The reaction solution was stirred overnight at 100° C., followed by column chromatography, to provide compound 158 (291 mg, 0.52 mmol), with a yield of 52%. MS: m/z 561 [M+H]$^+$. $^1$H NMR (400 MHz, d$_6$-DMSO) δ 7.99 (d, J=2.2 Hz, 1H), 7.89 (d, J=1.5 Hz, 1H), 7.80 (s, 1H), 7.70 (d, J=8.7 Hz, 11H), 7.33 (dd, J=18.7, 8.8 Hz, 3H), 7.02 (d, J=8.8 Hz, 1H), 5.73 (s, 1H), 4.33 (s, 1H), 3.52 (s, 3H), 3.47 (s, 1H), 3.43-3.37 (m, 1H), 3.28 (s, 3H), 2.55 (d, J=6.7 Hz, 1H), 2.35 (d, J=13.6 Hz, 1H), 2.25 (d, J=12.7 Hz, 1H), 2.12 (s, 1H), 2.09 (s, 3H), 2.03 (d, J=12.6 Hz, 3H), 1.79 (s, 2H), 1.37 (dd, J=22.4, 11.5 Hz, 2H), 1.21 (dd, J=27.8, 12.2 Hz, 2H).

192

Example 159 Synthesis of Compound (S)-1-(3,4-difluorophenyl)-6-(1-((trans)-4-methoxycyclohexyl)-5-(methyl(piperidine-4-yl)amino)-1H-benzo[d]imidazol-2-yl)piperidine-2-one (159)

Synthesis of t-butyl 4-((2-((S)-1-(3,4-difluorophenyl)-6-oxopiperidine-2-yl)-1-((trans)-4-methoxycyclohexyl)-1H-benzo[d]imidazole-5-yl)amino)piperidine-1-carboxylate (159-1)

154 (50 mg, 0.11 mmol), 4-Boc-piperidone (66 mg, 0.33 mmol) and acetic acid (6.6 mg, 0.11 mmol) were added into DCE (1 mL), to which was added sodium triacetoxyborohydride (93 mg, 0.44 mmol) in portions at room temperature under stirring. After addition, the reaction solution was further stirred for 30 min at room temperature. The solution was rotatory evaporated to dry, and the residue was purified by column chromatography, to provide 159-1 (56 mg, 0.09 mmol), with a yield of 82%.

Synthesis of t-butyl 4-((2-((S)-1-(3,4-difluorophenyl)-6-oxopiperidine-2-yl)-1-((trans)-4-methoxycyclohexyl)-1H-benzo[d]imidazole-5-yl)(methyl)amino)piperidine-1-carboxylate (159-2)

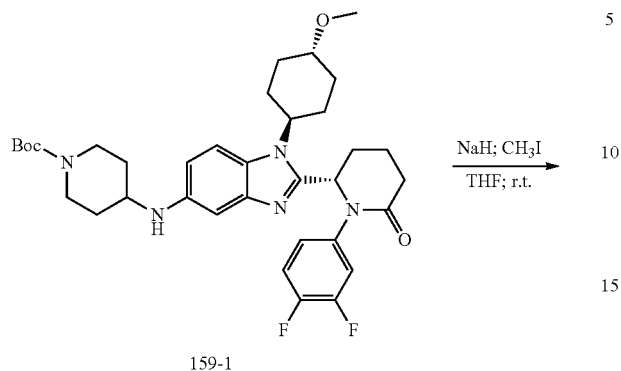

159-1

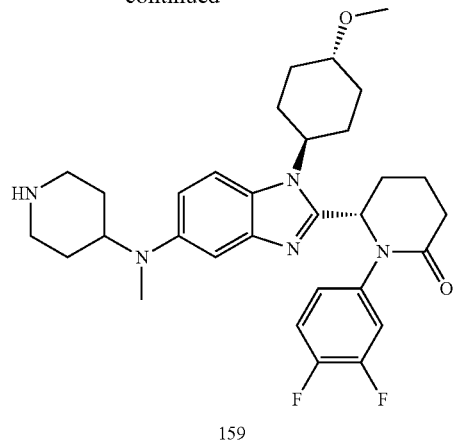

159

159-2 (37 mg, 0.056 mmol) was dissolved in DCM (1 mL), to which was added TFA (0.25 mL), and then the reaction solution was stirred for 6 h at room temperature. The solution was rotatory evaporated to dry, and then pH value was adjusted to be 8-9 with saturated NaHCO₃ solution. The resultant solution was extracted with dichloromethane, to provide 159 (25 mg, 0.046 mmol), with a yield of 82%. MS: m/z 552 [M+H]⁺.

Example 160 Synthesis of Compound ethyl 2-(2-((S)-1-(3,4-difluorophenyl)-6-oxopiperidine-2-yl)-1-((trans)-4-methoxycyclohexyl)-1H-benzo[d]imidazole-5-yl)acetate (160)

159-2

159-1 (50 mg, 0.08 mmol) was dissolved in THF (0.5 mL), to which was added NaH (6.3 mg, 0.16 mmol) in an ice-water bath, and then the solution was stirred for 10 min, followed by addition of methyl iodide (34 mg, 0.24 mmol). The solution was further stirred for 6 h, and then poured into ice-water (6 mL). The resultant solution was extracted with DCM, followed by purification by column chromatography, to provide 159-2 (37 mg, 0.056 mmol), with a yield of 71%.

Synthesis of Compound (S)-1-(3,4-difluorophenyl)-6-(1-((trans)-4-methoxycyclohexyl)-5-(methyl(piperidine-4-yl)amino)-1H-benzo[d]imidazol-2-yl)piperidine-2-one (159)

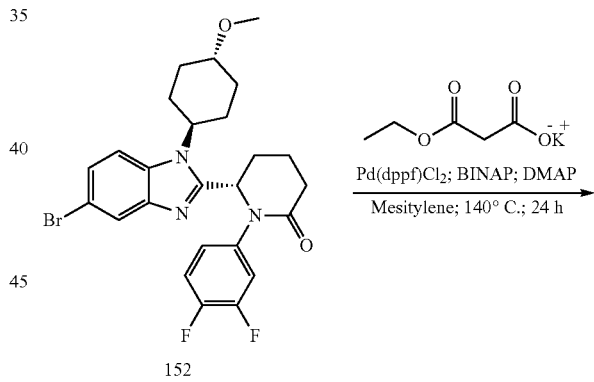

152

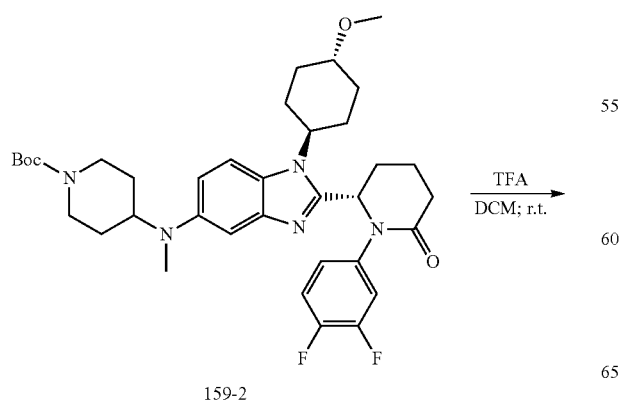

159-2

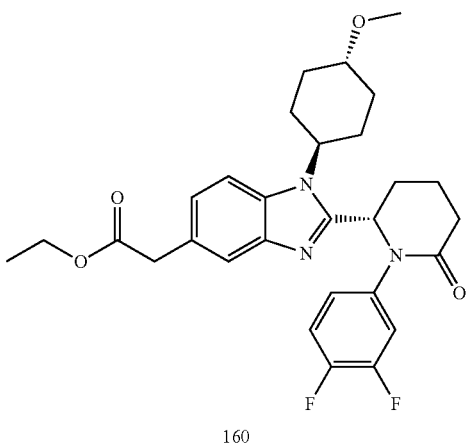

160

152 (52 mg, 0.1 mmol) was dissolved in mesitylene, to which were successively added Pd(dppf)Cl$_2$ (7 mg, 0.01 mmol), BINAP (6 mg, 0.01 mmol), DMAP (12 mg, 0.1 mmol) and ethyl potassium malonate (17 mg, 0.1 mmol). The mixture was stirred for 24 h at 140° C., followed by column chromatography, to provide 160 (10 mg, 0.02 mmol), with a yield of 20%. MS: m/z 526 [M+H]$^+$.

Example 161 Synthesis of (t-butyl (E)-3-(2-((S)-1-(3,4-difluorophenyl)-6-oxopiperidine-2-yl)-1-((trans)-4-methoxycyclohexyl)-1H-benzo[d]imidazole-5-yl)acrylate (161)

Example 162 Synthesis of Compound 5-(2-((S)-1-(3,4-difluorophenyl)-6-oxopiperidine-2-yl)-1-((trans)-4-methoxycyclohexyl)-1H-benzo[d]imidazole-5-yl)-1-methylpyridine-2(1H)-one (162)

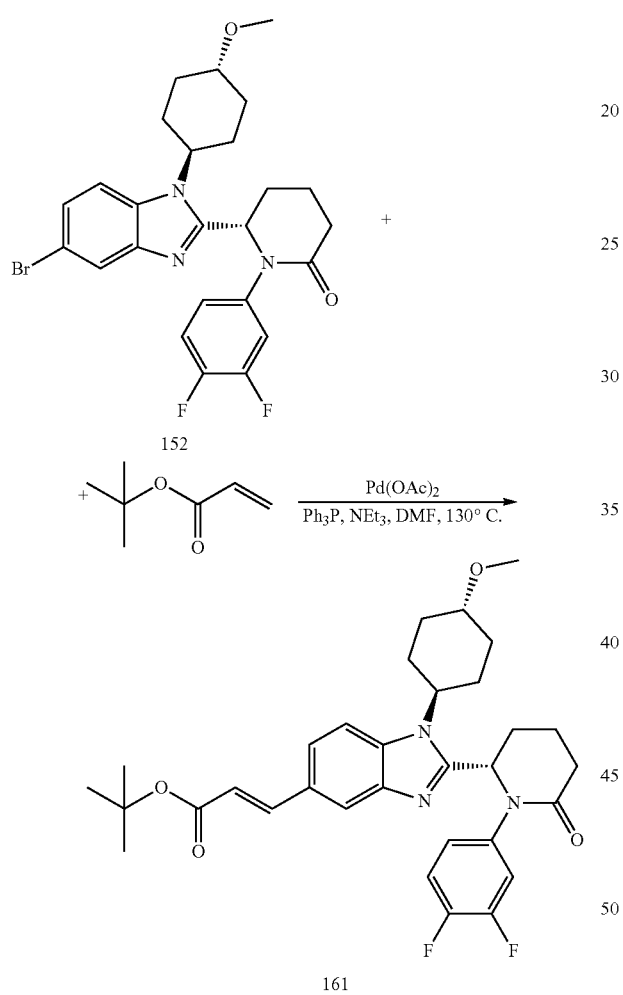

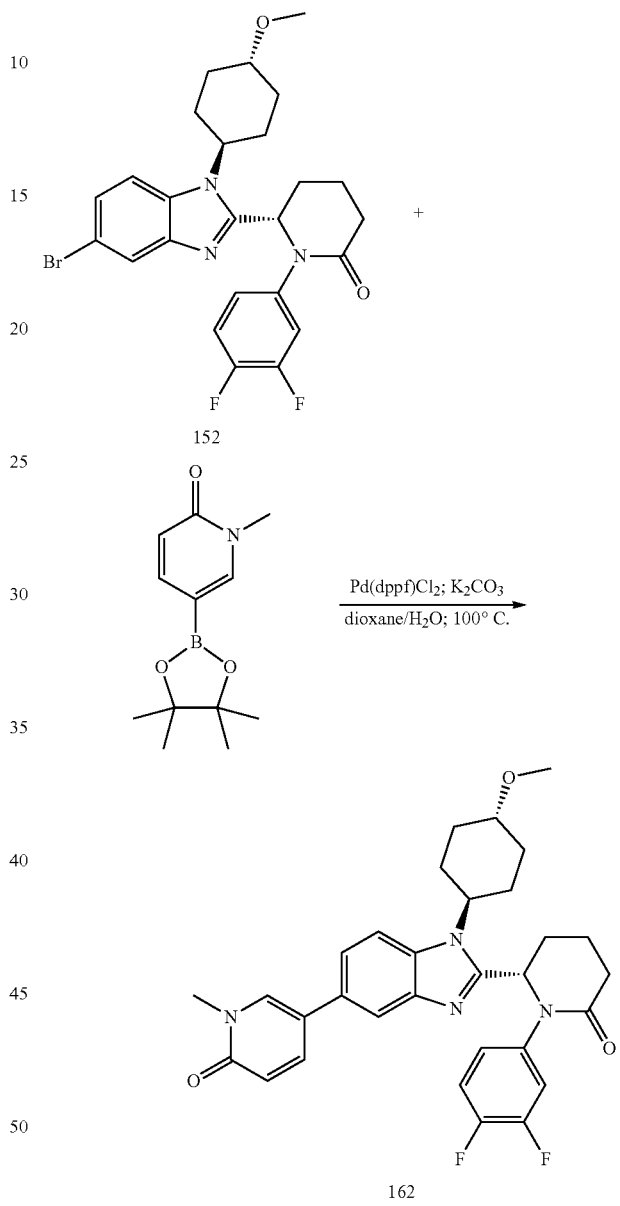

To a sealed tube, were added compound 152 (100 mg, 0.19 mmol), t-butyl acrylate (128 mg, 1 mmol), palladium acetate (2 mg, 0.009 mmol), triphenylphosphorus (3 mg, 0.011 mmol) and triethylamine (100 mg, 1 mmol), and then the solution was heated to 130° C. and reacted overnight. The reaction solution was cooled, and then water was added. The solution was extracted with ethyl acetate. The organic phase was dried over anhydrous sodium sulfate, followed by column chromatography, to provide 100 mg of solid (compound 161), with a yield of 96%, MS: m/z 566 [M+H]$^+$.

152 (518 mg, 1 mmol) was dissolved in dioxane, to which was added one drop of water, followed by addition of Pd(dppf)Cl$_2$ (73 mg, 0.1 mmol), potassium carbonate (276 mg, 2 mmol) and 1-methyl-5-(4,4,5,5-tetramethyl-1,3,2-dioxaborolan-2-yl)pyridine-2(1H)-one (747 mg, 3 mmol). The reaction solution was stirred overnight at 100° C., followed by column chromatography, to provide compound 162 (291 mg, 0.52 mmol), with a yield of 52%. MS: m/z 547 [M+H]$^+$.
$^1$H NMR (400 MHz, d$_6$-DMSO) δ 8.13 (s, 1H), 7.92-7.82 (m, 2H), 7.72 (d, J=8.5 Hz, 1H), 7.33 (dd, J=18.2, 9.1 Hz, 3H), 7.03 (s, 1H), 6.47 (d, J=9.3 Hz, 1H), 5.75 (d, J=9.8 Hz, 1H), 4.33 (s, 1H), 3.51 (s, 3H), 3.43 (d, J=25.9 Hz, 1H), 3.28

(s, 3H), 2.56 (s, 1H), 2.37 (s, 1H), 2.31-2.19 (m, 1H), 2.13 (s, 2H), 2.04 (d, J=10.6 Hz, 3H), 1.79 (s, 2H), 1.45-1.31 (m, 2H), 1.23-1.10 (m, 2H).

Example 163 Synthesis of Compound 2-((S)-1-(3,4-difluorophenyl)-6-oxopiperidine-2-yl)-1-((trans)-4-methoxycyclohexyl)-1H-benzo[d]imidazole-5-nitrile (163)

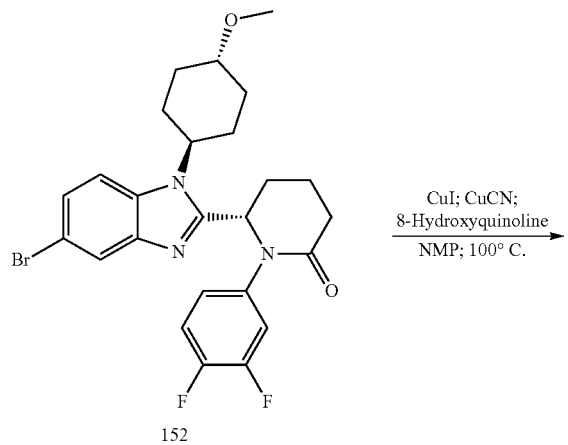

152 (518 mg, 1 mmol) was dissolved in NMP (5 mL), to which were added CuCN (179 mg, 2 mmol), CuI (19 mg, 0.1 mmol) and 8-hydroxyquinoline (28 mg, 0.2 mmol), and then the reaction solution was stirred overnight at 100° C. To the reaction solution, was poured water (25 mL), and the resultant solution was extracted with ethyl acetate. The organic phase was rotatory evaporated to dry, and the residue was purified by column chromatography, to provide 163 (52 mg, 0.11 mmol), with a yield of 11%. MS: m/z 465 [M+H]$^+$.

Example 164 Synthesis of Compound 6-(5-bromo-1-((trans)-4-methoxycyclohexyl)-1H-benzo[d]imidazol-2-yl)-1-(3,4-difluorophenyl)piperidine-2-one (164)

N-(5-bromo-2-(((trans)-4-methoxycyclohexyl)amino)phenyl)-6-oxopiperidine-2-formamide (164-1)

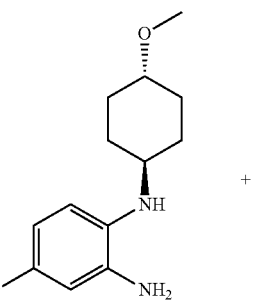

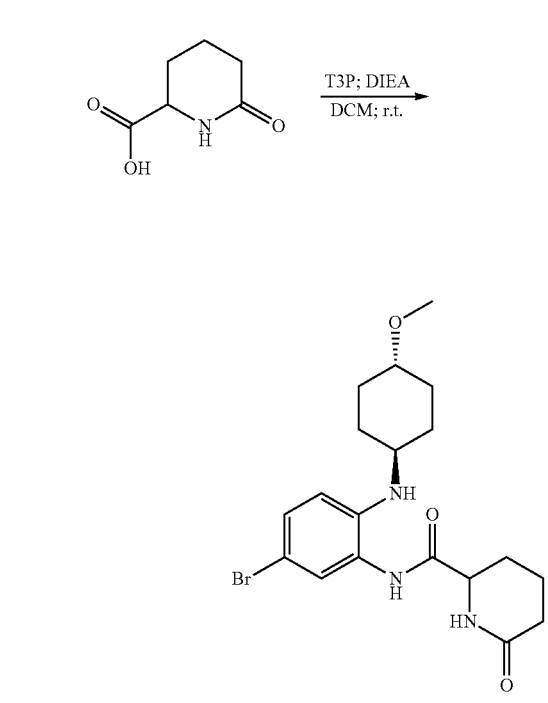

Intermediate 2 (2.98 g, 10 mmol) was dissolved in dichloromethane (30 mL), to which were added 2-piperidone-6-carboxylic acid (1.43 g, 10 mmol), propanephosphonic acid cyclic anhydride (50% in EA, 6.36 g, 10 mmol) and DIEA (1.54 g, 12 mmol). After addition, the reaction solution was stirred overnight at room temperature. The solution was rotatory evaporated to dry, and the residue was purified by column chromatography, to provide 164-1 (3.4 g, 8 mmol), with a yield of 80%.

Synthesis of 6-(5-bromo-1-((trans)-4-methoxycyclo-
hexyl)-1H-benzo[d]imidazol-2-yl)piperidine-2-one
(164-2)

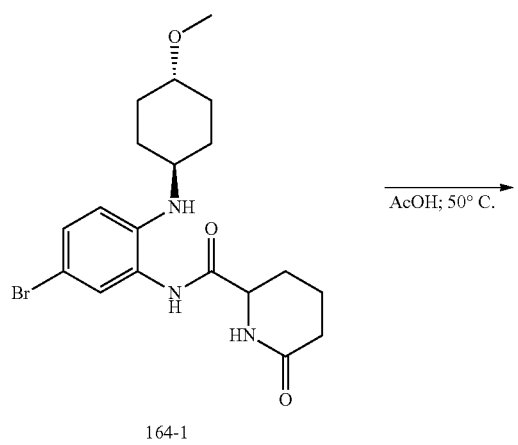

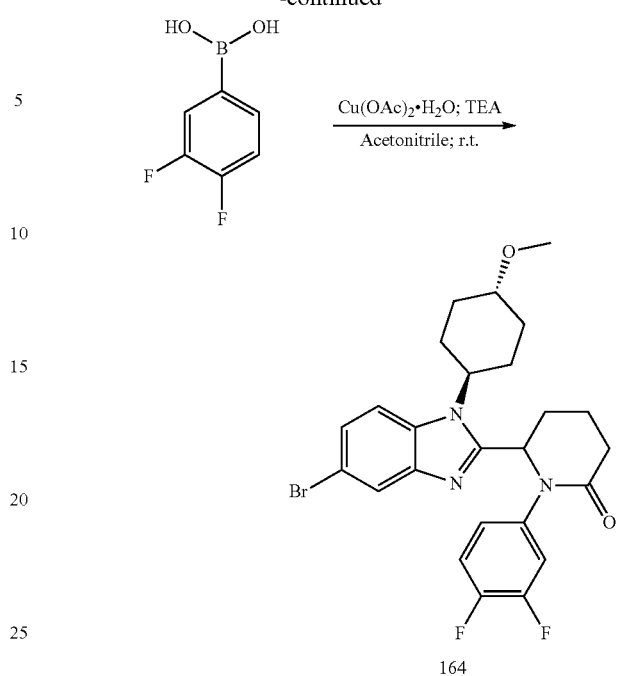

164-1 (3.4 g, 8 mmol) was dissolved in acetic acid (30 mL), and then the reaction solution was stirred for three days at 50° C. The solution was rotatory evaporated to dry, and the residue was dissolved in dichloromethane. The resultant solution was washed with saturated NaHCO₃ solution, dried over anhydrous sodium sulfate, and rotatory evaporated to dry. The residue was purified by column chromatography to obtain 164-2 (1.95 g, 4.8 mmol), with a yield of 60%.

Synthesis of 6-(5-bromo-1-((trans)-4-methoxycyclo-
hexyl)-1H-benzo[d]imidazol-2-yl)-1-(3,4-difluoro-
phenyl)piperidine-2-one (164)

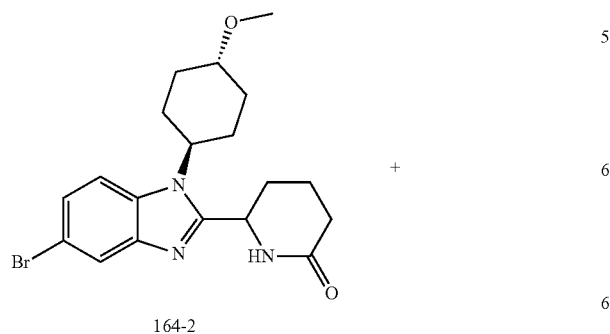

164-2 (1.95 g, 4.8 mmol), 3,4-difluorophenylboronic acid (230 mg, 1.48 mmol), copper acetate monohydrate (1.4 g, 7.2 mmol) and triethylamine (0.48 g, 4.8 mmol) were dissolved in acetonitrile (20 mL), and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide compound 164 (1.99 g, 3.84 mmol), with a yield of 80%. MS: m/z 518 [M+H]⁺.

Example 165 Synthesis of (S)-6-(5-((1-acetylpiperi-
din-4-yl)(methyl) amino)-1-((trans)-4-methoxycy-
clohexyl)-1H-benzo[d]imidazol-2-yl)-1-(3,4-difluo-
rophenyl)piperidine-2-one (Compound 165)

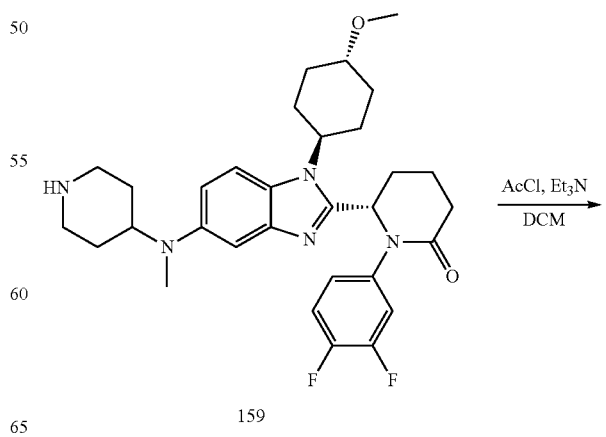

-continued

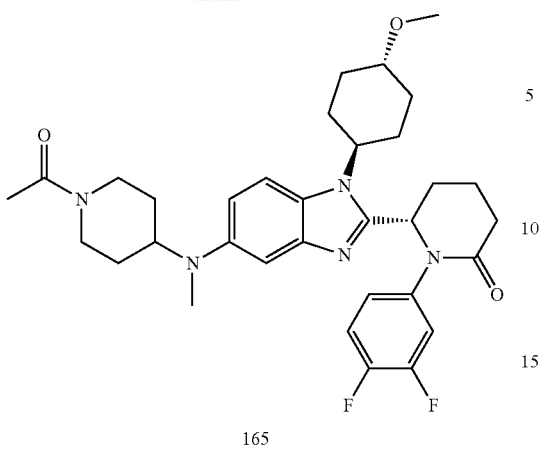

165

Compound 159 (551 mg, 1 mmol) and triethylamine (303 mg, 3 mmol) were dissolved in 20 mL of DCM, to which was slowly added acetyl chloride (120 mg, 1.5 mmol) dropwise, and the mixture was allowed to react for 3 h. The reaction solution was poured to water and extracted with dichloromethane. The organic phase was washed with saturated brine, dried over anhydrous sodium sulfate, and concentrated. The residue was purified by column chromatography to obtain 415 mg of product (compound 165), with a yield of 70%. MS: m/z 594 [M+H]$^+$.

Example 166 Synthesis of Compound N-(2-((S)-1-(3,4-difluorophenyl)-6-oxopiperidine-2-yl)-1-((trans)-4-methoxycyclohexyl)-1H-benzo[d]imidazole-5-yl)methylsulfonamide (166)

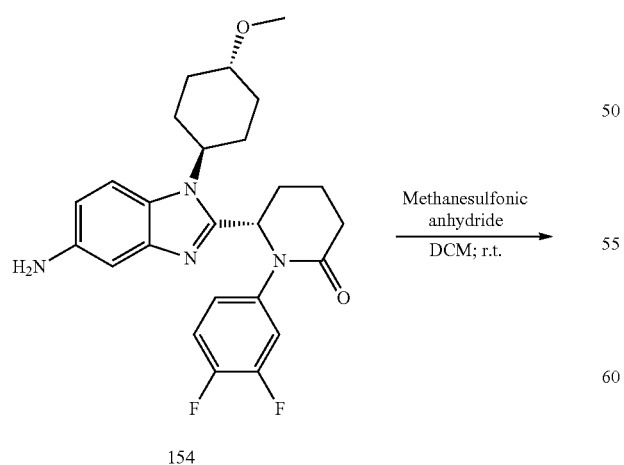

154

-continued

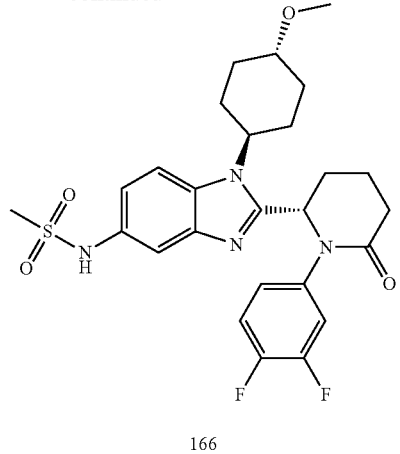

166

154 (20 mg, 0.04 mmol) was dissolved in DCM (0.5 mL), to which was added methanesulfonic anhydride (8 mg, 0.04 mmol), and then the solution was stirred at room temperature for 1 h. The solution was rotatory evaporated to dry, followed by column chromatography, to provide 166 (5 mg, 0.009 mmol), with a yield of 23%. MS: m/z 533 [M+H]$^+$.

Example 167 Synthesis of Compound N-(2-((S)-1-(3,4-difluorophenyl)-6-oxopiperidine-2-yl)-1-((trans)-4-methoxycyclohexyl)-11H-benzo[d]imidazole-5-yl)trifluoromethyl sulfonamide (167)

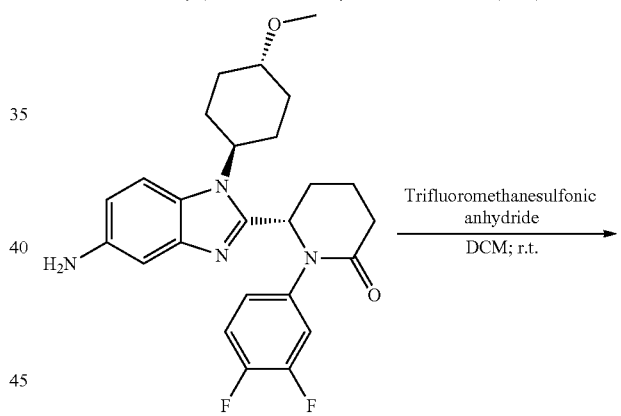

154

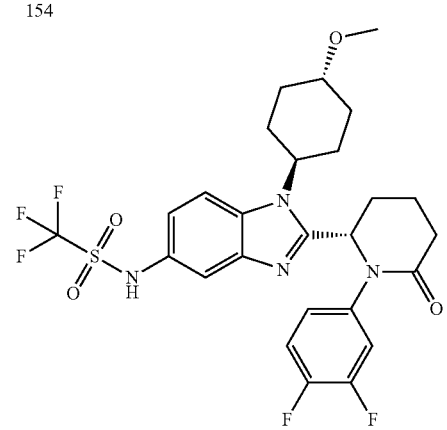

167

154 (20 mg, 0.04 mmol) was dissolved in DCM (0.5 mL), to which was added trifluoromethanesulfonic anhydride (11 mg, 0.04 mmol), and then the solution was stirred at room temperature for 1 h. The solution was rotatory evaporated to dry, followed by column chromatography, to provide 165 (5 mg, 0.008 mmol), with a yield of 21%. MS: m/z 587 [M+H]$^+$.

Example 168 Synthesis of Compound 1-(2-((S)-1-(3,4-difluorophenyl)-6-oxopiperidine-2-yl)-1-((trans)-4-methoxycyclohexyl)-1H-benzo[d]imidazole-5-yl)-3-methylurea (168)

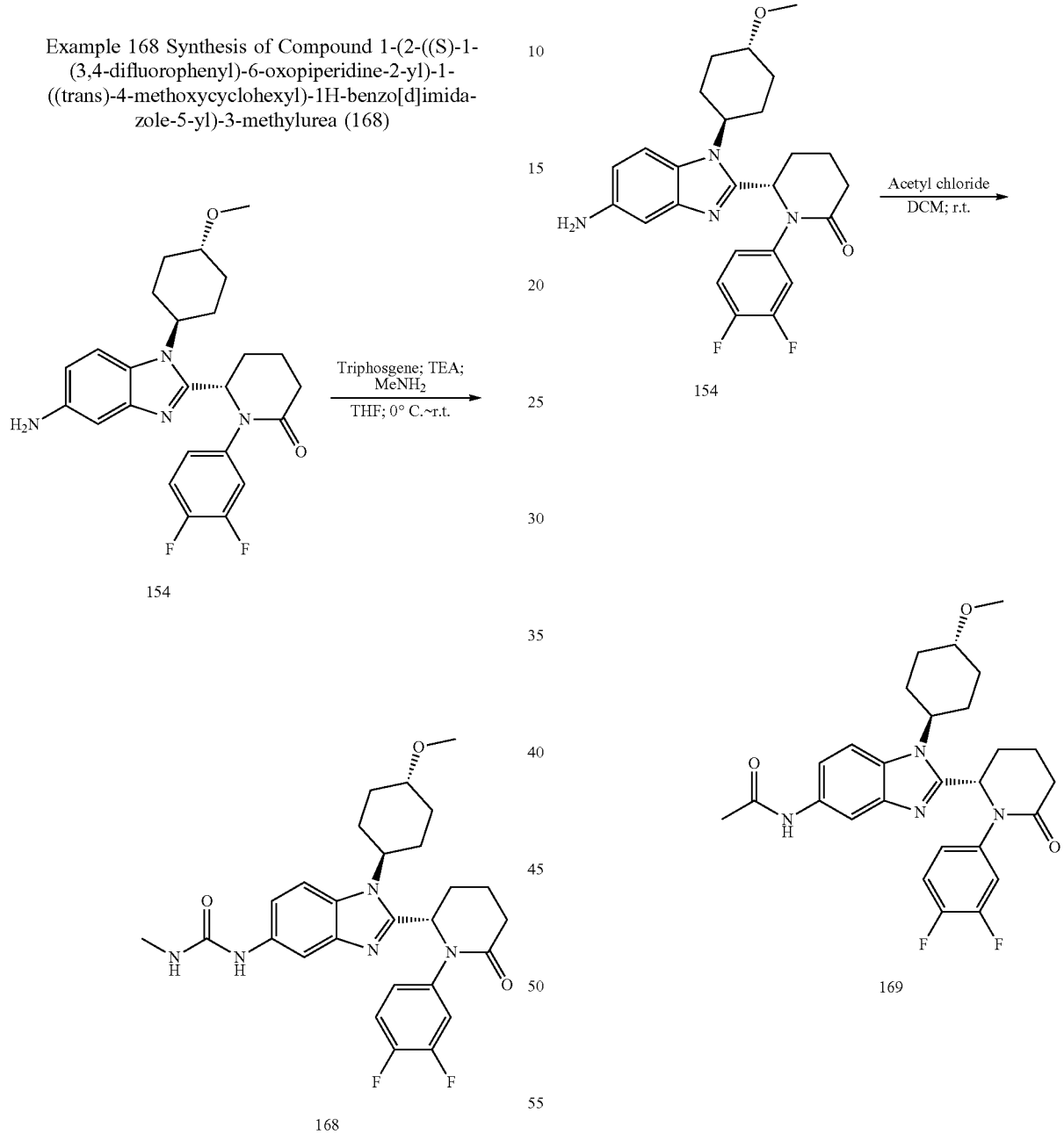

154 (20 mg, 0.04 mmol) was dissolved in THF (0.5 mL), to which was added TEA (8 mg, 0.08 mmol), and then the solution was cooled to 0° C. in an ice-water bath. Triphosgene (5 mg, 0.016 mmol) was added, and the mixture was stirred for 30 min. Then, methylamine hydrochloride (3 mg, 0.04 mmol) was added. The solution was naturally warmed to room temperature and then stirred for 30 min, followed by column chromatography, to provide 168 (15 mg, 0.03 mmol), with a yield of 73%. MS: m/z 512 [M+H]$^+$.

Example 169 Synthesis of Compound N-(2-((S)-1-(3,4-difluorophenyl)-6-oxopiperidine-2-yl)-1-((trans)-4-methoxycyclohexyl)-1H-benzo[d]imidazole-5-yl)acetamide (169)

154 (20 mg, 0.04 mmol) was dissolved in DCM (0.5 mL), to which was added acetyl chloride (3 mg, 0.04 mmol) dropwise at room temperature under stirring, and after addition, the solution was further stirred for 2 h, followed by purification by column chromatography, to obtain 169 (17 mg, 0.03 mmol), with a yield of 86%. MS: m/z 5497 [M+H]$^+$.

Example 170 Synthesis of Compound N-(2-((S)-1-(3,4-difluorophenyl)-6-oxopiperidine-2-yl)-1-((trans)-4-methoxycyclohexyl)-1H-benzo[d]imidazol-5-yl)-2-(dimethylamino)acetamide (170)

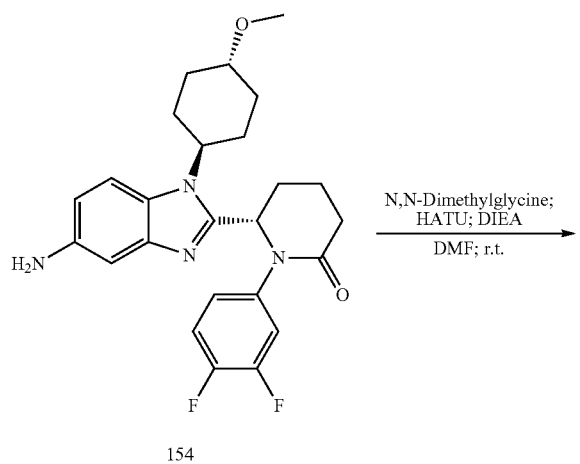

154 (20 mg, 0.04 mmol) was dissolved in DMF (0.5 mL), to which were successively added N,N-dimethylglycine (4 mg, 0.04 mmol), HATU (15 mg, 0.04 mmol) and DIEA (5 mg, 0.04 mmol), and then the mixture was stirred overnight at room temperature. Then, the reaction solution was poured to water (3 mL), and extracted with ethyl acetate, followed by column chromatography to provide 170 (12 mg, 0.02 mmol), with a yield of 50%. MS: m/z 540 [M+H]$^+$.

Example 171 Synthesis of Compound (S)-3-(3,4-difluorophenyl)-4-(5-(3,5-dimethylisoxazol-4-yl)-1-((trans)-4-ethoxycyclohexyl)-1H-benzo[d]imidazol-2-yl)-1,3-oxazinane-2-one (Compound 171)

Synthesis of trans-4-((4-bromo-2-nitrophenyl)amino)cyclohexanol (Intermediate 171-1)

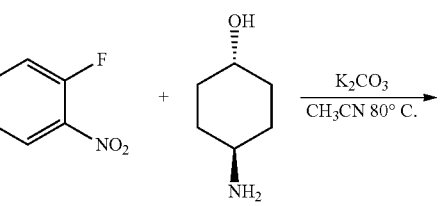

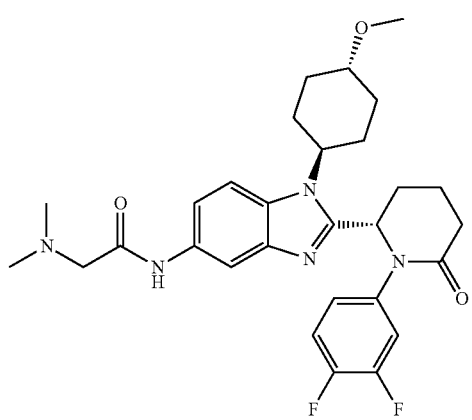

4-Bromo-1-fluoro-2-nitrobenzene (2 g, 9.14 mmol), (trans)-4-aminocyclohexanol (1.26 g, 10.97 mmol) and potassium carbonate (2.6 g, 18.84 mmol) were dissolved in acetonitrile (30 mL), and then the solution was heated to 80° C. and stirred for 5 h. The solution was cooled, to which was added water (100 mL), and then filtered. The filter cake was rinsed with water, and purified by column chromatography to provide 2.4 g solid (intermediate 171-1), with a yield of 83.7%.

Synthesis of 4-bromo-N-((trans)-4-ethoxycyclohexyl)-2-nitroaniline (Intermediate 171-2)

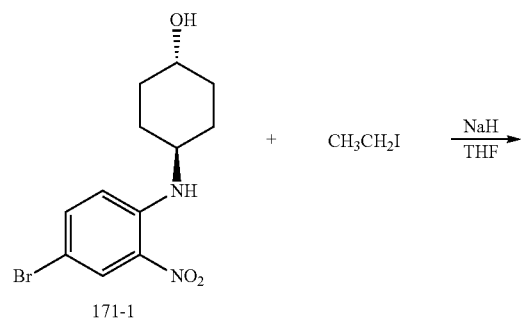

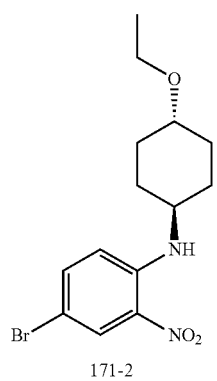

171-2

Intermediate 171-1 (2.4 g, 7.65 mmol) and NaH (0.37 g, 15.42 mmol) were dissolved in 20 mL of tetrahydrofuran, to which was added iodoethane (2.4 g, 15.39 mmol) in an ice bath, and then the solution was allowed to react overnight. The reaction solution was poured to ice-water, and then extracted with ethyl acetate (30 mL×3). The organic phase was washed once with saturated brine (20 mL), dried over anhydrous sodium sulfate, and concentrated. The residue was purified by column chromatography to provide 1.5 g of product (intermediate 171-2), with a yield of 58%.

Synthesis of 4-bromo-N1-((trans)-4-ethoxycyclohexyl)benzene-1,2-diamine (Intermediate 171-3)

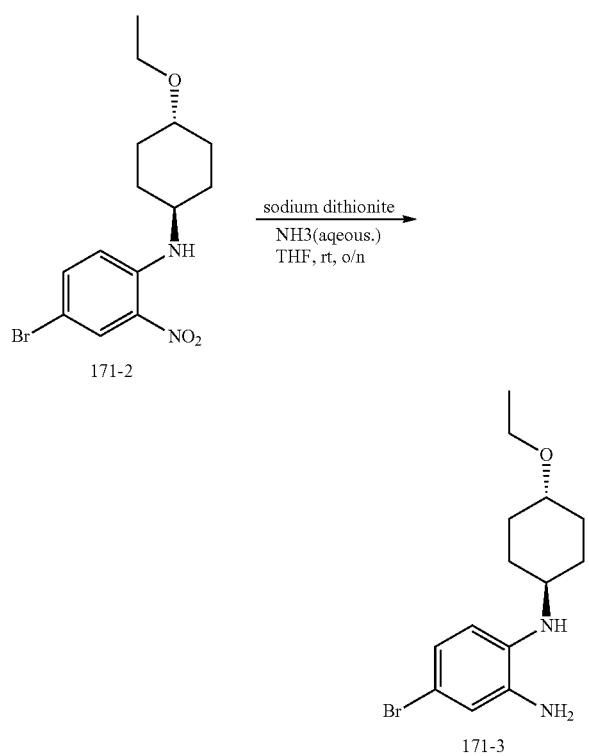

Intermediate 171-2 (1.5 g, 4.38 mmol) and ammonia (3 mL) were dissolved in 20 mL of tetrahydrofuran and 5 mL of water, to which was added sodium dithionite (3.8 g, 21.83 mmol), and then the reaction solution was stirred overnight at room temperature. The solution was allowed to stand for separation of layers. The organic layer was separated, while the aqueous layer was extracted with ethyl acetate (30 mL×2). The organic layers were combined, dried over anhydrous sodium sulfate, and concentrated. The residue was purified by column chromatography, to provide 850 mg of solid (intermediate 171-3), with a yield of 62%.

Synthesis of 4-(3,5-dimethylisoxazol-4-yl)-N1-((trans)-4-ethoxycyclohexyl)benzene-1,2-diamine (Intermediate 171-4)

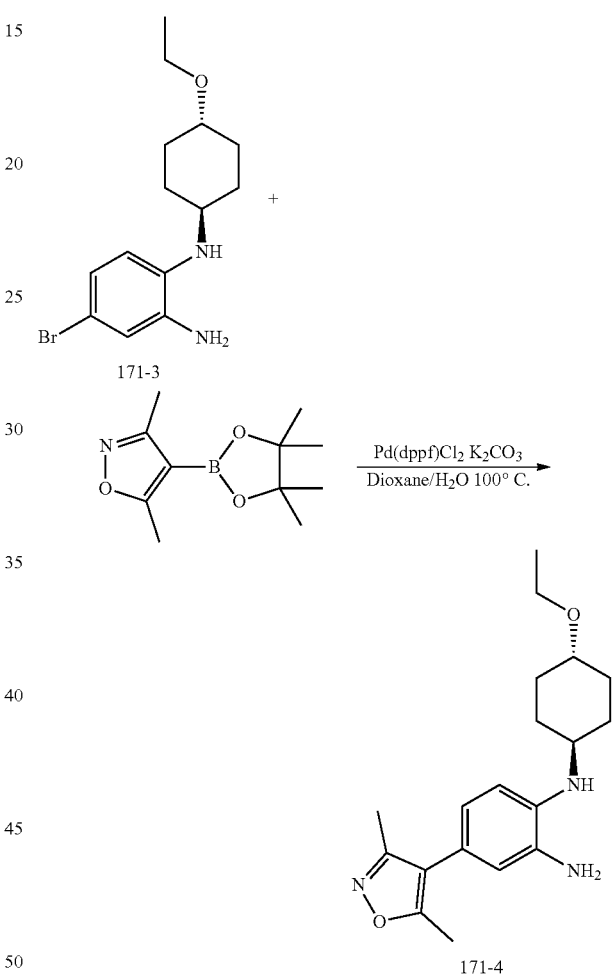

Intermediate 171-3 (850 mg, 2.73 mmol), 3,5-dimethylisoxazole-4-boric acid pinacol ester (923 mg, 4.12 mmol), [1,1'-bis(diphenylphosphino)ferrocene]dichloropalladium (II) (10 mg, 0.014 mmol) and potassium carbonate (753 mg, 5.44 mmol) were dissolved in 30 mL of dioxane and 50 mL of water, and then the system was purged with nitrogen for three times. The reaction solution was stirred for 10 h at 100° C. The solution was cooled and extracted three times with ethyl acetate. The organic layer was dried over anhydrous sodium sulfate, and concentrated. The residue was purified by column chromatography to provide 580 mg of solid (intermediate 171-4), with a yield of 65%.

209
Synthesis of t-butyl ((S)-3-((t-butyldimethylsilyl)oxy)-1-(5-(3,5-dimethylisoxazol-4-yl)-1-((trans)-4-ethoxycyclohexyl)-1H-benzo[d]imidazol-2-yl)propylcarbamate (Intermediate 171-5)

210
Synthesis of (S)-3-amino-3-(5-(3,5-dimethylisoxazol-4-yl)-1-((trans)-4-ethoxycyclohexyl)-1H-benzo[d]imidazol-2-ylpropan-1-ol (Intermediate 171-6)

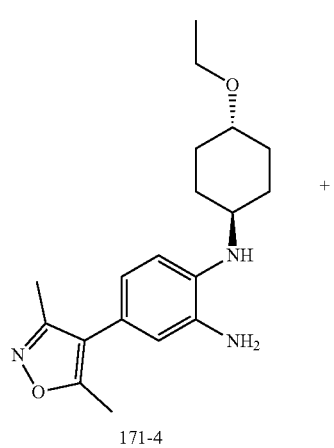

171-4

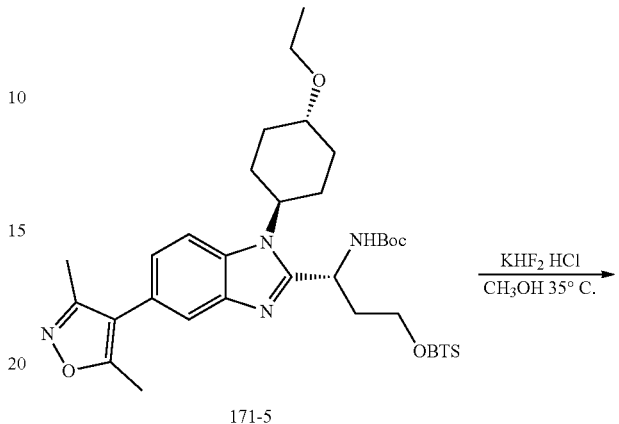

171-5

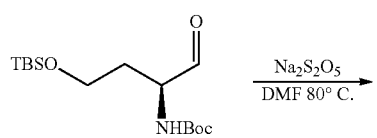

10

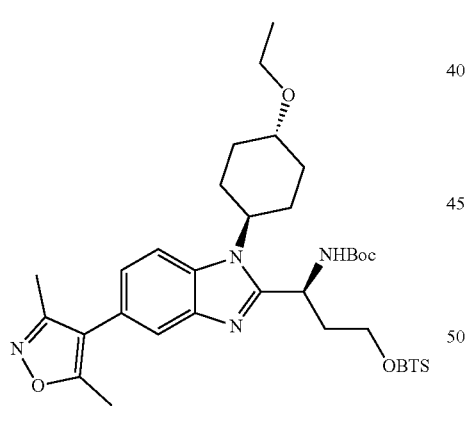

171-5

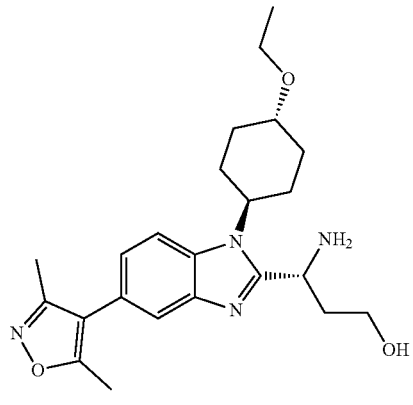

171-6

Intermediate 10 (673 mg, 2.12 mmol) was dissolved in N,N-dimethylformamide (10 mL), to which were added intermediate 171-4 (580 mg, 1.76 mmol) and sodium metabisulfite (670 mg, 3.53 mmol), and then the mixture was allowed to react for 5 h at 80° C. 50 mL of water was added to the reaction solution, and then the solution was extracted with ethyl acetate (30 mL×3). The organic phase was combined, washed once with saturated brine (20 mL), dried over anhydrous sodium sulfate, and concentrated. The residue was purified by column chromatography to obtain 420 mg of product (intermediate 171-5), with a yield of 38.2%.

Intermediate 171-5 (420 mg, 0.67 mmol) and potassium hydrogen difluoride (262 mg, 3.35 mmol) were dissolved in methanol (20 mL), to which was added 5 mL of concentrated HCl, and the reaction solution was allowed to react overnight at 30° C. pH value was adjusted to be 9-10, and then the reaction solution was concentrated and extracted with dichloromethane (30 mL×4). The organic phase was dried over anhydrous sodium sulfate, and concentrated. The residue was purified by column chromatography to provide 200 mg of product (intermediate 171-6), with a yield of 72.5%.

211

Synthesis of (S)-4-(5-(3,5-dimethylisoxazol-4-yl)-1-((trans)-4-ethoxycyclohexyl)-1H-benzo[d]imidazol-2-yl)-1,3-oxadiazine-2-one (Intermediate 171-7)

212

Synthesis of (S)-3-(3,4-difluorophenyl)-4-(5-(3,5-dimethylisoxazol-4-yl)-1-((trans)-4-ethoxycyclohexyl)-1H-benzo[d]imidazol-2-yl)-1,3-oxazinane-2-one (Compound 171)

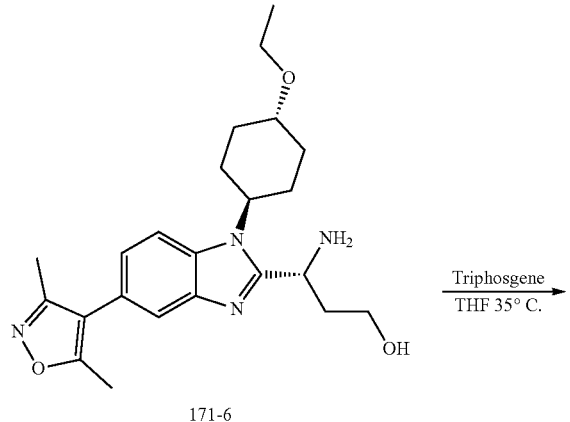

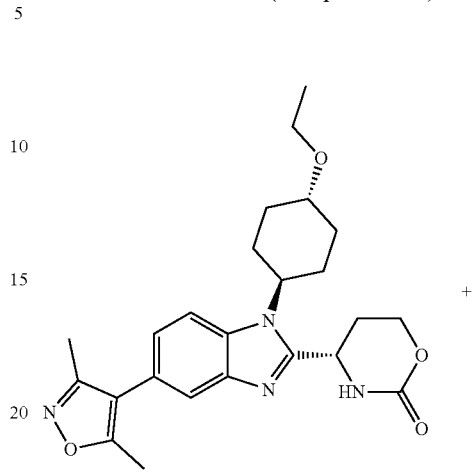

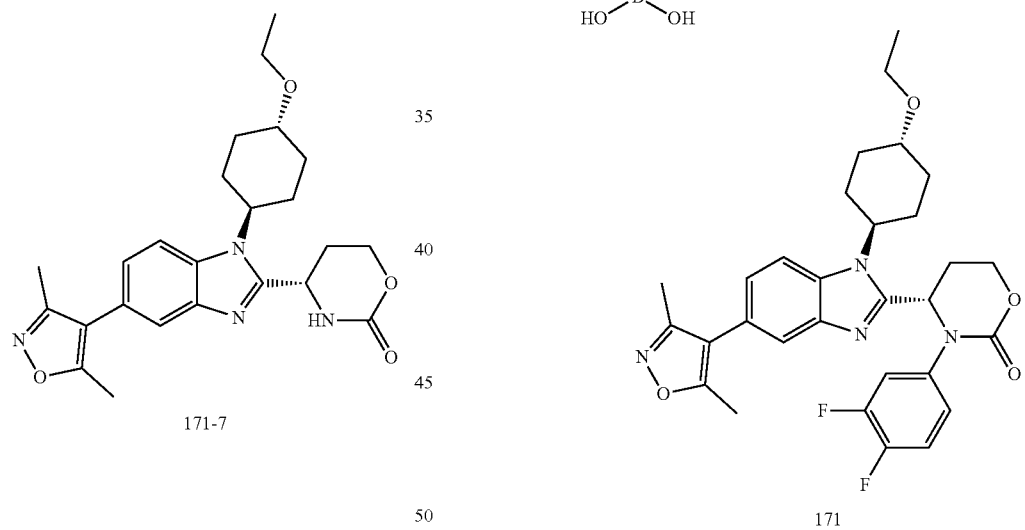

Intermediate 171-6 (200 mg, 0.48 mmol) and triethylamine (97 mg, 0.96 mmol) were dissolved in 60 mL of tetrahydrofuran, to which was added triphosgene (44 mg, 0.15 mmol) in portions, and then the reaction solution was allowed to react for 30 min. The resultant solution was successively washed with water and 1N hydrochloric acid, and then extracted with ethyl acetate. The organic phase was dried over anhydrous sodium sulfate, and concentrated. The residue was purified by column chromatography to obtain 116 mg of product (intermediate 171-7), with a yield of 54.8%.

Intermediate 171-6 (60 mg, 0.14 mmol), 3,4-difluorophenylboronic acid (90 mg, 0.57 mmol), copper acetate monohydrate (60 mg, 0.3 mmol) and triethylamine (30 mg, 0.3 mmol) were dissolved in 20 mL of acetonitrile, and then the mixture was allowed to react overnight at 30° C. The reaction solution was filtered and concentrated. The residue was washed with hydrochloric acid (1N), and then extracted with dichloromethane. The organic phase was dried over anhydrous sodium sulfate, and concentrated. The residue was purified by column chromatography to provide 60 mg of product (compound 171), with a yield of 77.9%. MS: m/z 551 [M+H]$^+$, $^1$H NMR (400 MHz, d$_6$-DMSO) δ 7.81 (d, J=8.5 Hz, 1H), 7.73 (d, J=1.3 Hz, 1H), 7.46 (ddd, J=11.9, 7.4, 2.4 Hz, 1H), 7.37 (dd, J=19.6, 9.1 Hz, 1H), 7.16 (dd, J=8.5, 1.5 Hz, 1H), 7.14-7.07 (m, 1H), 5.82 (s, 1H), 4.58 (t, J=10.0 Hz, 1H)), 4.40-4.28 (m, 2H), 3.49 (q, J=7.0 Hz, 3H), 3.31 (s, 1H), 2.68 (t, J=13.0 Hz, 11H), 2.40 (s, 3H), 2.24 (s, 4H), 2.21 (d, J=3.3 Hz, 11H), 2.17 (d, J=3.0 Hz, 1H), 2.09 (d, J=12.8 Hz, 1H), 2.02 (d, J=12.3 Hz, 1H), 1.84 (d, J=11.8 Hz, 1H), 1.42-1.32 (m, 2H), 1.12 (t, J=7.0 Hz, 3H).

Example 172 Synthesis of Compound (S)-3-(4-chloro-3-fluorophenyl)-4-(5-(3,5-dimethylisoxazol-4-yl)-1-((trans)-4-ethoxycyclohexyl)-1H-benzo[d]imidazol-2-yl)-1,3-oxazinane-2-one (Compound 172)

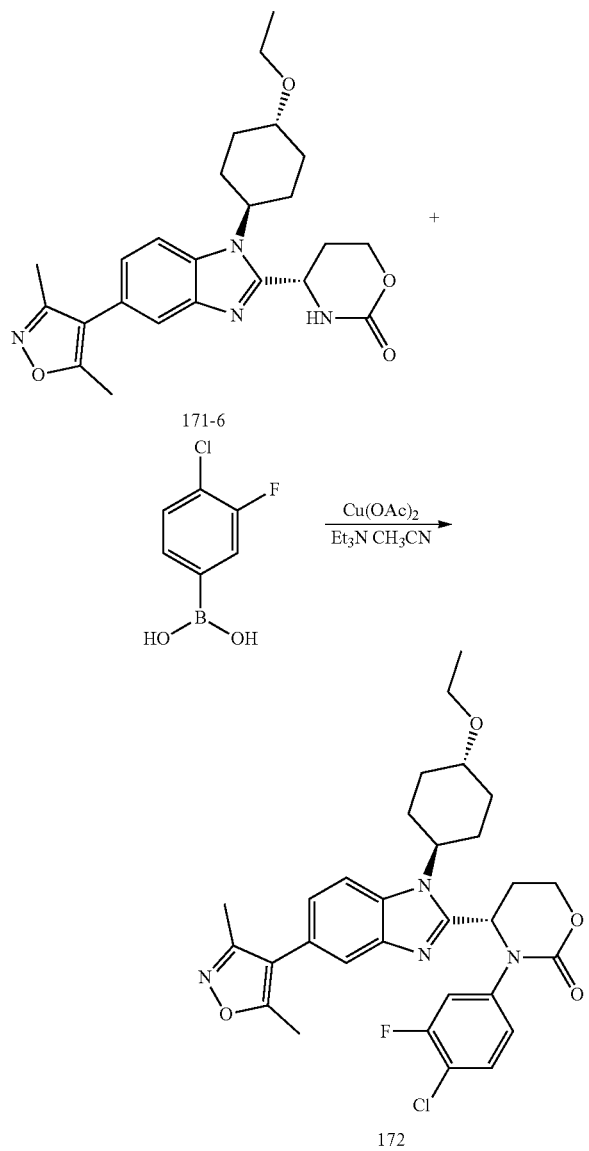

Intermediate 171-6 (56 mg, 0.13 mmol), 4-chloro-3-fluorophenylboric acid (90 mg, 0.52 mmol), copper acetate monohydrate (60 mg, 0.3 mmol) and triethylamine (30 mg, 0.3 mmol) were dissolved in 20 mL of acetonitrile, and then the mixture was allowed to react overnight at 30° C. The reaction solution was filtered and concentrated. The residue was washed with 1N hydrochloric acid, and then extracted with dichloromethane. The organic phase was dried over anhydrous sodium sulfate, and concentrated. The residue was purified by column chromatography to provide 58 mg of product (compound 172), with a yield of 78.8%. MS: m/z 566 [M+H]$^+$, $^1$H NMR (400 MHz, d$_6$-DMSO) δ 7.82 (d, J=8.5 Hz, 1H), 7.72 (d, J=1.3 Hz, 1H), 7.53 (t, J=8.6 Hz, 1H), 7.46 (dd, J=10.8, 2.3 Hz, 1H), 7.26-7.06 (m, 2H), 5.88 (s, 1H), 4.56 (dd, J=11.1, 9.0 Hz, 1H), 4.35 (dd, J=7.1, 3.6 Hz, 2H), 3.49 (q, J=6.9 Hz, 3H), 2.68 (t, J=13.1 Hz, 1H), 2.40 (s, 3H), 2.25 (d, J=16.9 Hz, 4H), 2.21 (s, 1H), 2.18 (s, 1H), 2.10 (d, J=11.8 Hz, 1H), 2.03 (d, J=12.5 Hz, 1H), 1.85 (d, J=11.2 Hz, 1H), 1.37 (d, J=5.7 Hz, 2H), 1.28 (d, J=10.8 Hz, 1H), 1.12 (t, J=7.0 Hz, 3H).

The beneficial effects of the present invention were demonstrated by the following experimental examples.

Experimental Example 1 Investigation of the Inhibitory Activity of Compounds on the Bromodomain (BRD) of CBP/EP300

I. Experimental Method
A. Experimental Method
CBP and EP300AlphaScreen Test:
1. Prepare 1× concentration of test buffer
2. Preparation of compound
The compound was firstly diluted in a ratio of 1:1000 relative to the final concentration using a Precision automatic sampler (by 3× gradient dilution method):
1) 50 μL of compound solution with a storage concentration of 10 mM was transferred to A2 well of a 96-well plate using an Echo automatic sampler.
2) 30 μL of DMSO was transferred to well A1, and wells A3 to A12 with Precision™.
3) 15 μL solution was transferred from A2 to A3 by Precision, and this operation was sequentially repeated until 15 μL solution was transferred from well A10 to well A11. Thus, a 1:3 gradient dilution was completed.
4) The compound plate was centrifuged at a speed of 1000 r/min for one minute.
3. Preparation of test plate
20 nL of solution was transferred from each concentration well of the compound plate to the test plate using an Echo automatic sampler: from well A1 of the preparation plate to wells A1 and A2 of the test plate, and from well A2 of the preparation plate to wells A3 and A4 of the test plate.
4. Binding test of bromodomain (BRD)
1) Preparation of 2-fold solution of protein and polypeptide
The protein and polypeptide were dissolved in a 1× concentration of detection buffer.
2) 10 μL of protein and polypeptide solution was transferred to each well in columns 3 to 24 in the test plate, and 10 μL of 1× test buffer was transferred to wells in columns 1 to 2 in the test plate as negative control.
3) The test plate was centrifuged at a speed of 1000 r/min for one minute.
4) The test plate was incubated at room temperature for 15 min.
5) A 2-fold receptor and donor solution was prepared by dissolving acceptor and donor beads with one-fold test buffer.
6) 2-fold receptor and donor solutions were transferred to the test plate.
15 μL of acceptor and donor solution was added and light was avoided.
7) The test plate was centrifuged at a speed of 1000 r/min for one minute and then incubated at room temperature for 60 min.

5. The Endpoints were Read in EnSpire and Alpha Modes.
6. Curve fitting

The experimental data was entered into an Excel document and the inhibition rate Inh % was calculated using equation (1):

$$\text{Inh \%} = (\text{Max} - \text{Signal})/(\text{Max} - \text{Min}) \times 100 \quad \text{Equation (1):}$$

wherein, Max: control containing DMSO, Min: low control containing DMSO,

The obtained data were entered into the XL-Fit software, and the $IC_{50}$ value was calculated using equation (2):

$$Y = \text{Bottom} + (\text{Top} - \text{Bottom})/(1 + 10^{\wedge}((\text{Log } IC_{50} - X) \times \text{Hill Slope})) \quad \text{Equation (2):}$$

II. Experimental Results

TABLE 1

$IC_{50}$ value of each compound against CBP/EP300 BRD

| Compound No. | CBP BRD $IC_{50}$ (nM) | EP300 BRD $IC_{50}$ (nM) |
|---|---|---|
| 113 | 1.2 | 0.8 |
| 143 | 4.7 | 2.7 |
| 112 | 2.0 | 1.7 |
| 117 | 0.71 | 0.73 |
| 106 | 4.8 | 2.2 |
| 141 | 22 | 9.6 |
| 171 | 1.8 | 2.4 |
| 172 | 2.3 | 2.1 |

As could be seen from the experimental results in Table 1, the compound of the present invention had obvious inhibitory activity on both CBP BRD and EP300 BRD, especially compounds 117, 112, 113, 106, 143, 171 and 172, whose $IC_{50}$ values for CBP BRD were as low as 5.0 nM or less, and whose $IC_{50}$ values for EP300 BRD were as low as 3.0 nM or less.

Experimental Example 2 Inhibitory Effect of the Compound According to the Present Invention on the Proliferation of Prostate Cancer CWR22RV1 Cells 1. Experimental Procedures:
   (1) CWR22RV1 prostate cancer cells were subcultured in cell culture medium, and well-grown cells were inoculated into 96-well plates with 80 μL per well and 1500 cells per well, and then the plate was cultured overnight at 37° C. in a 5% $CO_2$ incubator.
   (2) Drug was prepared as 30 mM of stock solution with dimethylsulfoxide (DMSO). Prior to use, the stock solution was diluted in a ratio of 1:3 with DMSO and then further diluted in a ratio of 1:3 to obtain 9 gradient concentrations. Each concentration of compound was diluted in a ratio of 1:200 with culture medium (to ensure the concentration of DMSO in the culture system was 0.1%). Two wells were set for each concentration. 20 μL of diluted compound solution was added to the cell culture well (with a final concentration of 10 μM, 3.3 μM, 1.1 μM, etc.), and then the plate was gently shaken to mix well. In addition, three negative control wells containing only cells and three blank control wells containing only culture medium (6 wells being each added with DMSO diluted in a ratio of 1:200 using 20 μL of culture medium) were included.

2. Test Results:
   (1) After the plate was cultured for 6 days, 10 μL of CCK-8 was added to each well, and then the plate was continually cultured in a 5% $CO_2$ incubator at 37° C. for 2.5 h.
   (2) The absorbance (OD value) was measured at 450 nm with a microplate reader.
   (3) Data were analyzed using the Dose-response-inhibition equation in the software GraphPad Prisms 6 to obtain $IC_{50}$ values.

3. Experimental Results

For the inhibitory activity on CWR22RV1 cells, the $IC_{50}$ values (nM) of the compounds according to the present invention were shown in Table 2.

A means the $IC_{50}$ value is ≤500 nM; B means the $IC_{50}$ value is >500 nM and ≤2000 nM; and C means the $IC_{50}$ value is >2000 nM.

TABLE 2

The IC50 value of each compound against CWR22RV1 cells

| Compound No. | $IC_{50}$ |
|---|---|
| 113 | A |
| 143 | B |
| 112 | A |
| 117 | A |
| 106 | B |
| 141 | C |
| 171 | B |
| 172 | B |

It could be seen that the compound of the present invention had a significant inhibitory effect on CWR22RV1 prostate cancer cells, especially compounds 112, 113, and 117, with an $IC_{50}$ value of less than 500 nM against CWR22RV1 prostate cancer cells.

Experimental Example 3 Inhibitory Effect of the Compound According to the Present Invention on Proliferation of Other Tumor Cells 1. Experimental Method Using the same method as in Example 2, CWR22RV1 cells were replaced with tumor cells in Table 3, and for the inhibitory activities against these tumor cells, the $IC_{50}$ values (nM) of the compounds according to the present invention were tested and calculated. The results are shown in Table 3.

2. Experimental Results

In table 3, A means the $IC_{50}$ value is ≤500 nM; B means the $IC_{50}$ value is >500 nM and ≤2000 nM.

TABLE 3

The $IC_{50}$ value of each compound against various tumor cells.

| Types of tumor cells | Cell lines | 171 | 172 | 113 | 117 |
|---|---|---|---|---|---|
| Prostate cancer | VCAP | A | A | A | A |
| | LNCAP-AR | A | A | A | A |
| | LNCAP | A | A | A | A |
| Leukemia | MOLM-16 | A | A | A | A |
| Breast cancer | MCF-7 | A | A | A | A |
| Multiple myeloma | OPM-2 | A | A | A | A |

It could be seen that the compound prepared in the present invention had obvious inhibitory effect on proliferation of other prostate cancer cells, leukemia cells, breast cancer cells and multiple myeloma cells. It was shown that the compound of the present invention had an inhibitory effect on various tumors.

Experimental Example 4 Inhibitory Effect of the Compound According to the Present Invention in Combination with CDK4/6 Inhibitor Palbociclib on Proliferation of CWR22RV1 Prostate Cancer Cells 1. Experimental Procedures:

The $IC_{50}$ values (nM) of the compound according to the present invention, palbociclib, and the combination of the compound according to the present invention and palbociclib against the proliferation of CWR22RV1 cells were tested and calculated, and the specific procedures were as follows:
1) CWR22RV1 cells were subcultured in cell culture medium, and well-grown cells were inoculated into 96-well plates with 60 μL per well and 2000 cells per well, and then the plate was cultured overnight at 37° C. in a 5% $CO_2$ incubator.
2) Drug was prepared as 10 mM of stock solution with dimethylsulfoxide (DMSO). Prior to use, the stock solution was diluted in a ratio of 1:3 with DMSO and then further diluted in a ratio of 1:3 to obtain 9 gradient concentrations. Each concentration of compound was diluted in a ratio of 1:200 with culture medium (to ensure the concentration of DMSO in the culture system was 0.1%). Two wells were set for each concentration. 20 μL of diluted compound solution was added to the cell culture well (with a final concentration of 10 μM, 3.3 μM, 1.1 μM, etc.); the stock solution of palbociclib was diluted with the culture medium as 500 nM, 150 nM, 50 nM, 5 nM, respectively, and then 20 μL of diluted palbociclib solution was added to the cell culture well (with a final concentration of 100 nM, 30 nM, 10 nM, 1 nM). The plate was gently shaken to mix well. In addition, three negative control wells containing only cells and three blank control wells containing only culture medium (6 wells being each added with DMSO diluted in a ratio of 1:200 using 20 μL of culture medium) were included.

2. Test Results:
(1) After the plate was cultured for 6 days, 10 μL of CCK-8 was added to each well, and then the plate was continually cultured in a 5% $CO_2$ incubator at 37° C. for 2.5 h.
(2) The absorbance (OD value) was measured at 450 nm with a microplate reader.
(3) Data were analyzed using the Dose-response-inhibition equation in the software GraphPad Prisms 6 to obtain $IC_{50}$ values.

3. Experimental Results

For the inhibitory activity on CWR22RV1 cells, the $IC_{50}$ values (nM) of the compounds according to the present invention were shown in Table 4.

TABLE 4

The $IC_{50}$ value for the combination of the compound and palbociclib against CWR22RV1 cells.

| Compound No. | $IC_{50}$ (nM) |
|---|---|
| 172 | 1500 |
| palbociclib | 100 |

TABLE 4-continued

The $IC_{50}$ value for the combination of the compound and palbociclib against CWR22RV1 cells.

| Compound No. | $IC_{50}$ (nM) |
|---|---|
| 300 nM palbociclib + 172 | <1 |
| 100 nM palbociclib + 172 | <1 |
| 10 nM palbociclib + 172 | 26 |

It could be seen that when compound 172 was administrated alone, its $IC_{50}$ value against CWR22RV1 cells was 1500 nM; when palbociclib was administrated alone, its $IC_{50}$ value against CWR22RV1 cells was 100 nM, however, when compound 172 was administrated in combination with palbociclib, the $IC_{50}$ value of compound 172 against CWR22RV1 cells could be significantly reduced. When compound 172 was administrated in combination with 100-300 nM of palbociclib, the $IC_{50}$ value of compound 172 against CWR22RV1 cells could even be reduced to <1 nM.

It was shown that the combination of compound 172 according to the present invention and palbociclib had a synergistic inhibitory effect on the activity of CWR22RV1 prostate cancer cells.

Experimental Example 5 Inhibitory Effect of the Combination of the Compound According to the Present Invention and CDK4/6 Inhibitor Palbociclib on Proliferation of MCF-7 Breast Cancer Cells 1. Experimental Method Using the same method as in Example 4, CWR22RV1 cells were replaced with MCF-7 cells, and for the inhibitory activities against the proliferation of MCF-7 cells, the $IC_{50}$ values (nM) of the compounds according to the present invention, palbociclib, and the combination of the compound according to the present invention and palbociclib were tested and calculated. The results are shown in Table 5.

2. Experimental Results

TABLE 5

The $IC_{50}$ value for the combination of the compound and palbociclib against MCF-cells.

| Compound No. | $IC_{50}$ (nM) |
|---|---|
| palbociclib | 12800 |
| 172 | 72 |
| 300 nM palbociclib + 172 | 7 |
| 100 nM palbociclib + 172 | 9 |
| 10 nM palbociclib + 172 | 27 |

It could be seen that when compound 172 was administrated alone, its $IC_{50}$ value against MCF-7 cells was 72 nM; when palbociclib was administrated alone, its $IC_{50}$ value against MCF-7 cells was 12800 nM; however, when compound 172 was administrated in combination with palbociclib, the $IC_{50}$ value of compound 172 against MCF-7 cells could be significantly reduced. When compound 172 was administrated in combination with 100-300 nM of palbociclib, the $IC_{50}$ value of compound 172 against MCF-7 cells could even be reduced to <10 nM.

It was indicated that the combination of compound 172 according to the present invention and palbociclib had a synergistic inhibitory effect on the activity of MCF-7 breast cancer cells.

In summary, the present invention provided a new class of compound, which had a high selectivity for EP300/CBP, and could effectively inhibit the activity of EP300/CBP; in addition, the compound of the present invention had an excellent inhibitory effect on various tumor cells including prostate cancer cells, leukemia cells, breast cancer cells and multiple myeloma cells. Thus, the compound of the present invention had broad application prospects in the preparation of an EP300/CBP inhibitor, and drugs for preventing and/or treating tumors, myeloid hematopoietic stem/progenitor cell malignant diseases, and regulating regulatory T cells.

The invention claimed is:

1. A compound of formula III-1, or a deuterated product thereof, or a salt thereof, or a conformational isomer thereof, or a crystal form thereof, or a solvate thereof,

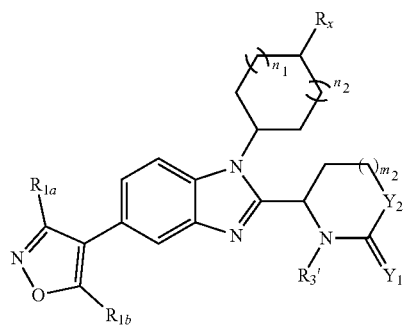

Formula III-1 wherein each of $R_{1a}$ and $R_{1b}$ is independently selected from the group consisting of deuterated or non-deuterated $C_{1-3}$ alkyl;

$n_1$ is 1, and $n_2$ is 1;

$m_2$ is 1;

$Y_1$ is O;

$Y_2$ is O;

$R_x$ is selected from the group consisting of deuterated or non-deuterated $C_{1-2}$ alkoxy;

$R_3'$ is a phenyl with no substituent or a phenyl substituted with 1, 2, or 3 $R_{3a}$; and $R_{3a}$ is selected from the group consisting of halogen, methyl, methoxy, and cyano.

2. The compound according to claim 1, or the deuterated product thereof, or the salt thereof, wherein $R_3'$ is a phenyl substituted with 2 or 3 $R_{3a}$ and said halogen is fluorine, chlorine, or bromine.

3. The compound according to claim 1, or the deuterated product thereof, or the salt thereof, wherein the compound is of formula III-3:

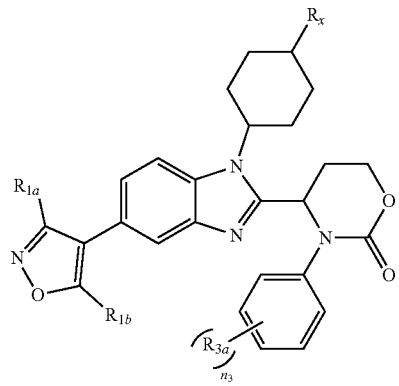

Formula III-3 wherein each of $R_{1a}$ and $R_{1b}$ is independently selected from the group consisting of deuterated or non-deuterated $C_{1-3}$ alkyl;

$R_x$ is selected from the group consisting of deuterated or non-deuterated $C_{1-2}$ alkoxy;

$n_3$ is 2 or 3; and $R_{3a}$ is halogen.

4. The compound according to claim 3, or the deuterated product thereof, or the salt thereof, wherein $n_3$ is 2 and said halogen is fluorine, chlorine, or bromine.

5. The compound according to claim 1, or the deuterated product thereof, or the salt thereof, wherein said compound is selected from the group consisting of:

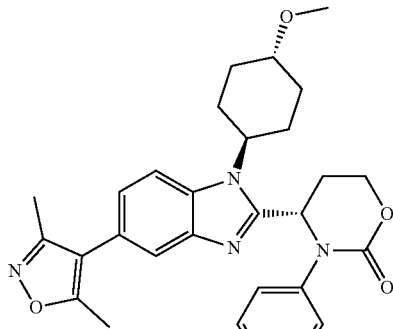

116

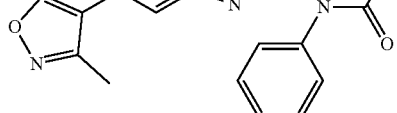

117

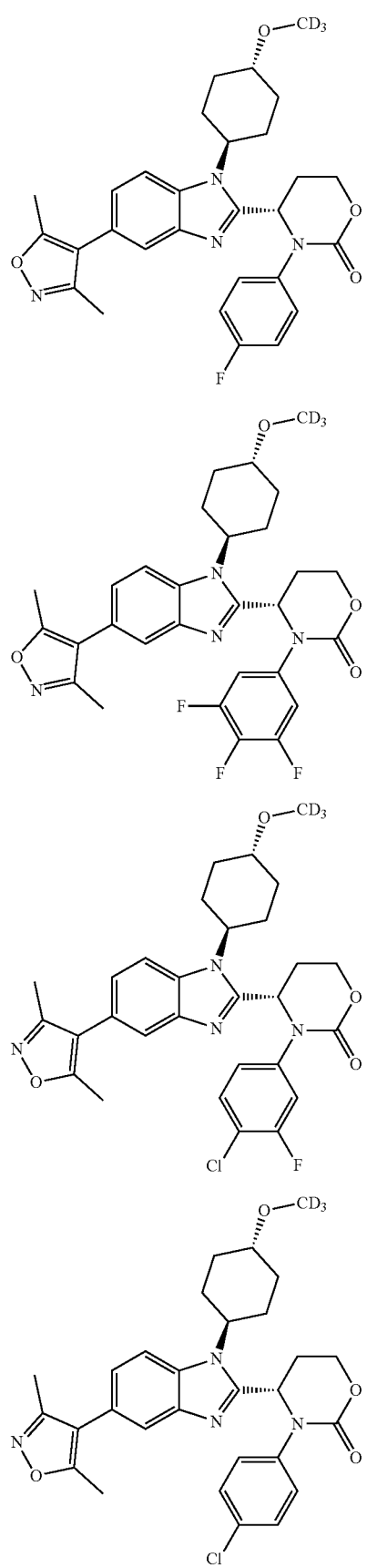
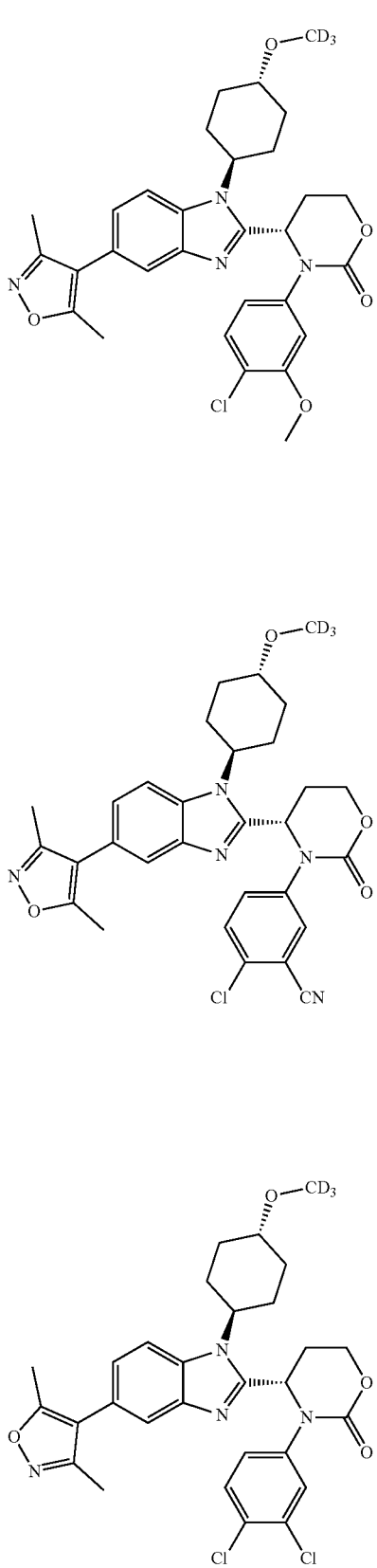

129 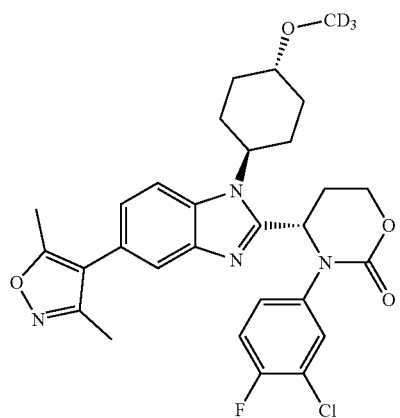
130 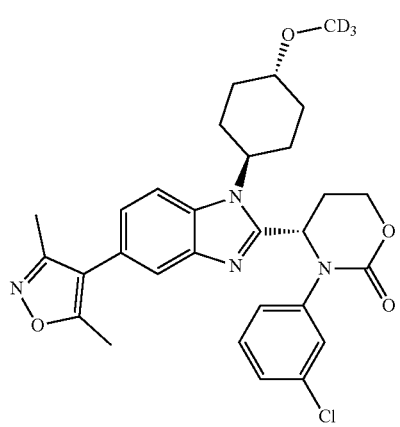
132 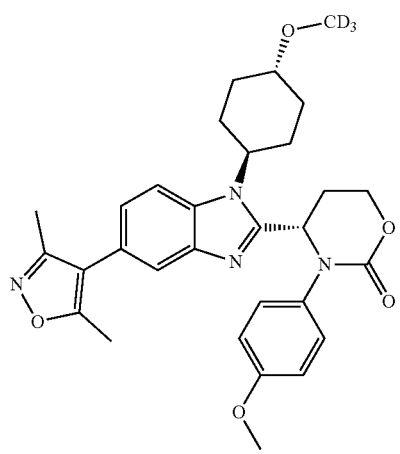
133 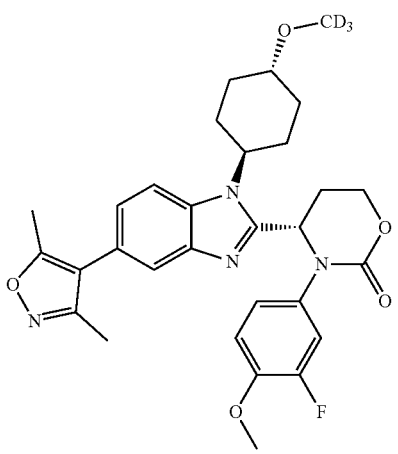
134 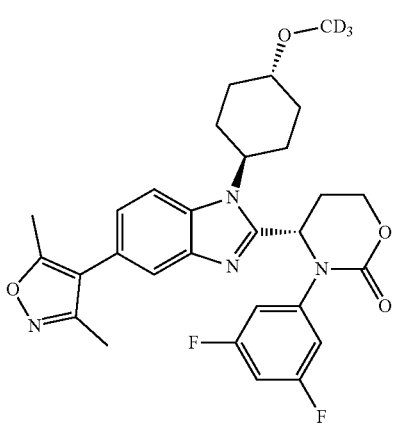
135 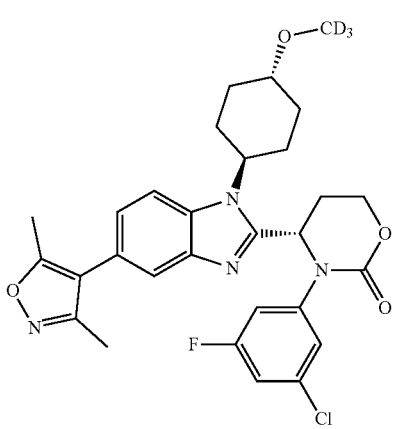

136
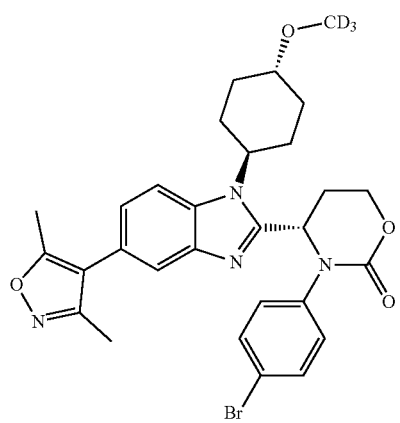
137
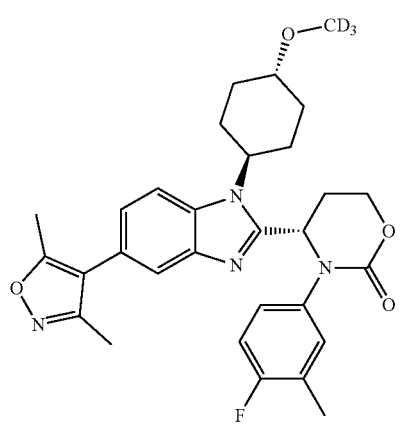
171
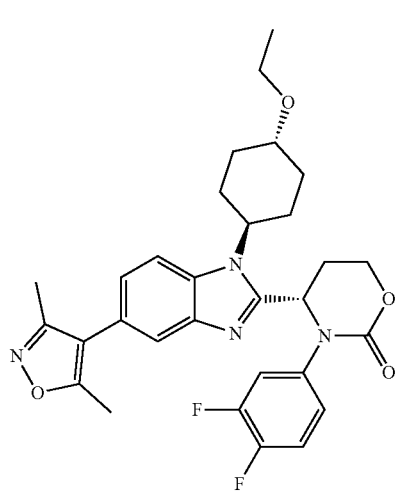
172
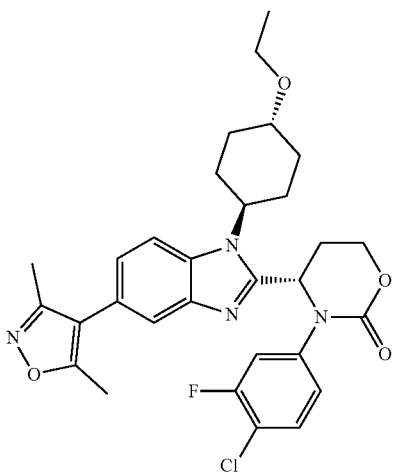
113
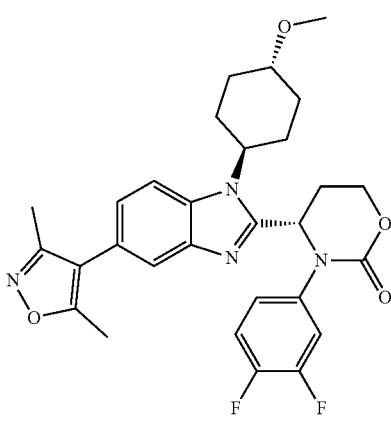
114

-continued

115

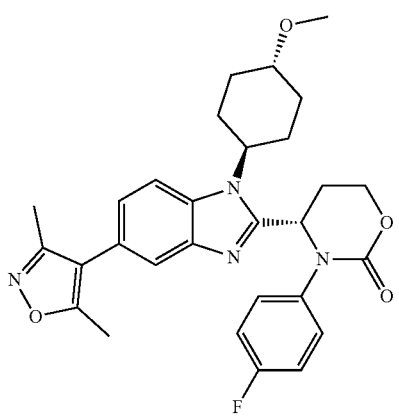

118

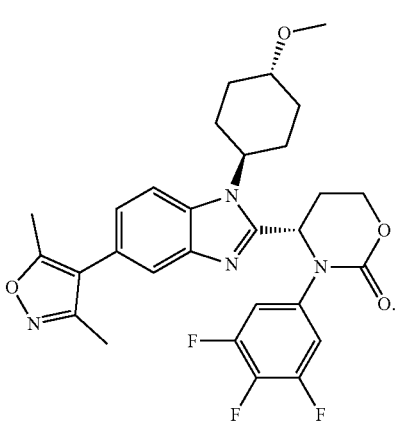

6. A medicament for the treatment of prostate cancer, wherein said medicament is a preparation comprising the compound according to claim 1, or the deuterated product thereof, or the salt thereof as active ingredient, in combination with a pharmaceutically acceptable excipient.

7. A pharmaceutical composition, comprising a same or different dosage unit of the compound according to claim 1, or the deuterated product thereof, or the salt thereof, and a medicament having antitumor effects for simultaneous or separate administration, in combination with a pharmaceutically acceptable carrier.

8. The pharmaceutical composition according to claim 7, wherein the medicament having anti-tumor effects is a chemotherapeutic drug or a radiotherapeutic drug.

9. The pharmaceutical composition according to claim 7, wherein the medicament having anti-tumor effects is one or more selected from the group consisting of CDK4/6 inhibitors, PARP inhibitors, androgen receptor inhibitors, and immune checkpoint inhibitors.

10. The pharmaceutical composition according to claim 9, wherein said CDK4/6 inhibitor is palbociclib.

11. A compound of formula IV, or a deuterated product thereof, or a salt thereof, Formula IV

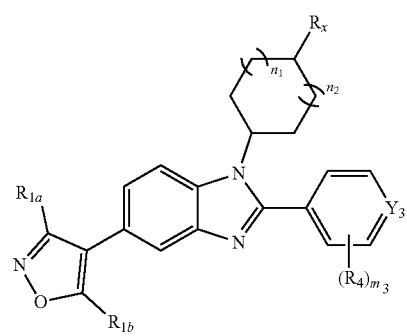

wherein each of $R_{1a}$ and $R_{1b}$ is independently selected from the group consisting of deuterated or non-deuterated $C_{1-3}$ alkyl;

$R_x$ is selected from the group consisting of deuterated or non-deuterated $C_{1-3}$ alkoxy;

$n_1$ is 0 or 1, and $n_2$ is 0 or 1;

$Y_3$ is CH;

$m_3$ is selected from an integer of 0 to 3;

each $R_4$ is independently selected from the group consisting of $C_{1-3}$ alkoxy, unsubstituted phenyl, and phenyl substituted by one or more halogens.

12. The compound according to claim 11, or the deuterated product thereof, or the salt thereof, wherein $m_3$ is 2 or 3.

13. The compound according to claim 12, or the deuterated product thereof, or the salt thereof, wherein the compound is

141

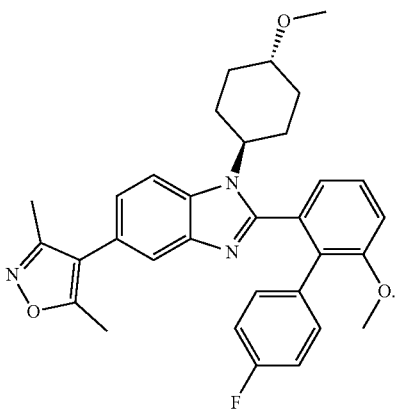

14. A medicament, wherein said medicament is a preparation comprising the compound according to claim 11, or the deuterated product thereof, or the salt thereof as active ingredient, in combination with a pharmaceutically acceptable excipient.

15. A pharmaceutical composition, comprising a same or different dosage unit of the compound according to claim 11, or the deuterated product thereof, or the salt thereof, and a medicament having antitumor effects for simultaneous or separate administration, in combination with a pharmaceutically acceptable carrier.

16. The pharmaceutical composition according to claim 15, wherein the medicament having anti-tumor effects is a chemotherapeutic drug or a radiotherapeutic drug.

17. The pharmaceutical composition according to claim 15, wherein the medicament having anti-tumor effects is one or more selected from the group consisting of CDK4/6 inhibitors, PARP inhibitors, androgen receptor inhibitors, and immune checkpoint inhibitors.

18. The pharmaceutical composition according to claim 17, wherein the CDK4/6 inhibitor is palbociclib.

* * * * *